US005625870A

United States Patent [19]

Moon

[11] Patent Number: 5,625,870

[45] Date of Patent: Apr. 29, 1997

[54] FRAUD CONTROL FOR RADIO FLEETS IN A LAND MOBILE RADIO SYSTEM

[75] Inventor: Billy G. Moon, Southlake, Tex.

[73] Assignee: Uniden America Corporation, Ft. Worth, Tex.

[21] Appl. No.: 258,237

[22] Filed: Jun. 10, 1994

[51] Int. Cl.$^6$ .......................... H04B 7/00

[52] U.S. Cl. .......................... 455/33.1; 455/34.1; 455/54.1; 455/67.1; 379/63

[58] Field of Search .......................... 455/9, 15, 17, 455/33.1, 34.1, 34.2, 54.1, 54.2, 67.1; 379/58, 63, 59; 340/825.31, 825.34

[56] References Cited

U.S. PATENT DOCUMENTS

| | | | |
|---|---|---|---|
| 4,092,600 | 5/1978 | Zimmerman et al. . | |
| 4,578,815 | 3/1986 | Persinotti . | |
| 4,612,415 | 9/1986 | Zdunek et al. . | |
| 4,670,905 | 6/1987 | Sandros et al. . | |
| 4,692,945 | 9/1987 | Zdunek . | |
| 4,701,944 | 10/1987 | Howard et al. . | |
| 4,831,373 | 5/1989 | Hess . | |
| 4,992,783 | 2/1991 | Zdunek et al. | 340/825.34 |
| 5,040,237 | 8/1991 | Barnes et al. | 455/9 |
| 5,054,068 | 10/1991 | Hess et al. | 455/33.1 |
| 5,239,294 | 8/1993 | Flanders et al. | 340/825.34 |
| 5,274,368 | 12/1993 | Breeden et al. | 340/825.31 |

*Primary Examiner*—Andrew Faile
*Attorney, Agent, or Firm*—Sidley & Austin

[57] ABSTRACT

A land mobile radio communication system has a plurality of cell sites, each of which typically has a plurality of repeaters. The over-the-air radio communications between the cell site repeaters and the mobile radios in the system include both a voice component and a data component. The data component is carried as low-frequency subaudible information. Communication channels are provided between the radio users at each site as well as between users at different sites and between mobile radio users and the public telephone network. Within a cell site, the transmitted and received communicatios are digitized and passed through serial buses in a time multiplex fashion. The digitized voice is transferred between time slots to provide the required switching function. The system includes operational software to provide direct inward dial telephone number recognition, automatic voice prompts for a user entering a new cell, call priority override, fraud control for radio fleets and a dynamic control channel.

2 Claims, 33 Drawing Sheets

REPEATER INTERFACE CARD

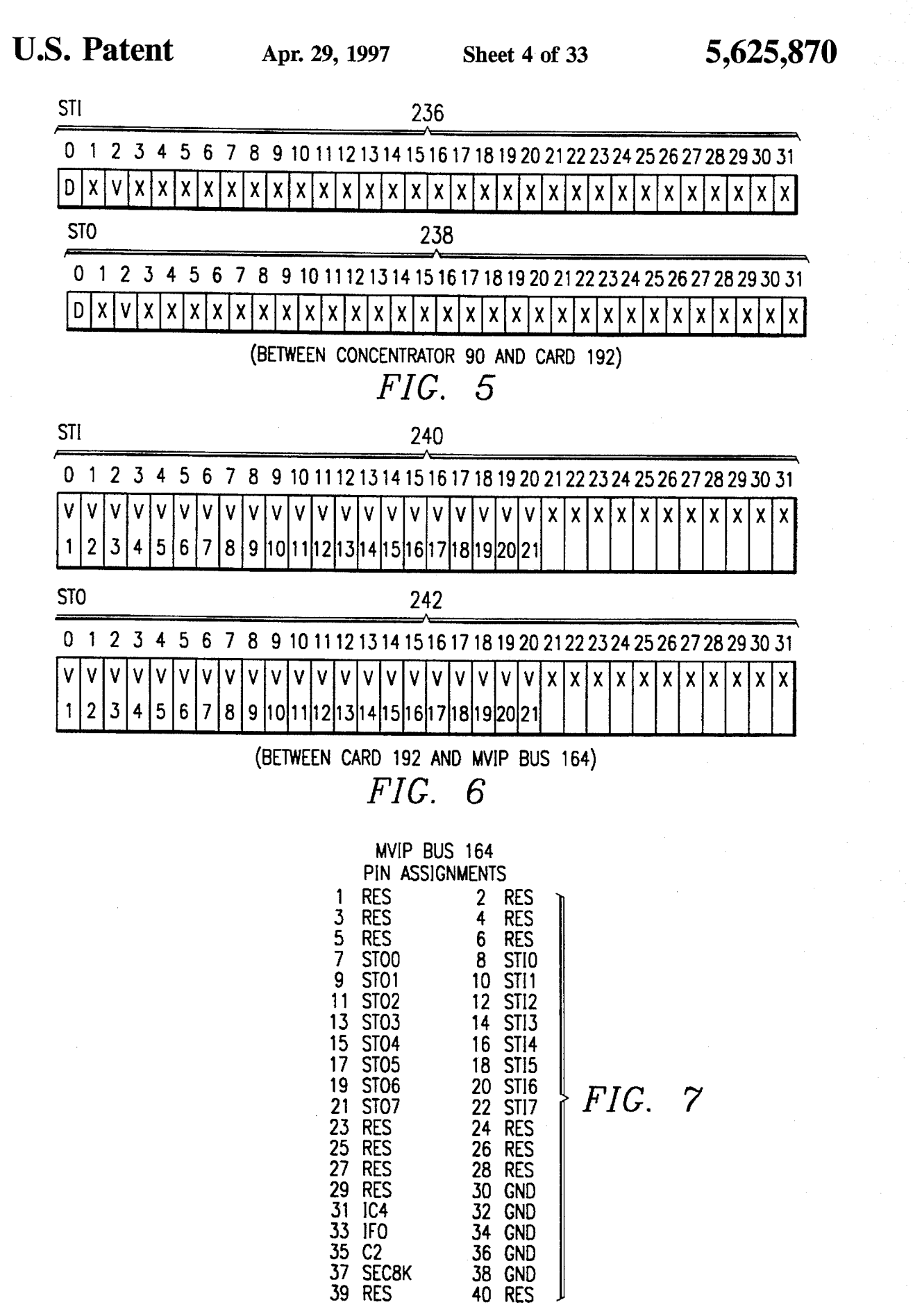

STI 236

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| D | X | V | X | X | X | X | X | X | X | X | X | X | X | X | X | X | X | X | X | X | X | X | X | X | X | X | X | X | X | X | X |

STO 238

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| D | X | V | X | X | X | X | X | X | X | X | X | X | X | X | X | X | X | X | X | X | X | X | X | X | X | X | X | X | X | X | X |

(BETWEEN CONCENTRATOR 90 AND CARD 192)

*FIG. 5*

STI 240

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| V<br>1 | V<br>2 | V<br>3 | V<br>4 | V<br>5 | V<br>6 | V<br>7 | V<br>8 | V<br>9 | V<br>10 | V<br>11 | V<br>12 | V<br>13 | V<br>14 | V<br>15 | V<br>16 | V<br>17 | V<br>18 | V<br>19 | V<br>20 | V<br>21 | X | X | X | X | X | X | X | X | X | X | X |

STO 242

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| V<br>1 | V<br>2 | V<br>3 | V<br>4 | V<br>5 | V<br>6 | V<br>7 | V<br>8 | V<br>9 | V<br>10 | V<br>11 | V<br>12 | V<br>13 | V<br>14 | V<br>15 | V<br>16 | V<br>17 | V<br>18 | V<br>19 | V<br>20 | V<br>21 | X | X | X | X | X | X | X | X | X | X | X |

(BETWEEN CARD 192 AND MVIP BUS 164)

*FIG. 6*

MVIP BUS 164
PIN ASSIGNMENTS

| | | | |
|---|---|---|---|
| 1 | RES | 2 | RES |
| 3 | RES | 4 | RES |
| 5 | RES | 6 | RES |
| 7 | STO0 | 8 | STI0 |
| 9 | STO1 | 10 | STI1 |
| 11 | STO2 | 12 | STI2 |
| 13 | STO3 | 14 | STI3 |
| 15 | STO4 | 16 | STI4 |
| 17 | STO5 | 18 | STI5 |
| 19 | STO6 | 20 | STI6 |
| 21 | STO7 | 22 | STI7 |
| 23 | RES | 24 | RES |
| 25 | RES | 26 | RES |
| 27 | RES | 28 | RES |
| 29 | RES | 30 | GND |
| 31 | IC4 | 32 | GND |
| 33 | IFO | 34 | GND |
| 35 | C2 | 36 | GND |
| 37 | SEC8K | 38 | GND |
| 39 | RES | 40 | RES |

LTR REPEATER FRAME

| 9 SYNC | 1 AREA | 5 GOTO | 5 HOME | 8 ID | 5 FREE | 7 PARITY |
|---|---|---|---|---|---|---|
| 362 | 364 | 366 | 368 | 370 | 372 | 374 |

376

LTR RADIO FRAME

| 9 SYNC | 1 AREA | 5 IN USE | 5 HOME | 8 ID | 5 PASS | 7 PARITY |
|---|---|---|---|---|---|---|
| 378 | 380 | 382 | 384 | 386 | 388 | 390 |

392

ESAS FRAME

| 9 SYNC | 3 CMD | 21 DATA | 7 PARITY |
|---|---|---|---|
| 394 | 396 | 398 | 400 |

FIG. 19H
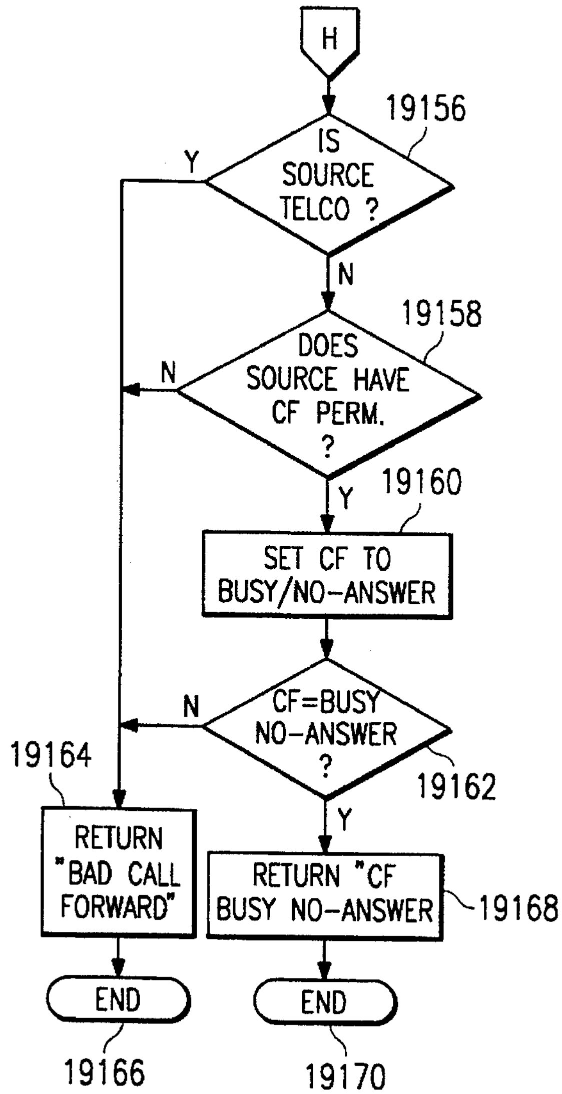
FIG. 19I
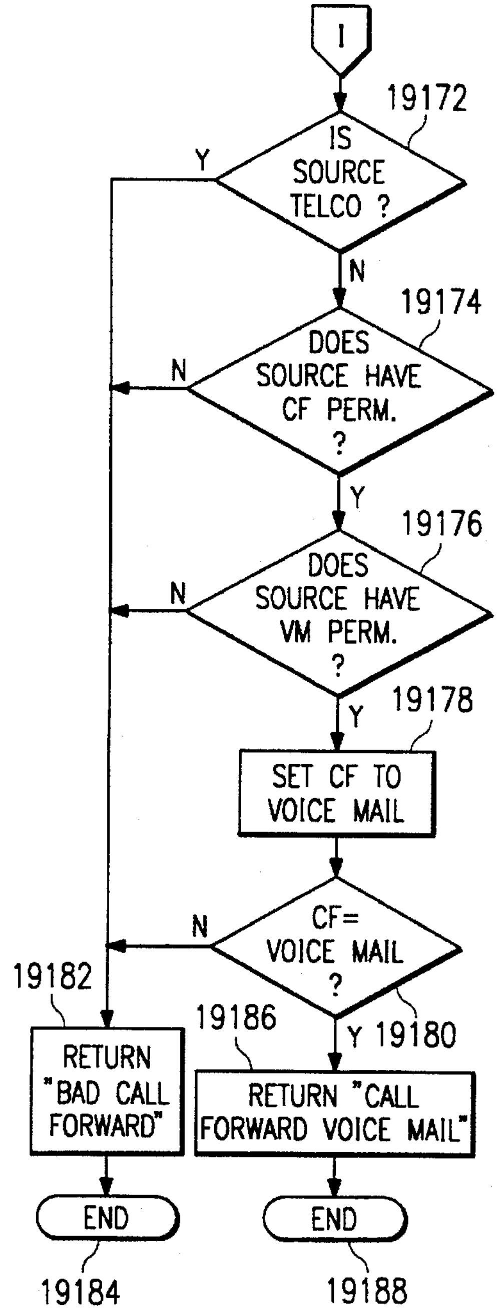
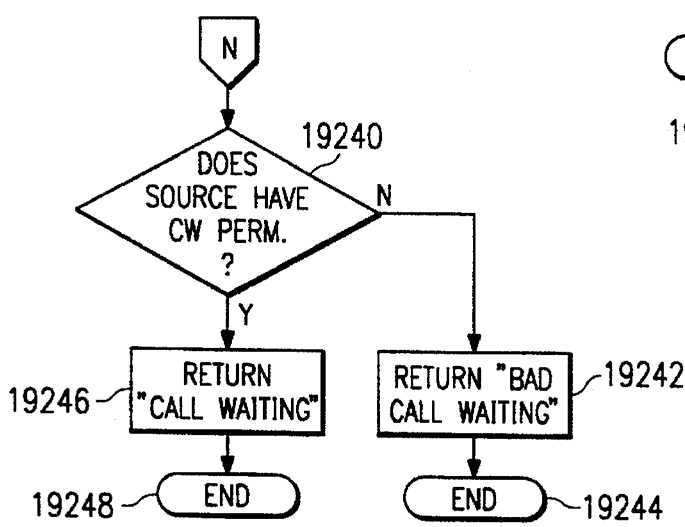
FIG. 19N

DYNAMIC LOADING-DATA STRUCTURE

USER CUSTOM CALLING DATA STRUCTURE

2500

| | | |
|---|---|---|
| 2502 | NUMBER | [8] |
| 2504 | UID | [32] |
| 2506 | CALL FORWARD TYPE | [8] |
| 2508 | CALL FORWARD DESTINATION | [8] |
| 2510 | PASSWORD | [8] |
| 2512 | CALL FORWARD NUMBER | [8] |
| 2514 | LAST NUMBER | [8] |
| 2516 | CREDIT CARD NUMBER | [8] |
| 2518 | AUTO CONNECT NUMBER | [8] |

FIG. 25

DID INFORMATION DATA STRUCTURE

2600

| | | |
|---|---|---|
| 2602 | ENABLED | Y/N |
| 2604 | TRANSLATION | [ ] |
| 2606 | EXTENSION | [ ] |

FIG. 26

ROAMING DATA STRUCTURE

2800

| | | |
|---|---|---|
| 2802 | UID (OF TRACKED RADIO) | [32] |
| 2804 | CURRENT CELL LOCATION | [32] |
| 2806 | ROAMING COUNT | [8] |
| 2808 | PERMISSION BITS | [32] |
| 2810 | MASKED PERMISSION | [32] |
| 2812 | TIME OF LAST UPDATE | [ ] |
| 2814 | STATUS OF RECORD | [8] |

FIG. 28

CELL LIST

2900

| | | |
|---|---|---|
| 2902 | ENABLED | Y/N |
| 2904 | RANGE-FROM | [ ] |
| 2906 | RANGE-TO | [ ] |
| 2908 | VOICE DIALING STRING | [ ] |
| 2910 | VOICE DWELL TIME | [ ] |

FIG. 29

NETWORK CUSTOM CALLING DATA STRUCTURE

3000

| | | |
|---|---|---|
| 3002 | TRANSACTION | [32] |
| 3004 | SPEED DIAL | [8] |
| 3006 | SPEED DIAL PROGRAM | [8] |
| 3008 | FIRST SLOT | [16] |
| 3010 | LAST SLOT | [16] |
| 3012 | LAST NUMBER REDIAL | [8] |
| 3014 | CALL FORWARD PROGRAM | [8] |
| 3016 | CALL FORWARD ALWAYS | [8] |
| 3018 | CALL FORWARD BUSY/NO ANS. | [8] |
| 3020 | CALL FORWARD VOICE MAIL | [8] |
| 3022 | CALL FORWARD PAGER | [8] |
| 3024 | RECORD GREETING | [8] |
| 3026 | PLAY GREETING | [8] |
| 3028 | CHECK MESSAGE | [8] |
| 3030 | ERASE MESSAGE | [8] |
| 3032 | PLAY NEXT | [8] |
| 3034 | PLAY PREVIOUS | [8] |
| 3036 | PLAY FASTER | [8] |
| 3038 | PLAY SLOWER | [8] |
| 3040 | VOLUME UP | [8] |
| 3042 | VOLUME DOWN | [8] |
| 3044 | CALL TRANSFER | [8] |
| 3046 | CALL WAITING | [8] |
| 3048 | HANG UP | [8] |
| 3050 | CTRUNK RADIO CALL | [8] |
| 3052 | TTRUNK RADIO CALL | [8] |
| 3054 | TOT FIRST DIGIT | [16] |
| 3056 | TOT NECT DIGIT | [16] |
| 3058 | SEND PAGE | [8] |
| 3060 | INACTIVITY TIMER | [16] |
| 3062 | NO ANSWER TIMER | [16] |
| 3064 | CONTACT TIMER | [16] |

*FIG. 30*

FRAUD CONTROL FOR RADIO FLEETS IN A LAND MOBILE RADIO SYSTEM

TECHNICAL FIELD

The present invention pertains in general to land mobile radio communication systems and in particular to such systems having trunks between cell sites and interconnections to the public switched telephone network.

BACKGROUND OF THE INVENTION

Mobile radio communications originally involved the communications directly from one mobile radio to a second mobile radio. It was quickly realized that the range of communications was limited by virtue of the low antenna heights and antenna gains associated with mobile radios. A repeater was devised as a radio transmitter and receiver which could be mounted with an antenna at a higher elevation thereby increasing the range of mobile communications. Because of the need for the repeater to both transmit and receive, a scheme for allocating frequencies was devised whereby a channel comprised two frequencies, a transmit frequency and a receive frequency. As such, a mobile radio originating a call could transmit on the first frequency which would be received by the repeater receiver. The repeater coupled the receive signal to its transmitter operating on the second frequency and the transmitter broadcasts the signal over a large coverage area where it could be received by a second mobile radio receiving on the second frequency. The concept of coupling the repeater's receiver to the repeater's transmitter is called repeat audio.

Since most users do not communicate continuously while using land mobile radio services it was realized that a single repeater could service a number of groups of users. Users who wished to communicate using the land mobile radio system would have to wait until the repeater was free and available for communications before initiating communications.

Originally, radios controlled their receive audio by using the carrier squelch scheme. With the carrier squelch scheme the radio mutes the received audio until the radio frequency carrier is detected. In this scheme, all users and all groups could listen to the communications of ocher groups because each of their radios would open squelch every time the radio frequency carrier was detected.

A later improvement involved the use of a coded squelch scheme. Such a scheme employs tone sequences which are detected by the receiving mobiles to cause them to open squelch only upon the detection of a tone sequence which had been preprogrammed into the receiver. In this way multiple groups of users could share a common repeater yet only listen to conversations intended specifically for them. Each transmitting mobile would transmit the tone sequence coding the squelch signal and the receiving mobiles would only open their receiver speakers in the presence of the same coded tone sequence.

A still later improvement was the use of out of band signaling to control squelch. Such a single may use subaudible tones or subaudible data streams to control the squelch in radios. Motorola Corporation developed an early system called Digital Private Line that utilized a subaudible data stream to control the squelch in receiving mobiles.

As the number of users increased, the loading, or the total quantity of users in groups accessing the given repeater increased dramatically. With the heavy loading, the grade of service begins to degrade as users who requested service are unable to achieve it because other users were currently utilizing the given repeater.

Yet another improvement in the use of land mobile radio involved the trunking of a plurality of repeaters together to enhance the grade of service to users. For such a system to function, the radios needed to be frequency agile. The use of synthesized transceivers provided for this capability. In such an environment, it is necessary not only to control the squelch in the radios but also the channel management, that is, the access of frequencies. Several different system protocols were developed. Motorola developed a system whereby a dedicated control channel was used within a trunking group of channels. The dedicated control channel was utilized by mobiles to request a voice channel and the control channel in turn acknowledged the use of a particular voice channel by the mobile.

The E. F. Johnson Company of Wauseka, Minn., developed a system called Logic Trunk Radio. The acronym for that is LTR®. In the LTR® system, each repeater transmits a subaudible data stream that is used for channel management and squelch control by the mobiles. The subaudible data is transmitted in data frames which are transmitted repetitively by the repeaters. When a repeater is idle, each repeater transmits a data frame approximately every ten seconds to indicate to the fleets of mobiles that the repeater is functioning and within range. Because the LTR® system was a open system, it became a defacto standard for a portion of the land mobile radio industry. Many manufacturers made compatible radio equipment and also compatible repeater and repeater logic equipment.

The LTR® system was designed around a single trunking group of repeaters which would naturally operate from a single radio transmitter site. Multiple systems could be installed in different geographical areas, however, there was no coordination between the multiple systems.

The LTR® system provided basic dispatch service in a transmission trunk mode of operation. As each radio user keys their microphone to initiate a transmission, the radio handshakes with the repeater using the subaudible data protocol and opens the repeat audio in the repeater which rebroadcasts the message being transmitted by the mobile radio. As soon as the user dekeys his microphone, the repeater turns off the repeat audio and disables its transmitter. Subsequently, as a message is responded to by a different mobile within a group of mobiles, the repeaters are rekeyed, the repeat audio turned on and a reply to the message is broadcast back. It is important to understand that each transmission is a relatively short burst lasting just a few seconds, and, for each transmission the system may trunk the user to a different available channel. The subaudible data stream, handling the channel management, would assign all of the mobiles within the group intended to receive the call to the appropriate repeater at the beginning of each transmission.

An alternative form of communications would be to interconnect the repeater to the public switch telephone network and allow the radios to access the telephone network for conversations. In this mode of operation, commonly called conversation trunked mode, the repeater is kept in the conversation for the duration of the call. Unlike transmission trunked operation, in conversation trunked operation, the length of calls is relatively long. Also, it is necessary to assign a unique ID for use in telephone interconnected service.

The nature of trunking systems which is well understood by those skilled in the art it is known that short bursts of communications utilize a trunked group of resources more efficiently than long duration communications.

Considering again that an environment where there are multiple radio transmitter sites, each having a plurality of repeaters in a trunked group, users who had access to such an environment had a need to communicate not only with one site but across the plurality of sites. It is understood in the industry that people with the capability to communicate continually wish to expand the area over which they communicate and increase the grade of service and the features available to them. The LTR® system did not provide a structure either in ID codes or in communication switching that facilitated a multiple site integrated environment. Furthermore, the LTR® system had a finite set of ID codes that could be used for either group conversations or for individual interconnected types of conversations. In a large network with a plurality of sites, where users must access multiple IDs at multiple sites, the resource and availability of ID codes was quickly diminished and the grade of service reduced. The reduced grade of service in conjunction with the inability to manage intersite communications left the LTR® system incapable of providing the needs of the end users. There is a need for a land mobile radio system wherein a plurality of sites each having a trunking group of repeaters can be interconnected and switch in such a way as to provide uniform integrated service across the entire network coverage area. Furthermore, an ID code structure is needed that allows for extended ID code naming sequences and also naming sequences for individual trunked repeater groups.

Also, there is a need to integrate not just land mobile radios with the public switch telephone system, but the need to use other network linking resources which can also be easily integrated into the network. With the operation of a complex network system, it is necessary to have management tools which can be used for configuring the network, monitoring the operation of the network and maintaining the network.

SUMMARY OF THE INVENTION

A selected embodiment of the present invention is a method for preventing unauthorized use of communication equipment in a land mobile radio system. The system has a cell with a plurality of repeaters and each repeater has a transmitter and a receiver which can be connected via a link to form a retransmission channel. The method includes the step of receiving at a repeater receiver in the cell a first identification code which is transmitted by a first radio. After receipt of the first identification code from the first radio, a link is established between the repeater receiver and its corresponding transmitter to establish the retransmission channel. A timer is started after receipt of the identification code from the first radio. The timer has a predetermined time-out period. If a second identification code is not received from the first radio before the timer completes the predetermined time-out period, the link between the repeater transmitter and receiver is terminated.

A further aspect of the present invention is a method for use in conjunction with a land mobile radio system which prevents unauthorized use of communication equipment. The system includes a cell which has a plurality of repeaters and each repeater includes a transmitter and a receiver, together with a selectively operable interconnecting link to form a retransmission channel. A first identification code, which has been transmitted by first radio, is received at a repeater receiver in the cell. After receipt of the first identification code from the first radio, the link is established between the repeater receiver and its corresponding transmitter to establish the retransmission channel. A timer is started following receipt of the identification code from the first radio. The timer has a predetermined time-out period. If a second identification code is received from the first radio before the timer completes the predetermined time-out period, the timer is stopped and the link between the repeater transmitter and receiver is maintained.

BRIEF DESCRIPTION OF THE DRAWINGS

For a more complete understanding of the present invention and the advantages thereof, reference is now made to the following description taken in conjunction with the accompanying drawings in which:

FIG. 5 is a timing diagram of the ST bus as it interfaces to the repeater interface card, FIG. 6 is a timing diagram of the ST bus as it interfaces to the repeater logic card, FIG. 7 is pin assignment diagram of the MVIP™ bus.

FIG. 25 is a memory data structure diagram for user custom calling data, FIG. 26 is a memory data structure diagram for DID data, FIG. 28 is a memory data structure diagram for roaming data, FIG. 29 is a memory data diagram for cell list data, FIG. 30 is a memory data structure diagram for network custom calling data.

DETAILED DESCRIPTION OF THE INVENTION

Figure 1:
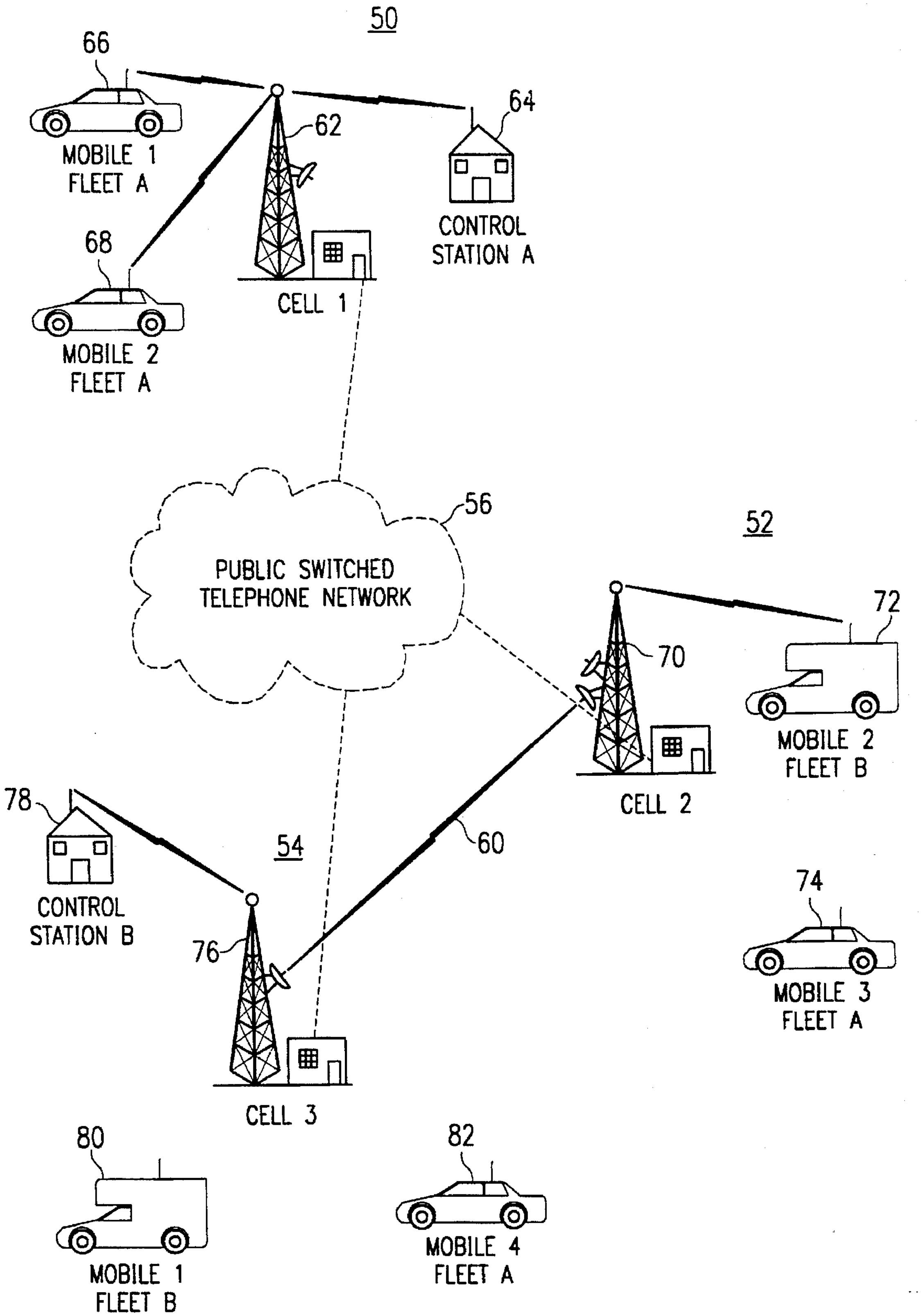
FIG. 1 is an overview diagram of a land mobile radio network.

An overview of a land mobile radio system which incorporates the present invention is shown in FIG. 1. The system includes three cells which are identified by reference normals 50, 52 and 54. The system my include any number of cells. The cells are interconnected by a public switched telephone network (PSTN) 56 which has lines extending to each of the cells. Each of the cells can be interconnected to one or more of the other cells by direct channels, such as indicated by a microwave link 60.

The cell 50 (Cell 1) has a tower with an antenna 62 which provides two-way radio communication to a control station 64 (control station A), a mobile 1 vehicle 66, which is in fleet A and a mobile 2 vehicle 68, which is also in fleet A.

Cell 52 (Cell 2) includes an antenna 70 which provides radio communication with a mobile 2 vehicle 72, which is in fleet B, and a mobile 3 vehicle 74 which is in fleet A.

Cell 54 (Cell 3) has an antenna 76 which provides bidirectional radio communication with a control station 78 (control station B), a mobile 1 vehicle 80, which is in fleet B, and a mobile 4 vehicle 82, which is in fleet A.

The control station 64 and each of the vehicles in fleet A are provided with bi-directional communication throughout all of the cell sites by the land mobile communication system shown in FIG. 1. Note that vehicles 74 and 82, which are in fleet A, are located respectively in cells 52 and 54. When there is communication between these vehicles and other fleet A vehicles, or the control station 64, such communications must be provided through interconnecting trunks between the various cells. In a similar fashion, the control station 78 and the fleet B vehicles are in two-way communication with each other. Note that fleet B vehicle 72 is located in cell 52 while the remaining fleet B vehicles and control station 78 are located in cell 54. Communication between all of the vehicles in fleet B requires the use of an interconnecting trunk between cells 52 and 54.

A further aspect related to the present invention is the interconnection of the cells 50, 52 and 54 with the public switched telephone network 56. The principal use of two-way radio communication is between the members of a particular fleet, however, an important capability for a mobile radio system is to provide communication between a mobile radio and the public network 56. This capability allows a user at a mobile radio to place a call through the public telephone system or to receive a call placed by a party through the public network 56 to a radio user in a cell. This capability is described in more detail below.

Figure 2:
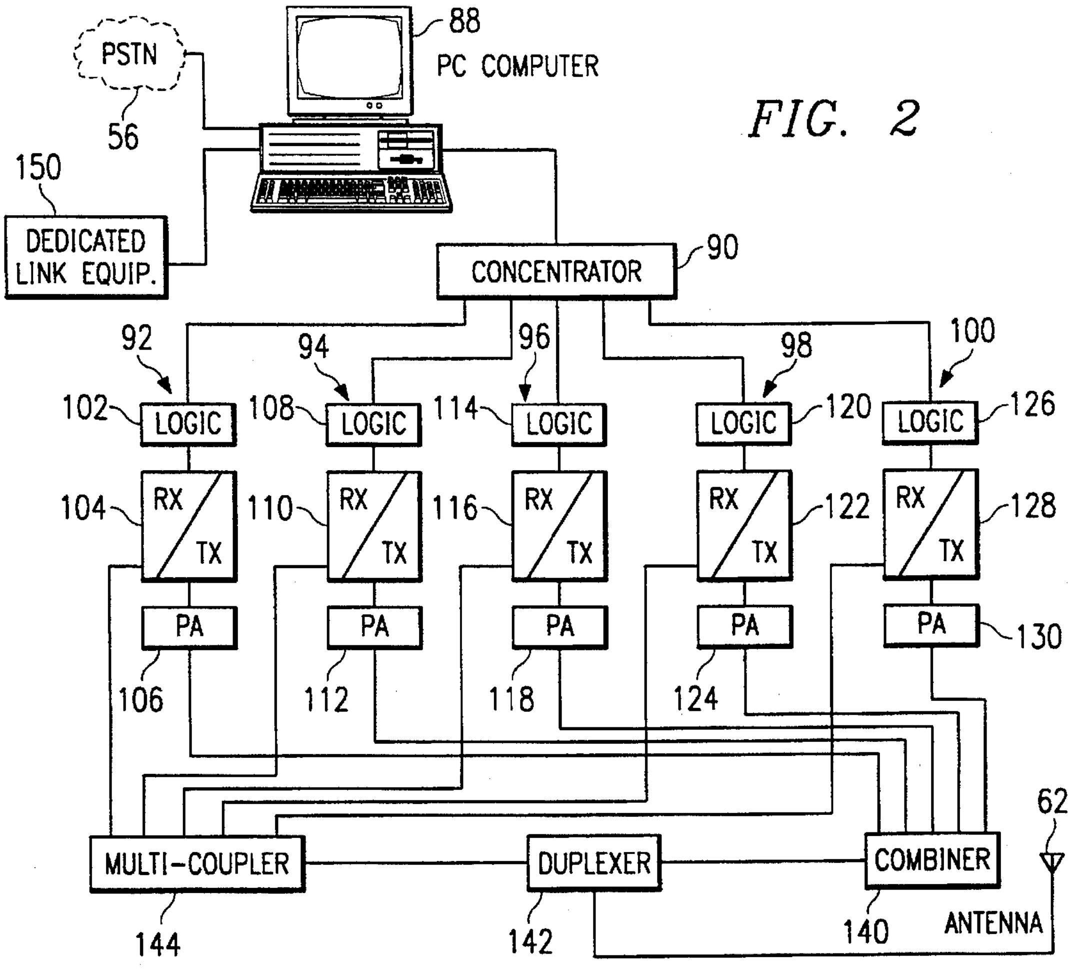
FIG. 2 is an electrical block diagram of a cell site.

The equipment provided at a cell, such as cell 50, is shown in a block diagram in FIG. 2. Each cell includes a computer 88 which provides switching and control operations for the cell. The preferred computer is one which is compatible with the IBM personal computer standard. For example, a Digital Equipment Company Model MTE433 can be utilized. This model computer operates with an Intel 80486 processor and uses the IBM OS/2 operating system. The operational software for the cell site is described in detail below.

The computer 88 is connected through a concentrator 90 which is described in further detail below in reference to FIGS. 9A and 9B. A typical cell includes one or more repeaters. However, a cell may have no repeaters but have telephone connections and interfaces to other cells. For the example shown in FIG. 2, there are provided repeaters 92, 94, 96, 98 and 100. Repeater 92 includes a repeater logic card 102, a transmitter/receiver unit 104 and a power amplifier 106. Repeater 94 includes in sequence a repeater logic card 108, a transmitter/receiver unit 110 and a power amplifier 112. Repeater 96 includes a repeater logic card 114, a transmitter/receiver unit 116 and a power amplifier 118. Repeater 98 includes a repeater logic card 120, a transmitter/receiver unit 122 and a power amplifier 124. The last repeater 100 includes a repeater logic card 126, a transmitter/receiver unit 128 and a power amplifier 130.

Although the configuration shown in FIG. 2 for a cell includes 5 repeaters, the configuration for use with the present invention provides for including up to 63 repeaters at each cell site.

The repeater logic cards 102, 108, 114, 120 and 126 are identical to each other and are further described below in reference to FIG. 11. The transmitter/receiver units 104, 110, 116, 122 and 128 are well-known conventional units which have been used in two-way radio base stations for many years. The power amplifiers 106, 112, 118, 124 and 130 are conventional devices which have been used in the industry and are well known. The typical power level of the amplifier is between 90 and 125 watts. The transmitter/receiver units preferably are synthesized FM radios.

The transmitter portions of the units 104, 110, 116, 122 and 128 are respectively connected to the power amplifiers 106, 112, 118, 124 and 130 which are all connected to a combiner 140, which is in turn connected through a duplexer 142 to the antenna 62. The duplexer 142 is further connected to a multi-coupler 144 which in turn distributes the received signals to the receiver portions of the transmitter/receiver units 104, 110, 116, 122 and 128. The combiner 140 and the multi-coupler 144 are conventional equipment well known in the mobile radio industry.

The computer 88 is further connected to dedicated link equipment 150 which can provide communication such as the microwave link 60 shown in FIG. 1.

Referring further to FIG. 2, the communication lines between the concentrator 90 and the repeater logic cards 102, 108, 114, 120 and 126 carry bi-directional digital information which includes digitized voice and data. Within the repeater logic cards, there is provided a digital-to-analog converter for converting the digitized transmit voice to an analog signal which is then provided to the transmit portion of the transmitter/receiver units. The repeater logic cards further include an analog-to-digital converter which receives the voice from the receiver section of the transmitter/receiver units and converts this to digital data that is transmitted through the communication lines to the concentrator 90.

Each of the repeaters 92, 94, 96, 98 and 100 has a pair of frequencies, one for transmitting and one for receiving.

These are typically offset by 45 megahertz. Since the repeaters all operate at different frequencies, they can operate concurrently.

Figure 3:
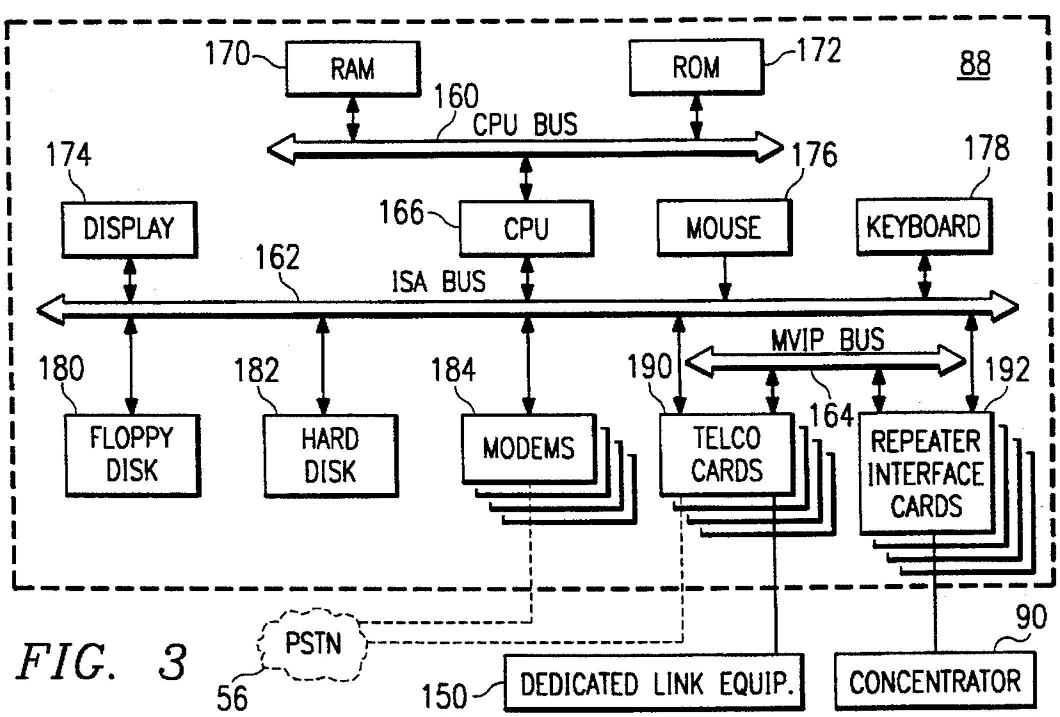
FIG. 3 is a block diagram of an ESAS® (Extended Sub Audible Signalling) switch.

Referring now to FIG. 3, there is shown a block diagram of the computer 88 together with certain equipment connected to the computer. The computer 88 includes a CPU bus 160 and an ISA (or EISA®) bus 162. These buses are conventional and are well known in the industry. For example, see "ISA Bus Specifications and Applications Notes", Jan. 30, 1990 by Intel Corporation and "Technical Reference Guide, Extended Industry Standard Architecture Expansion Bus", dated 1989 by Compaq Corporation. The computer 88 further includes an MVIP™ bus 164 which is a standard bus widely used in the telecommunications industry. The MVIP™ bus is defined in "Multi-Vendor Integration Protocol, Reference Manual Release 1.0", dated November, 1993 by Natural MicroSystems Corporation.

The computer 88 includes a CPU 166 which, as noted above, is preferably an Intel 80486. This CPU is connected to both the CPU bus 160 and ISA bus 162.

The computer 88 is further provided with conventional RAM 170 and ROM 172 which communicate with the CPU 166 through the CPU bus 160.

Conventional components of the computer 88 are a display 174, a mouse 176 and a keyboard 178. These three components are connected to the ISA bus 162.

Conventional components of the computer 88 are a floppy disk drive 180 and a hard disk drive 182, both of which are connected to the ISA bus 162.

One or more modems 184 or serial ports are included within the computer 88 and connected to the ISA bus as well as to the public switched telephone network 56.

The computer 88 further includes a telco card 190, or a plurality of such cards, and each of these cards is connected to both the ISA bus 162 and the MVIP™ bus 164. The telco card 190 is a conventional product available in the industry and is, for example, a model AG/8 manufactured by Natural MicroSystems Corporation. The telco card 190 is further described in reference to FIG. 8. The dedicated link equipment 150 is also connected to the telco card 190.

One or more repeater interface cards 192 are provided as a part of the computer 88. Each of these cards is connected to both the MVIP™ bus 164 and the ISA bus 162. The repeater card 192 is connected to the concentrator 90. Card 192 is further described below in reference to FIG. 4. Each of the repeater cards 192 can service up to 21 repeaters through the concentrator 90. Card 192 is connected to the concentrator 90, ISA bus 162 and the MVIP™0 bus 164.

Figure 4:
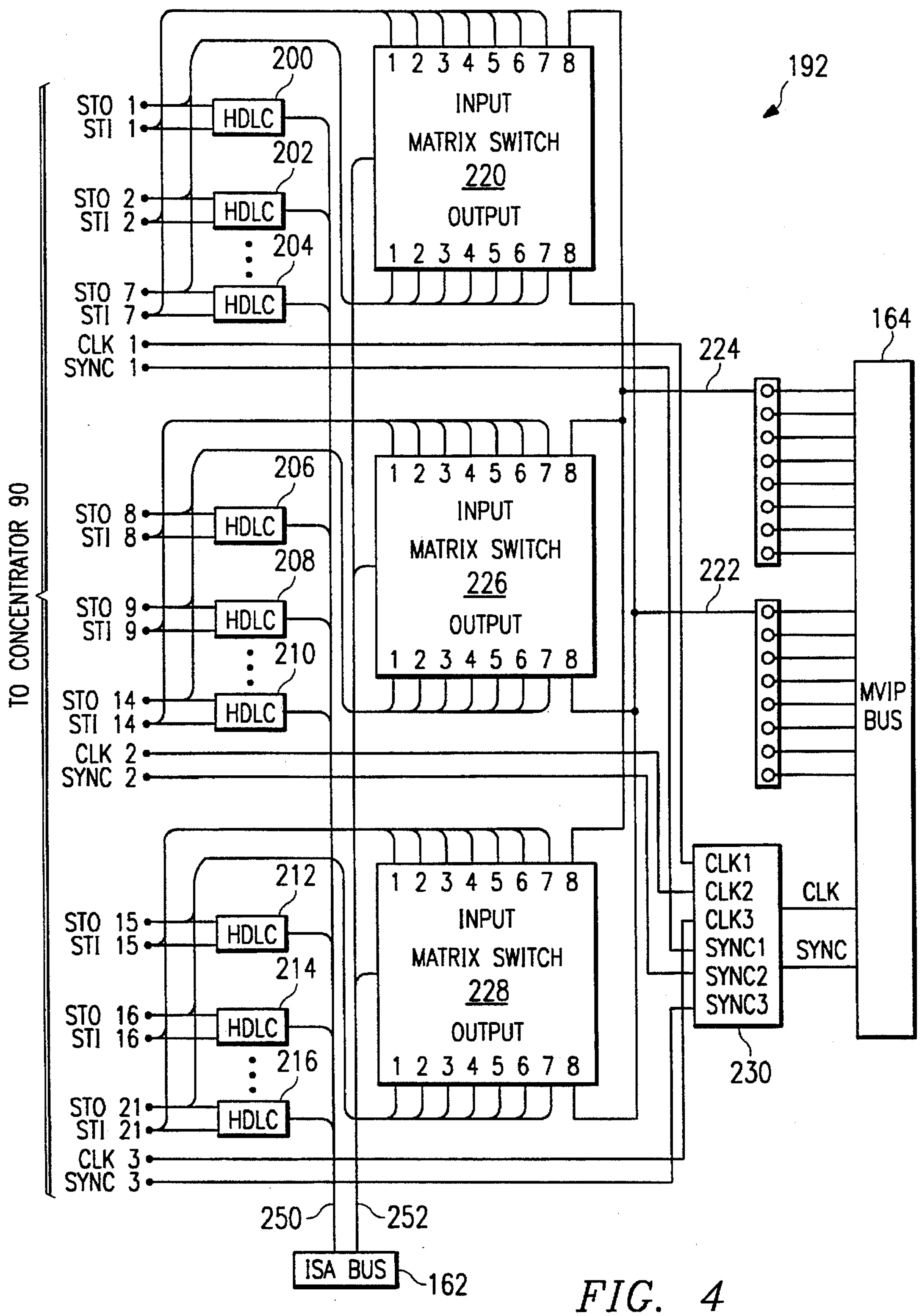
FIG. 4 is an electrical block diagram of a repeater interface card.
Figure 9B:
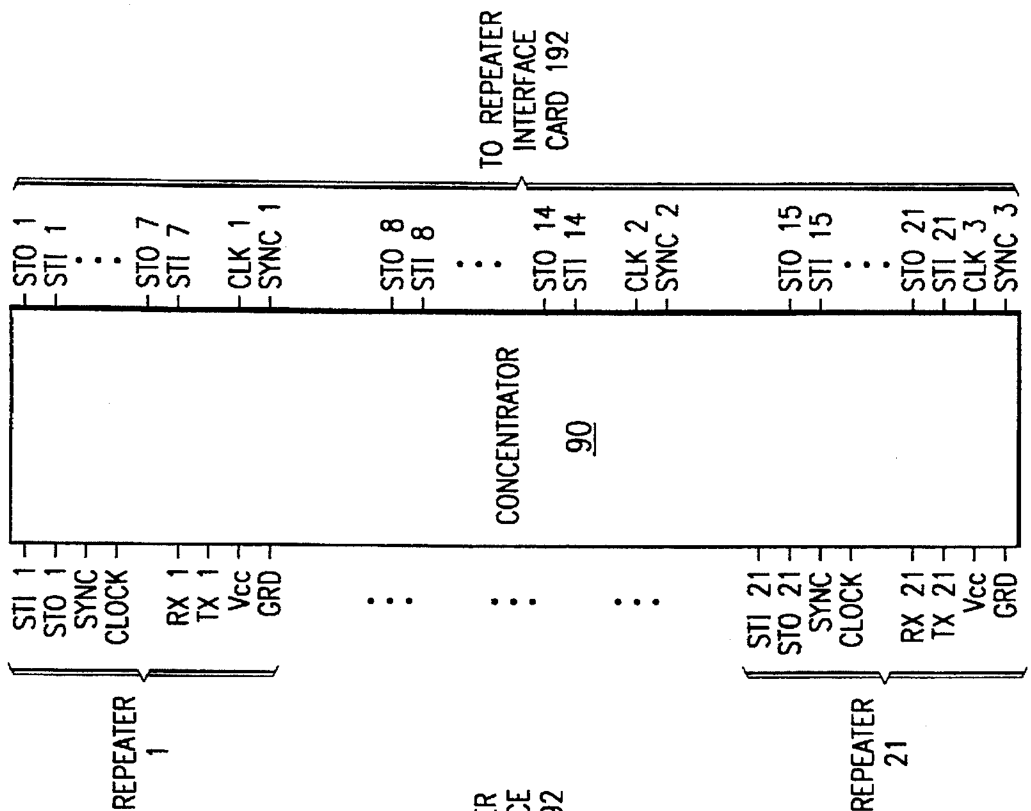

Referring further to FIG. 4, the interconnecting lines between the concentrator 90 and the repeater interface card 192 are shown at the left of FIG. 4 and are likewise shown at the top of FIG. 9B. These lines comprise three sets. The data transfer lines are referenced as "STO" (output line) and "STI" (input line). These are numbered in pairs of 1 through 7 in the first group. Each group also includes a clock (CLK) line and a synchronization (SYNC) line. The second group consists of data lines 8 through 14 and the third group consists of data lines 15 through 21. The ST lines comprise an ST-BUS which are defined in "Application Note MSAN-126 ST-BUS Generic Device Specification (Rev. A)" by Mitel Corporation, copyright 1990. The term "ST-BUS" stands for Serial Telecom Bus. The timing, framing, data rates and other characteristics of the ST-BUS are defined in this application note. Each ST line is essentially a serial data line having a rate of 2.048 megabits per second. Each ST line can carry 32 sources each at a rate of 64 KBIT/S. The implementation of the ST-BUS configuration in the present application is further described below in reference to FIGS. 5 and 6.

Further referring to FIG. 4, each pair of input and output ST lines is connected to a corresponding half duplex link controller. As shown in the figure, the line pair 1 (STO1 and STI1) is connected to controller 200, line pair 2 is connected to controller 202 and line pair 7 is connected to controller 204. As indicated in the figure the line pairs 3–6 also have corresponding controllers. Line pair 8 is connected to controller 206, line pair 9 is connected to controller 208 and line pair 14 is connected to controller 210. In the third set of lines, line pair 15 is connected to controller 212, line pair 16 is connected to controller 214 and line pair 21 is connected to controller 216. Each half duplex link controller, such as 200, is preferably a model 8920 manufactured by Mitel Corp.

Further referring to FIG. 4, in the first group of line pairs 1–7, each of the output lines (STO) is connected to the corresponding controller as well as to the output lines of a matrix switch 220. Each of the input lines in the first set of lines 1 through 7 is connected to both the corresponding controller and to the input pins 1–7 of the matrix switch 220. The group of input pins 1 through 7 of the matrix switch 220 are switched in time sequence to the output pin 8 which is in turn connected to a single line 222 of the MVIP™ bus 164. The input pin 8 of matrix switch 220 supplies data which is time sequenced to distribute data to the output lines 1 through 7 of the switch 220. The input pin 8 of switch 20 is connected to a single line 224 of the MVIP™ bus 164.

The second group of ST line pairs 8–14 has each output line connected respectively to its corresponding controller as well as to the output pins 1–7 of a matrix switch 226. The input lines of the second set are connected respectively to the corresponding controllers as well as to the input pins 1–7 of the switch 226. In a similar fashion to the matrix switch 220, the input pin 8, which is connected to line 224, distributes data in time sequence to the output pins 1–7 of switch 226. The output pin 8, which is connected to line 222, receives data in time sequence from input pins 1–7 of switch 226.

The third set of ST lines, lines 15–21, have the output lines connected to the corresponding controllers as well as to the output pins 1–7 of a matrix switch 228. The input lines of this set are connected to the corresponding controllers as well as to the input pins 1–7 of switch 228. In a similar fashion, the input pin 8, which is connected to line 224, distributes data to the output pins 1–7 of switch 228 in time sequence. The output pin 8, which is connected to line 222, receives, in time sequence, the data from input pins 1–7 of switch 228.

The matrix switches 220, 226 and 228 can be a model 8980 manufactured by Mitel Corp.

The MVIP™ bus 164 provides clock and synchronization signals to a fan out circuit 230 which in turn provides the clock and synchronization signals 1, 2 and 3 for each of the three sets of ST line pairs.

Referring to FIG. 5 there is shown the data format for the ST line pairs between the concentrator 90 and the repeater interface card 192. Each of STI lines comprises a repeated frame 236 which comprises 32 slots wherein each slot can contain 8 bits. The information contained within each slot is identified by a letter in which D represents digital data, V represents digitized voice and X identifies an unused time slot. Note that slot 0 carries data and slot 2 carries digitized voice while the remaining 30 slots are currently unused. The digitized voice over a single STI line is transmitted at the rate of 64 KBITS/S which is standard for a single one-way voice channel. Only one bit of data is actually carried in slot 0 for each frame, therefore there is a digital data rate, for slot 0, of 8 KBITS/S.

Further referring to FIG. 5, there is shown a frame 238 for the STO lines between the concentrator 90 and the card 192. Similar to the STI line, slot 0 carries one bit of digital data and slot 2 carries 8 bits of digitized voice. The voice and data rates for the STO line are the same as for the STI line.

The data format for the STI and STO lines on the MVIP™ bus 164, which is connected to the card 192, is shown in FIG. 6. A frame 240 for the STI line includes 32 slots. The STI line shown in FIG. 6 corresponds to line 222 and the STO line in FIG. 6 corresponds to line 224 in FIG. 4. Slots 0 through 20 of frame 240 contain voice data which comprises one byte (8 bits) of data per slot from each of the STI lines 1–21 in the lines between the concentrator 90 and the card 192. The 21 sets of data are combined in the matrix switches 220, 226 and 228.

Further referring to FIG. 6, the STO line for the MVIP™ bus 164 (line 224) comprises a frame 242 which includes 32 slots, each slot which can carry 8 bits of digitized voice. In the present embodiment, slots 0–20 are utilized to carry 21 voice channels. These 21 voice channels are transferred through line 224 to the matrix switches 220, 226 and 228 for each of these channels. These time multiplexed slots are applied individually to the ST0 lines 1–21 and the set of lines between the concentrator 90 and the interface card 192.

Further referring to FIG. 4, each of the controllers, including 200, is connected through a bi-directional line 250 to the ISA bus 162. Each controller extracts from the corresponding STI bus the data in slot 0 and provides this data through the line 250 to the ISA bus 160 and ultimately to the CPU 166. The CPU 166 also generates data which is transmitted through line 250 to each of the controllers which, in proper time sequence, applies the one bit of data per frame to slot 0 for the STO lines.

The matrix switches 220, 226 and 228 are connected through a control line 252 to the ISA bus to receive control signals from the CPU 66.

Referring to FIGS. 4, 5 and 6, the input and output ST lines are defined with respect to the MVIP™ bus 164. The STI lines 1–21 between the concentrator 90 and the interface card 192 provide digital data and digitized voice. The digital data is extracted by the controllers, for example controller 200, and transmitted through line 250 to the ISA bus 162 and then to the CPU 166. This occurs for each of the input lines and the corresponding controller. The digitized voice information, in slot 2, for each input line is routed through the corresponding one of the matrix switches 220, 226 and 228 where it is combined, in time sequence, with the other voice channels and transmitted through the MVIP™ bus 164 on line 222. This data is shown in frame 240 of FIG. 6.

The output data on line 224 of MVIP™ bus 164, as shown in frame 242 of FIG. 6, is provided to earth of the input pins 8 of the switches 220, 226 and 228. This data is distributed through time multiplexing to each of the output pins 1–7 for the STO lines 1–21. The CPU 166 generates digital data which is transmitted through the ISA bus 162 and the line 250 to each of the controllers, such as 200, so that the controller, in the appropriate time sequence, applies the digital data to slot 0 of the STO, such as frame 238 shown in FIG. 5.

The pin assignments for the MVIP™ bus 164 are described in FIG. 7. The term "RES" means a reserved line. The term "GND" means electrical ground. Pin 7 (STO0) corresponds to line 224 of MVIP™ bus 164. Pin 8 (STI0) corresponds to line 222 of MVIP™ bus 164. $C^2$ and $/C^4$ are Mitel ST-BUS 4.096 MHz and 2.048 MHz clocks. /FO is the Mitel ST-BUS 8KHZ framing signal. SEC8K is a secondary 8KHZ signal line used to carry HKHZ timing information derived from trunks on a secondary or subsequent digital trunk interface to a digitel trunk interface board that is providing clocks to the MVIP™ bus. (See the Multi-Vendor Integration Protocol noted above.)

Figure 8:
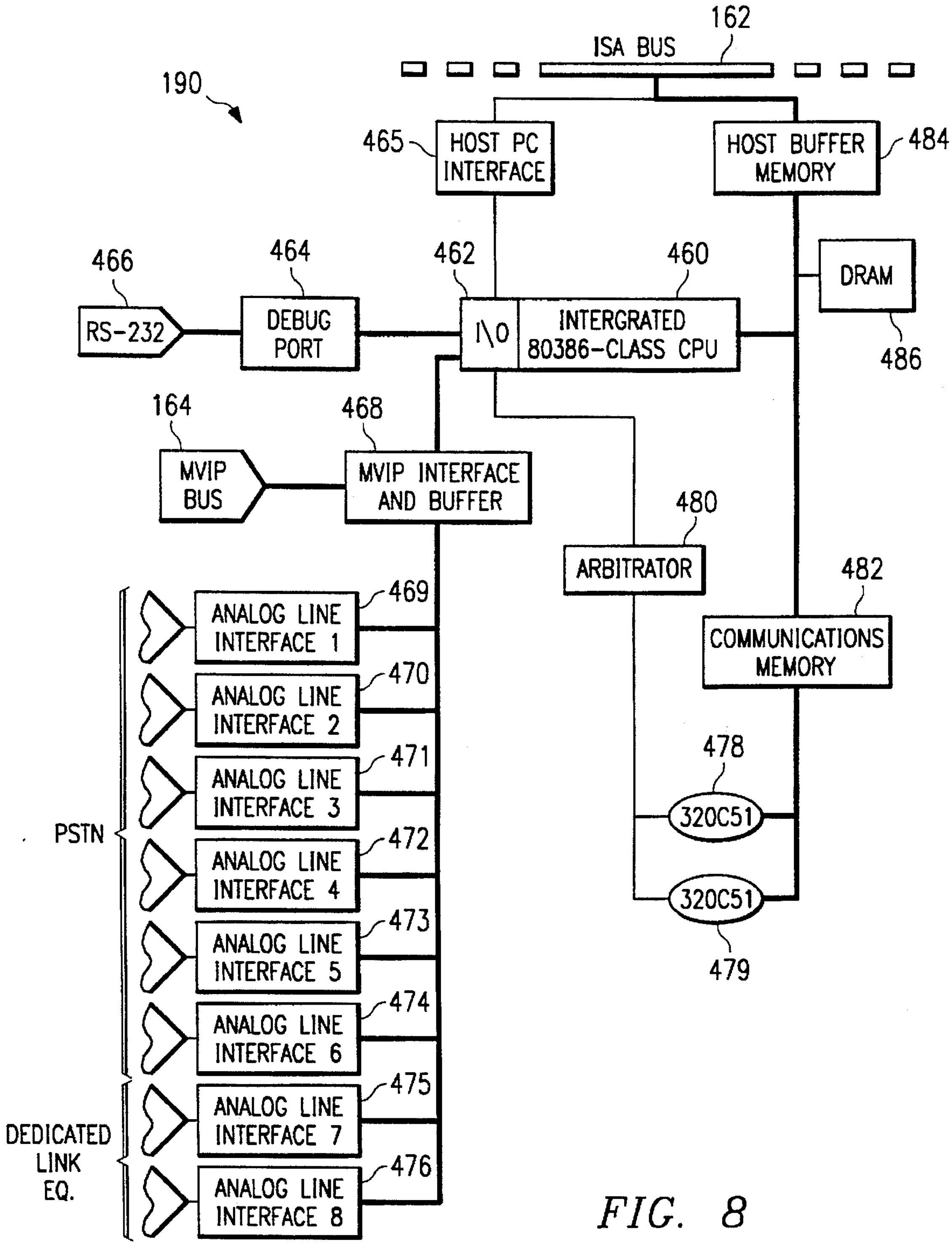
FIG. 8 is a functional block diagram of a telephone interface card 190 as shown in FIG. 3, FIGS. 9A and 9B are diagrams of the concentrator 90 shown in FIGS. 2 and 3.

The telco card 190 is described in detail in FIG. 8. This is a block diagram for a model AG/8 telco card manufactured by Natural MicroSystems Corp.

Reference is directed to FIG. 8 which is a functional block diagram of the telephone interface card 190. The telephone interface card is integrated into the ESAS® switch by connecting to the ISA bus 162 in the ESAS® switch and MVIP™ bus 164 also in the ESAS® switch. The telephone card 190 is central to the function of the ESAS® switch because it provides cross-point switching of the various digitized audio communication signals and the ability to record and play back voice prompts through the use of digital signal processors. The ESAS® switch may alternatively be called the host PC with respect to the telephone card 190.

The telephone interface card 190 includes a central processing unit (CPU) 460. The CPU 460 further includes an input/output section 462. The CPU is coupled to the ISA bus 162 of the host PC via host PC interface 464. A debug port 466 is provided with an RS232 port interface 466. This interface allows for direct connection of a terminal device to monitor the function and controls of the telephone card 190.

The control and switching of digitized audio signals within the telephone interface card 190 is controlled by the MVIP™ interface and buffer 468. The MVIP™ interface and buffer also includes a digital cross-point switch, not shown. The MVIP™ interface and buffer 468 is interfaced to the MVIP™ bus 164 in the host PC.

The MVIP™ interface and buffer 468 is connected to one or more analog line interfaces, shown herein as items 469 through 476. The analog line interface units provide digital-to-analog and analog-to-digital signal conversion and also provides electrical interface to common twisted pair lines in the public switched telephone network. The MVIP™ interface and buffer has the ability to interconnect any signal on the MVIP™ bus 64 with any one of the analog line interfaces 469 through 476.

The telephone card 190 also includes one or more digital signal processors 478 and 479. The digital signal processors are used to generate voice prompts and also provide other functions within the ESAS® switch. The digital signal processors 478 and 479 are coupled to I/O unit 462 via an arbitrator 480. The arbitrator 480 prevents collisions and mismanagement of the digital signal processors 478 and 479. In addition, the digital signal processors 478 and 479 are coupled to a communications memory 482.

The communications memory provides a memory buffer for signals into and out of the digital signal processors 478 and 479. The communications memory 482 is further coupled to a host buffer memory 484 which is in turn coupled to the ISA bus 162. Furthermore, the communications memory 482 is coupled to the CPU 460 and a RAM 486. The foregoing memory structure provides for the flow of data which may be interpreted as digitized audio between the storage devices on the ISA bus of the host PC, the RAM 486 on the telephone card, the communications memory 482, and the CPU 460.

The telephone card 190 is provided from the manufacturer with software device drivers that are compatible with a variety of software operating systems. These device drivers allow for complete control of the functions of the telephone card. Any combination of MVIP™ bus slots or analog telephone lines or signals from the DSPs 478 and 479 may be cross point switched. In addition, voice prompts can be stored in the memory of the telephone card or in the memory of the host CPU, such as in the hard disk drive or other memory storage devices.

While the telephone card 190 in FIG. 8 shows analog line interfaces, it is to be understood that several manufacturers of MVIP™ bus complaint hardware provide for a great variety of telephone resource interfaces. For example, T1 and E1 line interfaces are also available. Furthermore, loop start, ground start, or direct inward dialing interfaces are also available.

The telephone card 190 allows for the switching of any resource to any other resource via the MVIP™ interface and buffer 468. By utilizing the proper commands, the system is capable of recording voice prompts using digital signal processors 478 and 479, and likewise playing back the voice prompts at the appropriate times. The playback may be accomplished either through the analog line interfaces 469 through 476 or any other device on the MVIP™ bus 164, such as a radio frequency repeater. By the use of telephone card 190, the ESAS® switch has a great deal of flexibility in connecting communications resources and listening to or playing messages throughout the system.

Figure 9A:
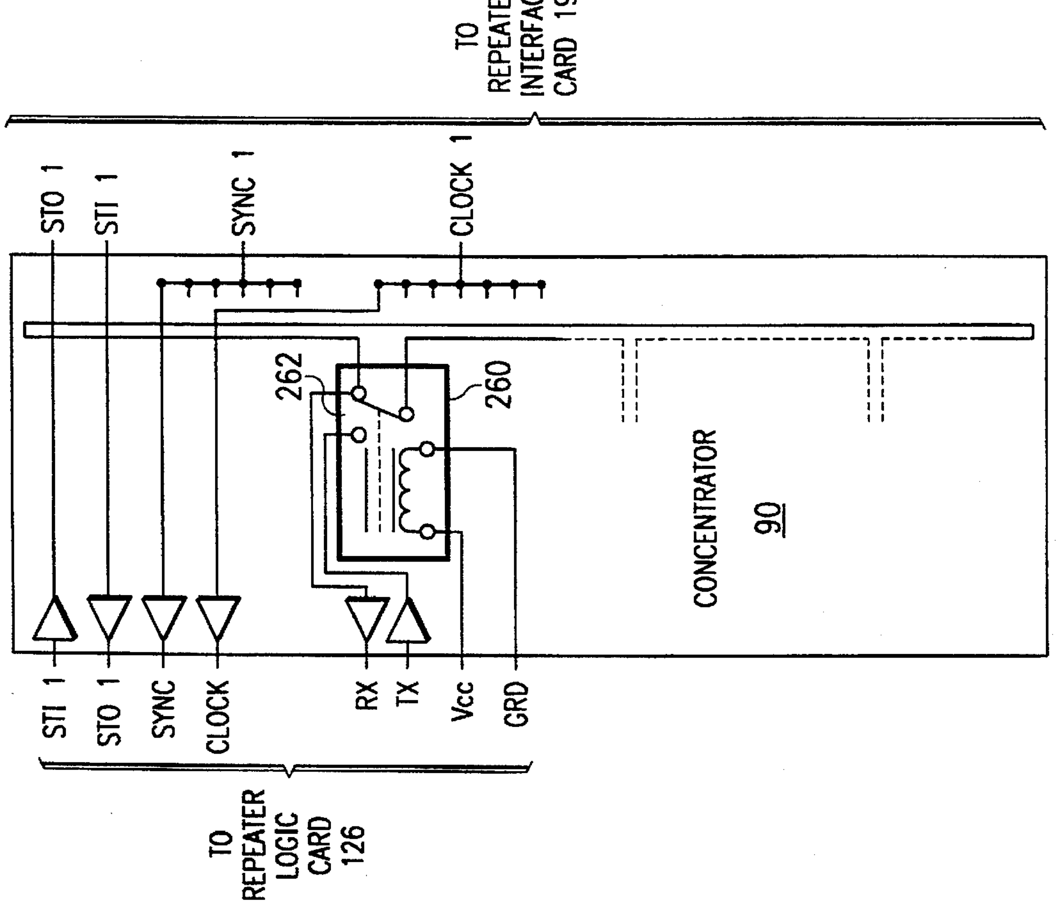

The concentrator 90 is further described in reference to FIGS. 9A and 9B. As shown in FIG. 9A, the concentrator 90 has connections to the repeater logic card, for example card 100 as shown in FIG. 2 and to the repeater interface card 192 as shown in FIG. 3. For each repeater logic card, there is a corresponding repeater. As shown in FIG. 2, the repeater logic card 126 is within the repeater 100. A group of 8 signals are transmitted between each repeater logic card and the concentrator 90. As shown for repeater logic card 126, there is the STI1 and STO1 ST-BUS signals, and corresponding synchronization and clock signals. These signals pass directly through the concentrator 90 via line drivers as shown, which line drivers may be, for example, RS422.

The remaining four lines RX, TX, Vcc and GRD are provided to a solenoid 260 within the concentrator 90. The solenoid 260 includes a switch 262 which when in the upper position, bypasses the TX and RX lines. In the lower position, switch 262 provides a sequential transfer through the lines TX and RX to the logic card 126 . The solenoid 260 is connected to a token ring bus 264. For each repeater there is a corresponding logic card which is in turn connected to a corresponding solenoid within the concentrator 90 so that each logic card is serially connected on the token ring bus when the switch corresponding to switch 262 is in the lower position. The TX and RX signals on each logic card, for example card 126, which is further described below in reference to FIG. 11, provide control information for managing the RF resources within a repeater. This includes activation, frequency selection and other conventional aspects of operating a transmitter/receiver pair in a land mobile radio system.

As further shown in FIG. 9B, for the present embodiment, there may be up to 21 repeaters connected to each concentrator 90. The lines at the top of the concentrator 90 are connected to the repeater interface card 192 as further described in FIGS. 3 and 4 and having the grouping of 7 ST line pairs in each of 3 groups.

Figures 10, 12, 13, 14:
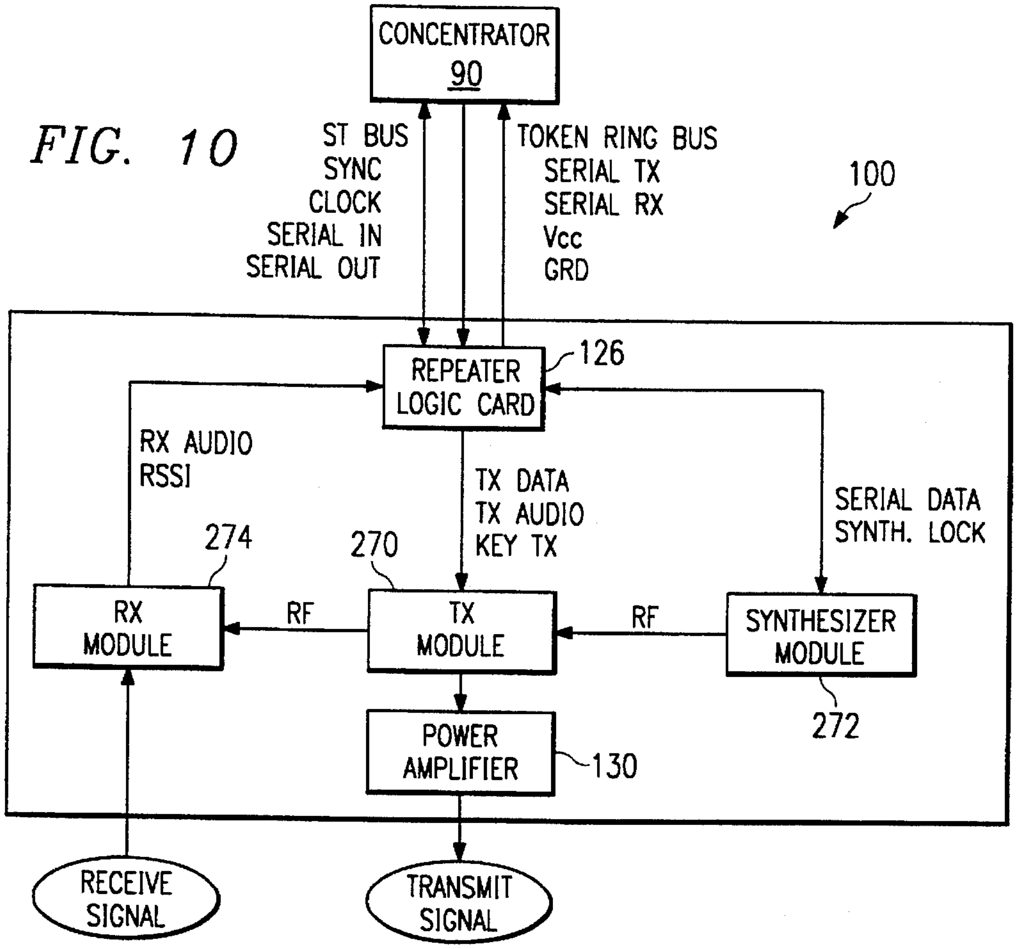
FIG. 10 is a block diagram of a repeater.
FIG. 12 is a data diagram of an LTR® repeater frame.
FIG. 13 is a data diagram of an LTR® radio frame.
FIG. 14 is a data diagram of an ESAS® frame.

A further description of the repeater 100, as shown in FIG. 2, is presented in FIG. 10. The repeater 100 is connected via its repeater logic card 126 to the concentrator 90 via an ST bus and a token ring bus. The ST bus provides synchronization and clock, serial-in data, serial out data. The token ring bus provides serial TX data and serial RX data together with Vcc and GRD. The repeater logic card 126, which is further described in reference to FIG. 11, provides TX data, TX audio and key TX (transmitter) data to a transmit module 270. The logic card 126 further provides serial data and a synthesizer locking signal to a synthesizer module 272 which generates a synthesized RF signal that is provided to the transmit module 270. The modulated transmit signal is provided to the power amplifier 130 as a transmit signal which is conveyed to the antenna 62.

A received signal from the antenna 62 is conveyed through the duplexer 142 and multi-coupler 144 to a receive module 274. The module 274 produces a receive audio signal and a RSSI signal (Receive Signal Strength Indication) which are provided to the repeater logic card 126.

Figure 11:
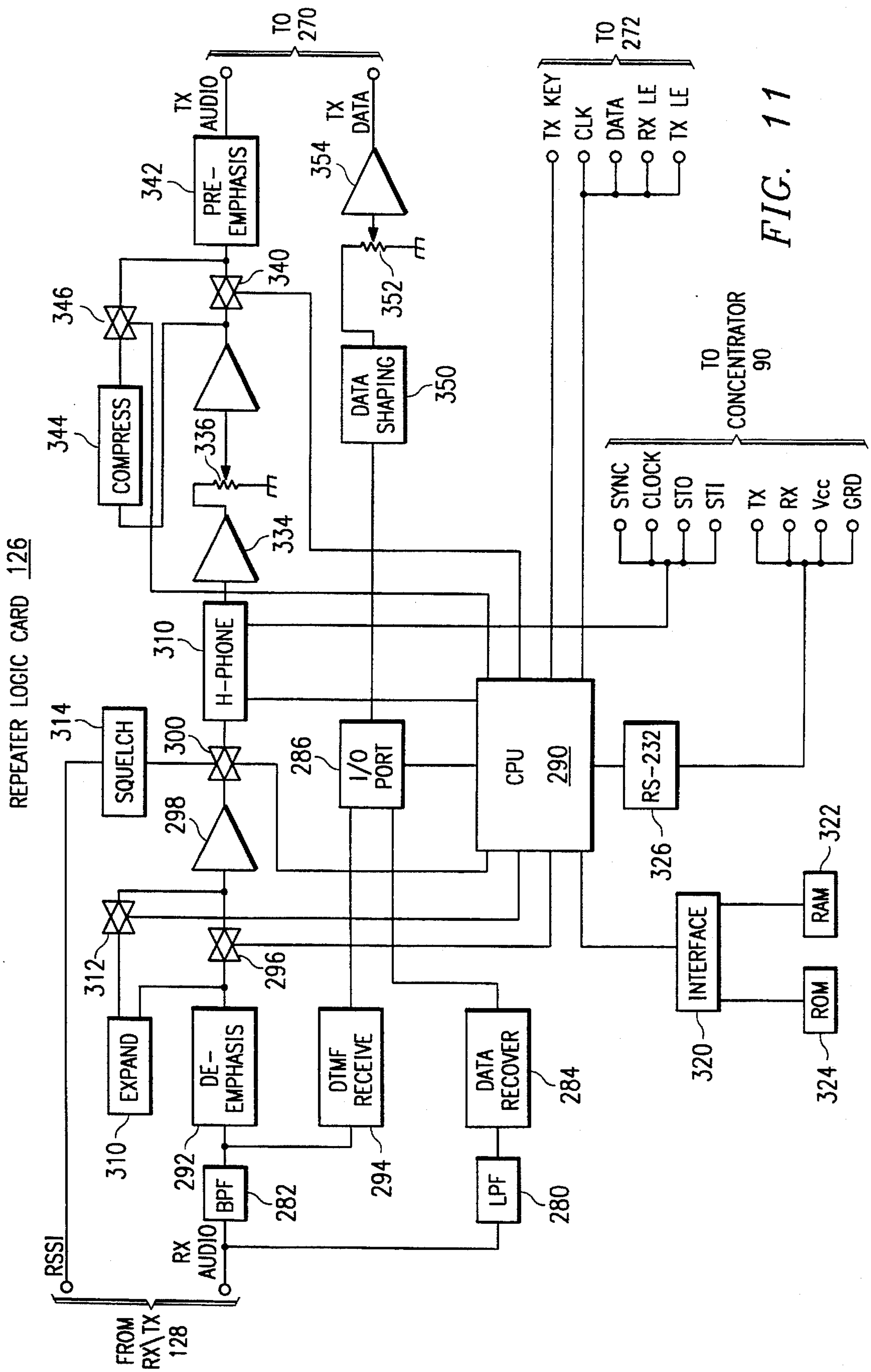
FIG. 11 is an electrical block diagram of a repeater logic card.

The repeater logic card 126 is described in detail in FIG. 11. Note that there is one repeater logic card for each repeater, as shown in FIG. 2. The repeater logic card 126 and its interface to various components of the transmitter/receiver units is further described in FIG. 10. For repeater 100, the receive audio and RSSI signals from the receiver section of transmitter/receiver unit 128 are input to the logic card 126. The receive audio is provided to both a low pass filter 280 and a band pass filter 282. The low pass filter extracts the subaudible data which is then produced as digital information in a data recovery circuit 284. This data is then passed through an I/O port 286 to a CPU 290. The CPU is preferably a model 641805 manufactured by Hitachi.

The filtered receive audio signal at the output of the band pass filter 282 is provided to both a de-emphasis circuit 292 and to a DTMF receiver 294. The output from the de-emphasis circuit 292 is passed through a switch 296 to a buffer 298. The output from the buffer 298 is passed through a switch 300 to an H-phone circuit 310. The H-phone circuit is, for example, a model 8992 manufactured by Mitel Corp.

The DTMF receiver 294 detects any DTMF tones and generates corresponding tone identification data which is transmitted through the I/O port 286 to the CPU 290.

The output of the de-emphasis circuit 292 is also passed through an expand circuit 310, a switch 312 and back to the input of buffer 298. The expand circuit 310 performs the function of audio expansion which provides greater dynamic range for the audio signal.

The RSSI (signal strength) input is provided to a squelch circuit 314 which controls the switch 300.

The CPU 290 operates through an interface circuit with conventional RAM 322 and ROM 324.

The CPU 290 is further connected to a UART port 326 which provides communication for the signals TX and RX which are provided to the token ring bus 264 within the concentrator 90. The CPU 290 further generates control signals for operation of the synthesizer module 272.

The H-phone circuit 310 digitizes the received voice signal from switch 300 and this digitized voice is provided on the ST bus line STI, as described for frame 236 in FIG. 5. The CPU 290 receives the recovered data from the input receive signal and this is transmitted through a data line 330 to the H-phone circuit 310 which inserts this data into slot 0 of the STI frame 236.

The H-phone circuit 310 further receives signal ST0 from the concentrator 90. The digitized voice data is converted to an analog signal which is passed through a buffer 334, a potentiometer 336, a buffer 338, a switch 340 to a pre-emphasis circuit 342. The output of the pre-emphasis circuit 342 is the transmit audio that is provided to the transmit module 270, as shown in FIG. 10. The output of the buffer 338 is routed through a compress circuit 344 and a switch 346 to the input of the pre-emphasis circuit 342.

The data in the STO signal received by the H-phone circuit 310 is transmitted through the data line 330 to the CPU 290 which in turn transmits it through the I/O port 286 to a data shaping circuit 350. The output from the circuit 350 is passed through a potentiometer 352 and a buffer 354 to produce the TX data. This is the low frequency (subaudible) data which forms a part of the transmitted signal. The TX audio and TX data are both provided to the TX module 270 as shown in FIG. 10.

The CPU 290 selectively controls the switches 296, 312, 300, 340 and 346.

Figure 15:
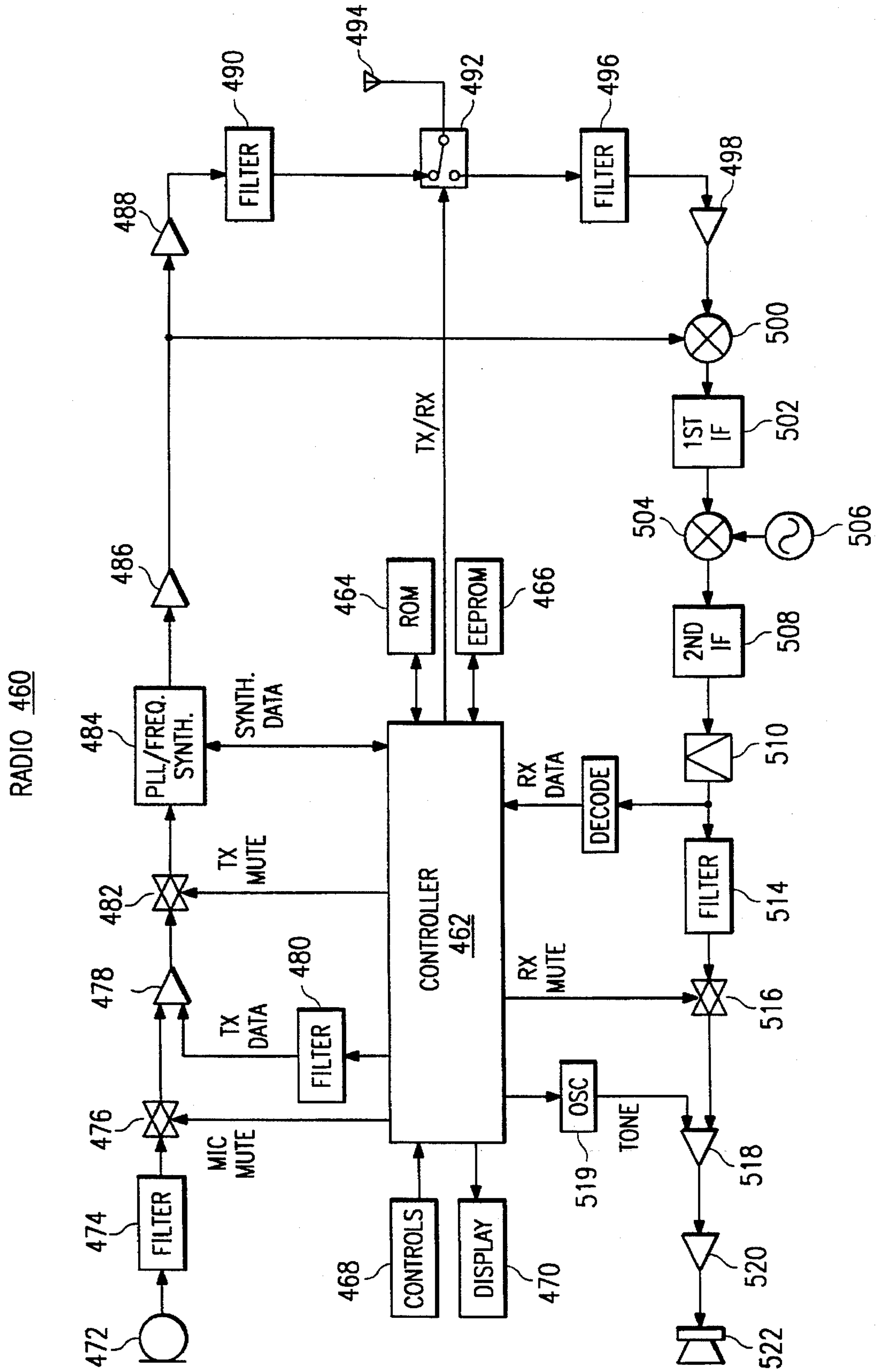
FIG. 15 is an electrical block diagram of a land mobile radio.

Reference is directed to FIG. 15 which is an electrical block diagram of a half-duplex radio 460. The half-duplex radio 460 is similar in design to other radios used in the trunk radio system, such as full duplex radios. The radio 460 includes a controller 462 for controlling various components within the radio. The controller 462 is interfaced to ROM 464 which contains object code software for executing the various functions of the radio 460. The controller 462 is further interfaced to EEPROM 466 which is used for temporary nonvolatile storage of variables and etc. The user of the radio controls the radio using controls 468 which may include knobs, buttons, switches and other similar devices. The controller is interfaced to display 470 for displaying information about the status of the operation of the radio to the user.

The user speaks into a microphone 472 when the radio is used in the transmit mode. The signal output from microphone 472 is coupled to bandpass filter 474 and further coupled to switch 476 which is controlled by controller 462. Switch 476 allows the controller to mute the microphone signal as would be necessary during data transmit only modes of operation. The output of switch 476 is coupled to preamplifier 478. Data signals generated in controller 462 are coupled through filter 480 and further coupled into preamplifier 478.

The combined data and microphone audio signals are output from amplifier 478 and couple through switch 482 which is under control of controller 462. The function of switch 482 is to allow the controller to mute all signals being transmitted by the radio. The combined audio and data signals output from switch 482 are coupled to PLL frequency synthesizer module 484.

The PLL frequency synthesizer module 484 receives a synthesizer data signal from controller 462 and generates a radio frequency signal, at the desired frequency, modulated with the combined audio and data signals received from switch 482. PLL frequency synthesizer devices such as device 484 are well known in the art and will not be described further herein.

The modulated radio frequency signal output from PLL frequency synthesizer 484 is coupled to buffer amplifier 486. The output of buffer amplifier 486 is coupled to power amplifier 488. The power amplifier 488 output is coupled through transmit filter 490 to limit the bandwidth of the transmitted signal. The output of bandpass filter 490 is coupled to transmit receive switch 492.

The transmit receive switch 492 is coupled to the controller such that the controller 462 can change the state of the switch between a transmit state and a receive state thereby coupling the appropriate signal through antenna 494.

In the receive mode of operation, antenna switch 492 is controlled by the controller 462 to be in the receive state such that the received radio signals from antenna 494 are coupled to receive filter 496. The output of I0 receive filter 496 is coupled to preamplifier 498 and further coupled to mixer 500.

Mixer 500 receives a first local oscillator signal from the output of buffer amplifier 486 which in turn receives an input from PLL frequency synthesizer 484. Since the transmit and receive frequencies of radio 460 are different, the PLL frequency synthesizer 484 must be sent different synthesizer data from controller 462 upon each transition from transmit to receive, such that the radio transmits on the correct frequency and further the radio receives on the correct frequency.

The combined radio frequency signal from amplifier 498 and first local oscillator signal from amplifier 486 mix in mixer 500 to produce a first intermediate frequency which is coupled to first intermediate frequency circuit 502. First intermediate frequency circuit 502 amplifiers and filters the first intermediate frequency and couples this signal to second mixer 504. Mixer 504 receives a second oscillator frequency from second oscillator 506. The combined first intermediate frequency and second oscillator frequency mix in mixer 502 to produce a second intermediate frequency which is coupled to second and immediate frequency circuit 508. For example, the first intermediate frequency may be approximately 10.7 MHz and the second intermediate frequency may be 455 KHz.

The second intermediate frequency is coupled to FM detector 510 where the modulated signal is detected within the radio frequency carrier. The output of FM detector 510 is coupled to a decode circuit 512 for the detection of subaudible data within the receive signal. The decoded data from decoder 512 is coupled to an input of controller 462. The output of FM detector 510 is further coupled to filter 514.

Filter 514 is a high pass filter that separates the subaudible data from the audio signal detected by detector 510. The output of filter 514 is coupled through switch 516 which is under the control of controller 462. The controller controls the receive signal and mutes it under the control of switch 516.

The output of switch 516 is coupled to preamplifier 518 which receives a second input from oscillator 519. The output of oscillator 519 may be one or more tone signals used to give call progress information to the user. The activation and deactivation of tones from oscillator 519 is under the control of controller 462. The combined received audio signal and tone signals preamplified by amplifier 518 are coupled to audio power amplifier 520 which is in turn coupled to loud speaker 522.

The above described radio allows for the transmission and reception of audio signals. In addition, the radio provides for the transmission of subaudible signalling data transmitted together with the audio signals, and, further for the reception of subaudible signals and the detection of them by the controller. The transmitted and received subaudible signals are used in the LTR® and ESAS® protocols for channel management and various data communications between the radio and the trunking system.

Reference is directed to FIG. 12 which is a data diagram for the LTR® repeater frame 360 as known in the prior art. The LTR® repeater frame 360 includes a nine bit sync pattern 362 which is used by the receiver of the radio to distinguish the beginning of a data message as opposed to noise or other data. The LTR® repeater frame 360 also includes a one bit area bit 364 which is used to arbitrate co-channel interference with adjacent sites. The LTR® repeater frame further includes five bits of GOTO repeater information 366. The GOTO repeater field tells the radio which repeater a call is to be received on.

When a radio receives a valid LTR® repeater frame, it checks the GOTO repeater field 366 and determines which repeater, in a trunk group, it is to listen to in order to receive a call. The LTR® repeater frame 360 further Includes a five bit HOME repeater field 368. The HOME repeater field 368 indicates the HOME channel of the radio initiating a call. The eight bit ID field 370 indicates the ID code of the group of radios transmitting the call.

The combination of the five bit HOME repeater field 368 and the eight bit ID field 370 uniquely identify a group of radios within any given cell. When a group of radios receives an LTR® repeater frame, they compare their own HOME repeater and ID with the HOME repeater and ID being transmitted in the LTR® repeater frame 360. If there is a match, the radios will open their squelches and receive the audio signal being transmitted.

The LTR® repeater frame 360 further includes a five bit FREE repeater frame 372. The FREE repeater field 372 is used by radios when they attempt to transmit and access the system to indicate which repeater is currently FREE to accept transmission from a radio. At the instant the user presses the push to talk button on his radio, the radio checks the FREE repeater field 372 and changes its transmit frequency to coincide with the frequency of that FREE repeater and begins the transmission on that frequency. Finally, the LTR® repeater frame 360 includes a seven bit parity field 374. The parity field 374 is a modified block check sum which allows the radio to determine if there has been a bit error in the transmitted LTR® repeater frame.

The LTR® repeater frame 360 is transmitted at approximately ten second intervals by a repeater which is idle and not currently carrying voice traffic. When a repeater is carrying audio traffic, the LTR® repeater frame is transmitted repetitively and continuously for the entire duration of the call. The continuous transmission of LTR® frames causes the radios who have the same home repeater and ID fields to hold open their squelch circuits so that a radio broadcast is received. At the end of a call, the LTR® repeater transmits an end of transmission (EOT) message which informs other receiving radios to close their squelch and mute the audio signal.

Reference is directed to FIG. 13 which is a data diagram of the LTR® radio frame 376 known in the prior art. Th LTR® radio frame is similar in structure to the LTR® repeater frame 360. Whereas the LTR® repeater frame 360 is the data frame transmitted by the repeater, the LTR® radio frame 376 is the data frame transmitted by the radio during trunking channel management.

The LTR® radio frame 376 includes a nine bit sync pattern 378 which is identical to the nine bit sync pattern in the LTR® repeater frame 362. Likewise, the LTR® radio frame includes a one bit area field 380 which is used in the same fashion as the one bit area field 364 in the LTR® repeater frame 360.

LTR® radio frame 376 includes a five bit repeater IN USE field 382. The repeater IN USE field 382 transmits the repeater number of the repeater that is currently carrying the transmitted audio signal from the radio transmitting the present LTR® radio frame. The LTR® radio frame 376 also includes a five bit HOME repeater field 384. This HOME repeater field 384 is used in the same fashion as the HOME repeater field 368 in the LTR® repeater frame 360. However, the HOME repeater field 384 transmitted by the radio in the LTR® radio frame 376 will always transmit the home repeater for that particular group of radios.

The LTR® radio frame 376 also includes an eight bit iD field 386. The eight bit ID field transmitted in the LTR® radio frame by a radio is always the ID code for that radio. As in the LTR® repeater free, the combination of the HOME repeater field 384 and the ID field 386 are combined to uniquely identify the transmitting radio group within a particular cell site. The LTR® radio frame 376 also includes a five bit PASS field 388. The five bit PASS field is always all "1s" and serves to reduce false messages in noise. Finally, the seven bit parity field 390 and the LTR® radio frame 376 are used in the same fashion as the seven bit parity field 374 in the LTR® repeater frame 360.

During a transmission, The radio continuously transmits repetitive LTR® radio frames. At the beginning of a radio transmission, the radio and the repeater handshake in the following fashion. When the radio is keyed, it transmits a first LTR® radio frame to the repeater and then reverts to the receive mode. The repeater subsequently transmits an LTR® repeater frame to the radio indicating the reception of the LTR® radio frame from the radio. The repeater also immediately opens the repeat audio signal and begins broadcasting the received audio from the radio on the LTR® repeater transmit frequency. The radio, upon receiving the return broadcast from the repeater immediately reverts to the transmit mode of operation and opens the microphone mute switch thereby allowing the transmission of audio signal from the radio transmitter to the repeater receiver and then rebroadcast by the repeater transmitter to the various radios enabled to receive the particular HOME repeater and group ID being transmitted.

The foregoing description of LTR® repeater frames and LTR® radio frames together with the protocol discussion are well known in the prior art and products compatible with the protocol are manufactured by several companies.

Upon considering the ID naming structure used in the prior art LTR® data framing, it will be understood that the eight bit ID field can define a maximum of 256 ID codes. It will also be understood that the five bit HOME repeater field can describe a maximum of 20 repeaters. Therefore, the maximum number of HOME repeater-ID combinations for a given trunking system will be 5000. Since the FCC allows only 20 radio channels to be trunked into one trunk group, it would appear that the 5000 ID codes would be adequate for any given trunk system.

Upon considering a trunked network which includes a large number of radio sites, and given the fact that most users would desire access to most of the radio sites, it can be seen that the ID code pool would be depleted quickly. Since the prior art ID code naming scheme does not provide for the definition of a cell site ID, it is not well suited for use in large multi-cell networks.

Reference is directed to FIG. 14 which is a data diagram for the ESAS® data frame 392. The ESAS® data frame includes a nine bit sync field 394. The sync field 394 differs from the LTR® data frame sync fields in that certain bits are inverted. The purpose for inverting the bits is so that a suitable sync pattern can be provided which is undetected by the prior art LTR® radios. Since the ESAS® frame nine bit sync pattern does not match the LTR® data frame sync pattern, the LTR® radios do not detect the presence of a data message and do not compare their HOME repeater and ID code with that being transmitted.

The ESAS® radios are capable of detecting both the prior art LTR® sync field and the ESAS® sync field 394.

Referring again to FIG. 14, the ESAS® frame 394 also includes a three bit command field 396. The ESAS® frame further includes a 21 bit data field 398 and a seven bit parity field 400. The seven bit parity field 400 is a modified block check sum field as in the prior art.

It can be seen that the total number of bits in an ESAS® frame is equal to 40 bits. Also in the prior art LTR® data frame, 40 bits are employed. The ESAS® system interleaves ESAS® data frames together with LTR® data frames. The process of interleaving the two different types of data frees allows the ESAS® system to communicate with prior art LTR® radios, allowing it to be backwardly compatible, while also allowing the ESAS® system to communicate with ESAS® radios. The ESAS® data frame, as shown in FIG. 14, allows the ESAS® system to transmit a three bit command field which allows for a total of eight different special ESAS® commands.

The ESAS® protocol provides for eight ESAS® repeater commands and eight ESAS® radio commands. The ESAS® repeater commands include CELL-NAME which is a command sent out by the system four times every five seconds, that radios use to determine which cell they are currently listening to.

The second ESAS® repeater command is the CENSUS command. The CENSUS command is sent out by the system to force all radios to check into the system.

The third ESAS® repeater command is the HEY-YOU command. This command is sent out by the system to contact a specific radio or group of radios.

The fourth ESAS® repeater command is the TEMP-ID command. This command is sent out by the system to assign a radio or group of radios to a temporary group ID. A temporary group ID is an LTR® HOME repeater and LTR® ID combination which is assigned by the ESAS® system on a temporary basis for the duration of a single call only.

The fifth ESAS® repeater command is the EOC command. This command is sent out by the system and indicates the end of a conversation to all of the radios.

The sixth ESAS® repeater command is the PERMITS command. This command is sent out by the system to set the permission of a radio. It can also be used to enable the radio's ROAM icon to be illuminated.

The seventh ESAS® repeater command is the SID command. This command is sent out by the system to indicate the short ID code of the radio being talked to.

The eighth ESAS® command is the STATUS command. This command is sent out by the system to deliver a status message to a radio. The foregoing commands may be accompanied by a data field 398 as shown in FIG. 14.

The ESAS® data frame also provides for eight ESAS® radio commands. These commands include the SID command which is sent by the radio to indicate its short ID code.

The second ESAS® radio command is the CELL-NAME command. This command is sent out by the radio to indicate the cell that it is talking to.

The third ESAS® radio command is the PERMITS command. This command is sent out by the radio as the second in a series of two commands when checking into a new system. This command informs the system of permissions that the radio is preprogrammed with.

The fourth ESAS® radio command is the WHAT command. This command is sent by the radio to the system in response to the system's HEY-YOU command. Together, these two commands allow for the establishment of communications between the ESAS® system and an ESAS® radio.

The fifth ESAS® radio command is the CALL command. This command is sent by the radio to place a call using its short ID code as the source radio.

The sixth ESAS® radio command is the EOC command. This command is sent by the radio to indicate the end of a call.

The seventh ESAS® radio command is the STATUS command. This command is sent by the radio to indicate a change in the radio's status.

The eighth ESAS® radio command is the CHECK-OUT command. This command is sent by the radio to check out of system. In a similar fashion to the ESAS® repeater commands, the ESAS® radio commands my be followed by a 21 bit field of data.

During normal operation and in placing a radio call between a ESAS® radio and system, it is common for the ESAS® system to initiate a call using ESAS® data frames wherein the radio requests to place a call and the system responds by assigning a temporary LTR® ID. For the duration of the audio conversation, the LTR® temporary ID is used in a fashion similar to an LTR® ID, as known in the prior art. Upon completion of the call, the temporary ID is taken back by the system and is available to be used again in a subsequent call. In this fashion, the ESAS® system has the capability of providing service to a very large number of radios because ID codes are used on a temporary basis.

The 21 bit data field 398 as shown in FIG. 14 is used to transmit the ESAS® short ID code, or SID. The SID provides for seven bits of cell information and 13 bits extension or ID information. Therefore, the SID has the capability to define over one million unique ID codes. The ESAS® command also provides for a unique ID, or UID code. The UID is a 32 bit pattern which provides for over two billion unique identifications. For the remainder of this discussion, UID and SID will be used to describe the 21 bit field SID in the ESAS® system.

Because of the combination of prior art LTR® data frames and the ESAS® data frames, it can be said that the ESAS® switch is a hybrid system. The ESAS® data frames provide for the use of new commands and also the transmission of new data between the radio and repeaters. These new capabilities include the transmission of SIDs and UIDs, the transmission of telephone numbers and other call destinations, the transmission of priority and permission information as well.

It should be understood that whether it is an LTR® system or an ESAS® system, the trunking channel management and the squelch control of the radios is controlled by the conventional LTR® subaudible IDs. This explains why it is necessary to interleave the LTR® data frames with the ESAS® data frames. It is essential to maintain a reasonable continuity of LTR® data frames to handle channel management and squelch control between the radios and repeaters. The ESAS® data frames are interleaved so that commands can be sent to and from the repeater without interrupting the normal channel management sequence and squelch control. In prior art plan mobile communication systems, the primary service provided end users which dispatch service utilizing transmission trunked signalling. Transmission trunk signalling is such that each push of the microphone push to talk button causes an access with the repeater and then as long as the push to talk button is held depressed, the user can speak, the repeater repeats the audio and the group of users associated with the user who initiated the call will hear the transmission. Upon releasing the push to talk button, the communication is terminated and the repeater than was used is returned to the pool of repeaters in the trunk group.

Also in the prior art, it was common to interconnect a repeater to a telephone line. In doing so, the transmission trunk mode of operation could not be used because the nature of a telephone conversation is to have a conversation trunk mode of operation. In a conversation trunk mode of operation, the repeater is kept active during the entire conversation. Therefore, wherein transmission trunked operation involves a separate access to the repeater for each portion of a conversation in a conversation trunked mode of operation, the repeater is kept active for the entire conversation.

The ESAS® system provides service in both the transmission trunked and conversation trunk modes of operation. However, instead of having a direct connection between each individual repeater and a telephone resource, the ESAS® system provides a matrix switch as described earlier which allows for the flexible interconnection of various resources and repeaters under software control. Since a typical ESAS® cell may include a plurality of repeaters, a plurality of telephone lines and possibly a plurality of network links, it is necessary for the software system to handle a variety of tasks simultaneously.

In order to accomplish this effectively, the ESAS® system utilizes a multi-tasking, multi-threaded operating system. In the preferred embodiment, an IBM 0S/2 operating system is used. The use of a multi-tasking, multi-threaded operating system allows the software architecture to be designed such that each task being handled by the system is operated as a separate thread within the software. Each call in an ESAS® system initiates a thread in the a multi-tasking, multi-threaded i0 operating system that flows through to completion. Multiple threads may run concurrently.

Since the ESAS® architecture provides for networking capability, that is the interconnection of calls between sites via network links, the architecture of the software is designed to support networking architecture. It is known in the prior art for non-radio system networks to use the ISO network model.

Figure 17A:
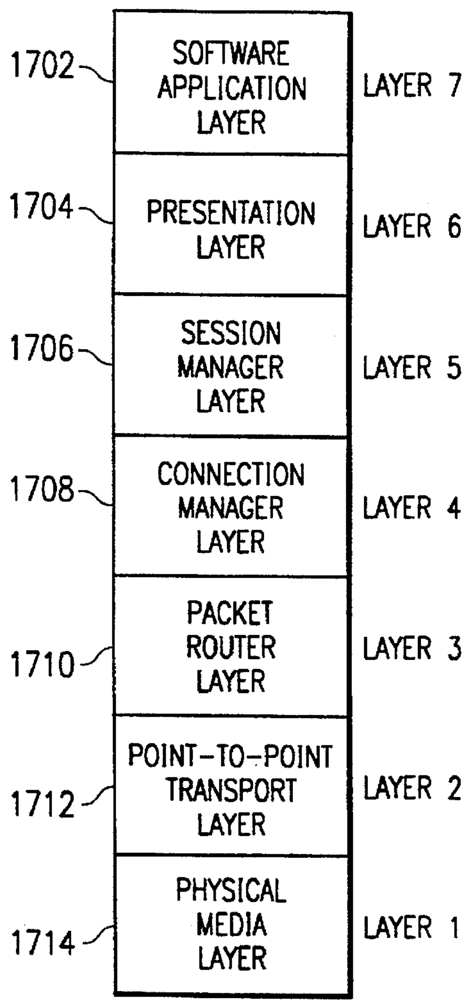
FIGS. 17A and 17B are block diagrams of the ISO, 7-layer network protocol stack.

Reference is directed to FIG. 17A which is a software block diagram of a network control system as known in the prior art. The 7-layer network architecture depicted in FIG. 17A is a common ISO standard and is known by those skilled in the art. Layer 7 1702 is the software application layer. The software application layer 1702 is the layer in the network where high level applications interface with the subsequent layers which handle communications.

Layer 6 is the presentation layer 1704. The presentation layer 1704 handles communications between high level applications and the session manager layer at 1706. The function of the presentation layer 1704 is to translate communications from the software application layer 1702 into a usable form for the session manager layer 1706.

Layer 5 is the session manager layer 1706. The session manager layer 1706 handles end-to-end communication sessions between different points within the network.

Layer 4 is the connection manager layer 1708. The connection manager layer is responsible for making point-to-point connections within the network at the direction of the session manager layer 1706.

Layer 3 is the packet router layer 1710. The packet router layer 1710 is responsible for receiving data from the connection manager layer 1708 and organizing the data into packets and handling the transmission of packets from end to end within a connection.

Layer 2 is the point-to-point transport layer 1712. The point-to-point transport layer is responsible for receiving data packets from the packet router layer 1710 and transporting the data packets from end to end across a given connection.

Layer 1 is the physical media layer 1714. The physical media layer 1714 is the actual media which carries data within the network. Such media may comprise a telephone line, a microwave length or a radio frequency channel. In the future, it is conceivable that the physical media layer may also be fiber optic or satellite communication links.

The purpose of the foregoing 7-layer network architecture is to allow development of networks where individual components of the networks can be designed and built independent of other individual elements in the network. For example, high level software applications to control the network can be developed independent of the knowledge of the physical media which will transport the information across the network. Such network architectures are well known in the art and are used by many industries.

Figure 17B:
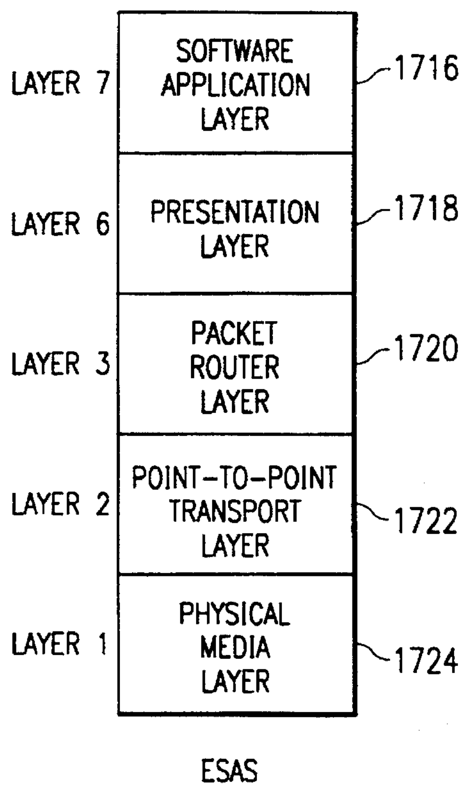

Reference is directed to FIG. 17B which is a software block diagram for the network architecture in the ESAS® system. The ESAS® network utilizes five of the seven layers in the standard ISO model. Layer 4, the connection manager layer, item 1708 in FIG. 17A and layer 5, the session manager layer, item 1706 in FIG. 17A, are not require din the ESAS® system. These layers are not required because the ESAS® system is a proprietary architecture and is intended to handle relatively small blocks of data. Layer 5 and layer 4 are predominantly used in the management of large blocks of data. Therefore, the presentation layer 6, item 1718 of FIG. 17B can communicate directly with the packet router layer 3, item 1720 in FIG. 17B. In summary, the ESAS® network system utilizes the software application layer which is layer 7 or item 1716. The presentation layer, layer 6, item 1718, the packet router layer, layer 3, item 1720, the point-to-point transport layer, layer 2, item 1722 and the physical media layer, layer 1, item 1724.

Figure 18:
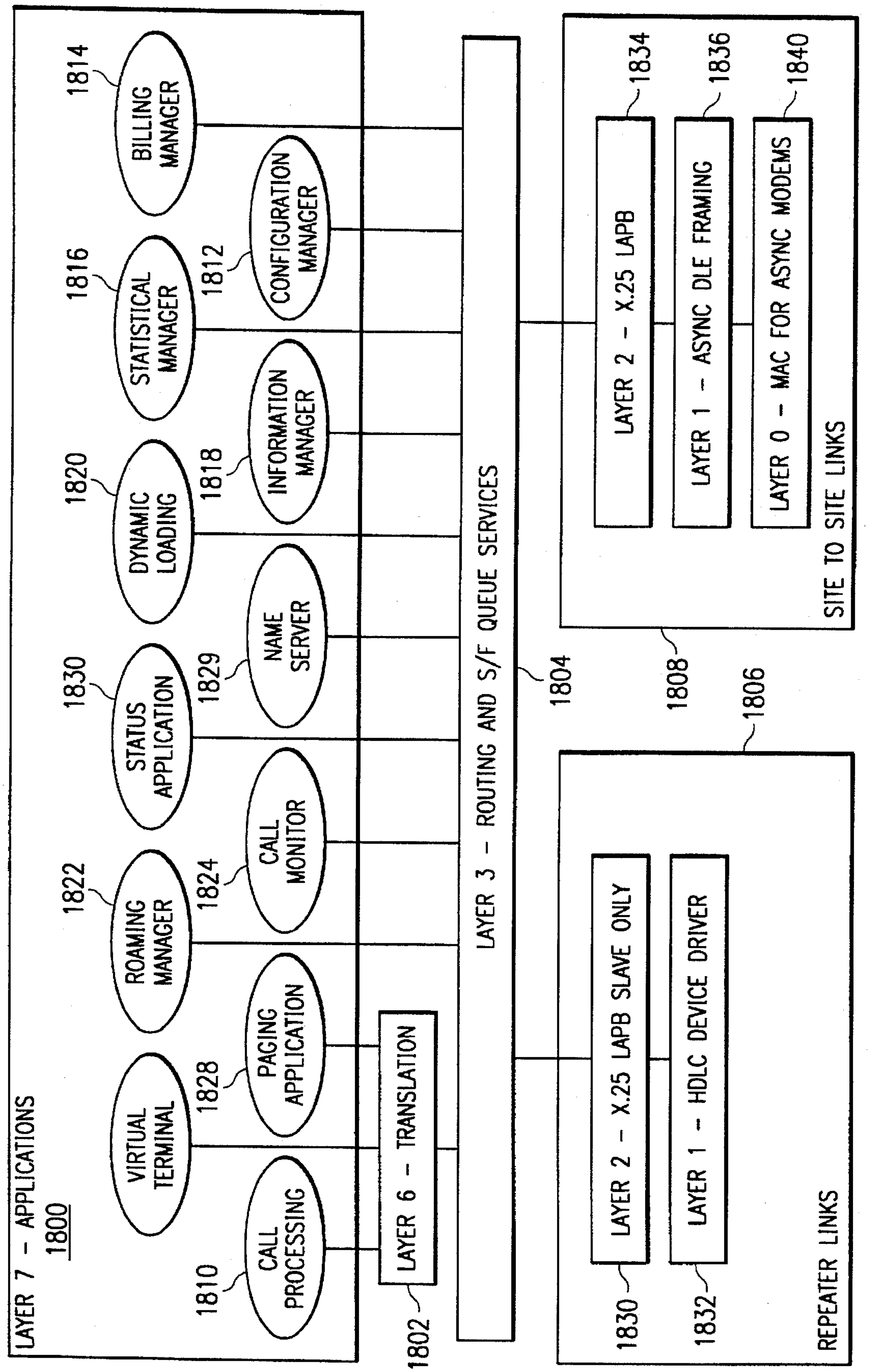
FIG. 18 is a block diagram of the layer 7 software applications in the ISO 7-layer network protocol stack.

Reference is directed to FIG. 18 which is a software block diagram of the major software components in the ESAS® network system. The diagram is structured in similar fashion to the ISO network layers depicted in FIG. 17B. Layer 7 applications 1800 communicate with layer 6 applications 1802 or directly with layer 3 applications 1804 which in turn communicate with the lower layers.

The lower layers, layer 1 and layer 2 are divided into two groups. Those that communicate with RF repeater links 1806 and those that communicate with site to site interconnections and the public switch telephone network 1808. The layer 7 applications 1800 includes all the high level applications that perform the various functions of the ESAS® switch.

The call processing engine 1810 is an application that handles all global call and resource management for the system. The call processing engine is the central control point for call management. A more thorough description of the call processing engine 1810 will be described later. The call processing engine 1810 communicates through layer 6, the presentation layer, which provides translation of commands between the call processing engine and the packet router layer, layer 3.

The configuration manager 1812 is a software application that provides a user interface for the input of various data for the configuration of the ESAS® switch. Configuration data is stored in data structures in a memory within the ESAS® switch. Configuration information may include information about least cost routing, custom calling information, roaming data, direct inward dialing data, cell information and user information and other variables utilized by the ESAS® switch. The billing manager 1814 is a high level software application which gathers call data, stores the call data in a memory and is used to generate time stamped billing records and other billing records. The billing manager 1814 provides import and export capability for transferring data between other third party software applications.

The statistical manager 1816 is a software application which gathers data from within the memory of the ESAS® switch and produces statistical reports regarding performance of the ESAS® switch. Examples of such statistical reports include average repeater loading, average call duration, call duration as a function of time and loading as a function of time.

The information manager 1818 receives call information from the call processing engine 1810 and stores it in an information memory. The information manager 1818 also does reasonableness testing on information received from the call processing engine and can interrupt call flows in the event unreasonable call transactions are being requested by the call processing engine 1810. The purpose for the information manager is to add fault tolerant capability to the ESAS® switch and to generate a record of faults or improper calls placed by the call processing engine for later review by the system operator.

The dynamic loading software application 1820 controls the relationship between transmission trunked dispatch communication and conversation trunked telephone interconnect communications. Since transmission trunked dispatch communication more efficiently utilize radio frequency spectrum, it is desirable to allocate a certain percentage of the system radio frequency resources for transmission trunk services only. The dynamic loading application 1820 allows for the dynamic control of the percentage of system radio frequency resources that are set aside for transmission trunk services. For example, during peak loading periods such as normal business days, the dynamic loading application may reserve a relatively large percentage of system resources for transmission trunked communications. However, during off-peak traffic periods such as late in the evening or weekends, the dynamic loading application may allocate a larger percentage of the system resources for conversation trunked communications. The dynamic loading application 1820 will be discussed in more detail later.

The roaming manger software application 1822 is a software application that tracks the location of roaming mobiles within the network. Each mobile radio is assigned a home cell and it is the home cell that tracks the location of its roamed radios. As radios roam through the network, they check into each new cell that they visit and that cell in turn sends a message to the home cell of that radio and informs the home cell of the radio's location. The roaming manager 1822 keeps track of the current location of each radio and provides a display to the system operator so that the location of radios can be determined. Also, the roaming manager provides information to the call processing engine about the location of roamed mobiles so that the call processing engine can route a call to the specific location of a roamed radio. The roamer information is stored in a roaming data structure as shown in FIG. 28.

The call monitor software application 1824 is a diagnostic tool used by the system operator. Call monitor application 1824 displays important information about the activity within any given call. In the event that a call is not completed, the call monitor will track the activity of the call processing engine and indicate at what point during the processing of any given call the call function ceased. This capability allows the system operator to determine what hardware or software resource is not functioning properly when the network is unable to complete a given call.

The virtual terminal 1826 is a software application that provides a direct connection between layer 7 and any specific RF repeater. The virtual terminal 1826 displays the functional status of the repeater on a display so that traffic flow can be monitored in real time. This serves as an important diagnostic tool for system operators when adjusting equipment.

The paging application 1828 is a layer 7 application that allows for the communication of digital paging message between telephone resources and radios within the ESAS® network. Messages are recorded into a memory in the ESAS® switch and then are subsequently distributed to mobile radio users. When a radio checks into a new cell location, the call processing engine checks with the paging application to determine if the particular ID of the radio that has checked in has any page messages waiting. If any page messages are waiting, then the call processing engine requests the paging application to transmit the page to the particular radio.

The status application 1830 is a software application sends and receives status messages, where such functions are allowed. A status message may indicate that a commercial vehicle is out of service, for example.

The name server 1829 is a layer 7 application that interprets numbers dialed. Typically, a call request includes a number dialed. The call processing application passes the number dialed to the name server for analysis and conversion. The name server will be described in greater detail later.

The call processing application 1810, the virtual terminal application 1826, and the paging application 1828 communicate with the lower layers through layer 6 1802. Layer 3, the packet router layer 1804, provides for the routing and store and forward queue services in the network. This layer buffers the flow of data to and from the layer 7 application and controls the point-to-point routing within the network.

Information that flows to and from RF repeaters is connected through block 1806. Block 1806 includes an ISO X.25 LAPB slave only mode of operation at block 1830. X.25 is an IS0 standard and LAPB is a link access protocol bisynchronous mode of operation identified in that standard. The physical media layer 1 at 1832 utilizes a half duplex link control device driver configuration. The hardware for the layer 1 application is detailed elsewhere in this application.

Information that flows from the layer 3 1804 to telephone lines for site-to-site links is connected through block 1808 which uses a different protocol stack technique than is used in the repeaters. The point-to-point transport layer, layer 2 at block 1834, also utilizes the ISO X.25 LAPB standard.

The layer 1 physical media layer utilizes an ISO asynchronous DLE framing protocol. This framing protocol utilizes the data link escape sequence as outlined in the ISO standard. For intersite data only communications, the ESAS® network utilizes an MAC asynchronous modem protocol at block 1840. This mode of operation is also an ISO standard MAC for media access control that is commonly used in asynchronous modems. The foregoing descriptions of the packet router layer, layer 3, point to point transport layer 2, and physical media layer, layer 1, are well known in the art and will not be discussed further here.

Figure 16:
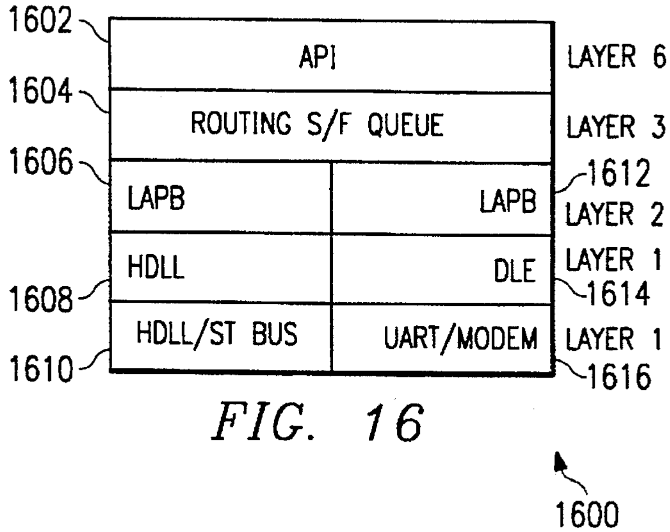
FIG. 16 is a software block diagram of the Application Programming Interface software.

Reference is directed to FIG. 16 which is a software block diagram 1600 of the application programming interface protocol or API used in the ESAS® network switch for network communications. The ESAS® cells access each other through both voice and data communications. For voice communications a simple dial up telephone line or dedicated audio grade network link can be utilized. However, for intersite data communications, it is necessary to provide a data interface between the application software among the different ESAS® cell sites.

Intersite communications are accomplished using a modified 7 layer ISO network model as described earlier. Communications flow from local resources such as repeaters up through the layers of the ISO network stack and then back down through the layers and out network links. In FIG. 16, the API is represented at layer 6 of the ISO protocol stack. This is the translation layer between higher level layer 7 applications and the lower level routing layers. Layer 3 uses the same routing and store and forward queue as described earlier for both repeater local resources and network link resources. The LAPB or link access protocol bisynchronous mode at level 2 1606 and the half-duplex link control 1608 are used to communicate with the repeaters at level 2 and level 1. Ultimately the interface to the repeater is via the HDLC ST bus interface at 1610. This was described earlier in the network architecture of the ESAS cell. For intersite linkings, the LAPB at 1612 is also used. The interface at level 1 is via the data link escape sequence at 1614. The hardware interface is a UART or universal asynchronous receiver transmitter is commonly used in data communication systems interfaced to a conventional modem at 1616. The modems may be configured for dial up connection or for dedicated connection, operating in either synchronous or asynchronous mode. The foregoing protocol stack allows for high level layer 7 applications to communicate with one another even across long distances and network links. A published document available from Uniden America Corporation, document No. X-IS-0001-2/93 gives a complete definition of the ESAS® API interface specification. A copy is included as Appendix 5.

In any event, when a radio accesses the system to place a call it is the responsibility of the call processing engine software application to manage the processing of the call within the ESAS® switch. Every call that is initiated in an ESAS® switch is assigned a call data structure which stores a variety of information about the call. This information would include the source of the call, the destination of the call, the priority of the call, the permission and other essential call information.

During the processing of a call, the call processing engine will call other functions within the ESAS® switch to gather information about the call, such as finding a resource to place the call or determining the location of a radio to which is a call is placed. In doing this, the technique used in the ESAS® switch is to pass a pointer to the call data structure to each function that is requested to perform an operation on a call. If one of the functions called by the call processing engine finds it necessary to manipulate the call data, it makes the change within the call data structure memory by manipulating certain variables. For example, if the name server application determines that a radio had forwarded calls to an alternative number than the destination number of the call would be changed in the call data structure memory by the name server. Subsequently, when the call processing engine requested a resource to place the call, the call would be placed to the new destination number that had been written into the call data structure memory by the name server.

A similar technique is used for all sorts of data stored within the ESAS® switch. The data structures reside in memory and they are manipulated by various functions and each time access to the information is needed, all functions access the same set of data.

The ESAS® switch is capable of a large variety of calls including simple dispatch service, radio to telephone line interconnected service, radio to radio conversation trunked service, all of those services across multiple network links, data calls, voice mail calls, page message calls and so forth. It is the responsibility of the call processing engine to manage the high level traffic flow of calls being placed within a system. Therefore, the call processing engine is necessarily a complex piece of software handling many situations and exceptions. The preferred design is to use a software state machine which utilizes a number of states that are transitioned from upon the occurrence of events which in turn call certain functions to take certain actions.

Appendix A is a software state table showing all of the functions of the call processing engine application. Along the left edge of the document are all of the software states that the call processing engine can rest in. Across the top boarder of the document are all of the events that can occur that cause the call processing engine to leave its current state. At the intersection of any given state and any given event are two blocks, the upper block containing the name of a function that is called upon the occurrence of the event that caused the call processing engine to leave its current state, and, below the function is the name of a new state to which the call processing engine will go upon completion of the function previously called.

In order to understand the function of the call processing engine state machine it is necessary to understand the definition of the states, the events and functions described therein. Appendix 2 is a tabulated list of the ESAS® software states that are utilized in the call processing engine. In Appendix 2, each listing begins with the name of the state which corresponds with the name of the state listed on Appendix 1 and a brief description of the state. Appendix 3 is a listing of the ESAS® events which includes a name of the event that corresponds with the name used in the call processing engine state table and a brief description of the event. Likewise, Appendix 4 is a listing of the ESAS® functions wherein the first line contains the function name and the subsequent lines are a brief description of the function. By reviewing the Appendix 1 call processing state diagram and referencing Appendices 2, 3 and 4 for the states, events and functions, it is possible to follow the flow of virtually any conceivable call within the ESAS® system.

For the present application, where appropriate, state diagrams will be included to detail specific features and inventions. It is to be understood that the same state diagram information is available by examining Appendices 1, 2, 3 and 4. Detail diagrams are provided for clarity only.

Figure 24:
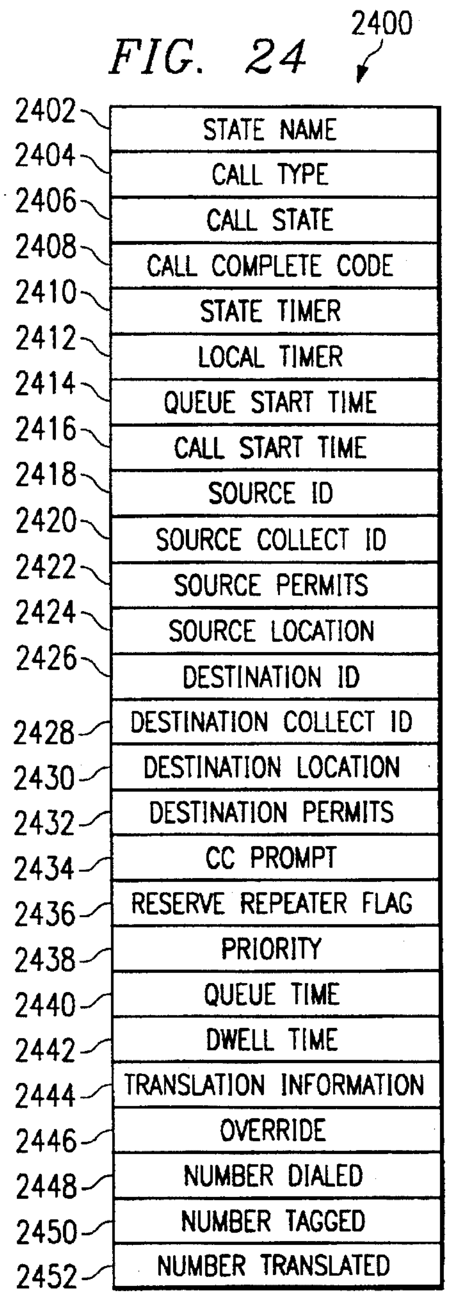
FIG. 24 is a memory data structure diagram for the call data.

Reference is directed to FIG. 24 which is a data structure diagram for the call data structure. Whenever a call is initiated in an ESAS switch, the call processing engine allocates a data structure record for the call. This data structure stores a variety of variables about the progress activities and other information about the call. As the call thread proceeds through the call processing engine, various functions are called to accomplish different tasks necessary in connecting the call. Each of these tasks is handed a pointer to the call data structure record for that call so that certain variables within the record can be manipulated in the course of processing the call.

The call data structure provides a STATE NAME field 2402 which stores a text description of the current state of the call. For example, the call may be in queue, connecting, it may be a dispatch call, or other such states and the purpose for having the STATE NAME description in the call data structure is so that the call monitor application can display on a display at the current state of a call. Call data structure also provides a CALL TYPE field 2404. Call types may be dispatch, interconnect, networked, mobile to mobile, and etc. A CALL STATE field 2404 is provided which provides a numerical code that corresponds to the STATE NAME field 2402. A CALL COMPLETE code 2408 is also stored within the call data structure. The CALL COMPLETE code indicates how the call was ultimately terminated. For example, the call was completed, the call was dropped, or the call was denied. The purpose of the CALL COMPLETE code is to provide a field of information on the final customer invoice that indicates why they are being charged a certain amount of money.

The call data structure provides a STATE TIMER field 2410. The state timer field is a timer that is started at the beginning of each state as the call processes through the call processing engine. This STATE TIMER is used as a time-out timer reference point so that the call does not remain in any given state beyond a predetermined period of time. In addition, the call data structure provides a LOCAL TIMER field 2412 which is used for local time-out timers as described in the state diagrams.

For calls that originate in the ESAS mode of operation, the ESAS mobile initiates a handshake requesting a call, then the mobile is placed in queue. The call data structure provides a QUEUE START TIME field 2414 which begins a timer at the time the call is placed in queue. A CALL START TIME field 2416 is a similar timer which begins counting at the time the call is finally connected. The time between the QUEUE START TIME and the CALL START TIME is the time that the call was in queue.

A SOURCE ID field 2418 is provided which stores the identity of the source of the call. For example, if a mobile radio placed the call, the unique idea of the mobile radio would be placed in this field. A SOURCE COLLECT ID field 2420 is provided which stores the temporary ID that is assigned to the source ID for the duration of the call. This is typically used in ESAS-equipped mobiles because the ESAS mobile requests the call using unique ID and yet channel management and squelch control are handled by a conventional LTR subaudible ID. The switch assigns a SOURCE COLLECT ID to handle this function. In addition of SOURCE PERMITS field 2422 stores a bit pattern which represents the various permissions that the source ID has. The SOURCE LOCATION field 2424 stores the final piece of information concerning the source of the radio, that is, the identity of the source cell location.

In a similar fashion, the destination of the call has fields corresponding to those of the source. There is a DESTINATION ID 2426, a DESTINATION COLLECTION ID 2428, a DESTINATION LOCATION 2430, and a DESTINATION PERMITS field 2432. Each of these fields corresponds to the source fields, however, contain information about the destination of the call.

The call data structure includes a CUSTOM CALLING PROMPT field 2434. This field stores a variable which defines a voice prompt which is to be played to the radio involved in the call. It is an optional field that is used for certain types of calls. A RESERVED REPEATER flag 2436 is also provided. This flag is set during an ESAS call when the radio is queued for connection in a call and a repeater within the trunk group has been reserved especially for handling the call. A PRIORITY field 2438 is provided to store a priority variable ranging from 0 to 15 to indicate the priority of the call. The priority begins as the priority of the source ID code. However, the priority can be changed by various software applications in this switch or by the destination ID code.

The call data structure includes a QUEUE TIME field 2440 which sets the maximum time in which the radio will be queued. If the queue time is exceeded, the call is dropped and an appropriate call complete code is assigned mo the record. A DWELL TIME field 2442 is also provided. This field is used during a transmission trunked call which is conveyed across the network and sets the maximum time a radio can be unkeyed, that is, dwelling during a call, before the call is finally dropped.

The call data structure includes a TRANSLATION INFORMATION pointer 2444 which is a pointer to a particular translation rule. This pointer is used at the Lime the call is finally connected so that the calling resource can determine the proper translation rule to use, just prior to connecting the call. An OVERRIDE field 2446 is provided which is a flag which can be set to override to indicate that the call has been given the maximum priority. This flag is used by the call monitor to display a special display code indicating the status of a high priority call.

The call data structure includes three fields related to the number being called. First is the NUMBER DIALED field 2448, then the NUMBER TAGGED field 2450, and finally the NUMBER TRANSLATED field 2452. The NUMBER DIALED field is initially filled with the called number given to the repeater by the calling mobile. However, as the call progresses through the call processing engine and the name server software applications, this number may be manipulated. For example, if a call was to be forwarded from a first number to a second number, the NUMBER DIALED would be updated to indicate the most recently known number to place the call to. The NUMBER TAGGED field is a special field used by the least cost router in translating the call wherein a portion of the original number dialed may be tagged to be used as a portion of the final number. This tagged portion is stored in the NUMBER TAGGED field 2450. Finally is the NUMBER TRANSLATED field 2452. Just prior to connecting the call, the call processing engine will fill the NUMBER TRANSLATED field with the current NUMBER DIALED field, possibly subject to further translation. This NUMBER TRANSLATED field 2452 then is ultimately dialed out the connecting resource.

It is common for the call processing engine to call the name server process to handle management of the number dialed. The name server is responsible for analyzing the number dialed, determining what type of call has been initiated and taking certain actions to prepare the call data structure to have the correct information for the call processing engine to proceed with the call.

A number dialed may comprise may comprise one or more components within the digit string received. A call pattern may be received which indicates a type of service requested by the calling party. For example, a pattern such as *7 in a number dialed might indicate that the part is requesting to place a call to the last number they called.

Therefore, it is common for a number dialed to contain a pattern which indicates a certain type of service.

Such services include last number redial, speed dial, speed dial program, call forward program, disable call forward, call forward always, call forward when busy or no answer, call forward to voice mail, call forward to pager, check voice mail, send page, call transfer or call waiting.

Certain services require more information than the mere pattern. For example, to program a speed dial number it is necessary to provide a token which indicates the location in which to store the speed dial number. The speed dial pattern might be "*8" and the token might be numbers ranging from "01" to "99." To place a speed dial program number, it would be necessary to dial *8 and then a token number such as "01." Further, it is necessary to specify the number that is to be programmed in the location specified by the token. For example, the number may be "555-1212." The required digit string to program a speed dial number in the ESAS® system would be "*8015551212." It is the responsibility of the name server to parse the number dialed into the various portions and determine the action to be taken.

In addition, the name server is responsible for determining actions such as the type of call; conversation trunked or transmission trunked, the location of a radio call, such as a local call or a network call. Furthermore, the name server must have the ability to handle exceptions where a number dialed does not fit any pattern. Also, the name server calls the least cost routing function once it is determined the correct number to be used.

In the foregoing discussion of the name server software application, certain custom calling information was required in order to complete the execution of the routines. The ESAS® switch provides two separate types of custom calling information. The first is user custom calling information and the second is network custom calling information.

The user custom calling information is a data structure that contains a plurality of records, one for each user ID, and these records contain information about recent events and actions taken by the user and certain preferences the user has. As described hereinbefore, certain data may be taken from the user custom calling data structure and placed in the call data structure.

The network custom calling information is similar to the user custom calling information in that it resides in a data structure within the ESAS® switch. The network custom calling data is specific to network functions as opposed to user custom calling data which is specific to user functions.

The Name Server is a software application that is called from other applications, notably the Call Processing Engine, and is passed a Number Dialed, (hereinafter "ND"), and returns a modified ND and/or a statement of the outcome of it analysis of the ND. The ND that is returned is a call destination used by the Call Processing Engine to place a call. This information is used by the Call Processing Engine to proceed with the call processing.

In the course of analyzing an ND, the Name Server test for the presence of a pattern, a token, and/or a destination number. A pattern is a one or more telephone digits that has special meaning and cause a special response by the system. A token is a number which represents a specific storage location for information stored within the memory of the system.

The Name Server is recursive in its function. It may, for example, be passed a first ND which is call forwarded to a second ND. As such, the first ND is analyzed by the Name Server and converted into the second ND. The second ND is then analyzed in the same way that the first ND was analyzed. This recursion may go through several repeat analysis before the desired call destination is found and the Name Server returns the call destination to the Call Processing Engine.

Referring now to FIG. 19 A through T which are flow diagrams, if the Name Server software application. The application begins at step 1900 and gets the number dialed, (ND), at step 1902. A count variable is initialized to eight at step 1904. The count is then decremented by one at step 1906. At step 1908, the count variable is compared for equality with zero, and if this is true, the Name Server returns "Bad Destination" to the calling function at step 1912 and terminates at step 1914. Alternatively, at step 1908, if the count variable is not equal to zero, the ND is tested for a Last Number Redial, (LNR), pattern at step 1916.

Figure 19A:
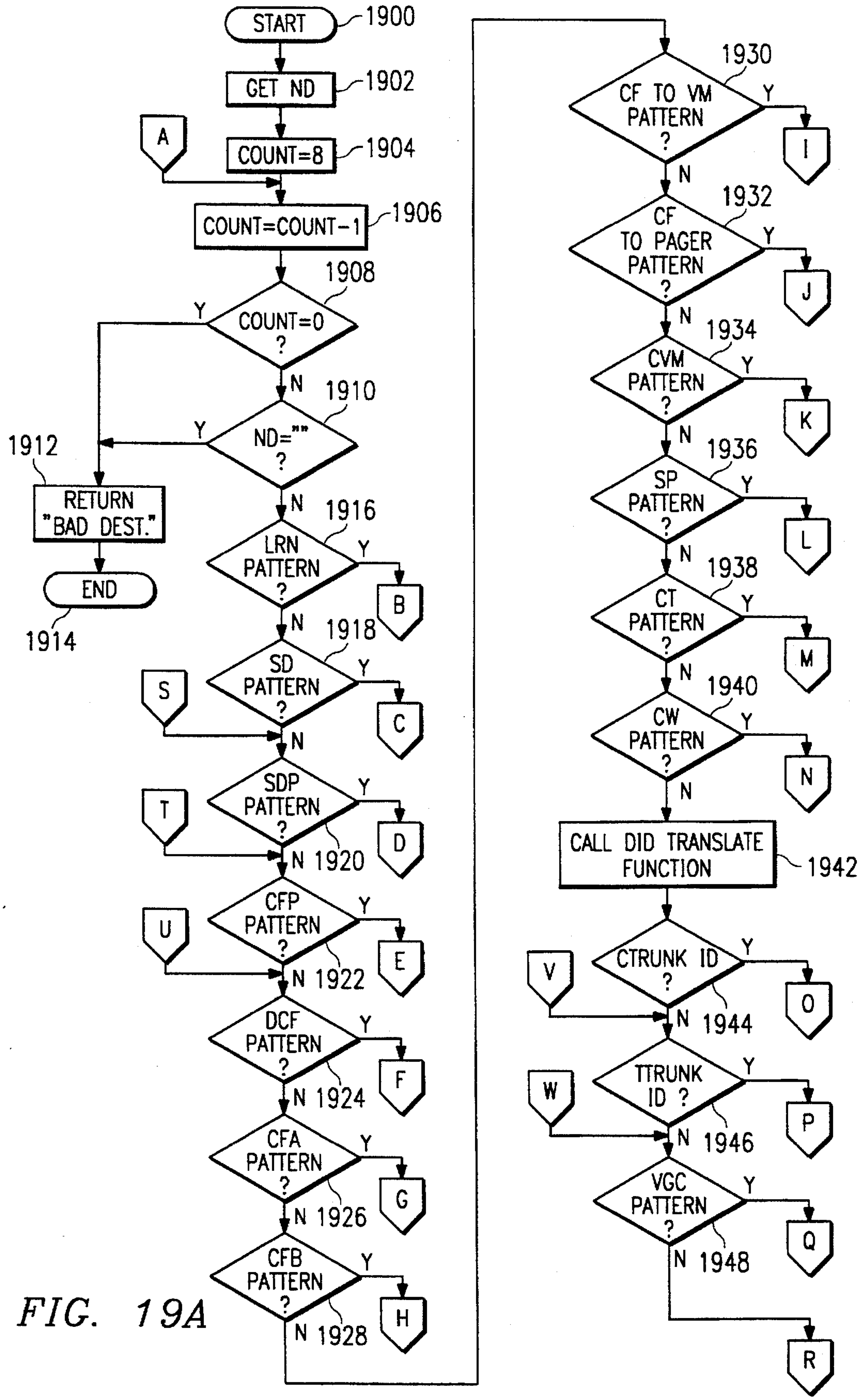
FIGS. 19A through 19T are software flow diagrams of the name server layer 7 application.
Figure 19B:
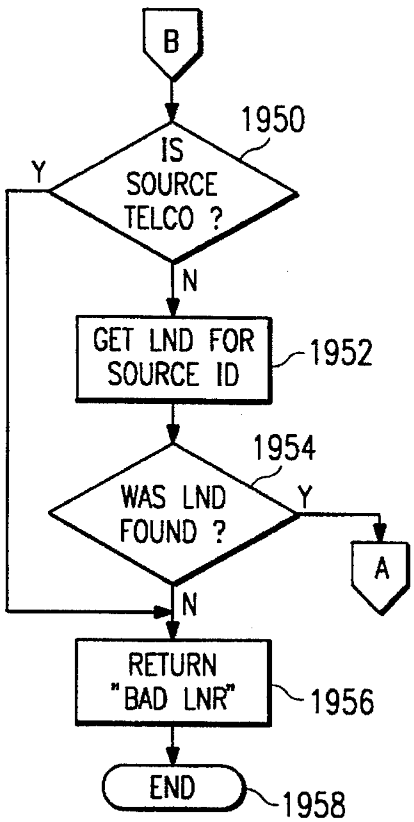

If the LNR patter is found in the ND at step 1916, the LNR routine is executed at connector "B", which connects to connector "B" in FIG. 19B. Alternatively, if the LNR pattern is not found at step 1916, the ND is tested for the Speed Dial, (SD), pattern at step 1918.

Figure 19C:
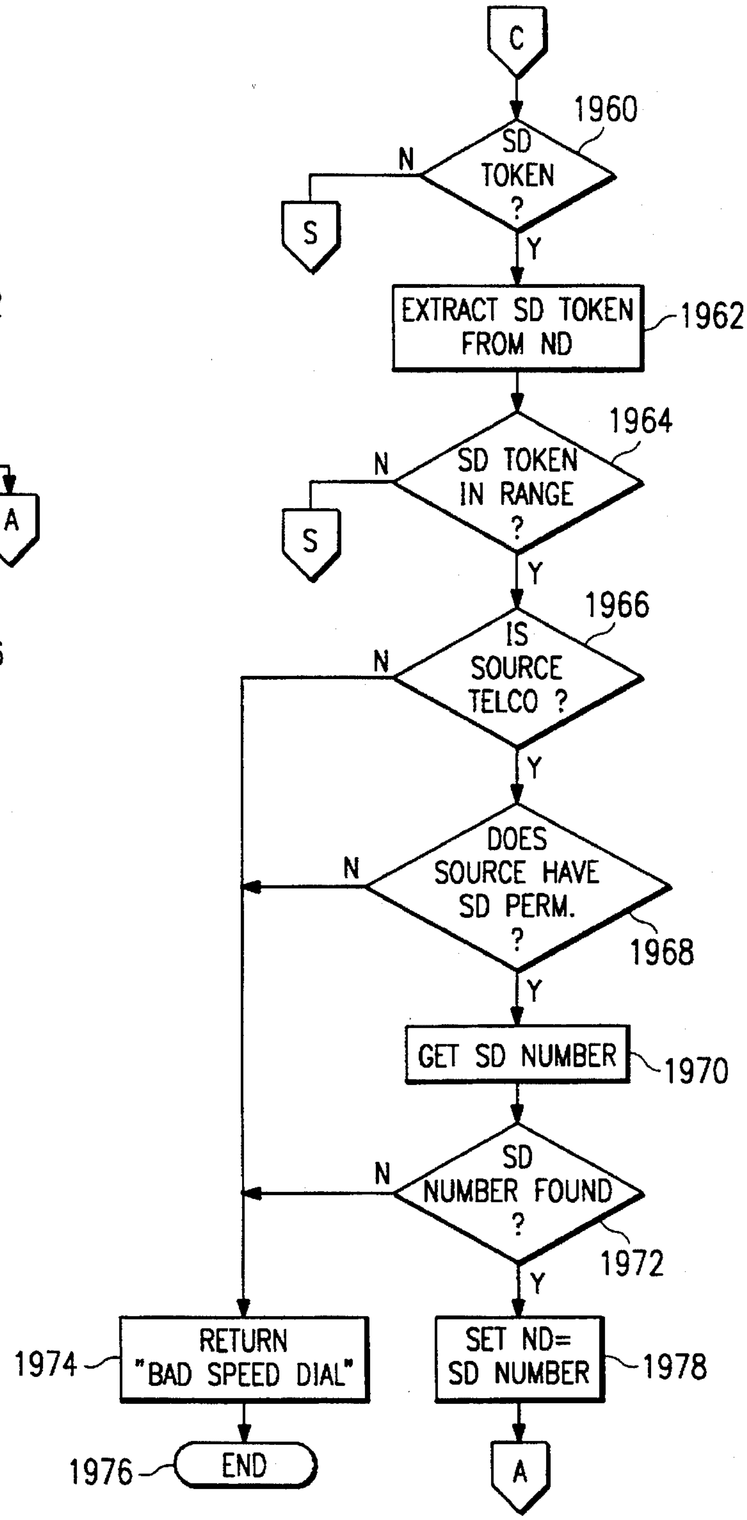

If the SD pattern is found at step 1918, the Speed Dial routine is executed at connector "C" which connects to connector "C" in FIG. 19C. Alternatively, at step 1918, if the SD pattern is not found, the ND is tested for a Speed Dial Program, (SDP), pattern at step 1920.

Figure 19D:
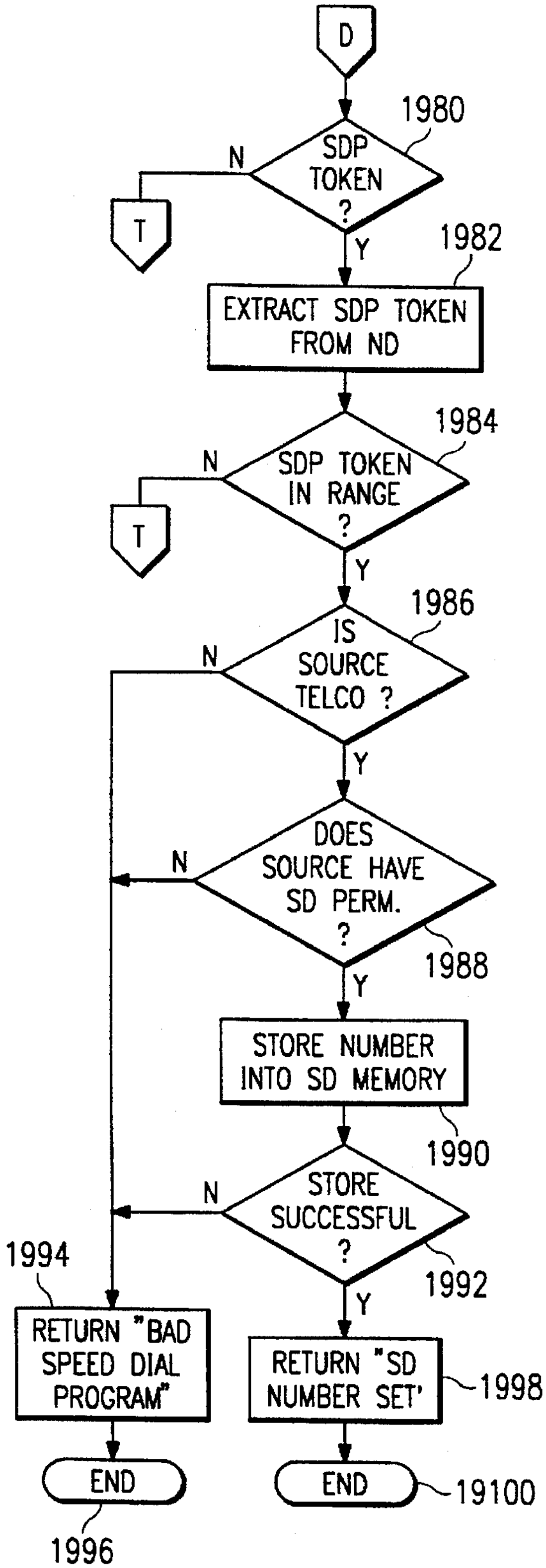

If the SDP pattern is found at step 1920, the Speed Dial Program routine is executed at connector "D", which connects to connector "D" in FIG. 19D. Alternatively, if the SDP pattern is not found at step 1920, the ND is tested for a Call Forward Program, (CFP), pattern at step 1922.

Figure 19E:
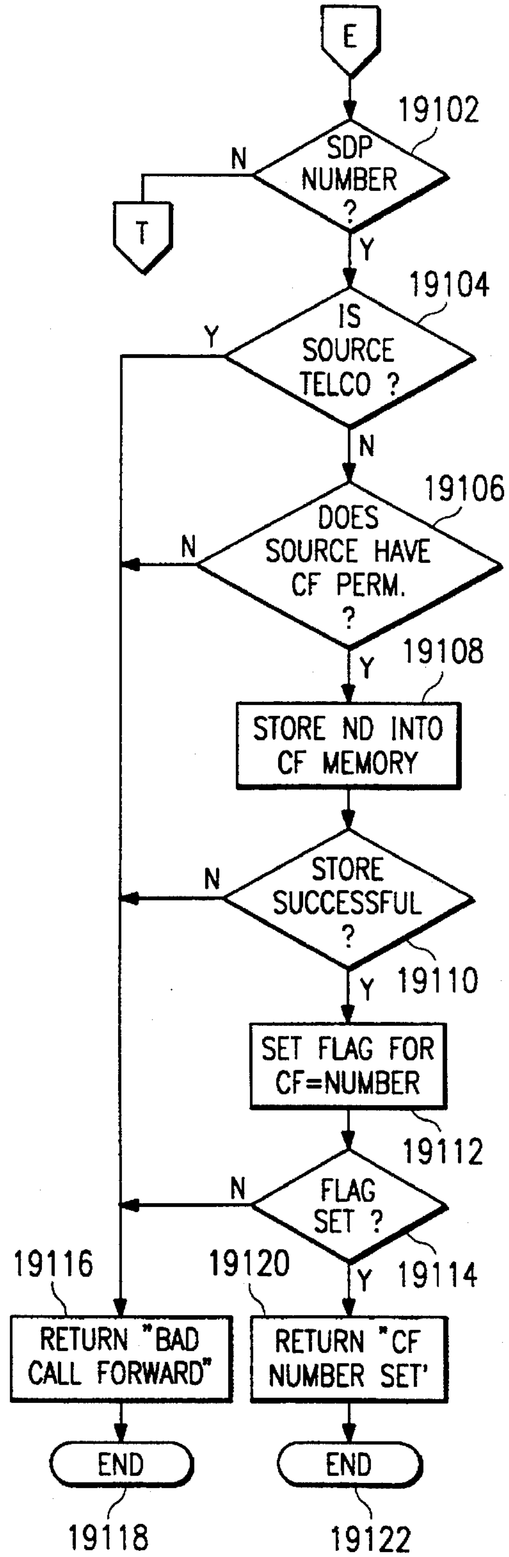

If the CFP pattern is found at step 1922, the Call Forward Program routine is executed at connector "E", which connects to connector "E" in FIG. 19E. Alternatively, if the CFP pattern is not found at step 192, the ND is tested for the Disable Call Forwarding, (DCF), pattern at step 1924.

Figure 19F:
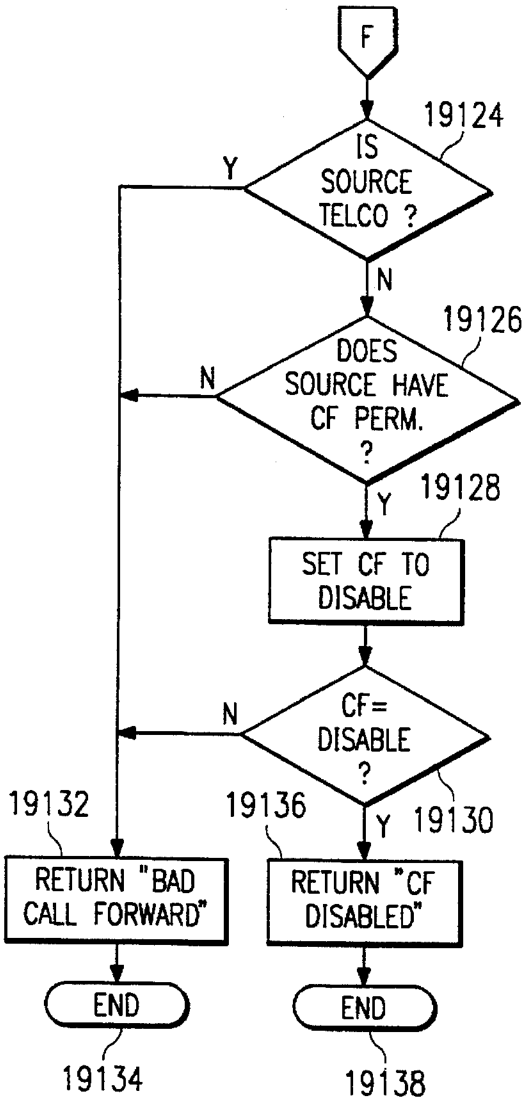

If the DCF pattern is found at step 1924, the Disable Call Forwarding routine is executed ate connector "F", which connects to connector "F" in FIG. 19F. Alternatively, if the CF pattern is not found at step 1924, then the ND is tested for a Call Forward Always, (CFA), pattern at step 1926.

Figure 19G:
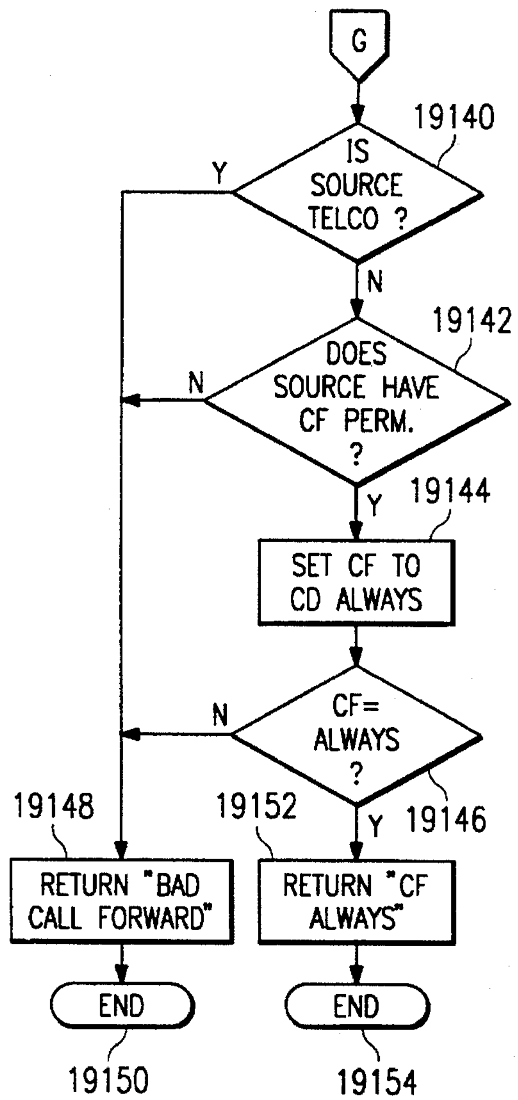

If a CFA pattern is found at step 1926, the CFA routine is executed at connector "G", which connects to connector "G" in FIG. 19G. Alternatively, if the CFA pattern is not found at step 1926, then the ND is tested for the Call Forward on Busy of no answer, (CFB), pattern at step 1928.

If the CFB pattern is found at step 1928, the CFB routine is executed at connector "H", which connects to connector "H" in FIG. 19H. Alternatively, if the CFB pattern is not found at step 1928, the ND is tested for the Call Forward to Voice Mail, (CF to VM), pattern at step 1930.

If the CF to VM pattern is found at step 1930, then the CF to VM routine is executed at connector "I", which connects to connector "I" in FIG. 19I. Alternatively, if the CF to VM pattern is not found at step 1930, the ND is tested for the Call Forward to Pager, (CF to Pager), pattern at step 1932.

Figure 19J:
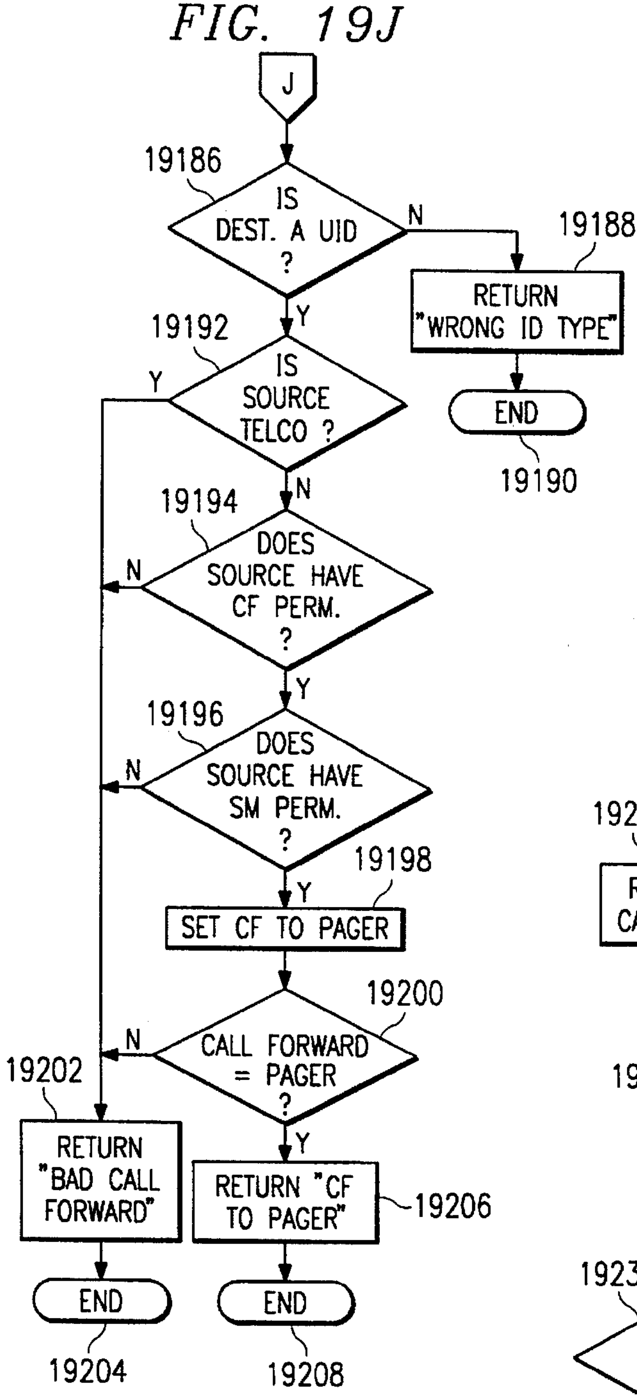

If the CF to Pager pattern is found at step 1932, then the CF to Pager routine is executed at connector "J", which connects to connector "J" in FIG. 19J. Alternatively, if the CF to Pager pattern is not found at step 1932, then the ND is tested for the Check Voice Mail, (CVM), pattern at step 1934.

Figure 19K:
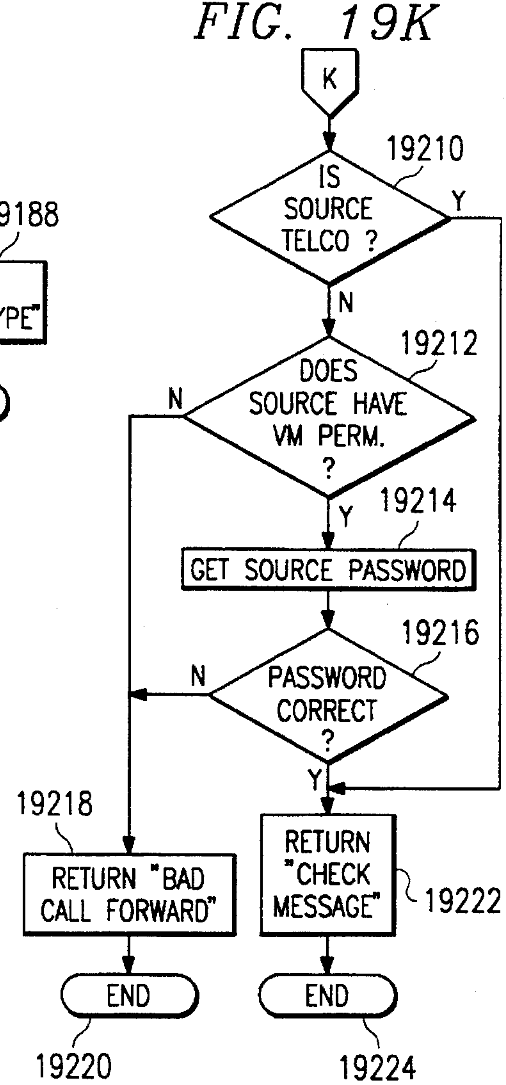

If the CVM pattern is found at step 1934, then the CVM routine is executed at connector "K", which connects to connector "K" in FIG. 19K. Alternatively, if the CVM pattern is not found at step 1934, then the ND is tested for the Send Page, (SP), pattern at step 1936.

Figure 19L:
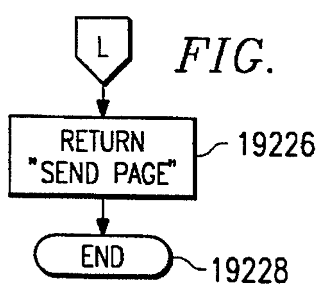

If the SP pattern is found at step 1936, then the SP routine is executed at connector "L", which connects to connector "L" in FIG. 19L. Alternatively, if the SP pattern is not found at step 1936, the ND is tested for the Call Transfer, (CT), pattern at step 1938.

Figure 19M:
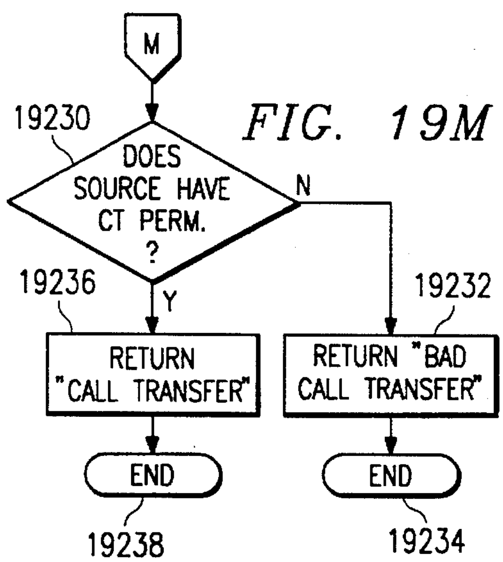

If the CT pattern is found at step 1938, then the CT routine is executed at connector "M", which connects to connector "M" in FIG. 19M. Alternatively, if the CT pattern is not found at step 1938, the ND is tested for the Call Waiting, (CW), pattern at step 1940.

If the CW pattern is found at step 1940, then the CW routine is executed at connector "N", which connects to connector "N" in FIG. 19N. Alternatively, if the CW pattern is not found at step 1940, the DID Translate function is called at step 1942. The DID Translate function tests the ND to determine if it is a DID number within the system, if so, the DID Translate function converts the ND into a destination radio ID an returns is to step 1944 in the present figure. The DID Translate function is described in detail hereinafter.

At step 1944, the ND is tested to determine if it is a Conversation Trunked, (C-Trunk), radio ID. If it is, the C-Trunk routine is executed at connector "0", which connects to connector "0" in FIG. 190. Alternatively, if the ND is not a C-Trunk ID at step 1944, the ND is tested to determine if it is a Transmission Trunked, (T-Trunk), ID at step 1946.

Figure 19P:
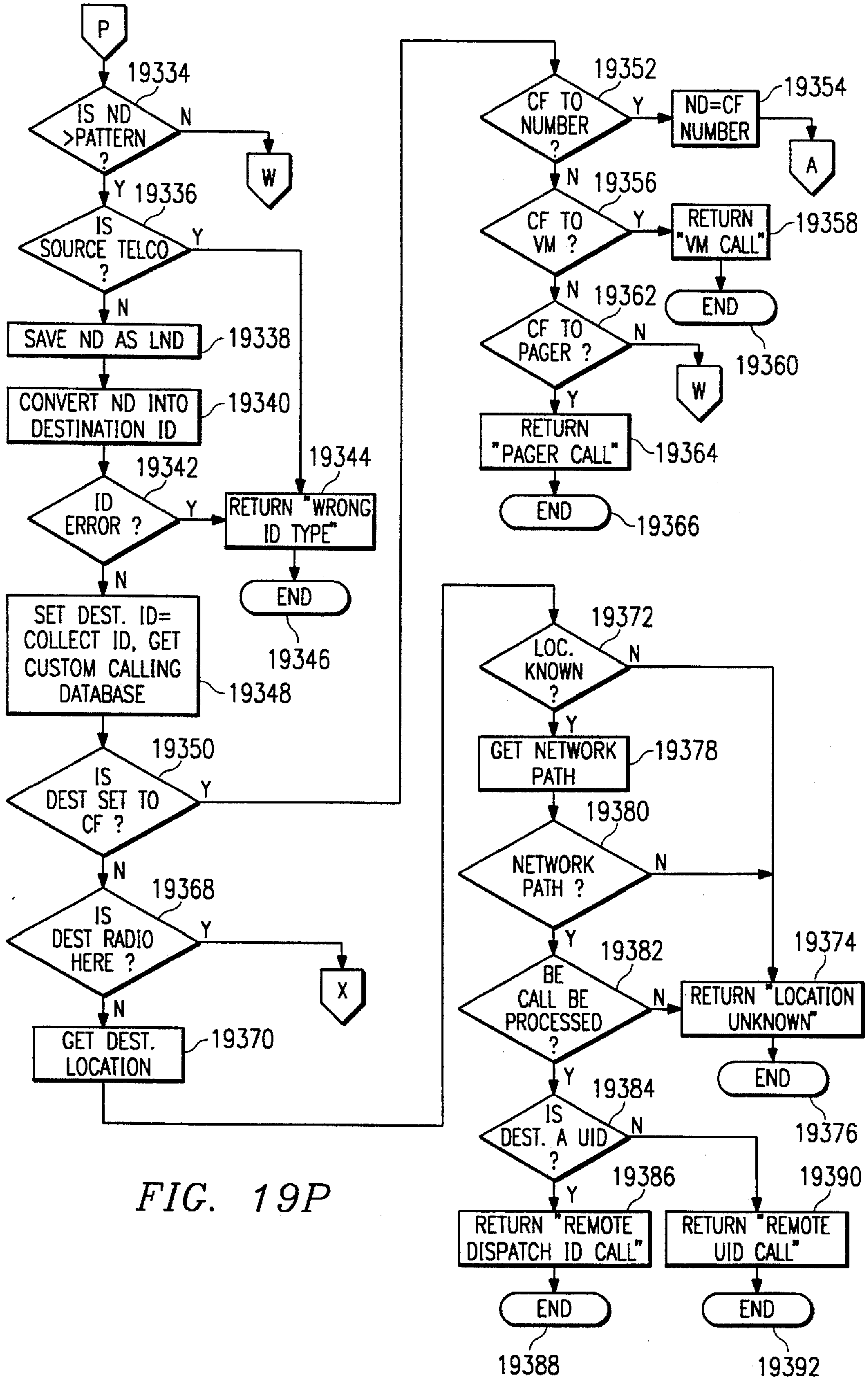
Figure 19Q:
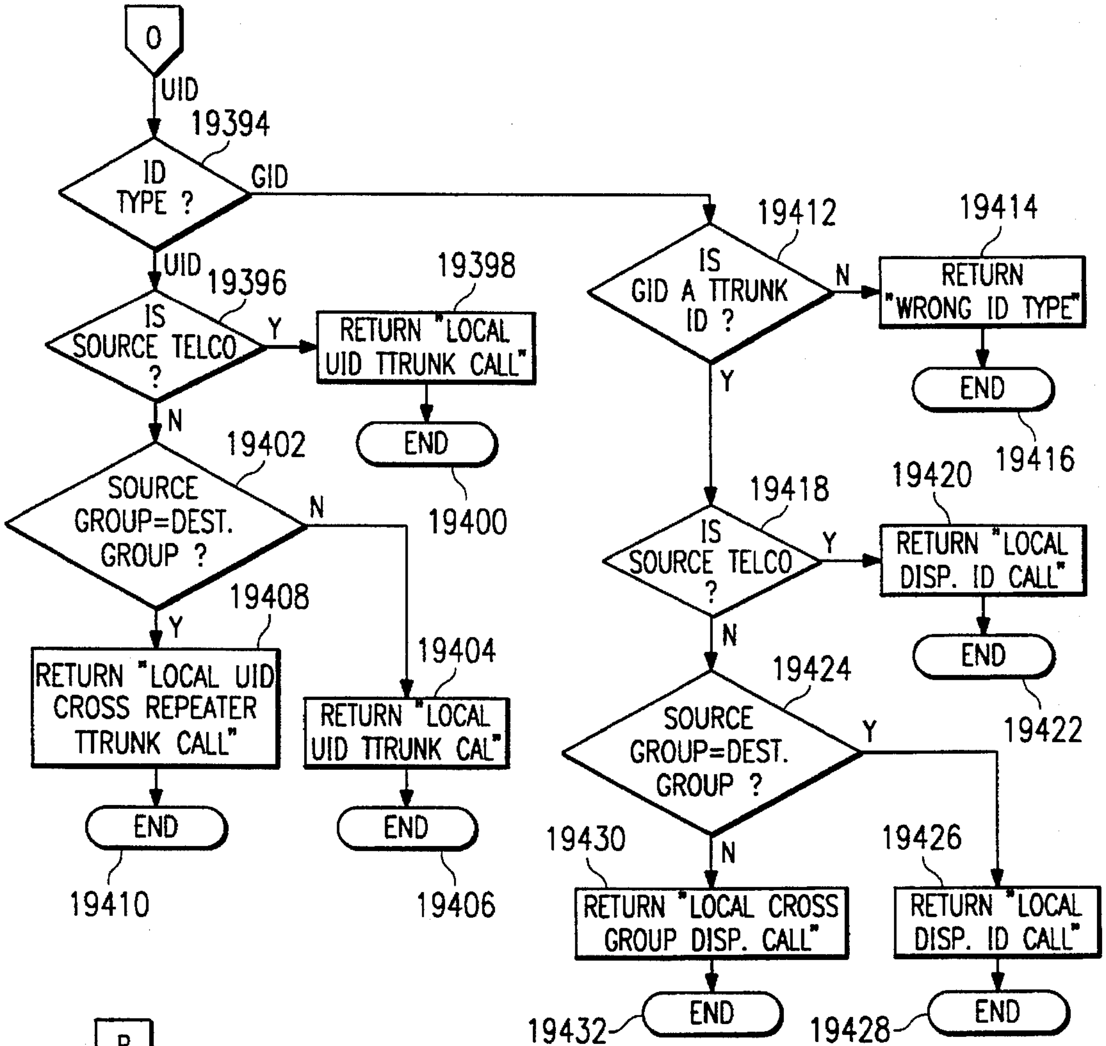

If the ND is a T-Trunk ID at step 1946, then the T-Trunk routine is executed at connector "P", which connects to connector "P" in FIG. 19P. Alternatively, if the ND is not a T-Trunk ID at step 1946, the ND is tested for a Virtual Group Call, (VGC), pattern at step 1948.

Figure 19R:
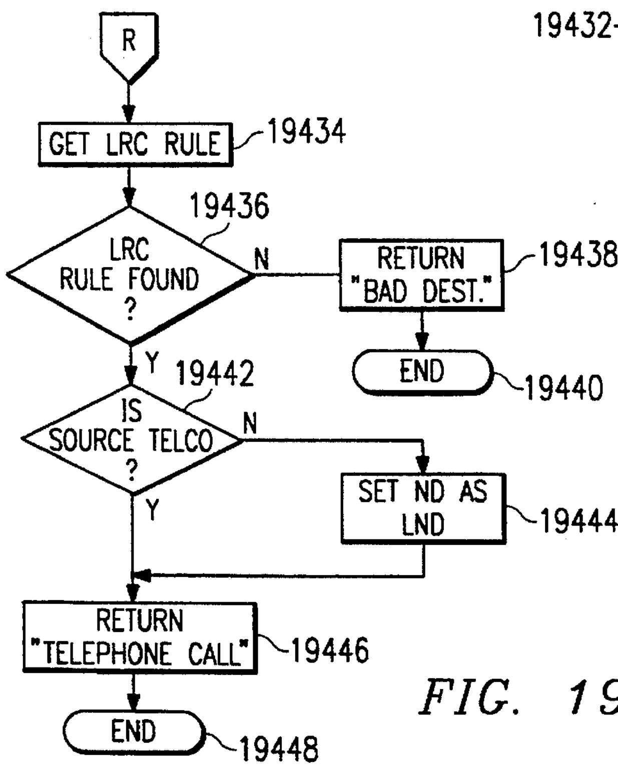
Figure 19S:
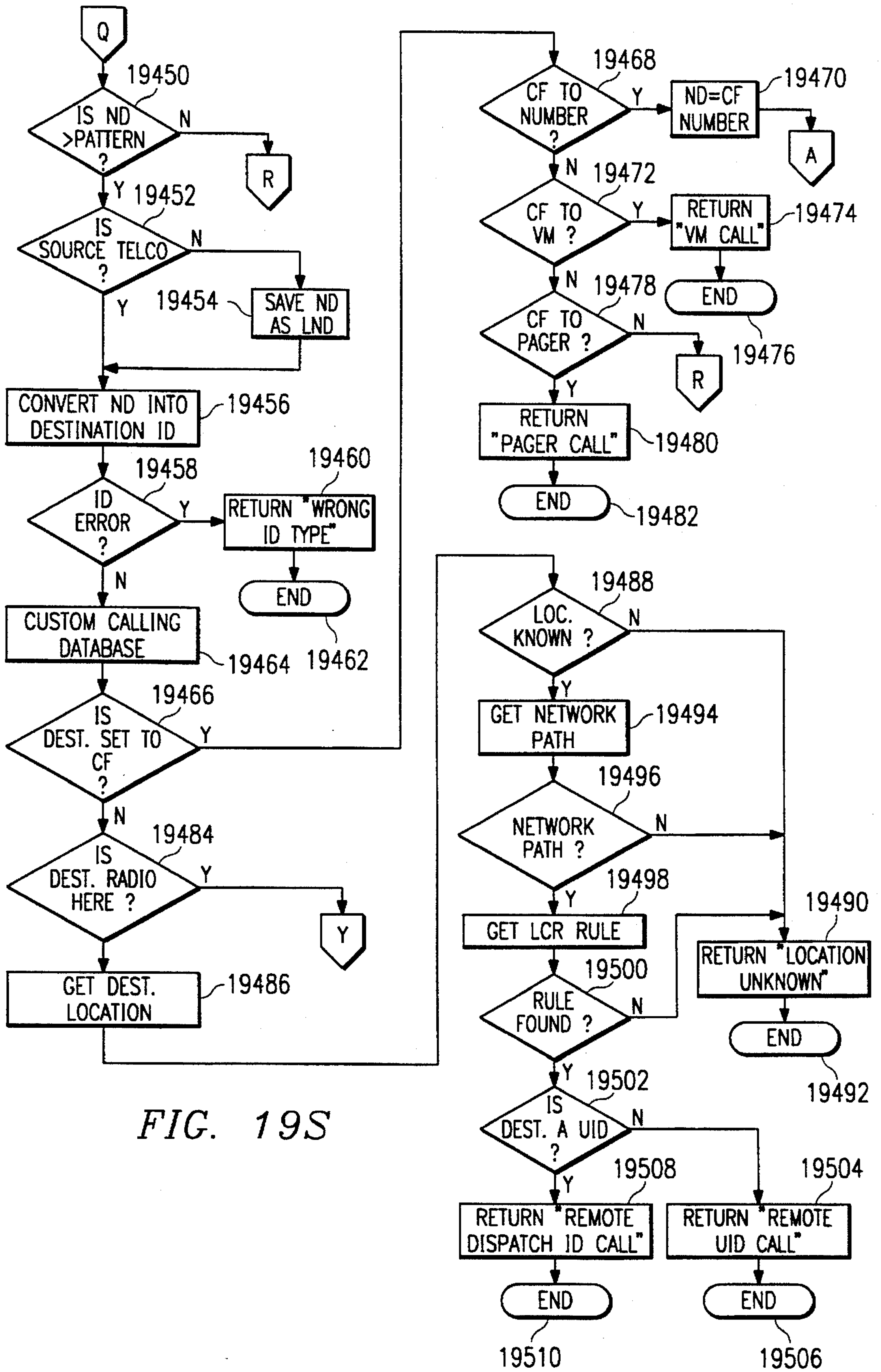

If a VGC pattern is found at step 1948, then the VGC routine is executed at connector "Q", which connects to connector "Q" in FIG. 19S. Alternatively, if the VGC pattern is not found at step 1948, then the Least Cost Router, (LCR), routine is executed at connector "R", which connects to connector "R" in FIG. 19R.

Reference is made directed to FIG. 19B which is a software flow diagram of the last number redial routine. FIG. 19B is entered at connector B, which connects to step 1916 from FIG. 19A when a last number redial pattern is detected in the number dialed. The last number redial routine begins by testing the source ID if the incoming call is a telephone line. If this is yes, then the controller moves to step 1956 and returns that is a bad last number redial because it is not reasonable to store last number dialed information from a telephone line when the routine ends at step 1958. Returning to step 1950 if on the other hand the source is not the telephone line, then the controller proceeds to step 1952 and gets the last number dialed from the custom calling database for the particular source ID. At step 1954 the controller checks to see if a last number dialed was found for the particular ID and if one was found the routine is exited at connector A, which returns to step 1906 in FIG. 19A and actually recurses through the name server to begin the process for the new last number. Alternatively, at step 1954 if a last number dialed was not found for the particular ID then the controller proceeds to step 1956 and returns bad last number redial and subsequently ends at step 1958.

Reference is directed to FIG. 19C, which is a software flow diagram of the speed dial routine. The speed dial routine is entered at connector C from step 1918 in FIG. 19A where a speed dial pattern was detected in the number dialed. At step 1960 the controller tests for a speed dial token in the number dialed, a speed dial token shows the position in the speed dial memory that the desired number is stored. If a speed dial token is not found the controller proceeds to step 1920 in FIG. 19A via connector S. Alternatively, in step 1960 if the speed dial token is found the controller proceeds to step 1962 and extracts the speed dial token from the number dialed. AT step 1964 it tests to see that the speed dial token is in an acceptable range, if it is not in the acceptable range the controller proceeds to step 1920 in FIG. 19A via connector S. Alternatively at step 1964 if the speed dial token is in range then the controller tests to see if the source of the call is a telephone line at step 1966. If the source is not a telephone line then the controller proceeds to step 1974 and returns bad speed dial and subsequently exits the routine at step 1976. Returning to step 1966 if the source is a telephone line then the controller proceeds to step 1968 and tests if the source has speed dial permission. If the source does not have speed dial permission then the controller proceeds to step 1974 and returns bad speed dial and exits the routine at step 1976. Alternatively at step 1968 if the source does have speed dial permission then the controller proceeds to step 1970 and gets speed dial numbers stored in the speed dial memory associated with the speed dial token that was extracted at step 1962. At step 1972 the controller tests to see if the speed dial number was found, similarly, if not the controller proceeds to step 1974, returns bad speed dial and exits the routine at step 1976. Alternatively, at step 1972 if the speed dial number is found the controller proceeds to step 1978 and sets the number dialed equal to the speed dial number that was recalled from memory at Step 1970. At this point the controller proceeds back to step 1906 in FIG. 19A via connector A and recurses through the routine with the new number dialed being set equal to the speed dial number recalled.

Reference is directed to FIG. 19D which is a software flow diagram of the speed dial program routine which is entered from step 1920 in FIGURE A, upon the detection of a speed dial program pattern in the number dialed and connects via connector D. In seep 1980 the controller tests to see if a speed dial program token is present in the number dialed. A speed dial program token indicates the memory storage location into which to store the speed dial number, if the speed dial token is not present in the number dialed the controller proceeds to step 1922 in FIG. 19A via connector T. Alternatively at step 1980 if the speed dial program token is present in the number dialed the controller extracts the speed dial program token from the number dialed at step 1982. Next, the controller tests if the speed dial program token is in range at step 1984, if it is not in range then the controller proceeds to step 1922 in FIG. 19A via connector T. Alternatively at step 1984 if the speed dial program token is in range the controller tests if the source of the call is a telephone line at step 1986. If the source is not a telephone line then the controller proceeds to step 1994 and returns bad speed dial program and then exits the routine at step 1996. Returning to step 1986 if the source is a telephone line then the controller proceeds to step 1988 and tests to see if the source has speed dial permission. If the source does not have speed dial permission at step 1988 then the controller returns "bad speed dial program" and exits the routine at step 1996. If at step 1988 the source does have speed dial permission then the controller stores the number into the speed dial memory of the custom calling information for the source ID at step 1990 and then proceeds to step 1992 and tests if the store into the custom calling memory was successful. If the store is not successful the controller proceeds to step 1994 and returns bad speed dial program and then exits the routine at step 1996. At step 1992 if the store is successful then the controller returns "speed dial number set" at step 1998 and then exits the routine at step 19100.

Reference is now directed to FIG. 19B which is a software flow diagram of the call forward programming routine. The routine is entered from step 1922 in FIG. 19A where a call forward program pattern is detected in the number dialed and it connects via connector E. At step 19102 the controller tests to see if a call forward program number is present in the number dialed, if a call forward program number is not present the controller proceeds to step 1924 in FIG. 19A via connector U. Alternatively at step 19102 if a call forward program number is present in the number dialed the controller proceeds to step 19104 and tests if the source is a telephone line. If the source is a telephone line the controller proceeds to step 19116 and returns "bad call forward" and exits the routine at step 19118. Alternatively, at step 19104 if the source is not a telephone line then the controller tests if the source ID has call forward permission at step 19106. IF the source does not have call forward permission then the controller proceeds to step 19116 and returns "bad call forward" and exits the routine at step 19118.

Returning to step 19106 if the source does have call forward permission then the controller proceeds to step 19108 and stores the number dialed into the call forward memory. Next step 19110 the controller tests if the store is successful or not and if the store was not successful the controller proceeds to step 19116, returns "bad call forward" and exits the routine at step 19118. Alternatively, at step 19110 if the store is successful then the controller proceeds to step 19112 and sets the flag for the call forward equal number. This flag is used to determine whether call forward is to be to a specific number or to some alternative destination. At step 19114 the controller tests to see if the flag was indeed set and if it was not the controller proceeds to step 19116 and returns "bad call forward" and exits the routine at step 19118. Alternatively, at step 19114 if the flag is set the controller proceeds to step 19120 and returns "call forward number set" and then exits the routine at step 19122.

Reference is directed to FIG. 19F which is a software flow diagram of the disable call forward routine, this routine is entered from step 1924 in FIG. 19A when a disabled call forward pattern is detected in the number dialed and connects via connector F. The disabled call forward routine begins by testing if the source of the call is a telephone line at step 19124, if the source is not a telephone line then the controller proceeds to step 19126 and checks to see if the source ID has call forward permission. If the source does have call forward permission then the controller proceeds to step 1928 and sets the call forward flag to disable for the source ID. Next the controller proceeds to step 19130 and tests to see if the call forward flag was set to disable, if the flag is set the controller proceeds to step 19136 and returns "call forward disable" and exits the routine at step 1938. Returning to step 19124 if the source is a telephone line it is not reasonable to have call forward enable for a telephone line and the controller proceeds to step 132, returns "bad call forward" and exits the routine at step 19134. Similarly, at step 19126 and step 19130 if the source does not have call forward permission or if the controller is unable to set the call forward flag to disable the effort to disable call forward is been unsuccessful and in both cases the controller proceeds to step 19132 returns "bad call forward" and exits the routine at step 19134.

Reference is directed to FIG. 19G which is a software flow diagram for the call forward always routine. The routine is entered from step 1926 in FIG. 19A when a call forward always pattern is detected in the number dialed and connects via connector G. At step 1940 the controller tests if the source is a telephone line, if the source is not a telephone line the controller proceeds to step 19124 and tests to see if the source has call forward permission. If the source does have call forward permission then the controller proceeds to step 19144 and sets the call forward flag to call forward always. Then to step 19146 it tests to see if the flag is set for call forward always and if it is set it proceeds to step 19152 and returns "call forward always" and finally exits the routine at step 19154, if at step 19140 the source is a telephone line or at step 19142 if the source does not have call forward permission or if at step 19146 the controller is unable to set the call forward flag to always then the call forward always has not been set and in any of those three cases the controller proceeds to step 19148, returns "bad call forward" and then exits the routine at step 150.

Reference is now directed to FIG. 19H which is a software flow diagram for the call forward on busy or no answer which is entered from step 1928 in FIG. 19A, when a call forward on busy or no answer pattern is detected and connects via connector H. At step 19156 the controller tests if the source is a telephone line if the source is not a telephone line the controller proceeds to step 19158 a d tests if the source has call forward permission. If the source does have call forward permission the controller proceeds to step 19160 and sets the call forward flag to busy or no answer. Then at step 19162 the controller tests to see if the flag was set successfully, if it was the controller proceeds to step 19168 and returns "call forward busy no answer" and exits the routine having successfully set the flag to call forward busy no answer at step 19170. Alternatively, if at step 156 the source is a telephone line or at step 19158 if the source does not have call forward permission or at step 19162 if the controller is unable to set the flag then the call forward change has not been implemented and the controller proceeds to step 19164 and returns "bad call forward" and finally exits the routine at step 19166

Reference is now directed to FIG. 19I which is a software flow diagram for the call forward to voice mail routine which is entered from step 1930 in FIG. 19A via connector I. This occurs when a call forward to voice mail pattern is detected in the number dialed. First the controller tests to see if the source is a telephone line at step 19172, if the source is not a telephone line the controller proceeds to step 19174 and tests to see if the source has call forward permission. If the source does have this permission then the controller proceeds to step 19176 and tests to see if the source has voice mail permission. If the source does have voice mail permission then the controller proceeds to step 19178 and sets the call forward flag to voice mail, then at step 19180 the controller checks to see if the flag was set successfully and if it was the controller goes on to step 19186 and returns "call forward voice mail" and exits the routine at step 19188. Alternatively, if at step 19172 the source is a telephone line or if at step 19174 the source does not have call forward permission or at step 19176 if the source does not have voice mail permission or if at step 19180 the controller is unable to set the call forward flag voice mail then the controller was unsuccessful at setting call forward to voice mail and in any of those four cases the controller proceeds to step 19182 and returns "that call forward " and exits the routine at step 19184.

Reference is directed to FIG. 19J which is a software flow diagram for the call forward to pager routine which is entered from step 1932 in FIG. 19A when a call forward to pager pattern is detected in the number dialed and connects via connector J. At step 19186 the controller tests to see if the destination is a unique ID if it is not a unique ID then the controller proceeds to step 19188 and returns "wrong ID type" and exits the routine at step 19190. The system does not provide for the call forwarding to a pager which does not have a unique ID code and this explains why the routine is exited with a wrong ID type statement on that instance.

Returning to step 19186 if the destination is a U ID then the controller tests to see if the source is a telephone line at step 19192 if the source is not a telephone line then the controller proceeds to step 19194 and tests to see if the source has call forward permission, if it does have call forward permission the controller goes to step 19196 and tests to see if the source has send message permission if the source does have permission to send message then the controller proceeds to step 19198 and sets call forward flag to pager, then at step 19200 the controller tests to see if the flag was set to call forward equal pager and if it is set then the controller proceeds to step 19206 and returns "call forward to pager" and exits the routine at step 19208. Alternatively, at step 19192 if the source is a telephone line or at step 19194 if the source does not have the call forward permission or at step 19196 if the source does not have send message permission or at step 19200 the controller is unable to set the flag to call forward equal pager then the controller was unable to successfully set call forward to pager then in any of those four cases the controller returns to step 19202, returns "bad call forward" and exits the routine at step 19204.

Reference is now directed to FIG. 19K which is a software flow diagram for the check voice mail routine which is entered from step 1934 in FIG. 19A, when a check voice mail pattern is detected in the number dialed and connects through connector K. First at step 19201 the controller tests to see if the source is a telephone line if the source is not a telephone line then the controller proceeds to step 19212 and checks to see if the source has voice mail permission. If the source does have voice mail permission then the controller proceeds to step 19214 and gets the source password from the number dialed then at step 19216 the controller tests to see if the password is correct as compared to the custom calling database for the source ID, if the password is correct, then the controller proceeds to step 19222 and returns "check messages" and exits the routine at step 19224. Returning to step 19210 if the source is a telephone line then a password is not necessary and the controller proceeds directly to step 19222 and returns "check messages" and exits the routine at step 19224. Alternatively at steps 19212 if the source does not have voice mail permission or at step 19216 if the password is incorrect then the controller will not allow the source to check the voice mail messages and will proceed in either case to step 19218 and return "bad call forward" and exit the return at step 19220.

Reference is now directed to FIG. 19L which is a software flow diagram for the send page software routine which is entered from step 1936 in FIG. 19A when a send page pattern is detected in the number dialed and connects through connector L. This simple routine has a step that returns "send page" at step 19226 and then is exited at step 19228.

Reference is now directed to FIG. 19M which is a software flow diagram for the call transfer software routine which is entered from step 1938 in FIG. 19A when a call transfer pattern is detected in the number dialed and connects via connector M. At step 19230 the controller tests to see if the source has call transfer permission if the source does not have call transfer permission then the controller returns "bad call transfer" at step 19232 and exits the routine at step 19234. Alternatively, at step 19230 the source does have call transfer permission then the controller proceeds to step 19236 and returns "call transfer" and exits the routine at step 19238.

Reference is now directed to FIG. 19N which is the software flow diagram for the call waiting software routine which is entered from step 1940 in FIG. 19A when a call waiting pattern is detected in the number dialed and connects via connector N. At step 19240 the controller tests to see if the source has call waiting permission. If the source does not have call waiting permission then the controller proceeds to step 19242 and returns "bad call waiting" and exits the routine at step 191244. Alternatively at step 19240 if the source does have call waiting permission then the controller returns "call waiting" at step 19246 and exits the routine at step 19248.

Figure 190:
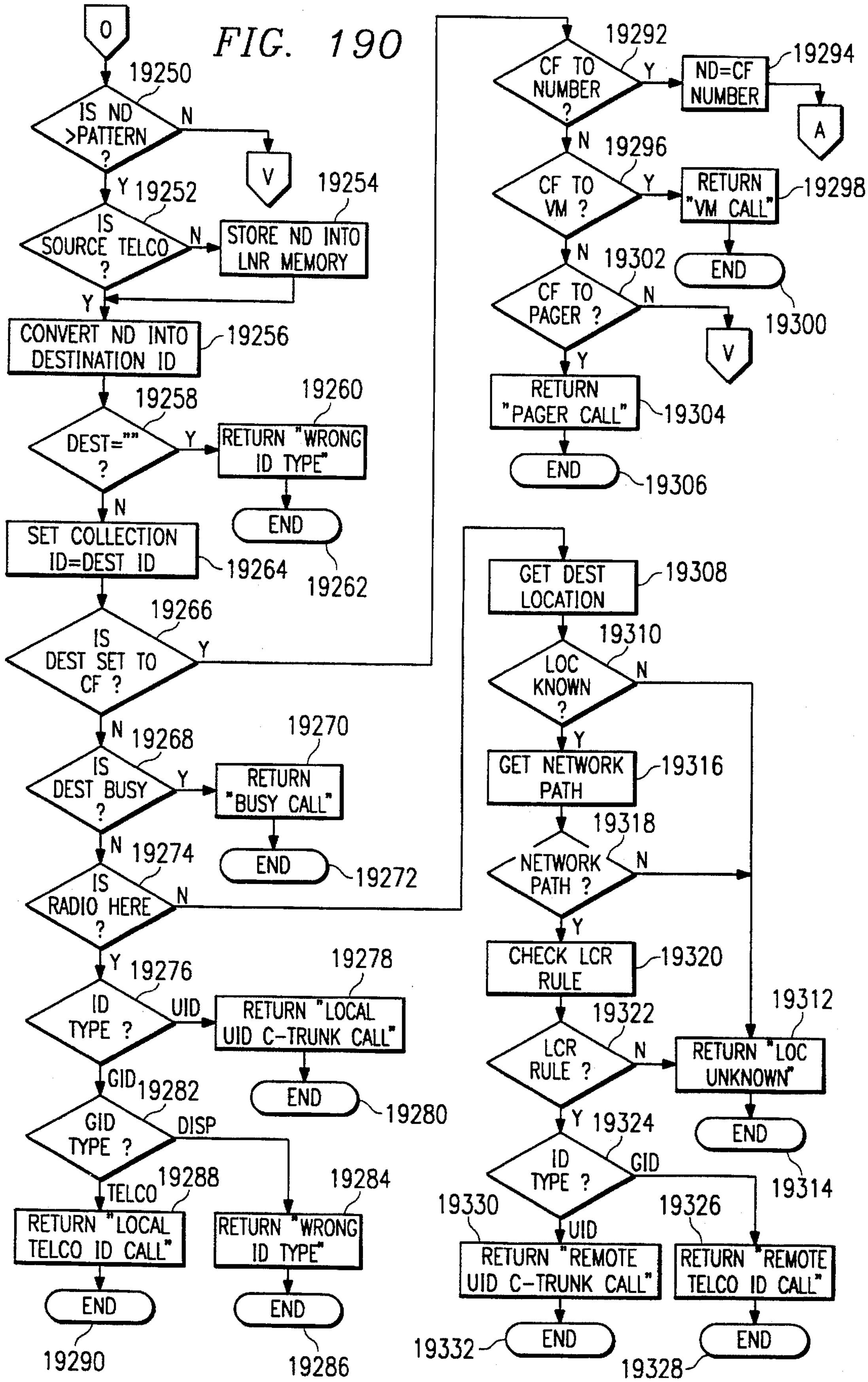

Reference is now directed to FIG. 190 which is the software flow diagram for a conversation trunked call which is entered from step 1944 in FIG. 19A when a conversation trunked ID is detected in the number dialed and connected by a connector 0. The conversation trunked call routine begins at step 19250 and the controller tests to see if the number dialed is larger than the conversation trunked ID pattern. If the number dialed is not larger than the pattern then the controller proceeds to step 1946 in FIG. 19A via connector V. Alternatively at step 19250 if the number dialed is larger than the conversation trunked call pattern then the controller proceeds to step 1952 and tests to see if the source is a telephone line. If the source is a telephone line then the controller stores the number dialed into the last number redial memory in the custom calling database for the source ID at step 19254. Next, the controller proceeds to step 19256 and alternatively at step 19252 if the source is a telephone line the controller also proceeds to step 19256. At this step the controller converts the number dialed into a destination ID and at step 19258 tests to see if the destination ID is an empty number contains no digits. If this is the case then the controller proceeds to step 19260 and returns "wrong ID type" and exits the routine at step 19262. Alternatively at step 19258 if the destination is not an empty number then the controller proceeds to step 19264 and sets the collection ID equal to the destination ID. Next at step 192666 the controller tests to see if the destination ID is set to call forward, if the destination ID is set to call forward then the controller proceeds to step 19292 and tests to see if the destination is set to call forward to a number. If the destination is set to call forward to a number the controller proceeds to step 19294 and sets the number dialed equal to that call forward number. It then returns to step 1906 in FIG. 19A via connector A and recurses through the name server with the new number dialed set to the call forward number of the destination ID. Alternatively at step 19294 if the destination ID is not set to call forward to a number the controller tests to see if the destination ID is set to call forward to voice mail at step 19296. If the destination is set to call forward to voice mail the controller proceeds to step 19298 and returns "voice mail call" and exits the routine at step 19300. Alternatively, at step 19296 if the destination ID is not set to call forward to voice mail the controller proceeds to step 19302 and tests to see if the destination ID is set to call forward to a pager. If the ID is not set to call forward to pager the controller proceeds to step 1946 in FIG. 19A via connector V. Alternatively at step 19302 if the destination ID is set to call forward to pager then the controller returns "pager call" at step 19304 and exits the routine at 19306. Returning now to step 19266 if the destination is not set to call forward the controller proceeds to step 19268 and tests to see if the destination ID is busy. If the destination ID is busy then the controller proceeds to step 19270 and returns "busy call" and exits the routine at step 19272. Alternatively, at step 19268 if the destination is not busy the controller proceeds to step 19274 and tests to see if the destination ID radio is in the local cell. If the destination ID radio is in the local cell, then the controller proceeds to step 19276 and tests to see what type of ID the destination is. If the destination is a unique ID then the controller proceeds to step 19278 and returns "local unique ID conversation trunked call" and exits the routine at step 19280. Alternatively, at step 19276 if the destination ID type is a group ID the controller proceeds to step 19282 and tests what type of group ID the destination is. If it is a dispatch group ID then the controller proceeds to step 19284 and returns "wrong ID type" and exits the routine at step 19286. Alternatively, step 19282 if the destination group ID is a telephone ID then the controller proceeds to step 19288 and returns "local telephone ID call" and exits the routine at step 19290. Returning now to step 19274 if the destination ID radio is not at the local cell then the controller proceeds to step 19308 and gets the destination ID location from the roaming manager at step 19308 and proceeds to step 19310 where the controller tests to see if the destination location is known. If the destination location is known the controller proceeds to step 19316 to get the network path to the destination location and then to step 19318 to test if the network path was received. If the network path is received then the controller proceeds to step 19320 and checks for a least cost routing rule for the destination location and then to step 19322 where the controller tests to see if a least cost routing rule was received and if the least cost routing rule is received the controller proceeds to step 19324 and tests what type of ID the destination ID is. If the destination ID is a group ID the controller proceeds to step 19326 and returns "remote telephone ID call" and exits the routine at step 19328. Alternatively at step 19324 if the destination ID type is a unique ID the controller proceeds to step 19330 and returns "remote unique ID conversation" and exits the routine at step 19332. Returning now to step 19310 if the location of the destination ID is not known or if at step 19318, if a network path is not received or at step 19322 if a least cost routing rule is not received then the controller is unable to make the call because the location cannot be found and proceeds to steps 19312 and returns "location unknown" and exits the routine at step 19314.

Reference is now directed to FIG. 19P which is a software flow diagram for the transmission trunk call routine, which is entered from step 1946 in FIG. 19A when a transmission trunked ID is detected in the number dialed and connects via connector P. At step 19334 the controller tests to see if the number dialed is larger than the transmission trunked ID pattern. If it is not larger then the controller proceeds to step 1948 in FIG. 19A via connector W. Alternatively at step 19334 if the number dialed is larger than the transmission trunked ID pattern, the controller proceeds to step 19336 and tests to see if the source is a telephone line. If the source is a telephone line the controller proceeds to step 19344 and returns "wrong ID type" and exits the routine at step 19346. Alternatively at step 19336 if the source is not a telephone line the controller saves the number dialed at the last number dialed for the source ID at step 19338. At step 19340 the controller converts the number dialed into a destination ID. Next at step 19342 the controller checks the ID to see if the ID is in error. If the ID is in error the controller proceeds to step 19344 and returns "wrong ID type" and exits the routine at step 19346. Alternatively at step 19342 if the ID is not in error then the controller proceeds to step 19348 and sets the destination ID equal to the collection ID and gets the custom calling database for the destination ID. Then at step 19350 the controller tests to see if the destination ID is set to call forward. If the destination ID is set to call forward the controller proceeds to step 19352 and tests to see if the destination ID is set for call forward to number. If it is set to call forward to number then the controller at step 19354 sets the number dialed equal to the call forward number and returns to step 1906 in FIG. 19A via connector A and recurses through the name server. Alternatively at step 19352 if the source ID is not set to call forward to a number then the controller proceeds to step 19356 and tests to see if the destination ID is set for call forward to voice mail. If the destination ID is set to call forward to voice mail then the controller proceeds to step 19358 and returns "voice mail call" and exits the routine at step 19360. Alternatively at step 19356 if the destination ID is not set to call forward to voice mail then the controller proceeds to step 19362 and checks to see if the destination ID is set for call forward to pager. If the destination ID is not set for call forward to pager then the controller proceeds to step 1948 in FIG. 19A via connector W. Alternatively at step 19362 if the destination ID is set for call forward to pager then the controller proceeds to step 19364 and returns "pager call" and exits the routine at step 19366. Returning now to step 19350 if the destination is not set for call forward then the controller proceeds to 19368 and tests to see if the destination radio is in the local cell. If the destination radio is in the local cell then the controller proceeds to step 19394 in FIG. 19Q. Alternatively at step 19368 if the destination radio is not in the local cell then the controller gets the destination radio location at step 19370 and at step 19372 tests to see if the location is known. If the location is known then the controller gets the network path to the destination ID location at step 19378 and at step 19380 tests to see if it actually received a network path. If the controller does receive a network path then the controller proceeds to step 19382 and tests to see if the call can be processed. If the call can be processed then the controller proceeds to step 19384. Returning to step 19372 if the location of the destination ID is not known or if at step 19380 a network path is not found or if at step 19382 the call can be processed then in either of those three events the controller does not know the location of the destination ID radio and proceeds to step 19374 and returns "location unknown" and exits the routine at step 19376. Returning now to step 19384 the controller tests the destination for a UID if the destination ID is a UID the controller proceeds to step 19386 and returns "remote dispatch ID call" and exits the routine at step 19388. Alternatively at step 19384 if the destination is not a UID then the controller proceeds to step 19390 and returns "remote unique ID call" and exits the routine at step 19392. Returning now to step 19368 if the destination radio is in the local cell then the controller proceeds to step 19394 via connector acts in FIG. 19Q. The controller tests the ID type for being a group ID or a unique ID. If the ID is a unique ID then the controller proceeds to step 19396 and tests to see if the source is a telephone line. If the source is a telephone line then the controller returns "local unique ID transmission trunked call" at step 19398 and exits the routine at step 19400. Alternatively at step 19396 if the source is not a telephone line then the controller proceeds to step 19402 and tests to see if the source group ID is equal to the destination group ID. If this test is false then the controller proceeds to step 19404 and returns "local unique ID transmission trunked call" and exits the routine at step 19406. Alternatively at step 19402 if the source group ID does equal the destination group ID then the controller proceeds to step 19408 and returns "local unique ID cross repeater transmission trunked call" and exits the routine at step 19410. Returning now to step 19394 if the ID type was a group ID then the controller proceeds to step 19412 and tests if the group ID is a transmission trunked ID if it is not the controller proceeds to step 19414 and returns "wrong ID type" and exits the routine at step 19416. Alternatively at step 19412 if the group ID is a transmission trunked ID then the controller proceeds to step 19418 and tests to see if the source is a telephone line if it is a telephone line then the controller returns "local dispatched ID call" at step 19420 and exits the routine at step 19422. Alternatively at step 19418 if the source is not a telephone line then the controller proceeds to step 19422 and tests to see if the source group ID is equal to the destination group ID. If the two ID's are equal then the controller returns "local dispatched ID call" at step 19429 and exits the routine at step 19428. Alternatively at step 19424 if the source group ID and the destination group ID are not equal then the controller returns "local cross dispatched call" at step 19430 and exits the routine at 19432.

Reference is now directed to FIG. 19R which is a software flow diagram for the telephone call routine which is entered from step 1948 in FIG. 19A when a virtual group call pattern is not found thereby allowing the software to follow all the way through all the possible options and connect through connector R to the telephone call root T. AT step 19434 the controller gets the least cost routing rule for the call destination. At step 19436 the controller tests to see if a lest cost routing rule is found. If one is not found the controller returns "bad destination" at step 19438 an exits the routine at step 19440. Alternatively at step 19434 if a least cost routing rule is found then the controller proceeds to step 19442 and tests to see if the source is a telephone line. If the source is not a telephone line then the controller sees the number dial as the last number dialed for the source ID at step 19444 and proceeds to step 19446. Likewise at step 19442 if the source is a telephone line the controller proceeds to step 19446 and returns "telephone call" and exits the routine at step 19448.

Reference is now directed to FIG. 19S which is a software flow diagram for the virtual group call routine which is entered from step 1948 in FIG. 19A when a virtual group call pattern is detected by the controller and connects via connector Q to step 19450. At step 19450 the controller tests to see that the number dialed is larger than the virtual group call pattern. If it is not the controller proceeds to step 19434 and FIG. 19R where it executes the telephone call routine. This is accomplished via connector R. Alternatively at step 19450 if the number dialed is larger than the virtual group pattern then the controller tests to see if the source is a telephone line. IF it is not a telephone line then the controller saves the number dialed as the last number dialed for the source ID at step 19454 and then proceeds to step 19456. Likewise at step 19452 if the source is found to be a telephone line then the controller proceeds to step 19456 and converts the number dialed into the destination ID. At step 19458 the controller tests to see if there is an ID error. If there is an error the controller returns "wrong ID type" at step 19460 and exits the routine at steps 19462. Alternatively at step 19458 if there is not an ID error the controller proceeds to step 19464 and recalls the custom calling database for the source ID. At step 19466 the controller tests to see if the destination ID is set for call forwarding. If it is set for call forwarding then the controller has to see if it is set for call forwarding to number at step 19468. If it is set to call forward for number then the controller sets the number dialed equaled to the call forward number at step 19470 and then returns to step 1906 in FIG. 19A via connector A and recurses through the name server again with the new number dialed set equal to the call forward number. Alternatively at step 19468 if the destination ID is not set for call forward to number the controller checks to see if it is set for call forward to voice mail at step 19472. If it is set to call forward for voice mail then the controller returns "voice mail call" at step 19474 and exits the routine at step 19476. Alternatively at step 19472 if the destination ID is not set to call forward for voice mail then the controller tests to see if it is set for call forward to pager at step 19478. If it is not then the controller returns to step 19434 in FIG. 19R via connector R and executes the telephone routine. Alternatively at step 19478 if the destination is set for call forward to pager the controller returns "pager call" at step 19480 and exits the routine at step 19482. Returning now to step 19466 if the destination ID is not set for call forwarding then the controller proceeds to step 19484 and it tests if the destination radio is in the local cell. If it is in the local cell the controller proceeds to step 19572 in FIG. 19T via connector Y. Alternatively if the destination radio is not in the local cell then the controller gets the destination location at step 19486 and tests to see if that location is known at step 19488. If the destination location is known the controller gets network path for that location at step 19494 and tests to see if it received a network path at 19496. If the network path is received then the controller gets the least cost routing rule to the destination location at step 19498 and then tests to see if that rule is found at step 19500. If a least cost routing rule is found then the controller proceeds to step 19502. Returning to step 19488 if the location of the destination radio is not known or if at step 19496 a network path is not found or if at step 19500 a least cost routing rule is not found then in any three of those situations the controller returns "location unknown" at step 19490 and exits the routine at step 19492. At step 19502 the controller tests to see if the destination ID is a unique ID. If it is not a unique ID then the controller returns "remote unique ID call" at step 19504 and exits the routine at step 19506. Alternatively at step 19502 if the destination ID is a unique ID then the controller returns "remote dispatch ID call" at step 19508 and exits the routine at step 19510.

Figure 19T:
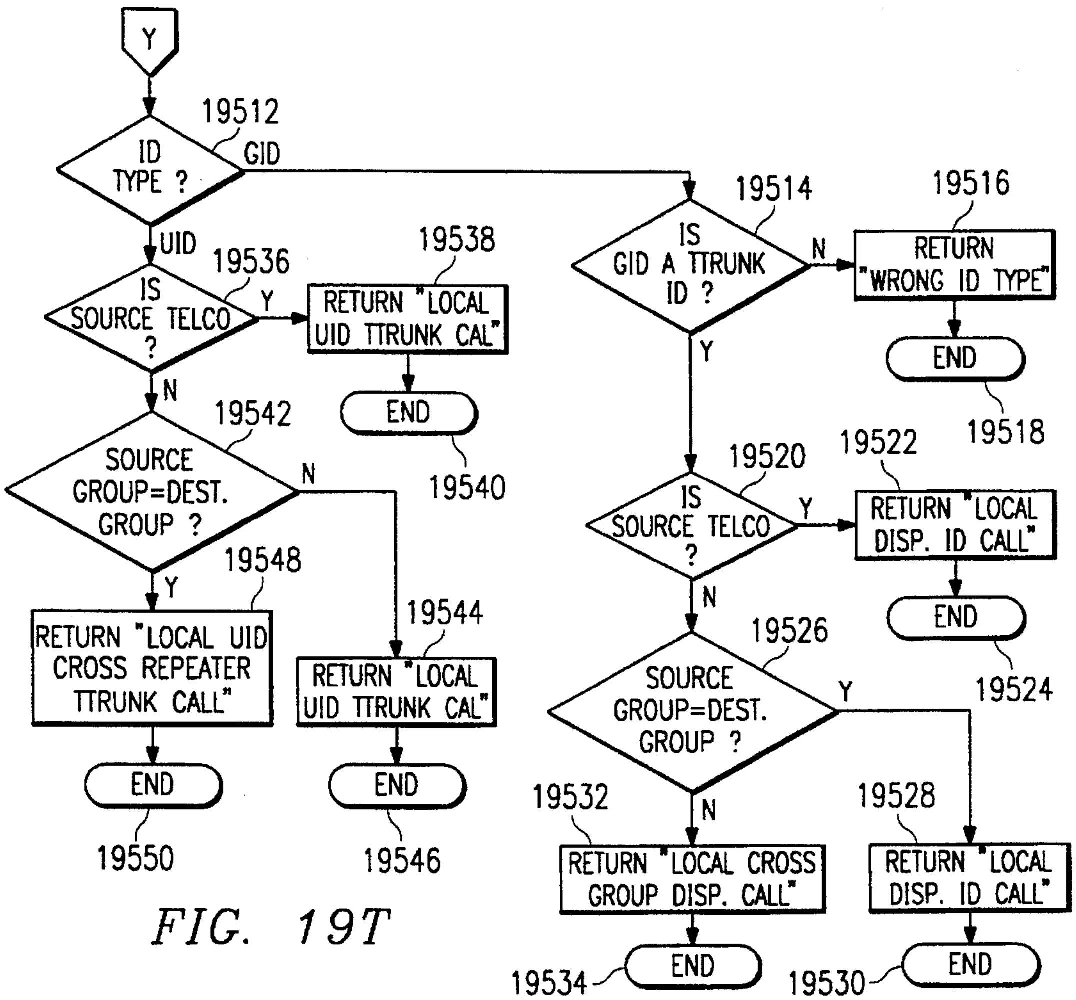

Reference is now directed to FIG. 19T which is entered from step 19484 in FIG. 19S via connector Y upon the controller discovering that the destination radio is in the local cell. At step 19572 the controller tests to see if the ID code is a group ID or a unique ID. If the ID code is a group ID then the controller proceeds 19514 and tests to see if the group ID is a transmission trunked ID, if it is not a transmission trunked ID the controller returns "wrong ID type" at step 19516 and exits the routine at step 19518. Alternatively at step 19514 if the group ID is a transmission trunked ID then the controller tests to see if the source is a telephone line at step 19520. If the source is a telephone line the controller returns "local dispatched ID call" at step 19522 and exits the routine at step 19524. Alternatively at step 19520 if the source is not a telephone line code the controller proceeds to step 19526 and tests to see if the source group ID is equal to the destination group ID, if the two ID's are equal then the controller returns "local dispatched ID call" at step 19528 and exits the routine at step 19530. Alternatively at step 19526 if the source group ID and the destination group ID are not equal then the controller returns the "local cross group dispatched call" at step 19532 and exits the routine at step 19534. Returning now to step 19512 if the ID type is a unique ID then the controller tests to see if the source is a telephone line at step 19536 if it is a telephone line the controller returns "local unique ID transmission trunked call" at step 19538 and exits the routine at step 19540. Alternatively at step 19536 if the source is not a telephone line then the controller tests to see if the source group ID is equal to the destination group ID at step 19542. If the ID's are not equal then the controller returns "local unique ID transmission trunked call" at step 19544 and exits the routine at step 19546. Alternatively at step 19542 if the source group ID and destination group ID are equal then the controller returns "local unique ID cross repeater transmission trunked call" at step 19548 and exits the routine at step 19550.

Figure 20:
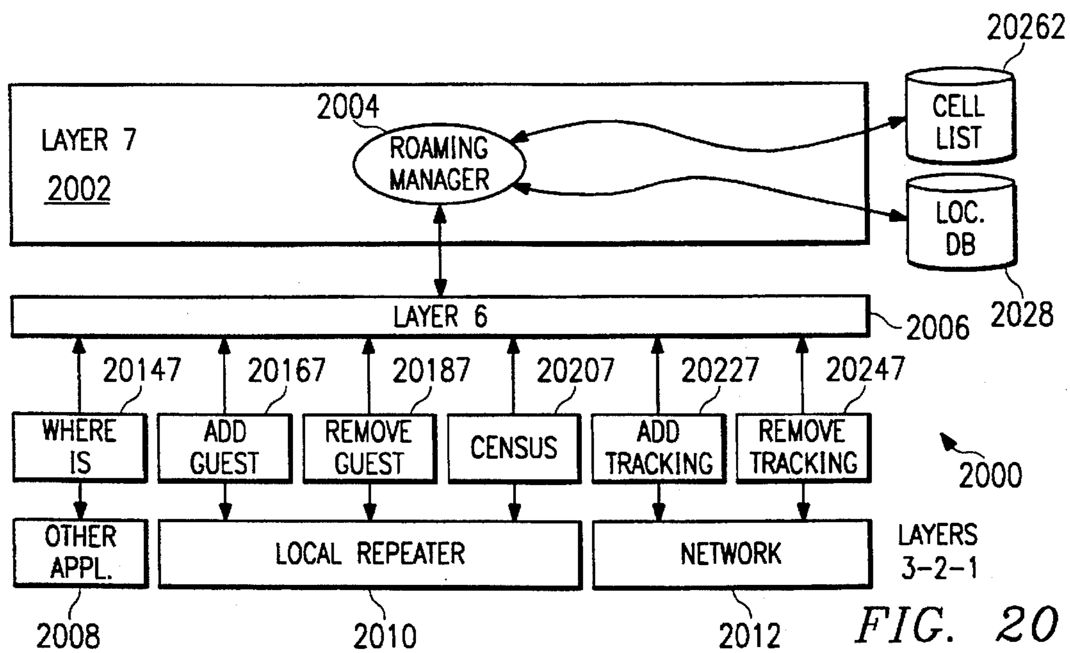
FIG. 20 is a software block diagram of the Roaming Manager.

Reference is directed to FIG. 20 which is a software flow diagram of the roaming manager function 2000 in the ESAS switch. The roaming manager 2004 resides within layer 7 2002 in the switch software architecture. The roaming manager 2004 has access to a cell list 2026 which lists all of the cells in the network. Refer to FIG. 29 for detailed description of cell list 2026. Furthermore, the roaming manager maintains a location data base 2028 which stores information about the location of all mobiles that the roaming manager has control over. Refer to FIG. 28 for detailed description of the roaming location data base.

From time to time as mobile radios check into a cell or as information about roaming mobiles is conveyed over the network to the cell, the information is fed to the roaming manager which subsequently updates the location data base 2028. The roaming manager communicates through the modified ISO 7-layer software protocol by interfacing with layer 6, the translation layer 2006. The translation layer directs commands to and from the roaming manager and the related applications within the ESAS system. The commands communicate through layers 3, 2 and 1 from other applications 2008, local repeaters 2010, and through the network 2012.

Other applications within the network 2008 may send a WHERE IS command 2014 through layer 6 2006 to the roaming manager 2004. The WHERE IS command 2014 requests the roaming manager to determine the location of a roaming mobile if possible. The roaming manager extracts this information from the location data base 2028 and communicates this information back to other applications 2008. As mentioned earlier, it is common for the call processing engine and for the name server applications to request such information from the roaming manager.

The local repeaters 2010 may request that the roaming manager add a guest radio by issuing the ADD GUEST command 2016 upon the check in of a roaming mobile. The ADD GUEST command 2016 is communicated through to the roaming manager 2004 who in turn records the information about the new guest in the location data base 2028. Conversely, if a radio checks out of the local repeater, then the local repeater sends a REMOVE GUEST command 2018 to the roaming manager 2004 which in turn deletes the mobile ID code from the location data base 2028. Therefore, when subsequent WHERE IS commands 2014 are received by the roaming manager 2004, the roaming manager will not find the location of the mobile in the location data base 2028.

From time to time, it may become necessary for the roaming manager to update its location data base information 2028. In order to accomplish this, the roaming manager 2004 sends a CENSUS command 2020 to the local repeater 2010. The local repeater interrogates all of the radios within its coverage area and responds by providing the complete census of the radios which respond back to the roaming manager 2004. In this way, the roaming manager is able to completely update the location data base 2028.

Within an ESAS network, it is optional as to whether a roaming mobile is automatically tracked or not. In the simplest form of operation, as radios roam and check into cells, the cell in which they check into records their presence by utilizing the ADD GUEST command to store the information in the local cell data base. However, for more comprehensive network service, it may be desirable to track the location of a roaming mobile. The tracking function is accomplished by commanding the roaming manager to send information back to the home cell of the roaming mobile so that the roaming manager in the home cell may store information about the roamed mobile. The roaming manager 2004 accomplishes this by receiving an ADD TRACKING command 2022 from another cell within the network 2012. The cell list 2026 is used to verify the identity of cell identities as they are received from the roaming manager. Likewise, if a mobile user elects to remove the tracking feature from his mobile, the network will provide a removed tracking command 2024 to the cells in the network and their corresponding roaming manager 2004.

In summary, if the tracking feature is added to a particular ID code, the command is entered into the radio's home cell and the roaming manager and the home cell checks the local cell list 2026 and sends a command through the network to all other cells, or a subset of the cells for which tracking is desired, and it instructs them to add tracking capability for the particular mobile ID. The add tracking command is sent to the various cells and upon CHECK IN of the mobile the cells with the tracking capability enabled will report back to the mobile's home cell that the mobile has checked in and the location is now known. In this way, whenever there is a request to find the location of a mobile to the roaming manager from another application, it has the ability to determine the location of the roamed mobile from the location data base 2028. At a later time when tracking is removed, the converse of the foregoing is an enacted. Specifically, the tracking capability is removed from the roaming manager at the mobile ID's home cell. The roaming manager of the home cell subsequently sends the REMOVE TRACKING command 2024 to all of the cells in the network for which tracking was enabled. Each of these cells then removes the tracking capability for that particular ID and removes information about that radio from the location data base.

Reference is directed to FIG. 28 which is a diagram of the roaming data structure 2800. The roaming data structure is accessed by the roaming manager software application and maintains a plurality of records concerning radios or mobile ID codes which have roamed into or out of a particular cell. A description of the roaming manager layer 7 software application is incorporated earlier with respect to FIG. 20. The roaming data structure comprises a unique ID field 2802 which stores the UID of the radio being tracked. A CURRENT CELL LOCATION field 2804 is included which indicates the current cell in which the radio being tracked is located. The roaming data structure also includes a ROAMING COUNT FIELD 2806 which is an integer count of the number of times the radio has changed cells. A permission bits field 2802 is included which records the permission bits of the radio being tracked. Further, a MASKED PERMISSION field 2810 is included which is a composite permission field of the permission of the roaming radio and the permission of the cell into which it is checked. It is necessary for both permissions to be active in order for any particular capability to be allowed. The roaming data structure includes a field for the TIME OF LAST UPDATE 2812 which indicates the last time at which the radio had made a roaming cell change. This field is useful when the roaming mobile record is aged. For example, if a mobile had been in a cell for an extended period of time, then it may be deleted from the roaming data structure. This time is programmable but may be adjusted to a 24-hour period. Finally, the roaming data structure comprises a STATUS OF RECORD field 2814 which includes a bit field describing the status of the roaming mobile whether it is enabled or disabled for certain call types.

Reference is directed to FIG. 30 which is a software diagram of the network custom calling data structure 3000. The network custom calling data structure comprises a TRANSACTION field 3002 which stores a pointer to the record. A SPEED DIAL field 3004 which contains the speed dial pattern used by the name server in determining if the number dialed is for a speed dial function. The network custom calling data structure also includes a SPEED DIAL PROGRAM field 3006 which is similar to the SPEED DIAL field is used to store the pattern for the speed dial program function. There is a FIRST SLOT 3008 and a LAST SLOT 3010. The first and last slot fields indicate the limits of the speed dial programming memory storage locations.

The network custom calling data structure also includes a LAST NUMBER REDIAL field 3012 which indicates the last number redial pattern for the network. There is a CALL FORWARD PROGRAM field 3014 which indicates the speed dial program pattern for the network. There is a CALL FORWARD ALWAYS field 3016 which indicates the call forward always pattern. Likewise, there is a CALL FORWARD BUSY ON NO ANSWER 3018, a CALL FORWARD TO VOICE MAIL 3020, a CALL FORWARD TO PAGER 3022 field, all of which are used to store their respective patterns for use in the name server.

Continuing, the network custom calling data structure includes fields for RECORD A GREETING 3024, PLAYING A GREETING 3026, CHECKING MESSAGES 3028, ERASING MESSAGES 3030, PLAYING THE NEXT MESSAGE 3032, PLAYING THE PREVIOUS MESSAGE 3034, PLAYING FASTER 3036, PLAYING SLOWER 3038, VOLUME UP 3040 and VOLUME DOWN 3042. Each of these fields 3024 through 3042 are used by the voice mail system for storing patterns necessary for the name server to interpret the meaning of the number dialed. In addition, the network custom calling data structure includes a CALL TRANSFER field 3044, a CALL WAITING field 3046, a HANG-UP field 3048, a CONVERSATION TRUNKED RADIO CALL field 3050, a TRANSMISSION TRUNKED RADIO CALL field 3052, each of which is used to store the associated pattern used in the name server for recognizing the number dialed.

In addition, the network custom calling data structure includes a TIME OUT TIMER FIRST DIGIT field 3054 and a TIME OUT TIMER NEXT DIGIT field 3056 which are used for setting the time out period used in waiting for a user to enter dialing digits.

There is a SEND PAGE field 3058 which stores the pattern for the send page command used by the name server. Finally, there is an INACTIVITY TIMER field 3060, a NO ANSWER TIMER 3062 and a CONTACT TIMER 3064, each of which are used to store the time duration for the respective timer for use throughout the network.

Reference is directed to FIG. 25 which is a data diagram 2500 of the user custom calling data structure. The custom calling data structure contains a plurality of records, one for each user ID code, which indicates certain custom calling features for the particular ID code. The use custom calling data structure includes a TELEPHONE NUMBER 2502 which indicates the telephone number of a radio ID. Further, it includes a UID 2504 which stores the UID code for the particular user.

The custom calling data structure 2500 further includes information concerning call forward capabilities of a user. First, the CALL FORWARDING TYPE 2506 indicates whether the radio has call forwarding enabled and if so, whether it is call forward always, as for any call, or call forward when radio busy, or call forward when the line is busy or no answer. Further, the data structure has a CALL FORWARD DESTINATION field 2508 which stores the call forwarding destination location which may be, for example, voice mail, page messaging or other locations. A PASSWORD field 2510 is provided to control access to the call forwarding capabilities of each user by allowing the user to enter his own security password. A CALL FORWARD NUMBER field 2512 is provided which stores the telephone number for the call forwarding destination in the event that the destination is a telephone number.

In addition, the custom calling data structure includes a LAST NUMBER field 2514 which stores the last number dialed for each particular user and this field is recalled in the event that the user activates the last number redial feature wherein the number is recalled from this data structure and used as the number dialed in the subsequent call. A CREDIT CARD NUMBER field 2516 is included which stores the user's personal credit card number for the purpose of charging calls to his credit card number in the event the user has activated the automatic credit card billing feature. Finally, the user custom calling data structure has an AUTO CONNECT NUMBER field 2518 which stores a telephone number that is called automatically in the event the customer has activated the automatic telephone number connect feature.

Figure 23:
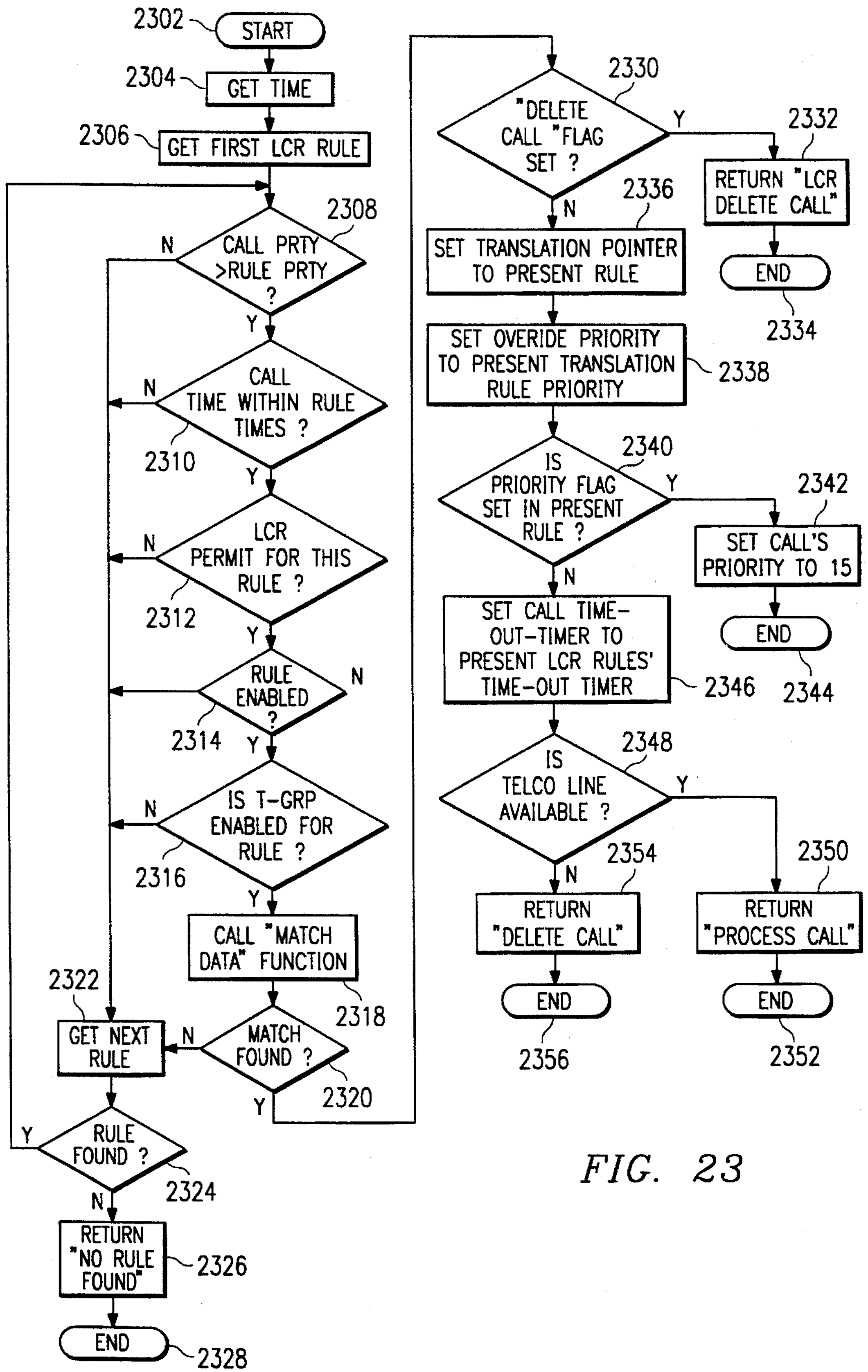
FIG. 23 is a software flow diagram for a least cost router software application.

References directed to FIG. 23 which is a software flow diagram for the least cost routers software application. The least cost router is entered at step 2302 as the beginning of a function which can be called from several other functions and processes within the ESAS® software.

At step 2304 the controller gets the current time. At step 2306 the controller gets the first least cost router rule from the least cost router data structure, which is described elsewhere in this application. At step 2308 the controller tests to see if the priority of the present call is greater than the priority in the present rule. If this is true, the controller proceeds to step 2310 and tests to see if the call time is within the time limit set in the present least cost router rule. If the condition is true, the controller proceeds to step 2312 and tests to see if the user has least cost routing permission for this particular rule. If that condition is true, the controller tests the least cost router data structure to see if the rule is enabled. If it is, the controller proceeds to step 2316 where it tests to see if the trunk group for the present call is enabled for this least cost router rule. If that is true, the controller proceeds to step 2318 and executes the match data function. The match data function attempts to screen the call information and find a least cost routing rule suitable for placing the call.

At step 2320, the controller tests to see if a match has been found. If a match has been found, then a least cost routing rule has been found and the controller proceeds to step 2330.

Returning to step 2308, if the call priority for the call is less than the rule priority or at step 2310 if the call time does not fall within the rule times or at step 2312 if there is no least cost router permission for this particular rule or if at step 2314 the rule is not enabled or at step 2316 if this trunk group is not enabled for this rule or at step 2320 if there was no match found for this least cost routing rule, then the controller proceeds to step 2322 and gets the next least cost routing rule and then at step 2324 tests to see if a rule was found. If a role was found, then the flow recirculates to step 2308 with the new rule and the same set of tests are conducted.

Alternatively, at step 2324 if no rule is found, then the controller returns to step 2326 and returns "NO RULE FOUND" and exits the routine at step 2328. Returning now to step 2330, the controller tests to see if the "delete call" flag is set in the present least cost routing rule. If the delete call flag is set, then the controller proceeds to step 2332 and returns "least cost routing delete call" and exits the routine at step 2324.

Alternatively, at step 2330 if the delete call flag is not set, then the controller proceeds to step 2336 and sets the translation pointer to the present least cost routing rule, then at step 2338 the controller sets the override priority to the present translation rule priority and at step 2340 it tests to see if the priority flag is set in the present rule. If the flag is set, then the controller proceeds to step 2342 and sets the calls priority to 15 and exits the routine at step 2344.

Alternatively, at step 2340 if the priority flag is not set for the present rule, then the controller proceeds to step 2346 and sets the call time-out timer to the present least cost routing rule's time-out timer setting. At step 2348 the controller tests to see if there is a telephone line available to place the call. If there is a telephone line available, then the controller proceeds to step 2350 and returns "PROCESS CALL" and then exits the routine at step 2352. Alternatively, at step 2348 if a telephone line is not available to place the call, then the controller proceeds to step 2354 and returns "DELETE CALL" and finally exits the routine at step 2356.

The foregoing routine allows the controller to analyze the number dialed and the call data for a particular call and to select the optimum resource for connecting the call by repetitively comparing the call information with records in a least cost routing data structure until a match is found. It also provides the system operator a great deal of flexibility in controlling the call routing process. For example, at step 2308 in FIG. 23, the controller compares the call priority with the present rule priority. By adjusting the rule priority, the system operator has the ability to limit the types of users that can access a particular rule. Likewise, at step 2310 in FIG. 23, the system operator has the ability to adjust the time period in which a particular rule is allowed to be active. Similarly, the permission for the rule, whether the rule is enabled or disabled, or whether the trunk group is enabled for a particular rule, are all under the control of the variables within the least cost routing data structure.

As mentioned previously, the ESAS® system is capable of operating in transmission trunk mode and conversation trunk mode. During transmission trunk mode, a repeater is kept active only for a short duration of time such as few seconds. Alternatively, in the conversation trunk mode of operation a repeater is kept active for the entire duration of a call. Because of this and because of the theories of trunking efficiency, repeater resources are used far more efficiently in transmission trunk mode than they are in conversation trunk mode.

Land mobile radio service has traditionally been used for dispatch service which operates in the transmission trunk mode of operation. The bulk of services provided are provided in the transmission trunk mode. Systems are capable of carrying heavy traffic loads, especially during off-peak hours therefore it is desirable for system operators to provide conversation trunk modes communication during these period of time. For example, users may desire to place telephone calls during the off-peak loading hours.

Figure 22:
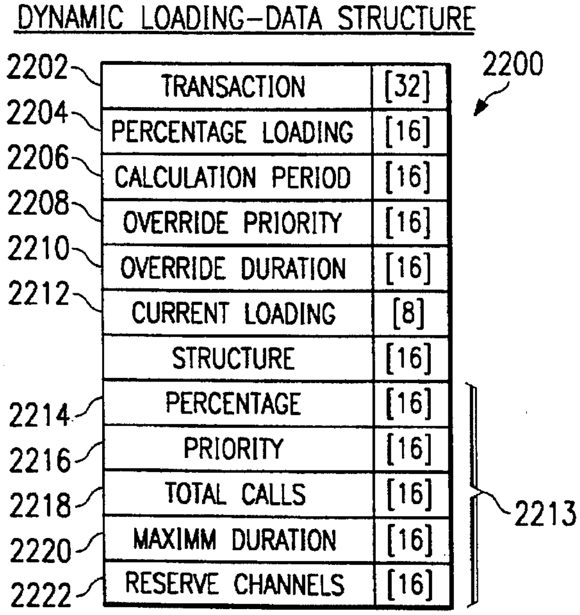
FIG. 22 is a memory data structured diagram for the dynamic loading data.

To accommodate these mixed services, the ESAS® system provides a dynamic loading scheme in its design. Dynamic loading provides guaranteed system access for emergency services. FIG. 22 details a dynamic loading data structure which stores information about traffic within the system. Furthermore, FIG. 31 details the dynamic loading software application. Conceptually, dynamic loading reserves a portion of the repeaters in a trunk group for transmission trunk traffic only. While the amount of transmission trunk traffic is relatively low, as a percentage of total loading, the dynamic loading application allows a larger number of repeaters to be used in conversation trunked calls. However, if the history of traffic within a repeater trunk group indicates that there has been a high level of transmission trunk traffic, then the dynamic loading application will limit the number of repeaters that are allowed to carry conversation trunk traffic.

Each repeater is assigned a priority number between 0 and 15 which is known as the override priority. In order for a conversation trunked call to access a reserved repeater, it must have a call priority number that is greater than the override priority number for the reserved repeater. Only a portion of the repeaters require an override priority to allow non-dispatch calls.

However, then conversation trunked calls may access those repeaters without overriding the repeater's priority. Repeater priorities are not assigned on a repeater-by-repeater basis. Rather, they are assigned on a trunk group basis and the dynamic loading application assigns a certain number of repeaters are reserved for dispatch access only.

Reference is directed to FIG. 22 which is a data diagram of 2200 of the data structure used in the dynamic loading software application. For each trunk group, the dynamic loading data structure includes a TRANSACTION NUMBER 2202, a PERCENTAGE LOADING variable 2204 which indicates the average repeater busy loading during a weighted time period, a CALCULATION PERIOD 2206 which is used in calculating the percentage loading FIG. 2204. The dynamic loading data structure further includes an OVERRIDE PRIORITY 2208 which ranges from the number 0 to 15 and indicates the minimum priority level required to override the system's priority level. An OVERRIDE DURATION 2210 is also stored in the data structure and indicates the call duration necessary to override the current priority level.

The dynamic loading data structure 2200 further includes a substructure 2212 which further includes a PERCENTAGE LOADING 2214, a priority level 2216, a TOTAL NUMBER OF CALLS 2218, a MAXIMUM CALL DURATION 2220 and a number of RESERVED CHANNELS variable 2222.

The substructure 2213 comprises several additional fields. The substructure defines an incremental step in the loading scheme utilized by the dynamic loading data structure. Each incremental step represents a degree of loading in the trunk group. The PERCENTAGE field 2214 defines the maximum percentage of loading under which this particular substructure record will apply. The PRIORITY field 2216 indicates the priority necessary to override this dynamic loading level. The TOTAL CALLS field 2218 indicates the total number of conversation trunked calls which can be active at any given instant when this substructure is active. The MAXIMUM DURATION field 2220 indicates the maximum call length duration for a conversation trunked call while this particular substructure is active. Finally, the RESERVED CHANNELS field 2222 indicates the number of channels are reserved for transmission trunk only services. In a typical example where five dynamic loading levels are employed, the first level would run from 0% to 20%, the second from 21% to 40%, the third from 41% to 60%, and so on to 100%. The substructures under the dynamic loading data structure would have the percentage fields 2214 set at 20%, 40%, 60%, 80% and 100%, respectively. Additionally, the priority levels would gradually increase. For example, the priority level at field 2216 may be at 5, 8, 12, 14 and 15, respectively. The maximum duration of the calls allowed in conversation trunk mode as defined in field 2220 would be gradually decreased and furthermore the reserve channels as defined in field 2222 would gradually be increased.

By using this data structure scheme, the system allows for reduced conversation trunk traffic as the amount of transmission traffic increases. This means that a high grade of service will be provided to transmission trunk users during peak loading times, such as normal business days, yet still allowing utilization of conversation trunked resources during off-peak times such as in the evenings and weekends.

The dynamic loading data structure 2200 is accessed by the dynamic loading software application, the call processing software application, the name server application and the repeater software application in the process of placing and receiving calls.

Figure 31:
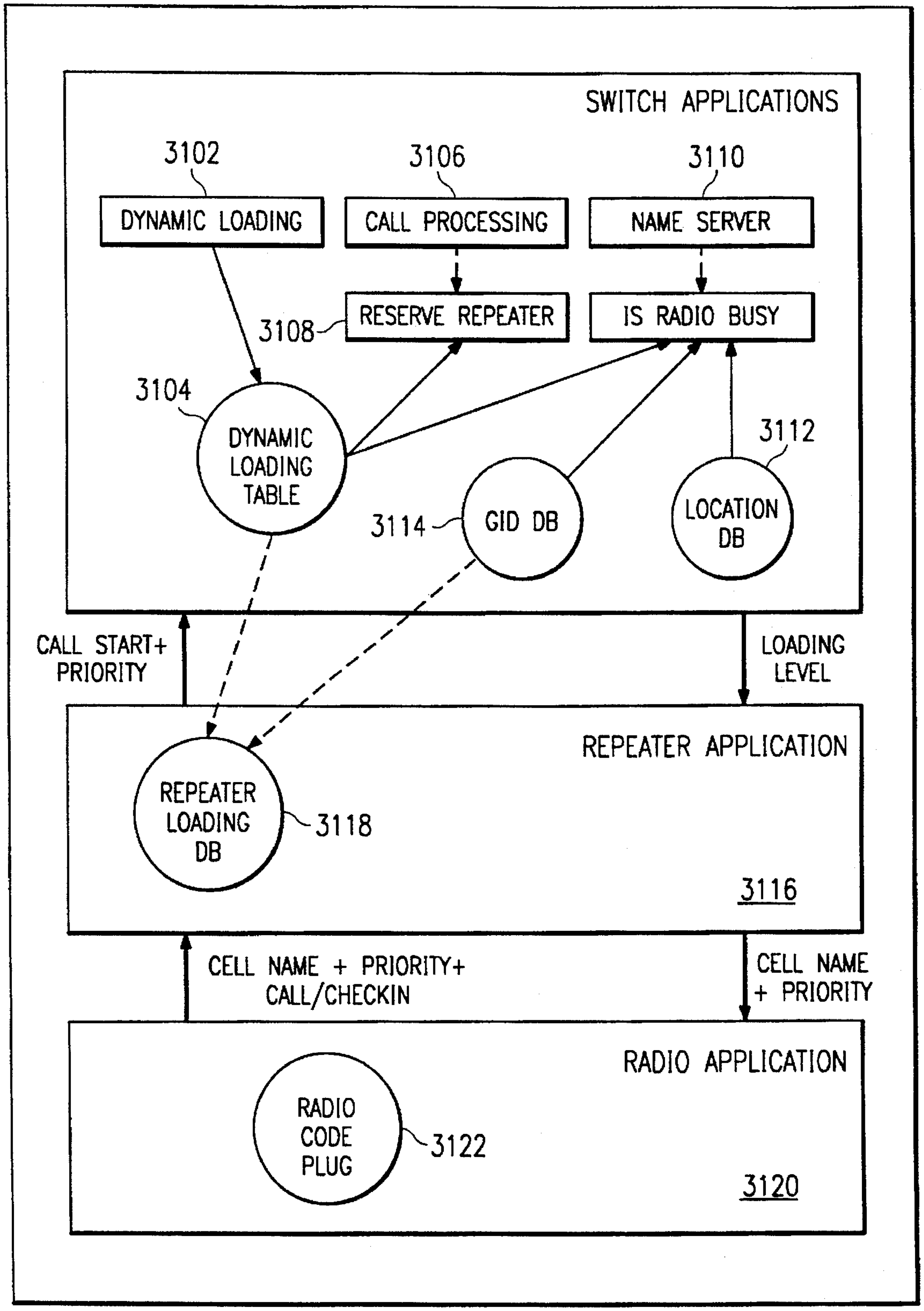
FIG. 31 is a logic diagram for a dynamic loading application.

Reference is directed to FIG. 31 which is a software block diagram of the dynamic loading application in an ESAS® switch. The dynamic loading application is not a software application in and of itself, but rather the interaction between several other software applications in the ESAS® switch. The dynamic loading application does maintain a group of variables in the memory in the switch for use in allocating repeater resources during call processing.

The variables stored by the dynamic loading application include the active loading level. The active loading level is the ratio of the number of busy repeaters divided by the total number of repeaters in a given trunk group. For example, if a trunk group consisted of five repeaters and at any given instance, three of the repeaters were busy, then the active loading level would be 60%.

The dynamic loading application also calculates a variable active call loading percentage. The active loading percentage is the average active loading level over a given period of time. A period of time such as 60 seconds minutes may be used in calculating the active loading percentage. Other variable stored include the active priority level, the maximum call duration, the override priority level, the override call duration and the number of reserved channels.

The dynamic loading software is represented by block 2102 in FIG. 31. The dynamic loading table which stores the variables just described is represented by block 3104.

The dynamic loading application 3102 can be set to calculate the active loading percentage at a specific interval of time. At the end of this calculation interval, the dynamic loading application sets the active loading level, active loading percentage, active priority level and sends a command to each repeater in the trunk group to tell it the current active priority, maximum call duration, override priority, override call duration and reserve channel number.

The call processing application 3106 interacts with the dynamic loading application 3102. From time to time, the call processing application will need to reserve a repeater for a new conversation, such as an inbound telephone call. To reserve a repeater, the call processing application calls the function reserve repeater 3108. The reserve repeater 3108 function will only allocate a repeater to the call processing application 3106 if the trunk group associated with the called radio has at least as many free repeaters as reserve channels for the current loading level. For example, if the reserve channel 3108 is set to 2 (meaning reserved two channels for emergency access) and three repeaters are free, then the reserve repeater function 3108 would allocate a repeater for the call. If there were only two repeaters free, then the reserve repeater function 3108 would only allocate a repeater to the call if the call had a priority level associated with a greater than or equal to the active priority for the trunk group.

The name server 3110 also interacts with the dynamic loading application 3102. The name server 3110 qualifies new calls by checking to see if the radio being called is busy or not. The name serve 3110 declares a radio as busy if the priority level associated with the call is less than the active priority level as stored in the dynamic loading table 3104. For example, if the active priority level was 7 and a call was received from a phone line for a group ID with priority level 3, then the name server 3110 would declare the radio busy. On the other hand, if the radio's priority was 7 or more and the radio was not busy with another call, then the name server 3110 would declare that the radio is free. Calls to unique IDs vary from calls to group IDs in that the radio's priority is extracted from the roamer location broker 3112 rather than the group ID database 3114.

On the other hand, if a call were originated from a radio rather than a telephone line, then the calls priority would be associated with the source radio and not the destination radio. This implies that a high priority radio will be able to call a low priority radio even when the active priority level in the dynamic loading table 3104 is greater than the low priority radio's priority level, if the caller's priority level is greater than or equal to the active priority level.

The repeater application as identified by block 3116 in FIG. 31 also interacts with the dynamic loading application. The repeater maintains an active count of the number of free repeaters in its particular trunk group. It also receives loading messages from the switch informing it of the active priority level, maximum call duration, override priority level, override call duration and number of reserve channels. This information is transferred from the dynamic loading table 3104 to the repeater loading database 3118.

The repeater broadcasts its active priority level to radios with each CELL-NAME transmission. This time period is programmable. If the number of free channels is less than or equal to the number of reserve channels and the repeater is free, then the repeater will only accept ESAS® calls and LTR® calls whose priority level is greater than or equal to the active priority level. All other call attempts will simply be ignored.

For ESAS® calls, the call's priority level is sent along with the CELL-NAME as part of the call request. For LTR® radios, the repeater maintains a table of all group IDs in the trunk group. Within this table, the repeater has the group ID priority level and thus can associate any LTR® call request with a priority level before making the decision to handshake with the LTR® radio.

The repeater uses the maximum call duration time to time out all calls started on nonreserve channels and the override call duration to time out calls placed on reserve channels. The ESAS® radio applications as depicted in block 3120 also interact with the dynamic loading application 3102 via the repeater applications 3116. All ESAS® radios are programmed with a code plug 3122. As part of this code plug, a priority level can be associated with a call, cell, etc. The radio hears CELL-NAME messages from its host cell and notes the system active priority level. When the user of the radio wants to initiate a call on the host cell, the radio will sound the "system busy" alert and not make the call if the active system priority level is greater than the call priority level.

Additionally, the radio carries out a roaming algorithm while hosted by an ESAS® cell. This algorithm qualifies the signal strength of its host cell and attempts to find new cells in the network when the signal level drops below a given threshold within a specific amount of time. The signal strength is measured as a message error rate based on the cell name messages received from the host cell. If the priority level of a cell name message is above the radio's priority level (i.e., the radio currently cannot use the cell), then the radio notes the host's priority level, but does not count the cell name message as a good packet for roaming purposes. The effect of this is to have a radio automatically initiate roaming from the host cell whose priority is consistently above the radio's access priority.

Reference is directed to FIG. 26 which is a data diagram 2600 for the DID information data structure. The DID information data structure contains a plurality of records which are used in converting a DID telephone number into a group ID or unique ID number when a call is placed. The data structure includes an ENABLE field 2602 which is used to enable and disable the particular record in the field. The purpose for doing this is to give the system operator the ability to disable the DID function of a particular unit on a case by case basis. A TRANSLATION field 2604 is included which gives the specific translation rule in converting the phone number to a specific unit ID. The translation rules used here are the same as those used in the least cost router. Finally, the DID information data structure comprises an EXTENSION field 2606 which is the digits that are given to the network switch by the telephone company upon receipt of an inbound did call.

Figure 27A:
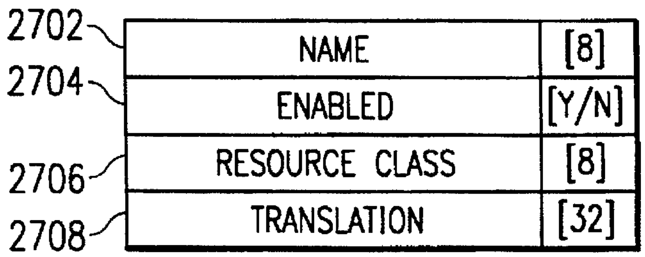
FIGS. 27A and 27B are memory data structure diagrams for least cost router data and least cost router pattern data.
Figure 27B:
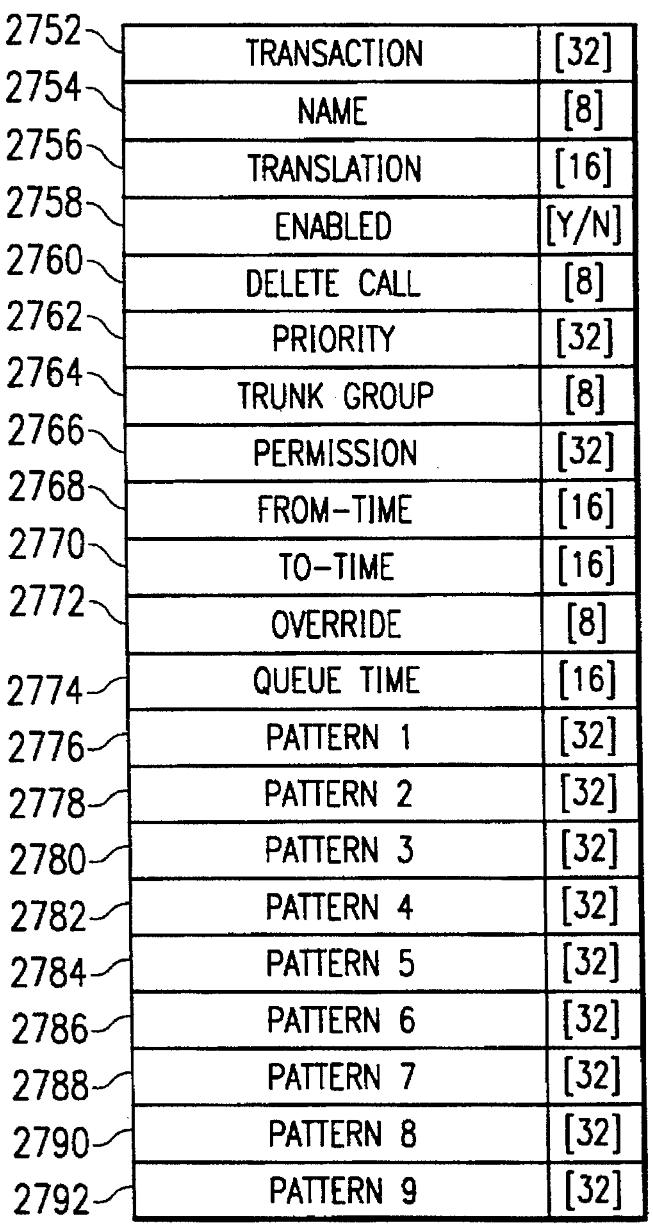

Reference is directed to FIG. 27B which is a data diagram of the LCR Pattern Data Structure 2750. This data structure is used by the LCR software routine as depicted in FIG. 23. The LCR routine sequentially reads records from the LCR Pattern Data Structure 2750 and attempts to match a number dialed to a particular LRC Pattern Data Structure. If a match is found, then the LCR Routine stores a pointer to the matched LCR Pattern record in the Call Data Structure. At a later time in the processing of a call, when a telephone resource is selected, the DIAL TELEPHONE NUMBER function will use the pointer to select the Pattern record which will in turn be used to select a translation record, see FIG. 27A, that will ultimately be used to translate the number dialed into a form that is appropriate for the particular telephone call and resource used to place that call.

The purpose of the forgoing process is to make the dialing of digits by a user, to place a desired call, independent of the resource the system uses to connect the call.

The LCR Pattern Data structure 2750 comprises the following fields:

| ITEM | Description | Size | Description |
|---|---|---|---|
| 2754 | Name | 8 bytes | Familiar name of rule |
| 2756 | Translation | 16 bytes | Translation rule |
| 2758 | Enabled | [Y/N] | Is the rule enabled? |
| 2760 | Delete Call | 8 | Does this rule require the call to be terminated? |
| 2762 | Priority | 32 bytes | Number from 0 to 15 defining the priority level of calls that match this rule. |
| 2764 | Trunk Group | 8 bytes | Matched to a particular GID by matching the call source ID with this filed. |
| 2766 | Permission | 32 bytes | A permission mask that is assigned to the call if a match is found. |
| 2768 | From-Time | 16 bytes | The beginning time of a time window in which this LCR pattern rule is valid. |
| 2770 | To-Time | 16 bytes | The end time for a time window in which this rule is valid. |
| 2772 | Override | 8 bytes | The override priority level assigned to calls that match this rule. |
| 2774 | Queue Time | 16 bytes | The length of time a call matching this rule will be left in queue before it is terminated. |
| 2776 | Pattern1 | 32 bytes | A pattern, for a particular resource class that is used to match this rule. |
| 2778 | Pattern2 | 32 bytes | A pattern, for a particular resource class that is used to match this rule. |
| 2780 | Pattern3 | 32 bytes | A pattern, for a particular resource class that is used to match this rule. |
| 2782 | Pattern4 | 32 bytes | A pattern, for a particular resource class that is used to match this rule. |
| 2784 | Pattern5 | 32 bytes | A pattern, for a particular resource class that is used to match this rule. |
| 2786 | Pattern6 | 32 bytes | A pattern, for a particular resource class that is used to match this rule. |
| 2788 | Pattern7 | 32 bytes | A pattern, for a particular resource class that is used to match this rule. |
| 2790 | Pattern8 | 32 bytes | A pattern, for a particular resource class that is used to match this rule. |
| 2792 | Pattern9 | 32 bytes | A pattern, for a particular resource class that is used to match this rule. |

The MATCH DATA function is called from the Least Cost Router routine, FIG. 23 and serves to compare the number dialed with a list of nine patterns that are stored in the Least Cost Router Pattern Data Structure, FIG. 27B. The MATCH DATA function uses the following set of match rules:

| Pattern Data | Matches in Number Dialed |
|---|---|
| ? | Any single digit at the same relative location in number. |
| * | Matches one or more digits at the end of the number dialed. |
| (XX) | Matches "XX" characters in the number dialed. |
| 0–9 | Matches the specific digit. |
| ABCDEF | Matches the DTMF digits ABCDEF |
| { } | Transfers digits in number dialed to the TAGGED DATA field. |

Upon finding a match, the LCR Routine stores a pointer to the matched rule in the Call Data Data Structure, FIGURE 29.

Figure 21A:
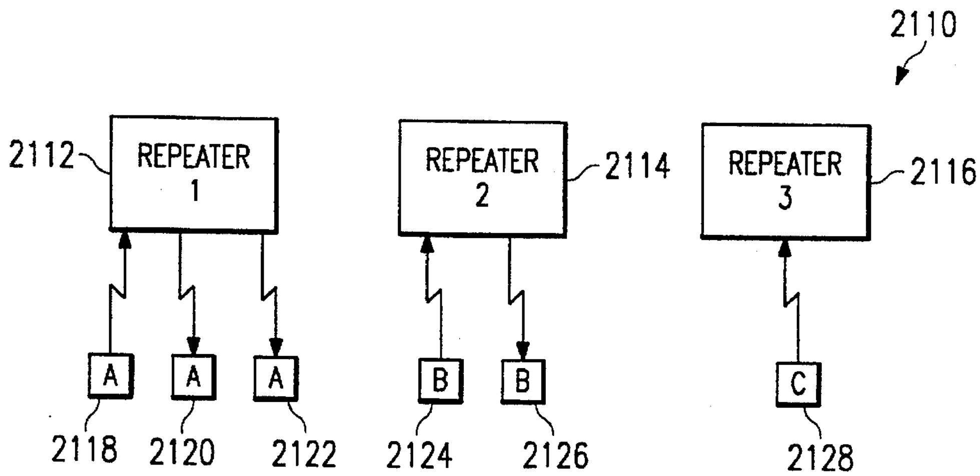
FIGS. 21A–21D are block and layer diagrams for a dynamic control channel for a land mobile radio site.
Figure 21B:
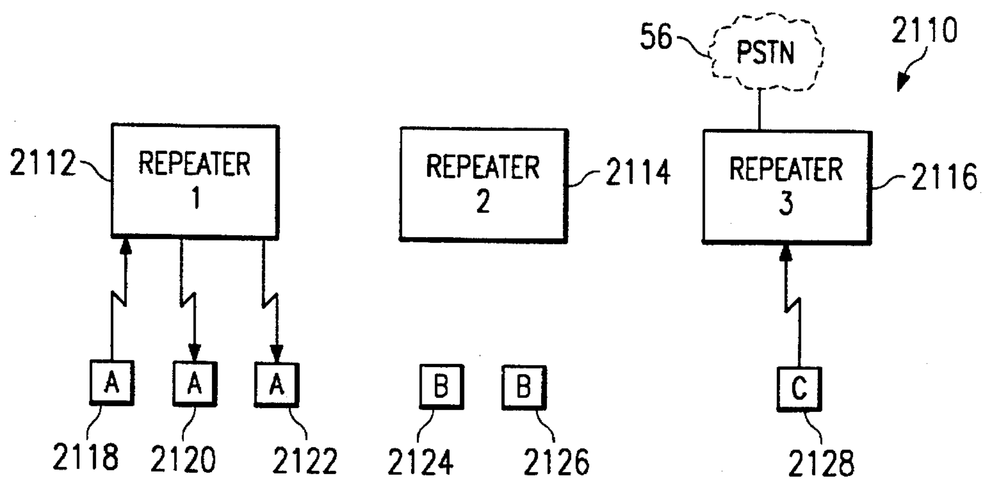
Figure 21C:
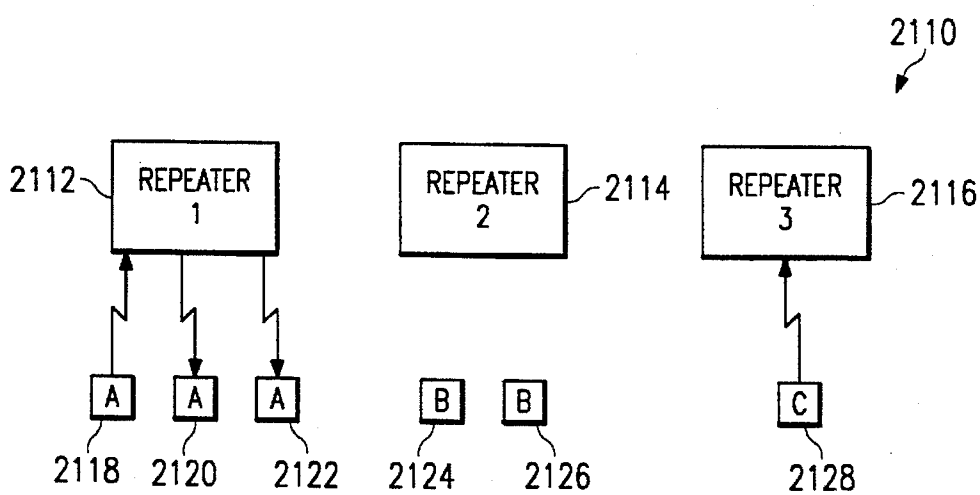

A dynamic control channel as used in conjunction with the ESAS system is described in reference to FIGS. 21A–21D. In FIGS. 21A–21C, a cell site 2110 includes a plurality of repeaters 2112, 2114 and 2116. These are, respectively, repeaters 1, 2 and 3. Each of these repeaters, as described above, includes both a transmitter and a receiver to provide a repeater channel. The cell site 2110 has three radio groups which are A, B and C. Radio groups A and B are dispatch only (LTR radios) and group C is an ESAS radio set. Group A radios are 2118, 2120 and 2122. The group B radios are 2124 and 2126. The only group C radio shown is radio 2128.

As show in FIG. 21A, repeater 2126 (repeater 3) has been designated as a control channel repeater and as such ignores all LTR IDs, which have been made temporarily invalid, and will only handle data. The data is provided by an ESAS radio, such as radio 2128. In this embodiment, the cell is set to accept call requests and rejects any attempts for new calls.

In FIG. 21A, the ESAS radio 2128 has requested a telephone call (conversation trunked call), but the repeater 2116 has been designated as a control channel repeater and, therefore, handles only data which is received from the ESAS radio 2128. The request for a telephone call by radio 2128 is thus placed in a queue and no immediate service is provided. However, if the called number is a higher priority than the system priority for the repeater 2116, for example a "911" call, the repeater 2116 is then used to provide a conversation trunked call with the radio 2128. However, in a more typical case, the call request (a conversation trunked call) by radio 2128 is placed in a queue awaiting availability of a free repeater.

As shown in FIG. 21B, repeater 2110 has become free and repeater 2116 has been assigned to handle the queued call request from ESAS radio 2128. As a result, there is only one free repeater; therefore, repeater 2110 has been designated to provide the dynamic control channel and, therefore, is not permitted to handle audio. Thus, the control channel has been switched from repeater 2116, as shown in FIG. 21A, to repeater 2110, as shown in FIG. 21B.

Referring to FIG. 21C, the ESAS radio 2128 continues to have its conversation trunked call routed through repeater 2116 while repeater 2110 provides the control channel. The radios in groups A and B are dispatch only radios, not ESAS; therefore, when there is a dedicated dynamic control channel, repeater 2110 at this time, the IDs for the LTR radios (dispatch radios) are invalidated so that they cannot capture the control channel repeater. Thus, any attempt by the dispatch radios in groups A and B to use a repeater in a cell site 2110, when a control channel repeater has been designated, will be denied.

Although only one control channel is shown in FIGS. 21A–21C, the more general case is "n", that is, a selected number of control channels which can be one or more.

Figure 21D:
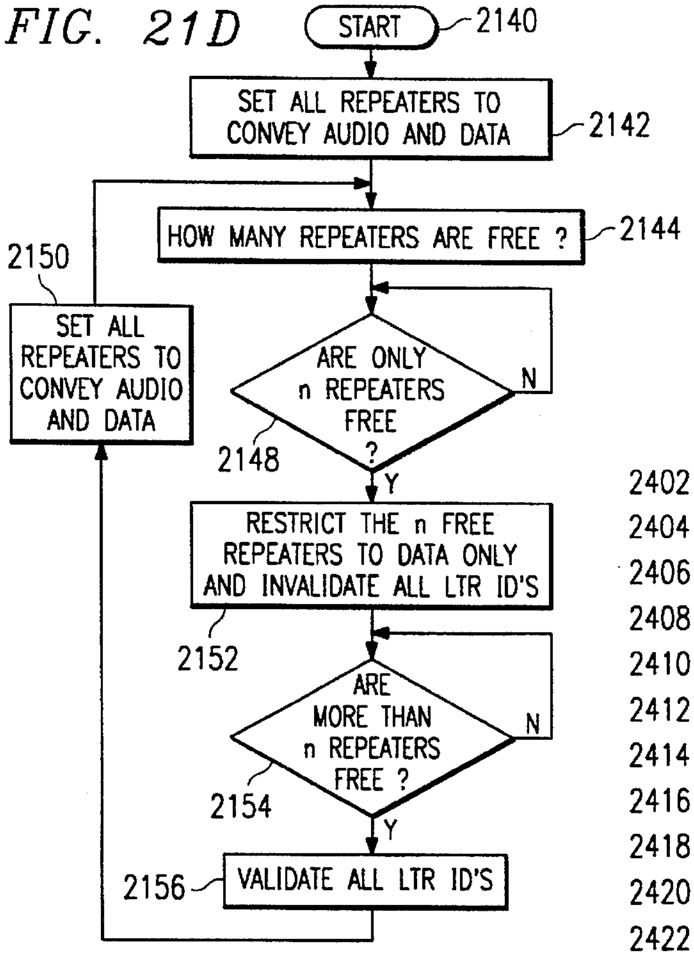

A flow diagram of the control process for the dynamic control channel is illustrated in FIG. 21D. This is now described in reference to FIGS. 21A, 21B, 21C and 21D. The operations are begun at the start 2140. Next, an operational block 2142 is performed to set all of the repeaters to convey both audio and data. After block 2142, an operational block 2144 is carried out to determine how may repeaters are free, that is, not in use. Following operational block 2144, control is transferred to a question block 2148 in which a determination is made if only n repeaters are free. If the answer is NO, which means that more than n repeaters are free, the NO exit is taken and return is made to the entry of the question block 2148. When it is determined that there are only n free repeaters, the YES exit is taken to an operational block 2152.

Within the operational block 2152, operations are carried out to restrict the n free repeaters to data only communication and to invalidate all of the LTR IDs. This is the condition shown in all of the FIGS. 21A, 21B and 32C, since there is only one free repeater. In this configuration, n is one. Further, the one free repeater is designated to provide the control channel and it is restricted to data only. This is repeater 2116 in FIG. 21A and repeater 2114 in FIGS. 21B and 21C. Note in FIG. 21C that an attempt to access repeater 2114 by LTR radio 2124 is blocked.

Following operational block 2152, control is transferred to question block 2154 where an inquiry is made to determine if more than n repeaters are free. If only n repeaters are free, the NO exit is taken and entry is again made to the question block 2154 more than n repeaters are free, the YES exit is taken and entry is made to an operational block 2156. Within the block 2156, all of the LTR IDs are validated so that the dispatch radios can again be operational. Control is directly transferred to operational block 2150 in which all of the repeaters are set to convey both audio and data. This is done because there is more than n free repeater channels. From the operational block 2150 control is then returned to the operational block 2144 to repeat the process of determining the number of free repeaters.

The dynamic control channel operation, as shown in FIGS. 21A–D, ensures that there will always be at least one channel available to receive data and perform critical operation functions independent of system loading.

Figure 32:
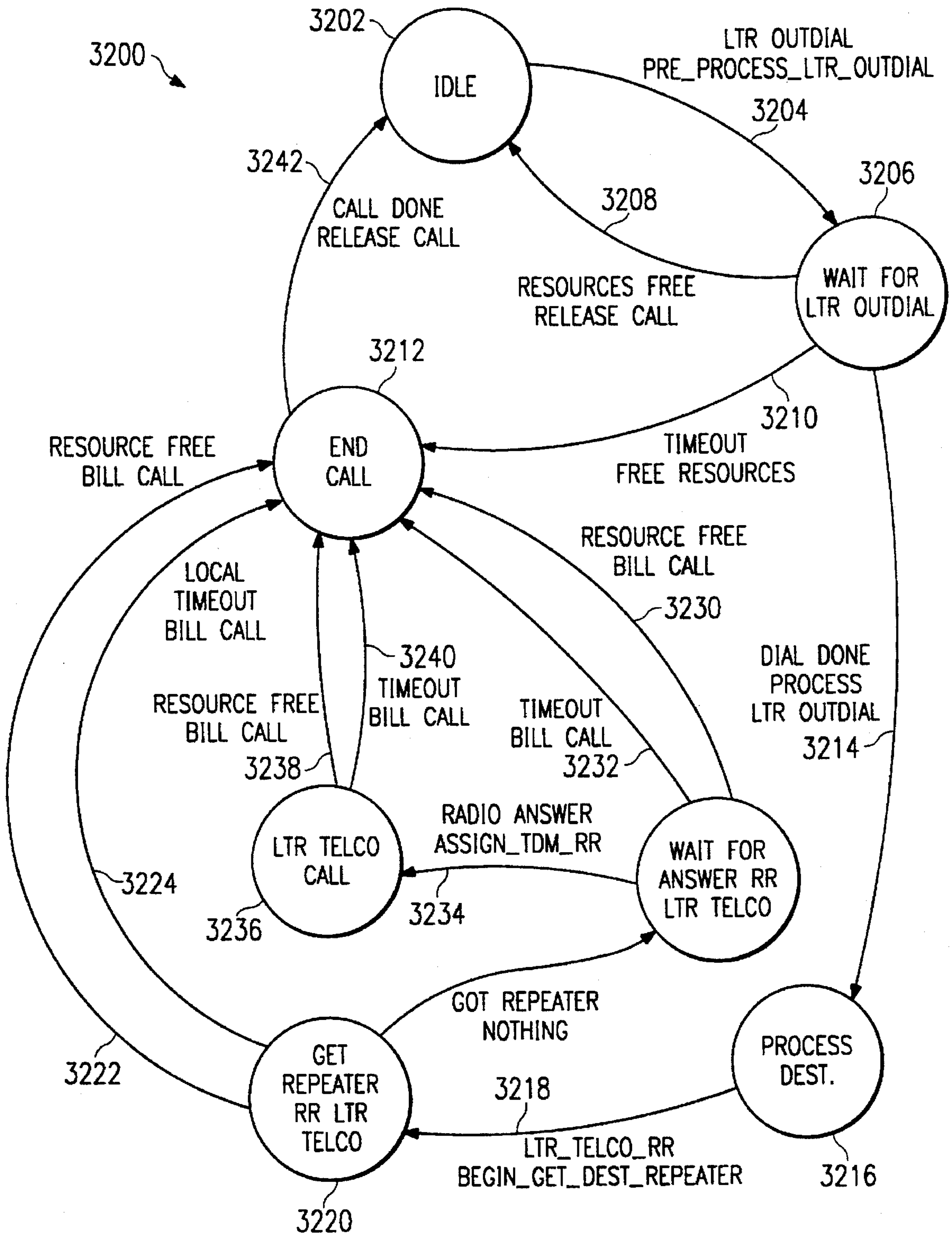
FIG. 32 is a software state diagram for internal DID number recognition.

Reference is directed to FIG. 32 which is a software state diagram for the internal telephone number recognition process in the ESAS® switch. Every call begins in the idle state at step 3202 where the system is idle and waiting for some event to occur. Upon the occurrence of any event, a function is called which further defines a subsequent state to which the process moves. The nomenclature in FIG. 32 is such that there are a pair of phrases associated with each transitional arrow. The upper phrase describes the event that occurred to cause the process to leave a state. The lower phrase describes the function that is called as a result of the event. Finally, the function that is called defines a state that the process will subsequently go to until another event occurs.

The present process begins with the transition 3204 to the wait for LTR® outdial state 3206 upon the event LTR® outdial. The LTR® outdial event indicates that an LTR® outdial call has been initiated on a repeater into the telephone network. As a result of that event, the process will call the preprocess LTR® outdial function which is a function that checks the source ID code for outdial privileges. If no privileges are found, it sends a call invalid signal to the host repeater and terminates the call. Alternatively, if the correct privileges are found, the function causes the process to transition to the wait for LTR® outdial state at step 3206.

The wait for LTR® outdial state can be exited upon one of three events occurring. First, the resource free event will cause the process to follow transition arrow 3208. Secondly, the time out event will cause the process to transition via transition 3210 and thirdly, the dial done event will cause the process to transition via transition 3214. The resource free event informs the system that the resource has been released from a call. This would be the result if a user who had just initiated an LTR® outdial call had hung up before dialing the digits. As a result of the resource free event, the process calls the release call function which is a function that releases the source repeater and returns the process to the idle state at step 3202 waiting for another event to occur. Alternatively, at the wait for LTR® outdial state 3206, the user may delay in entering the telephone number digits and a time out event may occur and cause the state to transition via transition 3210 to the end call state 3212. The time out event causes the process to call the free resources function which transitions to the end call state 3212.

Returning now to the wait for LTR® outdial state 3206, if the dial done event occurs which indicates that the digit dial is complete, then the controller calls the process LTR® outdial function and transitions via 3214 to the process destination state 3216. The process LTR® outdial function checks the number dialed with the least cost dial rules, the DID mapping and the name server in an LTR® call to validate the call, translate the call, select resources or determine the call terminator type. For the present invention, the DID mapping table would detect the number dialed as being a DID number and translate the number dialed into a number translated that is equal to the ID code of the destination radio. In this way, the ESAS® switch will not place a call into the public switch telephone network as the dialing of a telephone number would dictate but rather translate the number into a radio ID code associated with the telephone number and contact the radio directly via a repeater.

The process destination state 3216 determines the destination location and/or destination ID for a particular call. The state is exited via transition 3218 upon the occurrence of the LTR® telco RR event. The LTR® telco RR event occurs when an LTR® telephone line to telephone line request has been received by the processor. The function begin get destination repeater is called which searches for an available destination repeater according to the known destination of the source radio. This function causes the process to transition to the get repeater RR LTR® telco state 3220.

The get repeater LTR® telco state 3220 can be exited upon the occurrence of one of three events. The resource free event will cause the transition via 3222 to the end all state 3212, or the local time out event via transition 3224 will cause the transition to the end call state 3212 or finally, the got repeater event will cause the transition via 3226 to the wait for answer RR LTR® telco state 3228. In a similar fashion to transition 3208, transition 3222 occurs if a resource becomes free which would happen, for example, if the source radio disconnected from the call. In that case, the bill call function would be called which directs the process to go to the end call state 3212. The bill call function causes the process to create a billing record for the call and then transition to the out call state at 3212.

Alternatively, at the get repeater RR LTR® telco state 3220, if a local time out occurs because of the failure of the system to receive an event in a timely fashion, then the 3224 transition occurs and the go call function is called and the process transitions to the end call state 3212. At the get repeater RR LTR® telco state 3220, if the got repeater event occurs, then transition 3226 occurs and no function is called as the process transitions to the wait for answer RR LTR® telco state 3228. The got repeater event occurs when the system has found a destination repeater for the call.

The wait for answer RR LTR® telco state 3228 causes the controller to wait for a radio to answer a repeater to repeater LTR® telephone call. The state may be exited upon the occurrence of one of three events. A resource free event will cause the bill call function to be called and the 3230 transition to transfer control the end call state 3212. Alternatively, from the wait for answer RR LTR® telco state 3228, a time out event will cause the bill call function to be called and the 3232 transition will cause the process to go to the end call state 3212. Alternatively, a radio answer event which indicates that the radio has answered the call will cause the assigned TDM RR function to be called which assigns a TDM slot for a repeater to repeater call and causes transition 3234 to transition the process to the RR LTR® telco call state 3236.

The RR LTR® telco call state 3232 indicates that a telephone call is currently in process. The state will be exited upon one of the repeater resources becoming free which will cause the bill call function to be called and transition 3238 to cause the process to go to the end call state 3212. Alternatively, from the RR LTR® telco call state 3236, if the system has a call time out timer active, a time out event will cause the bill call function to transition control via transition 3240 to the end call state 3212. As can be seen, the call will be terminated by either one of the two radios involved in the conversation hanging up and causing the repeater resource to become free or a time out timer expiring which terminates the call automatically.

During the end call state 3212, the system is tearing down call set up and freeing resources. The end call state is exited upon the occurrence of the call done event which indicates that a call is complete and calls the release call function which cancels the call data record and returns the system to the idle state 3202 via transition 3242.

Figure 33:
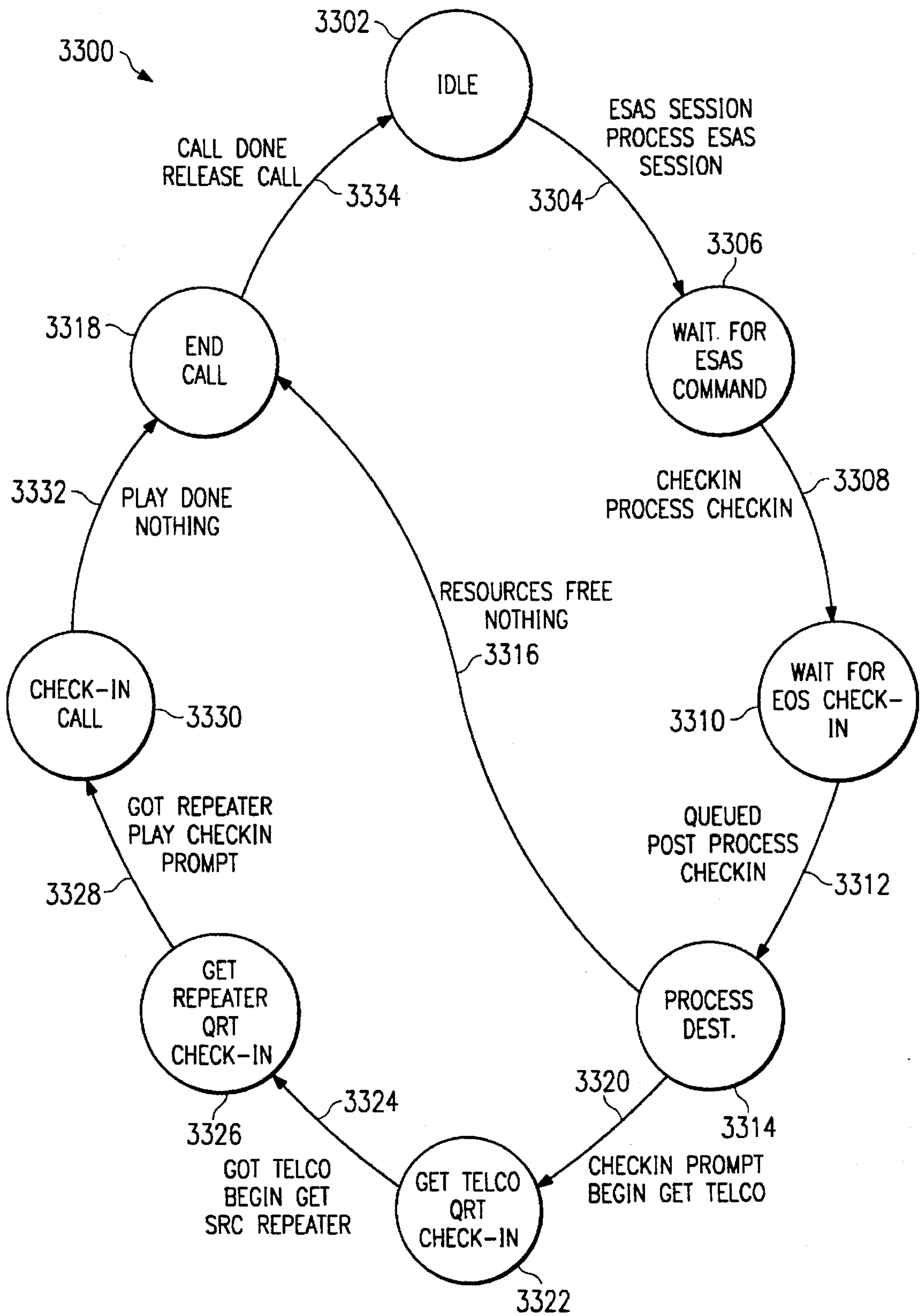
FIG. 33 is a software state diagram for automated voice prompts.

Reference is directed to FIG. 33 which is a software state diagram for the automated voice prompt service 3300 in an ESAS® switch. The process begins in the idle state 3302 while the processor is waiting for an event to occur. Upon the occurrence of an ESAS® session which indicates that an ESAS® session has been initiated with the switch, the switch calls the process ESAS® session function which checks to see if a radio has any pages or voice mail waiting and sends them and the system transitions via 3304 to the wait for ESAS® command state at 3306.

In the wait for ESAS® command state, the system waits for an ESAS® command to be received from a radio. The state is exited upon the occurrence of a check in of that which occurs when a check in command is received and calls the process check in function which checks to see if there are any pages or voice mail messages for a radio and the check in event causes the processor to transition via 3308 to the wait for EOS check in state 3310.

During the wait for EOS check in state 3310, the processor is waiting for an EOS check in command which is received from the radio and causes the event queue to occur which indicates that the radio is held in queue by the switch and the post-process check in function is called causing the processor to transition via 3312 to the process destination state 3314. The post-process check in function is called at the end of a check in session and it determines if a voice prompt is needed to properly terminate the call. If such an action is required, the processor transitions via 3312 to process destination state 3314 in which the call processing engine determines the destination location and/or destination ID for a call which in this example is a voice mail prompt. The process destination state 3314 can be exited in one of two ways. If a resource free event occurs which indicates that the radio has terminated the call, then the switch calls no function but transitions via transition 3316 to the end call state 3318.

Alternatively, at process destination step 3314, if a CHECK-IN prompt event occurs which indicates that there is a need for a CHECK-IN prompt to be played, the The CHECK-IN prompt event causes the BEGIN GET TELCO function to be called which searches for a valid telephone line resource on which to play the voice prompt and causes the process to transition via 3320 to the get telco QRT check in state I0 at 3322.

During the get telco QRT check in state at 3322, the processor is waiting to get a queued repeater to telephone line resource to play a check in prompt. This state is exited upon the receipt of a got telco event which indicates that a telephone resource has been acquired and calls the function begin get source repeater which searches for a source repeater and causes the process to transition via transition 3324 to the get repeater QRT check in state at 3326.

The get repeater QRT check in state 3326 is a state in which the processor waits for a repeater assignment during a queued radio to telephone check in session. This state is exited upon the receipt of a got repeater event which indicates that a repeater has been assigned and the calling of the play check in prompt function, and causes the processor to transition via transition 3328 to the check in call state at 3330.

During the check in call state 3330, the digital signal processor on the telephone interface card is recalling data from a memory and converting it into a digitized voice prompt which is coupled via the MVIP™ bus to the repeater on which the radio which has just checked in is currently communicating. The radio will here the check in prompt during the check in call state at 3330.

The check in call state is exited upon the play done of that occurring which indicates that the voice prompt is done playing. No event is called and the process transitions via transition 3332 to the end call state at 3318. During the end call state, the processor tears down the connection between the DSP and the repeater and frees the resources and is exited upon the receipt of a call done event which indicates that the resources have been freed and the release call function is called which terminates the call data structure and transitions via transition 3334 back to the idle state 3302.

The foregoing software state diagram is useful in combination with a multi-cell trunked radio network constructed of ESAS® switches. As an ESAS® radio roams through a network, it continually attempts to maintain communications with the cell that it is currently communicating with. As the radio moves away from the cell, the repetitively broadcast idle message is transmitted by the cell become lower in signal strength until a point where the radio can not longer adequately receive them.

At the point where the radio can no longer receive idle messages from the cell it is currently listening to, it checks a scan list stored in the radio's memory for alternate frequencies. The radio begins scanning the alternate frequencies searching for a new cell that is transmitting idle messages which it is capable of receiving. Upon finding a frequency transmitting ESAS® idle message, the radio attempts the check in procedure described in the foregoing state diagram. This check in procedure is automatic and requires no user intervention. Because the changing of the cell of communication by the radio influences decisions that the end user makes in operating his radio, for example, placing dispatch calls versus placing inter-cell transition trunked calls, it is important to notify the user of this change. Traditionally, the notification of such a change would have been done by indicating a change on a display on the radio, however, in a mobile environment it is infrequent that the user actually looks at the radio to determine its currently operational state. The advantage of the ESAS® system is that the user will receive an audible voice prompt indicating not only the fact that he has changed his cell of communication but the voice prompt can include information that describes what cell is currently checked into. In addition, it is possible for the system operator to enter other useful information or even possible sales information in the check in voice prompt to use to his benefit.

Figure 34:
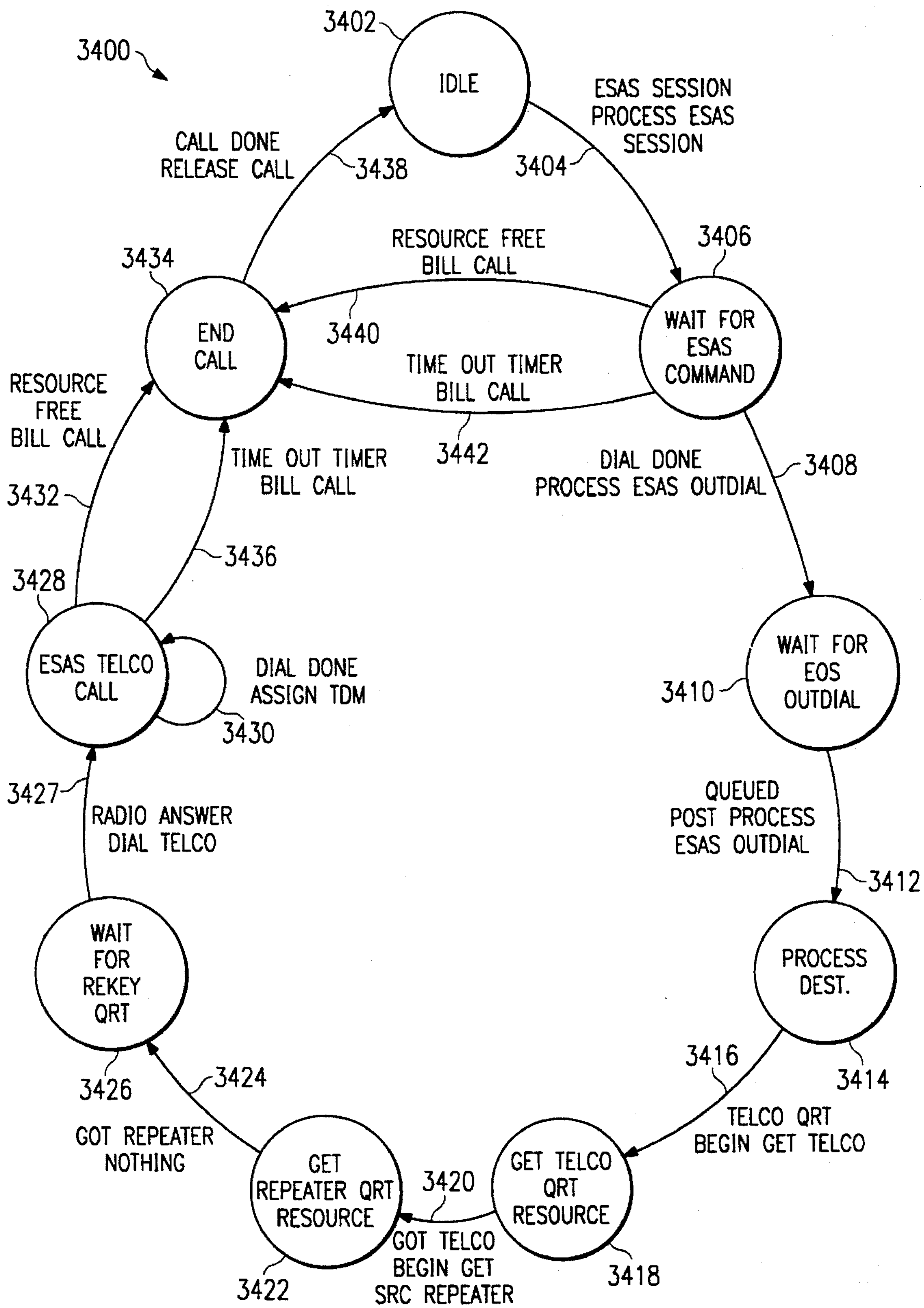
FIG. 34 is a software state diagram for priority override based on number dialed.

Reference is directed to FIG. 34 which is a software state diagram for the priority override based on number dialed invention 3400. The process begins at the idle state 3402 while the processor waits for an event to occur. The event that occurs is the ESAS® session event which indicates that a ESAS® session has been initiated by a radio upon which the processor calls the process ESAS® session function which checks to see if the radio has any pages or voice mail messages waiting for it and causes the processor to transition via transition 3404 into the wait or ESAS® command state at 3406.

While the wait for ESAS® commands state 3406, the resource free event may occur or the time out timer event may occur. If the resource free event occurs, then the bill call function is called and control transitions via transition 3440 to the end call state at 3434. Alternatively, if the time out timer event occurs while in the wait for ESAS® command state 3406, then the bill call function is called and the control transitions via transition 3442 to the end call state 3434.

At 3406 in the wait for ESAS® commands state, the processor is waiting for the completion of dialing by the user and the event dial done occurs. As a result of this event, the processor calls the process ESAS® outdial function. In the normal course of handling a telephone call, the process ESAS® outdial function which operates within the call processing engine calls the name server to determine the correct means for dialing the dial digits.

Within the name server as described earlier, a series of tests are run and for the example of a simple emergency call such as 911, ultimately the least cost routing software would be executed. At step 19434 in FIG. 19R. This would cause the execution of the least cost routing software routine in FIG. 23.

Within the least cost routing software routine, the processor would sequentially check through an array of records in an attempt to determine if there was a match with the number dialed. In this example, the number dialed is 911. The least cost routing routine as shown in FIG. 23 would check several fields within the least cost router pattern data structure which is shown in FIG. 27B. Among them would be whether the call priority exceeded the rule priority in step 2308, whether the call was within the time limits for the rule which falls in steps 2310 and 2312, whether the rule was in enabled in step 2314 and so forth. Assuming that all these tests were passed for the dialed number 911 and assuming there was a least cost router pattern for the number 911, then the least cost routing routine would determine that there was a match for the number 911.

A match having been found, the least cost router would replace the priority of the call with the priority of the LCR rule. In this example, the pattern rule is set for 15, therefore the call rule would be raised to the highest rule which is also 15. Alternatively, there is a field in the least cost router pattern for an override flag if the override flag has been enabled and there is a match between the number dialed and the particular rule, then the call priority would automatically be set to 15 according to step 2342 in FIG. 23. In either case, the call's priority having been raised to level 15, the call now is set such that it would receive a resource if one were available.

The priority having been raised to 15 and the call having matched a least cost routing pattern, the process ESAS® outdial function causes the control to transition through transition 3408 to the wait for EOS outdial state at step 3410.

While in the wait for ESAS® command state 3406, the processor waits for a ESAS® command from the radio. During the present process, the processor waits for a dial done event which indicates that the dialing of digits by the radio is complete and the processor calls the process ESAS® outdial function which checks the number dialed by the radio with the least cost routing rules, the DID mapping, the name server in an ESAS® call to validate the call, translate the call, select resources or determine the call terminator type. Having called the process ESAS® outdial function, the processor transitions via transition 3408 to the wait for EOS outdial state at 3410.

During the wait for EOS outdial state, the processor is waiting for end of session message during an outdial call. It is looking for the event that the radio has been queued at the end of its call access session. The queued event indicates that the radio has gone off the air and the post-process ESAS® outdial function is called which asserts the call type event associated with the call being placed after the end of the ESAS® session has been set up on a repeater and causes the process to transition via transition 3412 to the process destination state at 3414.

While in the process destination state 3414, the processor is determining the destination location and/or destination ID for a given call. The state is exited when a telco QRT event occurs which calls the function begin get telco which searches for a valid telephone line resource. Upon calling of this function, the processor transitions via transition 3416 to the get telco QRT resource state at 3418.

While in the get telephone QRT resource state 3418, the processor is getting a telephone resource for a queued radio to telephone resource call and waiting for the got telco event which indicates that the telephone resource has been found and calls the begin get source repeater function which searches for a source repeater for the call and causes the processor to transition via transition 3420 to the get repeater QRT resource state at 3422. While in the get repeater QRT resource state at 3422, the processor is getting a repeater for a queued radio to telephone resource call at waiting for the got repeater event indicating that the repeater has been found upon which event no function is called in the process transitions via transition 3424 to the wait for rekey QRT state at 3426.

While in the wait for rekey QRT state at 3426, the repeater is waiting for the radio to rekey in a queued radio to telephone resource call in acknowledging the connection of the call. The processor is waiting for the radio answer event to occur indicating the rekey has occurred and calls the dial telco function which dials a telephone number onto the telephone line resource and causes the processor to transition from via transition 426 to the ESAS® telco call state at 3428.

While in the ESAS® telco call state at 3428, the processor waits for the completion of the dialing by waiting for the dial done event and calls the assign TDM function which is assigns a TDM slot to interconnect the repeater communicating with the radio and the telephone resource and transitions via transition 3430 back to the ESAS® telco call state waiting to exit the state via one of two different events. The first event being the resource free event which indicates that either the telephone resource or the radio has disconnected freeing the resource upon which the processor will call the bill call function causing the process to transition via transition 3432 to the end call state 3434. Alternatively, at the ESAS® telco call state at 3428, a time out timer may expire causing that event to call the bill call function and likewise transition via transition 3436 to the end call state 3434.

While in the end call state, the processor waits for the call to be torn down and the resources to be freed. The event that indicates this is the call done event which indicates that the resources have all been freed and the release call function is called which terminates the call data record and transitions via transition 3438 back to the idle state 3402 and awaits a subsequent call.

Figure 35A:
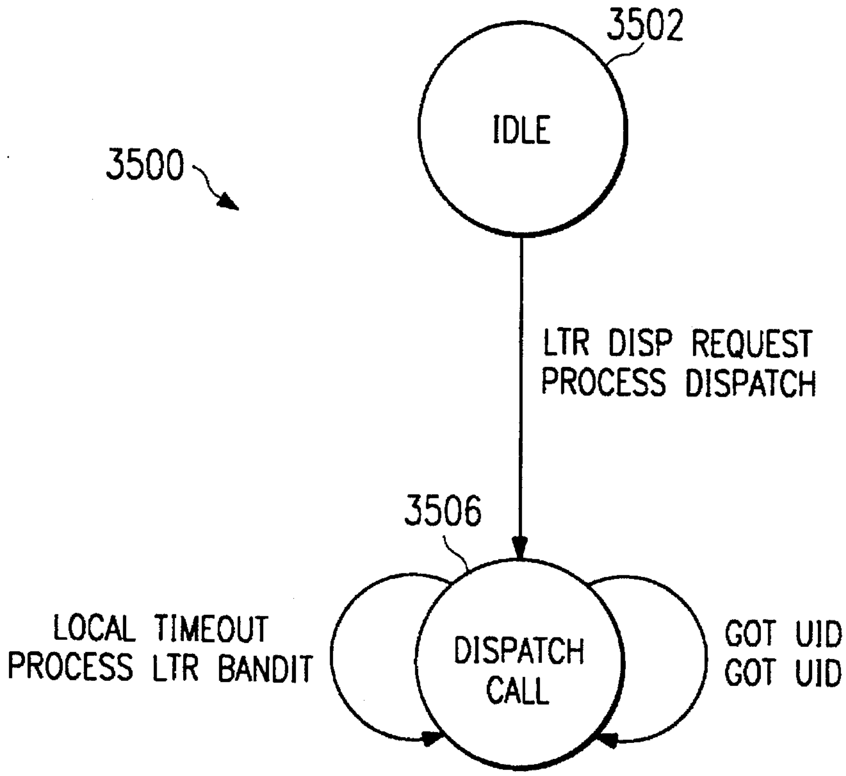
FIG. 35A is a software state diagram for fraud control for ESAS® fleets and FIG. 35B is a data flow diagram for subaudible signalling.

Reference is directed to FIG. 35A which is a software state diagram of the fraud control of ESAS® speecher in the ESAS® switch. The process begins in the idle state at step 3502 when an LTR® dispatch request event occurs. An LTR® dispatch request is a LTR® dispatch call request having been received by a repeater. This causes the processor to execute the process dispatch function which determines if a call is valid and if not sends a call invalid command to the repeater which causes the repeater to squelch the audio transmission thereby disabling the call.

The process dispatch function causes the processor to transition via transition 3504 from the idle condition 3502 to the dispatch call state 3506.

The process dispatch function starts a local timer within the dispatch call state and if the local timer event occurs while in the dispatch call state 3506, then it indicates that the local time out timer has expired and causes the process to call the process LTR® abandon function. The process LTR® abandon function is called when a call that is an ESAS® restricted call fails to receive a short ID or UID within two seconds from the start of the call. While in the dispatch call state 3506, the got UID event may occur. This event indicates that the repeater has received either an SID or UID from the mobile and causes it to call the function got UID. The got UID function is called when an SID or UID is received during the call and it checks to see if an ESAS® restricted timer is running. If so, it stops the timer before the call is aborted.

Beyond the dispatch call state 3506, the dispatch call would operate in the standard function as described in the call processing engine information.

Figure 35B:
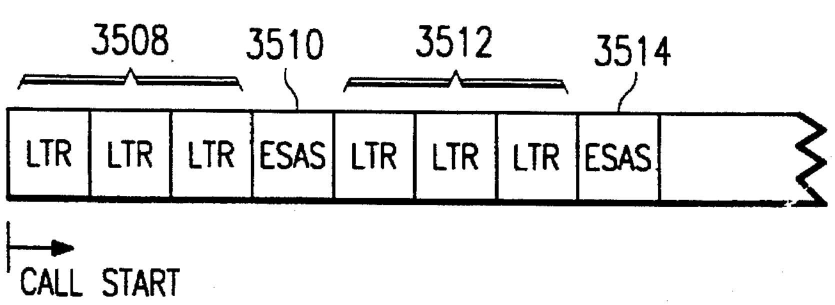

Reference is now directed to FIG. 35B which is a data flow diagram for the subaudible signalling on the dispatch call. This data stream represents the data stream transmitted by an ESAS® mobile while it is in a dispatch conversation. At the start of the call, the ESAS® mobile will send out 3 LTR® data frames 3508. Next, it will send out one ESAS® UID data frame 3510 then three more LTR® data frames 3512 and then another ESAS® UID data frame 3514. This process will repeat with three LTR® data frames followed by an ESAS® data frame indefinitely as long as the transmitting mobile is in the transmitting mode.

By using this technique and considering the function of the software state diagram in FIG. 35A, it can be seen that as long as the ESAS® mobile is transmitting an ESAS® data frame which contains a UID, every fourth data frame the local time out timer in the dispatch call state 3506 will be reset by the got UID function because the ESAS® mobile has transmitted the UID within the ESAS® data frame. Alternatively, if an LTR® mobile attempts to access the ID code which has this function enabled, then the dispatch call state at 3506 in FIG. 35A will not receive an ESAS® data frame with a UID therefore the got UID event will not occur and the got UID function will not be called to disable the local timer. Therefore, the process LTR® bandit function will be called which will ultimately send a call invalid message to the repeater handling the dispatch call which will force the repeater to disable the repeat audio and terminate the call.

This feature is important in environments were a service provider sells a group of radios to a customer who has ESAS® radios and subsequently the customer purchases non-ESAS® radios from an alternative source and attempts to use those radios at the same billing rate as the original ESAS® radios.

The foregoing procedure will prevent the transmission by the non-ESAS® radios within the trunk group by disabling the repeat audio through the repeater handling the conversation. In this way the system operator has the ability to limit the radios used by a customer to only those radios with ESAS® capability.

| States | What ? | Station ID | LTR_DISP_R | Queued | Resource Free | Timeout | Local Timeout | LTR_OUTDIAL | Repeater Off Line | Dial Done | Call Done | ESAS Session |
|---|---|---|---|---|---|---|---|---|---|---|---|---|
| IDLE | | func_null<br>STATION ID | process_dispatch<br>DISPATCH | | | | | pre_process_ltr_outdial<br>WAIT FOR LTR OUTDIAL | func_null<br>REPEATER OFF LINE | | | process_esas_session<br>WAIT FOR ESAS COMMAND |
| DISPATCH | | | | | bill_call<br>IDLE | reset_repeater<br>END CALL | process_ltr_bandit<br>DISPATCH | | | | | |
| STATION ID | | | | | release_call<br>IDLE | reset_repeater<br>END CALL | | | | | | |
| WAIT FOR LTR OUTDIAL | | | | | release_call<br>IDLE | free_resources<br>END CALL | process_ltr_bandit<br>WAIT FOR LTR OUTDIAL | | | process_ltr_outdial<br>PROCESS DESTINATION | | |
| WAIT FOR ESAS COMMAND | process_what<br>WAIT FOR EOS WHAT | | | free_resources<br>END CALL | bill_call<br>END CALL | bill_call<br>END CALL | | | | process_esas_outdial<br>WAIT FOR EOS OUTDIAL | | |
| PROCESS DESTINATION | | | | | free_resources<br>END CALL | free_resources<br>END CALL | | | | | | |
| END CALL | | | | check_free_resources<br>END CALL | check_free_resources<br>END CALL | reset_repeater<br>END CALL | | | | | release_call<br>IDLE | |
| GET TELCO RESOURCE | | | | | bill_call<br>END CALL | get_telco<br>GET TELCO RESOURCE | bill_call<br>END CALL | | | | | |
| …T TELCO QRT RESOURCE | | | | | | get_telco<br>GET TELCO QRT RESOURCE | NOT IN TABLE<br>IDLE | | | | | |
| …AL TELCO | | | | | bill_call<br>END CALL | bill_call<br>END CALL | | | | assign_tdm_outdial<br>TELCO CALL | | |
| TELCO CALL | | | | | bill_call<br>END CALL | | bill_call<br>END CALL | | | | | |
| GET REPEATER QRT RESOURCE | | | | | bill_call<br>END CALL | get_source_repeater<br>GET REPEATER QRT RESOURCE | bill_call<br>END CALL | | | | | |
| BEGIN INDIAL | | | | | free_resources<br>END CALL | | | | | | | |
| WAIT FOR INDIAL PROMPT | | | | | free_resources<br>END CALL | free_resources<br>END CALL | | | | | | |
| WAIT FOR INDIAL DESTINATION | | | | | free_resources<br>END CALL | free_resources<br>END CALL | | | | | | |
| RECORD VOICE MAIL | | | | | bill_vm<br>END CALL | bill_vm<br>END CALL | | | | | | |
| GET TELCO RT VM | | | | | bill_vm<br>END CALL | get_telco<br>GET TELCO RT VM | bill_vm<br>END CALL | | | | | |
| GET TELCO QRT VM | | | | | bill_vm<br>END CALL | get_telco<br>GET TELCO QRT VM | bill_vm<br>END CALL | | | | | |
| GET REPEATER QRT VM | | | | | bill_vm<br>END CALL | get_source_repeater<br>GET REPEATER QRT VM | bill_vm<br>END CALL | | | | | |
| GET PAGE | | | | | bill_call<br>END CALL | play_goodbye_prompt<br>END CALL | | | | send_page<br>END CALL | | |
| …T TELCO RT PAGE | | | | | bill_call<br>END CALL | get_telco<br>GET TELCO RT PAGE | bill_call<br>END CALL | | | | | |
| … TELCO QRT PAGE | | | | | bill_call<br>END CALL | get_telco<br>GET TELCO QRT PAGE | bill_call<br>END CALL | | | | | |
| GET REPEATER QRT PAGE | | | | | bill_call<br>END CALL | get_source_repeater<br>GET REPEATER QRT PAGE | bill_call<br>END CALL | | | | | |
| GET VM ADMIN COMMAND | | | | | bill_call<br>END CALL | bill_call<br>END CALL | | | | | | |
| LISTEN TO VM | | | | | bill_call<br>END CALL | play_vm_admin_prompt<br>GET VM ADMIN COMMAND | | | | | | |
| RECORD VM PROMPT | | | | | bill_call | play_vm_admin_prompt | | | | | | |

A-1

| | | | | | | | | | | | | | |
|---|---|---|---|---|---|---|---|---|---|---|---|---|---|
| | | | | | END CALL | GET VM ADMIN COMMAND | | | | | | | |
| GET TELCO RT VM ADMIN | | | | | bill_call | get_telco | bill_call | | | | | | |
| | | | | | END CALL | GET TELCO RT VM ADMIN | END CALL | | | | | | |
| GET TELCO QRT VM ADMIN | | | | | bill_call | get_telco | bill_call | | | | | | |
| | | | | | END CALL | GET TELCO QRT VM ADMIN | END CALL | | | | | | |
| GET REPEATER QRT VM ADMIN | | | | | bill_call | get_source_repeater | bill_call | | | | | | |
| | | | | | END CALL | GET REPEATER QRT VM ADMIN | END CALL | | | | | | |
| GET REPEATER LTR TELCO | | | | | bill_call | get_destination_repeater | process_no_answer_indial | | | | | | |
| | | | | | END CALL | GET REPEATER LTR TELCO | PROCESS DESTINATION | | | | | | |
| WAIT FOR ANSWER LTR TELCO | | | | | bill_call | process_no_answer_indial | process_no_answer_indial | | | | | | |
| | | | | | END CALL | PROCESS DESTINATION | PROCESS DESTINATION | | | | | | |
| LTR TELCO CALL | | | | | bill_call | bill_call | | | | | | | |
| | | | | | END CALL | END CALL | | | | | | | |
| GET REPEATER QRR LTR TELCO | | | | | bill_call | get_source_repeater | process_no_answer_indial | | | | | | |
| | | | | | END CALL | GET REPEATER QRR LTR TELCO | PROCESS DESTINATION | | | | | | |
| GET TELCO RT LTR TELCO | | | | | bill_call | get_telco | bill_call | | | | | | |
| | | | | | END CALL | GET TELCO RT LTR TELCO | END CALL | | | | | | |
| GET TELCO QRT LTR TELCO | | | | | bill_call | get_telco | bill_call | | | | | | |
| | | | | | END CALL | GET REPEATER QRT LTR TELCO | END CALL | | | | | | |
| GET REPEATER QRT LTR TELCO | | | | | bill_call | get_source_repeater | bill_call | | | | | | |
| | | | | | END CALL | GET REPEATER QRT LTR TELCO | END CALL | | | | | | |
| GET RADIO TR ESAS CTRNK | | | | | bill_call | get_radio | process_no_answer_indial | | | | | | |
| | | | | | END CALL | GET RADIO TR ESAS CTRNK | PROCESS DESTINATION | | | | | | |
| GET REPEATER TR ESAS CTRNK | | | | | bill_call | get_destination_repeater | process_no_answer_indial | | | | | | |
| | | | | | END CALL | GET REPEATER TR ESAS CTRNK | PROCESS DESTINATION | | | | | | |
| WAIT FOR ANSWER TR ESAS CTRNK | | | | | bill_call | process_no_answer_indial | process_no_answer_indial | | | | | | |
| | | | | | END CALL | PROCESS DESTINATION | PROCESS DESTINATION | | | | | | |
| ESAS CTRNK CALL | | | | | bill_call | bill_call | | | | | | | |
| | | | | | END CALL | END CALL | | | | | | | |
| GET RADIO QRR ESAS CTRNK | | | | | bill_call | get_radio | process_no_answer_esas_ctrnk | | | | | | |
| | | | | | END CALL | GET RADIO QRR ESAS CTRNK | PROCESS DESTINATION | | | | | | |
| GET REPEATER QRR ESAS CTRNK | | | | | bill_call | get_source_repeater | bill_call | | | | | | |
| | | | | | END CALL | GET REPEATER QRR ESAS CTRNK | END CALL | | | | | | |
| GET TELCO RT ESAS CTRNK | | | | | bill_call | get_telco | bill_call | | | | | | |
| | | | | | END CALL | GET TELCO RT ESAS CTRNK | END CALL | | | | | | |
| GET LINK RT ESAS CTRNK | | | | | bill_call | bill_call | bill_call | | | | | | |
| | | | | | END CALL | END CALL | END CALL | | | | | | |
| GET TELCO QRT ESAS CTRNK | | | | | bill_call | get_telco | bill_call | | | | | | |
| | | | | | END CALL | GET TELCO QRT ESAS CTRNK | END CALL | | | | | | |
| GET REPEATER QRT ESAS CTRNK | | | | | bill_call | get_source_repeater | bill_call | | | | | | |
| | | | | | END CALL | GET REPEATER QRT ESAS CTRNK | END CALL | | | | | | |
| GET RADIO RT ESAS CTRNK | | | | | bill_call | bill_call | process_no_answer_esas_ctrnk | | | assign_fdm_outdial | | | |
| | | | | | END CALL | END CALL | PROCESS DESTINATION | | | ESAS CTRNK CALL | | | |
| GET USER VM ADMIN | | | | | free_resources | free_resources | | | | | | | |
| | | | | | END CALL | END CALL | | | | | | | |
| GET PASSWORD VM ADMIN | | | | | free_resources | free_resources | | | | | | | |
| | | | | | END CALL | END CALL | | | | | | | |
| GET TELCO QRT CHECKIN | | | | | | get_telco | func_null | | | | | | |
| | | | | | | GET TELCO QRT CHECKIN | GET REPEATER QRT CHECKIN | | | | | | |
| GET REPEATER QRT CHECKIN | | | | | | get_source_repeater | free_resources | | | | | | |
| | | | | | | GET REPEATER QRT CHECKIN | END CALL | | | | | | |
| CHECKIN CALL | | | | | free_resources | free_resources | | | | | | | |

2

APPENDIX 1

A-2

AA-3

A-2

| | | | | | | | | | | | | |
|---|---|---|---|---|---|---|---|---|---|---|---|---|
| | | | | | END CALL | END CALL | | | | | | |
| GET TELCO TT CTRNK | | | | | bill_call | get_telco | | | | | | |
| | | | | | END CALL | GET TELCO TT CTRNK | | | | | | |
| GET RADIO RT LTR TELCO | | | | | bill_call | bill_call | | | | assign_tdm_outdial | | |
| | | | | | END CALL | END CALL | | | | LTR TELCO CALL | | |
| GET LINK RT LTR TELCO | | | | | bill_call | bill_call | | | | | | |
| | | | | | END CALL | END CALL | | | | | | |
| GET LINK TT CTRNK | | | | | bill_call | dial_ctrnk_radio | | | | | | |
| | | | | | END CALL | GET DESTINATION TT | | | | | | |
| GET DESTINATION TT | | | | | free_resources | assign_tdm_imp | | | | assign_tdm_imp | | |
| | | | | | END CALL | CALL TT | | | | CALL TT | | |
| CALL TT | | | | | bill_call | bill_call | | | | | | |
| | | | | | END CALL | END CALL | | | | | | |
| GET TELCO TT TTRNK | | | | | free_resources | get_telco | | | | | | |
| | | | | | END CALL | GET TELCO TT TTRNK | | | | | | |
| GET LINK TT TTRNK | | | | | free_resources | dial_net_key | | | | | | |
| | | | | | END CALL | GET DESTINATION TT | | | | | | |
| GET TELCO NET DISPATCH SETUP | | | | | free_resources | get_telco | free_resources | | | | | |
| | | | | | END CALL | GET TELCO NET DISPATCH SETUP | END CALL | | | | | |
| GET LINK NET DISPATCH SETUP | | | | | free_resources | dial_net_key | | | | | | |
| | | | | | END CALL | WAIT FOR COMMAND NET DISPATCH SETUP | | | | | | |
| WAIT FOR COMMAND NET DISPATCH SETUP | | | | | free_resources | get_source_repeater | | | | get_net_command | | |
| | | | | | END CALL | GET REPEATER NET DISPATCH SETUP | | | | WAIT FOR COMMAND NET DISPATCH SETUP | | |
| GET REPEATER NET DISPATCH SETUP | | | | | free_resources | get_source_repeater | | | | | | |
| | | | | | END CALL | GET REPEATER NET DISPATCH SETUP | | | | | | |
| NET DISPATCH SETUP CALL | | | | | free_resources | release_net_repeater | | | | | | |
| | | | | | END CALL | DWELL NET DISPATCH | | | | | | |
| DWELL NET DISPATCH | | | | | begin_get_telco | begin_get_telco | begin_get_telco | | | begin_net_dwell | | |
| | | | | | GET TELCO NET DISPATCH END | GET TELCO NET DISPATCH END | GET TELCO NET DISPATCH END | | | DWELL NET DISPATCH | | |
| NET DISPATCH CALL | | | | | check_net_resources | free_resources | | | | get_net_command | | |
| | | | | | NET DISPATCH CALL | END CALL | | | | NET DISPATCH CALL | | |
| GET REPEATER NET DISPATCH | | | | | begin_get_telco | get_net_repeater | | | | get_net_command | | |
| | | | | | GET TELCO NET DISPATCH END | GET REPEATER NET DISPATCH | | | | GET REPEATER NET DISPATCH | | |
| GET RADIO NET DISPATCH | | | | | free_resources | get_radio | | | | | | |
| | | | | | END CALL | GET RADIO NET DISPATCH | | | | | | |
| GET REPEATER RR LTR TELCO | | | | | bill_call | get_destination_repeater | bill_call | | | | | |
| | | | | | END CALL | GET REPEATER RR LTR TELCO | END CALL | | | | | |
| WAIT FOR ANSWER RR LTR TELCO | | | | | bill_call | bill_call | | | | | | |
| | | | | | END CALL | END CALL | | | | | | |
| GET RADIO RR ESAS CTRNK | | | | | bill_call | get_radio | process_no_answer_ltr_telco | | | | | |
| | | | | | END CALL | GET RADIO RR ESAS CTRNK | PROCESS DESTINATION | | | | | |
| GET REPEATER RR ESAS CTRNK | | | | | bill_call | get_destination_repeater | process_no_answer_ltr_telco | | | | | |
| | | | | | END CALL | GET REPEATER RR ESAS CTRNK | PROCESS DESTINATION | | | | | |
| WAIT FOR ANSWER RR ESAS CTRNK | | | | | bill_call | process_no_answer_ltr_telco | process_no_answer_ltr_telco | | | | | |
| | | | | | END CALL | PROCESS DESTINATION | PROCESS DESTINATION | | | | | |
| GET TELCO RT SEND PAGE | | | | | bill_call | get_telco | bill_call | | | | | |
| | | | | | END CALL | GET TELCO RT SEND PAGE | END CALL | | | | | |
| GET USER SEND PAGE | | | | | bill_call | bill_call | bill_call | | | | | |
| | | | | | END CALL | END CALL | END CALL | | | | | |
| GET TELCO QRT SEND PAGE | | | | | bill_call | get_telco | bill_call | | | | | |
| | | | | | END CALL | GET TELCO QRT SEND PAGE | END CALL | | | | | |
| GET REPEATER QRT SEND PAGE | | | | | bill_call | get_source_repeater | bill_call | | | | | |

3

APPENDIX 1

A-3

AA-4

A-3

| | | | | | | | | | | | | |
|---|---|---|---|---|---|---|---|---|---|---|---|---|
| | | | | | END CALL | GET REPEATER QRT SEND PAGE | END CALL | | | | | |
| GET TELCO RT CC COMPLETE | | | | | bill_call<br>END CALL | get_telco<br>GET TELCO RT CC COMPLETE | bill_call<br>END CALL | | | | | |
| GET TELCO QRT CC COMPLETE | | | | | bill_call<br>END CALL | get_telco<br>GET TELCO QRT CC COMPLETE | begin_get_source_repeater<br>GET REPEATER QRT CC COMPLETE | | | | | |
| GET REPEATER QRT CC COMPLETE | | | | | bill_call<br>END CALL | get_source_repeater<br>GET REPEATER QRT CC COMPLETE | bill_call<br>END CALL | | | | | |
| GET TELCO QR DISPACH | | | | | | get_telco<br>GET TELCO QR DISPACH | free_resources<br>END CALL | | | | | |
| GET REPEATER QR DISPATCH | | | | | | get_source_repeater<br>GET REPEATER QR DISPATCH | free_resources<br>END CALL | | | | | |
| DISPATCH SETUP CALL | | | | | free_resources_setup_call<br>END CALL | free_resources_setup_call<br>END CALL | | | | | | |
| WAIT FOR EOS OUTDIAL | | | | post_process_esas_outdial<br>PROCESS DESTINATION | post_process_esas_outdial<br>PROCESS DESTINATION | free_resources<br>END CALL | | | | | | |
| WAIT FOR EOS WHAT | | | | post_process_what<br>END CALL | post_process_what<br>END CALL | free_resources<br>END CALL | | | | | | |
| WAIT FOR EOS CHECKIN | | | | post_process_checkin<br>PROCESS DESTINATION | post_process_checkin<br>PROCESS DESTINATION | free_resources<br>END CALL | | | | | | |
| GET RADIO QR DISPATCH | | | | | free_resources<br>END CALL | get_radio<br>GET RADIO QR DISPATCH | free_resources<br>END CALL | | | | | |
| DWELL QR DISPATCH | | | process_dispatch<br>CALL QR DISPATCH | | | get_telco<br>GET TELCO QR END DISPATCH | | | | | | |
| CALL QR DISPATCH | | | | | free_resources<br>DWELL QR DISPATCH | get_telco<br>GET TELCO QR END DISPATCH | process_ltr_bandit<br>CALL QR DISPATCH | | | | | |
| GET TELCO QR END DISPATCH | | | | | | get_telco<br>GET TELCO QR END DISPATCH | free_resources<br>END CALL | | | | | |
| GET REPEATER QR END DISPATCH | | | | | | get_source_repeater<br>GET REPEATER QR END DISPATCH | free_resources<br>END CALL | | | | | |
| WAIT FOR SOURCE ANSWER QRR ESAS CTRNK | | | | | bill_call<br>END CALL | NOT IN TABLE<br>ABORT DESTINATION | | | | | | |
| WAIT FOR SOURCE ANSWER QRR LTR TELCO | | | | | bill_call<br>END CALL | bill_call<br>END CALL | | | | | | |
| GET RADIO QRR SETUP DISPATCH | | | | | bill_call<br>END CALL | get_radio<br>GET RADIO QRR SETUP DISPATCH | bill_call<br>END CALL | | | | | |
| GET TELCO QRR SETUP DISPATCH | | | | | bill_call<br>END CALL | get_telco<br>GET TELCO QRR SETUP DISPATCH | bill_call<br>END CALL | | | | | |
| GET SRC REPEATER QRR SETUP DISPATCH | | | | | bill_call<br>END CALL | get_source_repeater<br>GET SRC REPEATER QRR SETUP DISPATCH | bill_call<br>END CALL | | | | | |
| GET DST REPEATER QRR SETUP DISPATCH | | | | | bill_call<br>END CALL | get_destination_repeater<br>GET DST REPEATER QRR SETUP DISPATCH | bill_call<br>END CALL | | | | | |
| DISPATCH SETUP QRR CALL | | | | | bill_call<br>END CALL | bill_call<br>END CALL | | | | | | |
| DWELL QRR DISPATCH | | | | | | begin_get_telco<br>GET TELCO QRR END DISPATCH | | | | | | |
| GET SRC REPEATER QRR DISPATCH | | | | | free_resources_setup_call<br>DWELL QRR DISPATCH | get_source_repeater<br>GET SRC REPEATER QRR DISPATCH | | | | | | |
| GET DST REPEATER QRR DISPATCH | | | | | free_resources_setup_call<br>DWELL QRR DISPATCH | get_destination_repeater<br>GET DST REPEATER QRR DISPATCH | | | | | | |
| CALL QRR DISPATCH | | | | | free_resources_setup_call<br>DWELL QRR DISPATCH | begin_get_telco<br>GET TELCO QRR END DISPATCH | | | | | | |
| GET TELCO QRR END DISPATCH | | | | | bill_call | get_telco | bill_call | | | | | |

APPENDIX 1

A-4

AA-5

A-4

| | | | | | | | | | | | | | |
|---|---|---|---|---|---|---|---|---|---|---|---|---|---|
| | | | | | | END CALL | GET TELCO QRR END DISPATCH | END CALL | | | | | |
| GET SRC REPEATER QRR END DISPATCH | | | | | | fail_call<br>END CALL | get_source_repeater<br>GET SRC REPEATER QRR END DISPATCH | | | | | | |
| GET DST REPEATER QRR END DISPATCH | | | | | | bill_call<br>END CALL | get_destination_repeater<br>GET DST REPEATER QRR END DISPATCH | | | | | | |
| GET TELCO TT TELCO | | | | | | free_resources<br>END CALL | get_telco<br>GET TELCO TT TELCO | | | | | | |
| GET LINK TT TELCO | | | | | | free_resources<br>END CALL | dial_telco<br>GET DESTINATION TT | | | | | | |
| GET TELCO NET DISPATCH END | | | | | | | get_telco<br>GET TELCO NET DISPATCH END | get_net_repeater<br>GET REPEATER NET DISPATCH END | | | | | |
| GET REPEATER NET DISPATCH END | | | | | | | get_net_repeater<br>GET REPEATER NET DISPATCH END | | | | | | |
| REPEATER OFF LINE | | | | | | free_resources<br>END CALL | | | | | | | |
| AGE TEMP IDS | | | | | | | release_call<br>IDLE | | | | | | |
| BORT DESTINATION | | | | | | | get_destination_repeater<br>ABORT DESTINATION | free_resources<br>END CALL | | | | | |

APPENDIX 1

A-5

BB-1

| Play Done | Radio to Telco Call | Telco to Telco Call | Telco to Telco CTRNK Call | Telco to Telco TTRNK Call | Queued Radio to Telco Call | Got a Telco Line | Got a Repeater | Play Prompt | No Prompt | Indial Digits Done | Telco to Voice Mail |
|---|---|---|---|---|---|---|---|---|---|---|---|
| | | | | | | check_for_prompt<br>BEGIN INDIAL | | | | | |
| | begin_get_telco<br>GET TELCO RESOURCE | begin_get_telco<br>GET TELCO TT TELCO | begin_get_telco<br>GET TELCO TT CTRNK | begin_get_telco<br>GET TELCO TT TTRNK | begin_get_telco<br>GET TELCO QRT RESOURCE | | | | | | play_vm_record_prompt<br>RECORD VOICE MAIL |
| free_resources<br>END CALL | | | | | | | | | | | |
| | | | | | | dial_telco<br>DIAL TELCO<br>begin_get_source_repeater<br>GET REPEATER QRT RESOURCE | | | | | |
| | | | | | | | dial_telco<br>DIAL TELCO | | | | |
| | | | | | | | | play_indial_prompt<br>WAIT FOR INDIAL PROMPT | get_indial_destination<br>WAIT FOR INDIAL DESTINATION | | |
| get_indial_destination<br>WAIT FOR INDIAL DESTINATION | | | | | | | | | | | |
| | | | | | | | | | | process_indial<br>PROCESS DESTINATION | |
| play_beep<br>RECORD VOICE MAIL | | | | | | | | | | | |
| | | | | | | assign_vm_tdm<br>RECORD VOICE MAIL<br>begin_get_source_repeater<br>GET REPEATER QRT VM | | | | | |
| | | | | | | | assign_vm_tdm<br>RECORD VOICE MAIL | | | | |
| play_beep<br>GET PAGE | | | | | | | | | | send_page<br>END CALL | |
| | | | | | | assign_page_tdm<br>GET PAGE<br>begin_get_source_repeater<br>GET REPEATER QRT PAGE | | | | | |
| | | | | | | | assign_page_tdm<br>GET PAGE | | | | |
| get_vm_command<br>GET VM ADMIN COMMAND | | | | | | | | | | process_vm_command<br>GET VM ADMIN COMMAND | |
| play_vm_admin_prompt<br>GET VM ADMIN COMMAND | | | | | | | | | | | |
| play_beep | | | | | | | | | | | |

AA-1

APPENDIX 1

B-1

B-1
AA-2
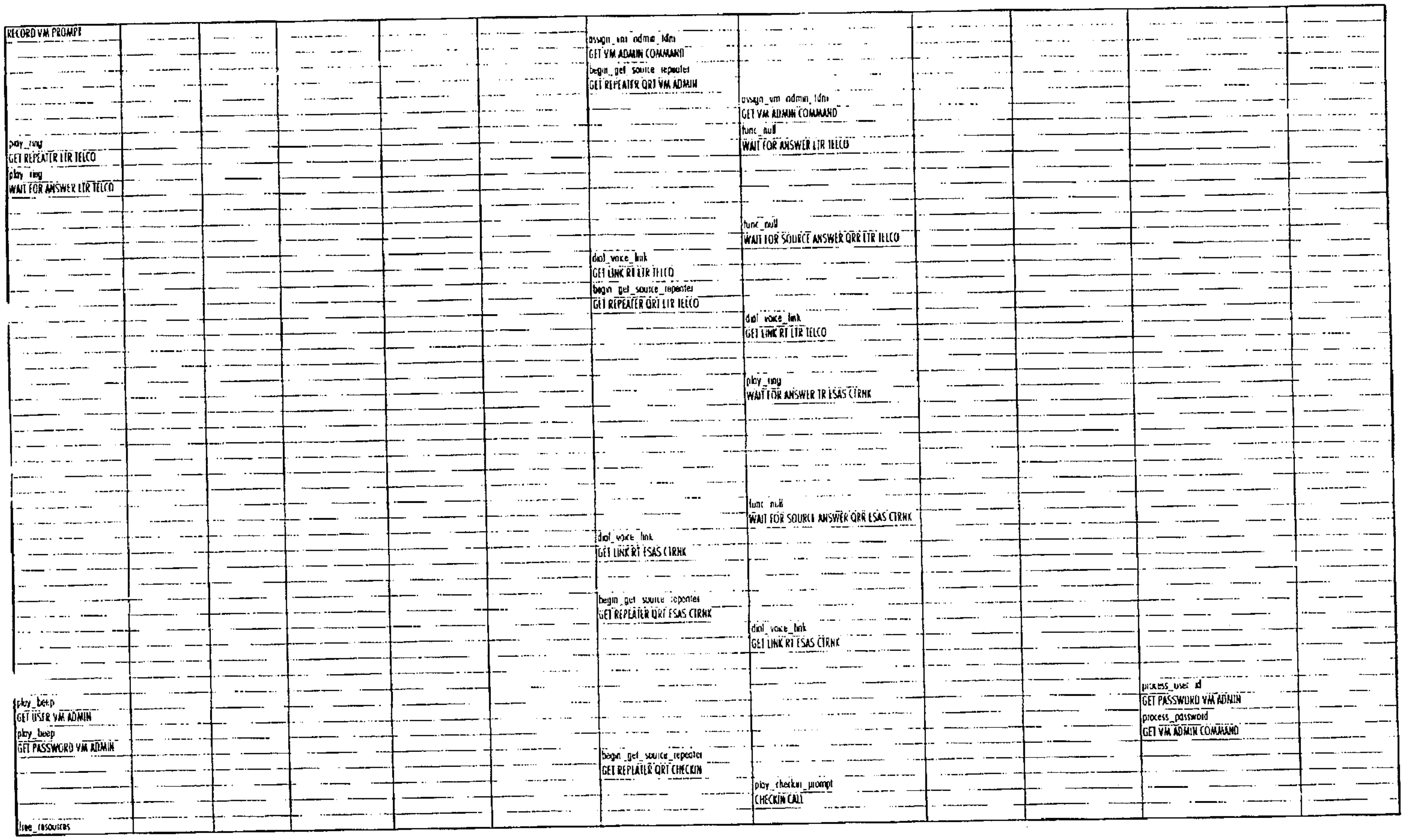
BB-2
APPENDIX 1
B-2

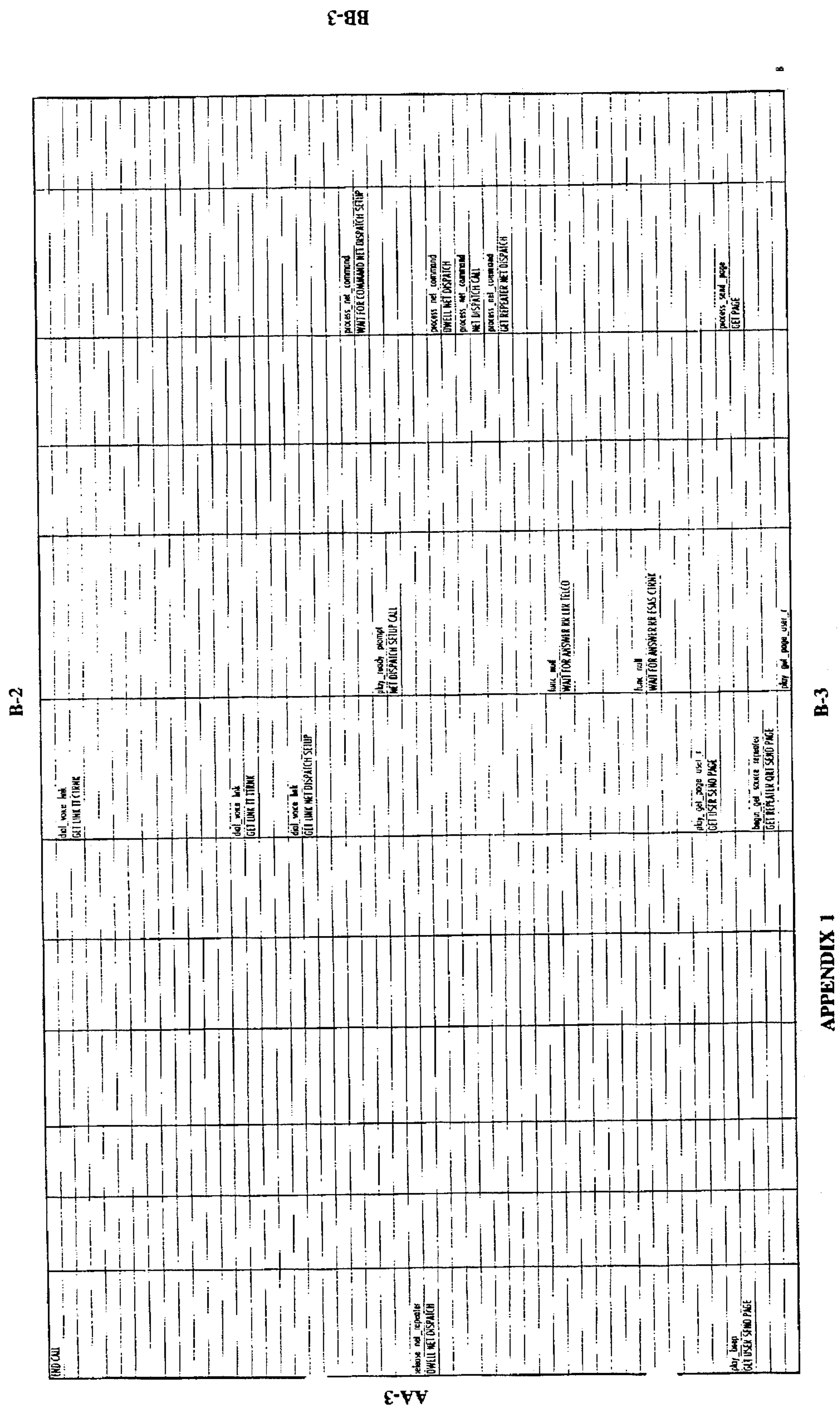
APPENDIX 1

BB-4
B-3
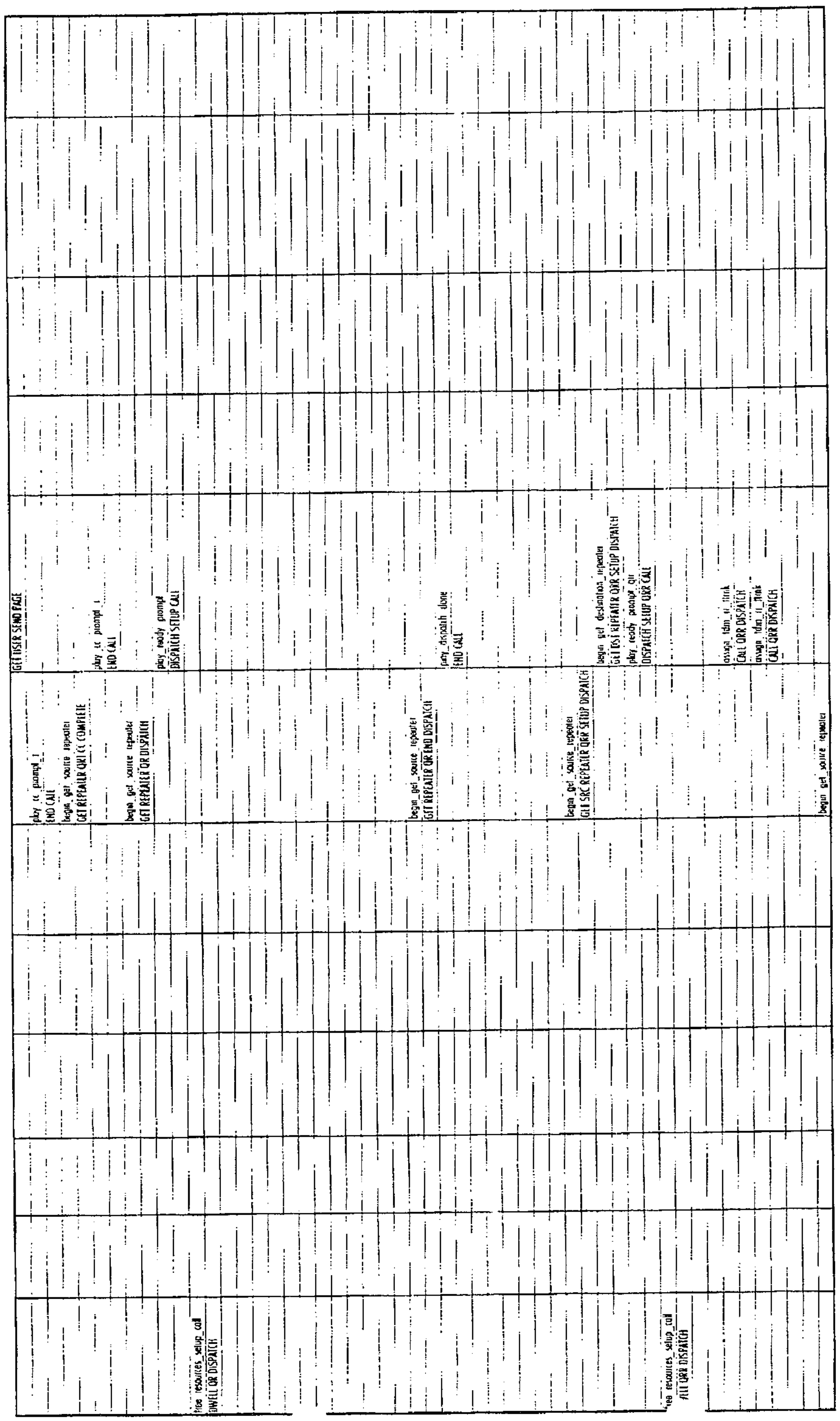
B-4
AA-4
APPENDIX 1

B-4
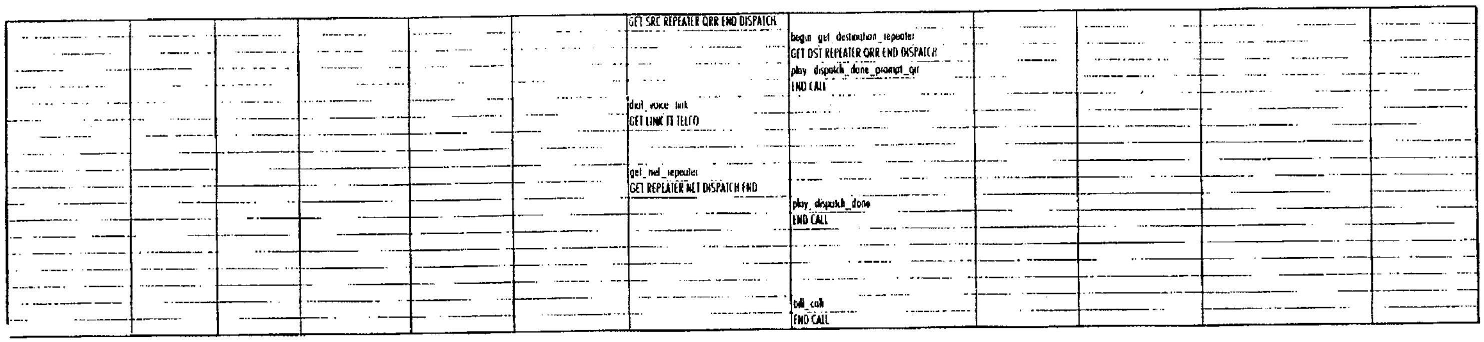
AA-5
BB-5
APPENDIX 1
B-5

CC-1

| Radio to Voice Mai | Queued Radio to Voice Mail | Record Done | PAGE from Telco | PAGE from Radio | PAGE from Queued Radi | VM Administration from Tel | VM Administration from Radio | VM Administration from Queued Radio | Record VM Prompt | Play Previous | Play Next | Play Slower | Play Faster | Play Softer |
|---|---|---|---|---|---|---|---|---|---|---|---|---|---|---|
| begin_get_telco<br>GET TELCO RT VM | begin_get_telco<br>GET TELCO QRT VM | | play_page_prompt<br>GET PAGE | begin_get_telco<br>GET TELCO RT PAGE | begin_get_telco<br>GET TELCO QRT PAGE | play_initial_prompt<br>GET USER VM ADMIN | begin_get_telco<br>GET TELCO RT VM ADMIN | begin_get_telco<br>GET TELCO QRT VM ADMIN | | | | | | |
| | | bill_vm<br>END CALL | | | | | | | | | | | | |
| | | | | | | | | | play_record_vm_prompt<br>RECORD VM PROMPT | play_previous<br>LISTEN TO VM | play_next<br>LISTEN TO VM | play_slower<br>GET VM ADMIN COMMAND | play_faster<br>GET VM ADMIN COMMAND | play_softer<br>GET VM ADMIN COMMAND |
| | | play_vm_admin_prompt | | | | | | | | | | | | |

11

BB-1

APPENDIX 1

C-1

CC-2
C-1
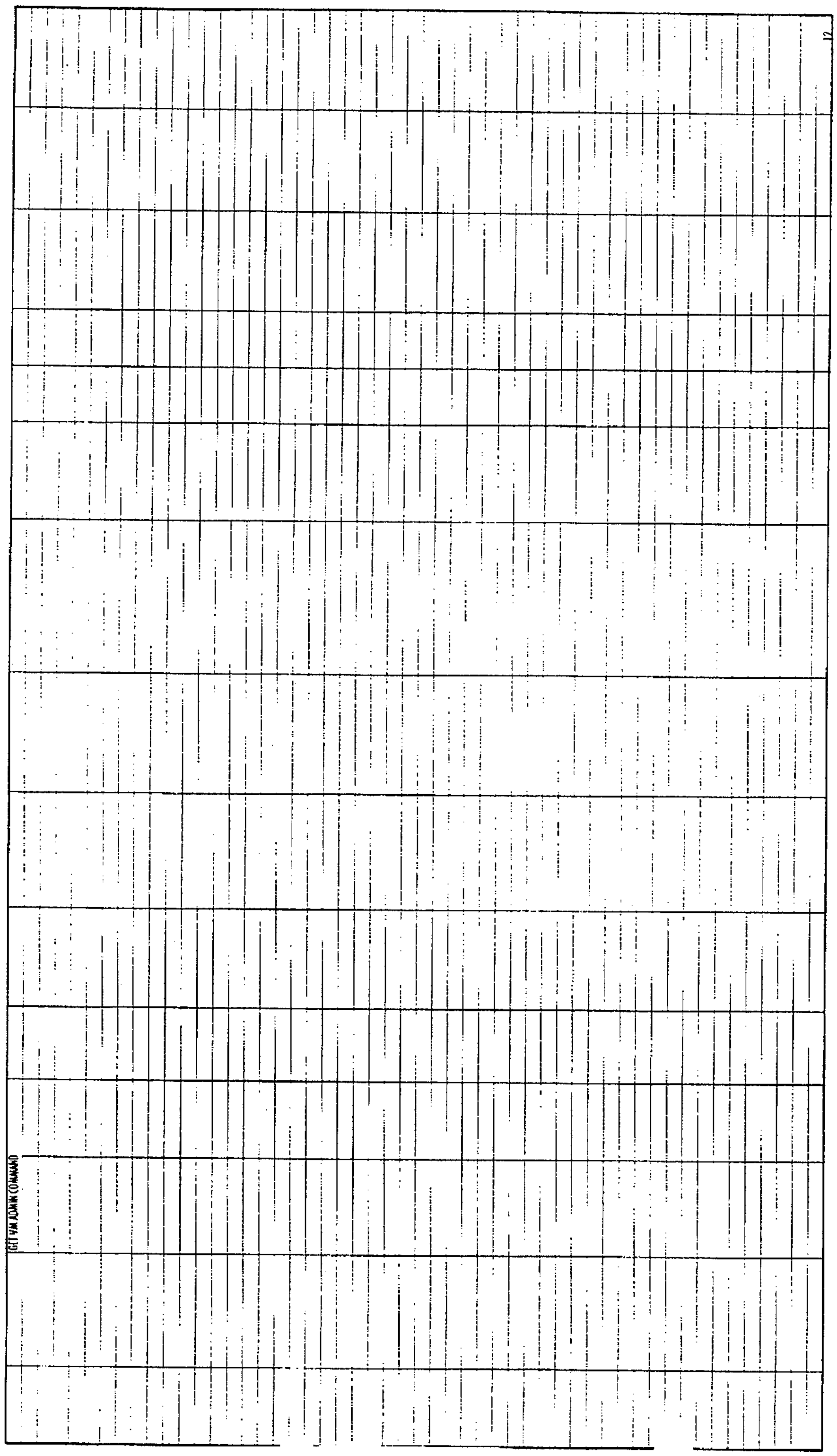
C-2
APPENDIX 1
BB-2

CC-3
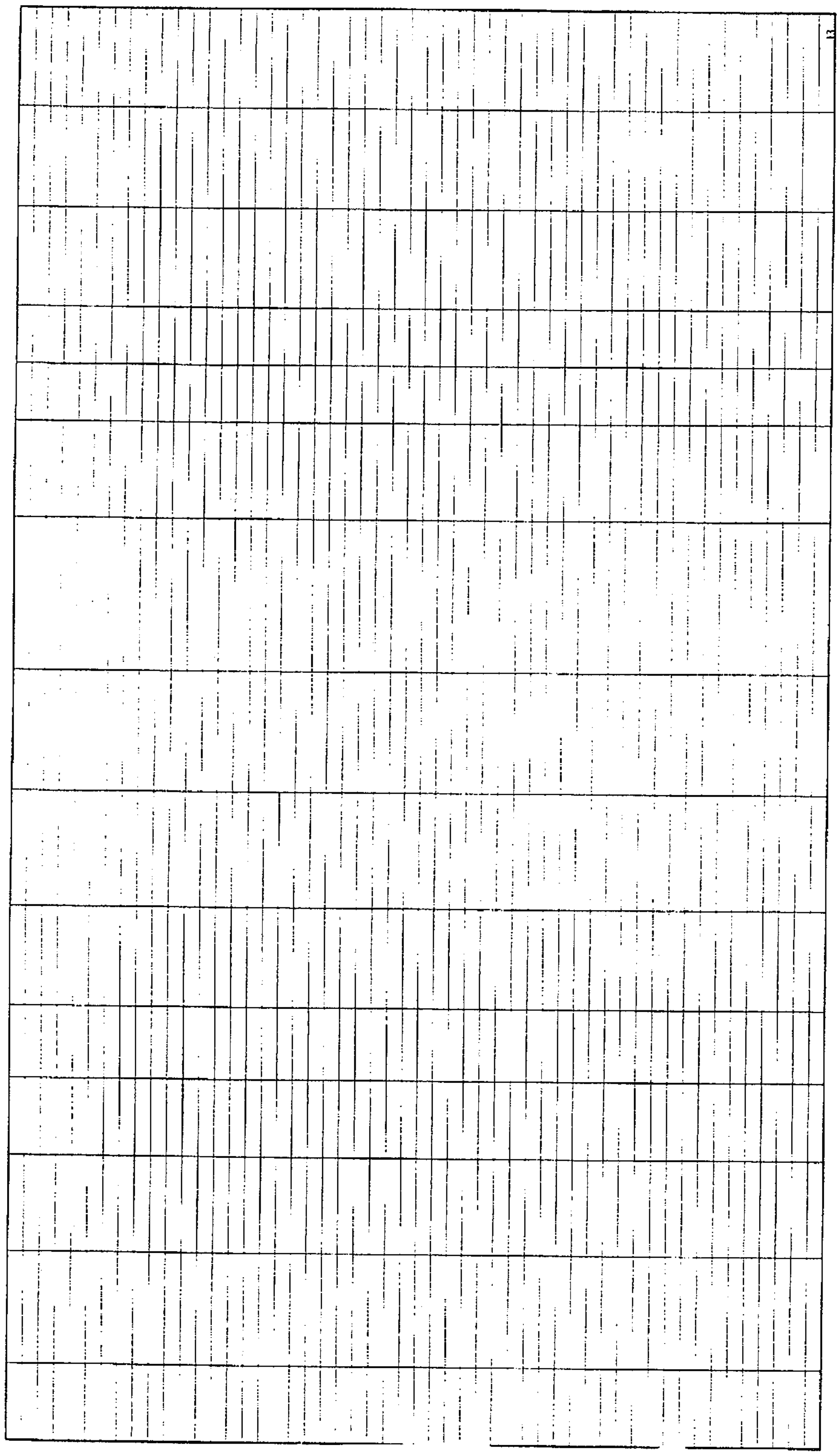
C-2 C-3
APPENDIX 1
BB-3

CC-4
C-3
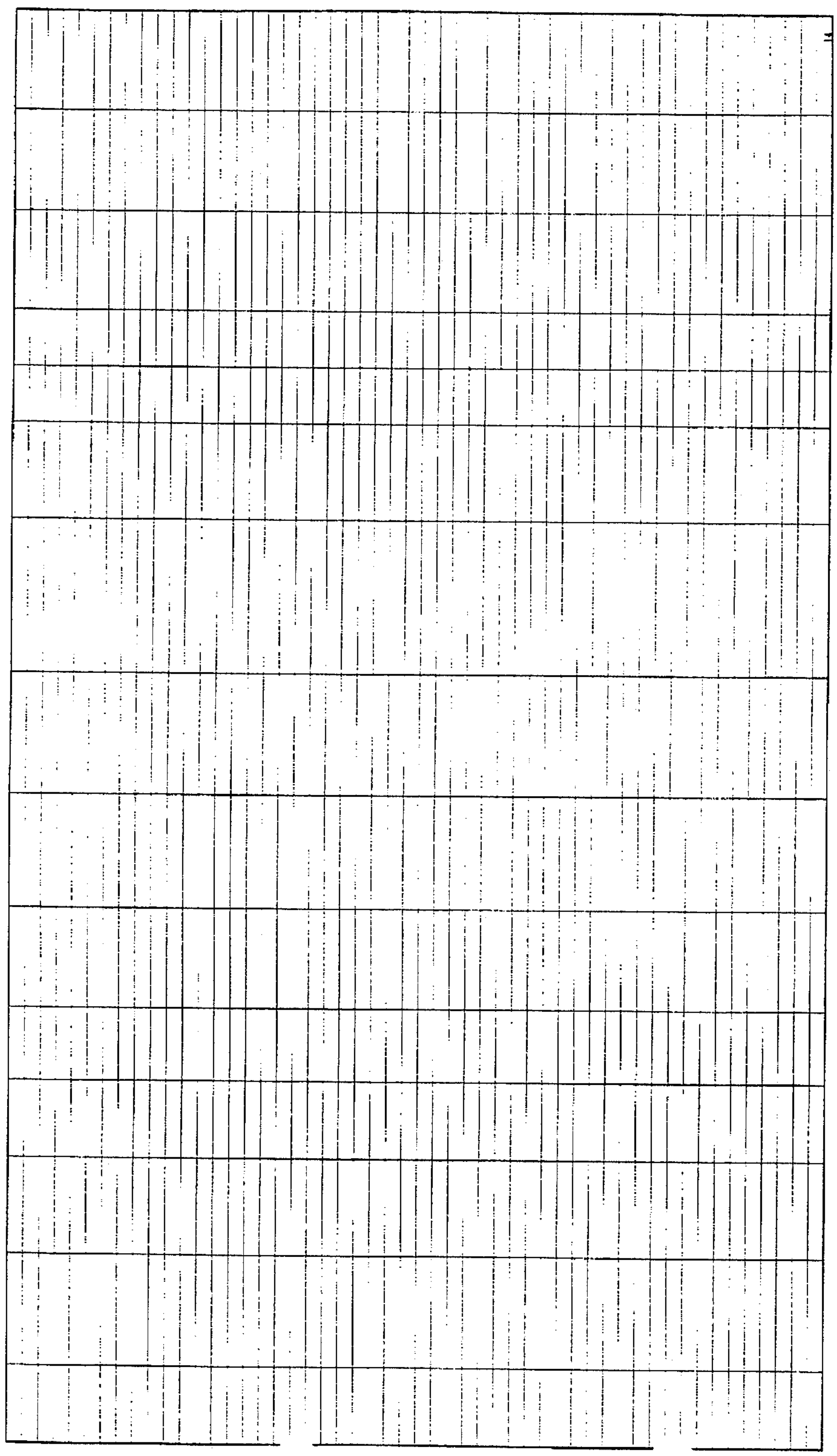
C-4
APPENDIX 1
BB-4

APPENDIX 1
CC-5
C-4
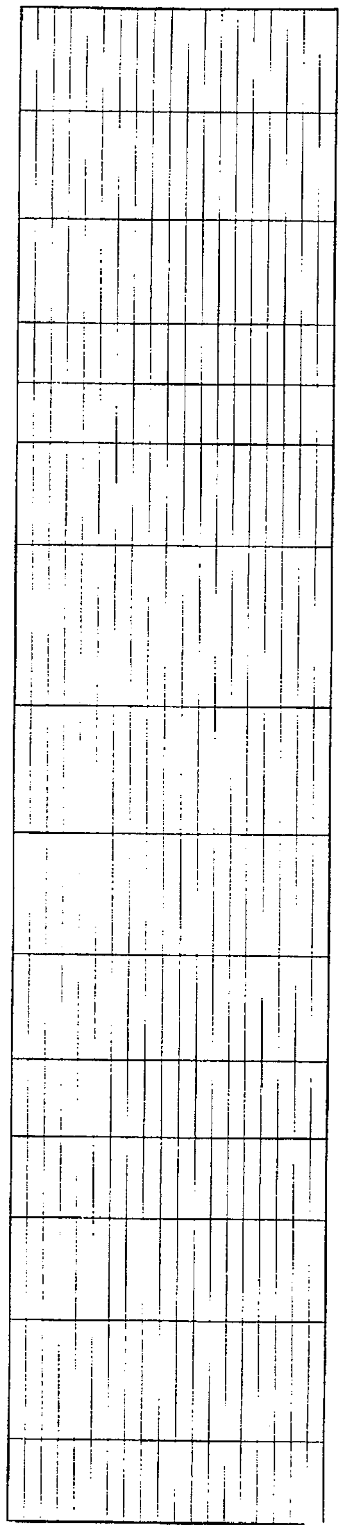
C-5
BB-5

DD-1

| Play Louder | Play Greeting | Erase | LTR_TELCO_TR | LTR_TELCO_RR | LTR_TELCO_QRR | LTR_TELCO_QRT | LTR_TELCO_RT | Radio Answered | ESAS_CTRNK_RR | ESAS_CTRNK_QRR | ESAS_CTRNK_TR | ESAS_CTRNK_RT |
|---|---|---|---|---|---|---|---|---|---|---|---|---|
| | | | begin_get_destination_repeater | begin_get_destination_repeater | begin_get_source_repeater | begin_get_telco | begin_get_telco | | begin_get_radio | begin_get_radio | begin_get_radio | begin_get_telco |
| | | | GET REPEATER LTR TELCO | GET REPEATER RR LTR TELCO | GET REPEATER QRR LTR TELCO | GET TELCO QRT LTR TELCO | GET TELCO RT LTR TELCO | | GET RADIO RR ESAS CTRNK | GET RADIO QRR ESAS CTRNK | GET RADIO TR ESAS CTRNK | GET TELCO RT ESAS CTRNK |
| play_louder | NOT IN TABLE | erase_vm | | | | | | | | | | |
| GET VM ADMIN COMMAND | LISTEN TO VM | GET VM ADMIN COMMAND | | | | | | | | | | |

APPENDIX 1

D-1

CC-1

16

DD-2
D-1
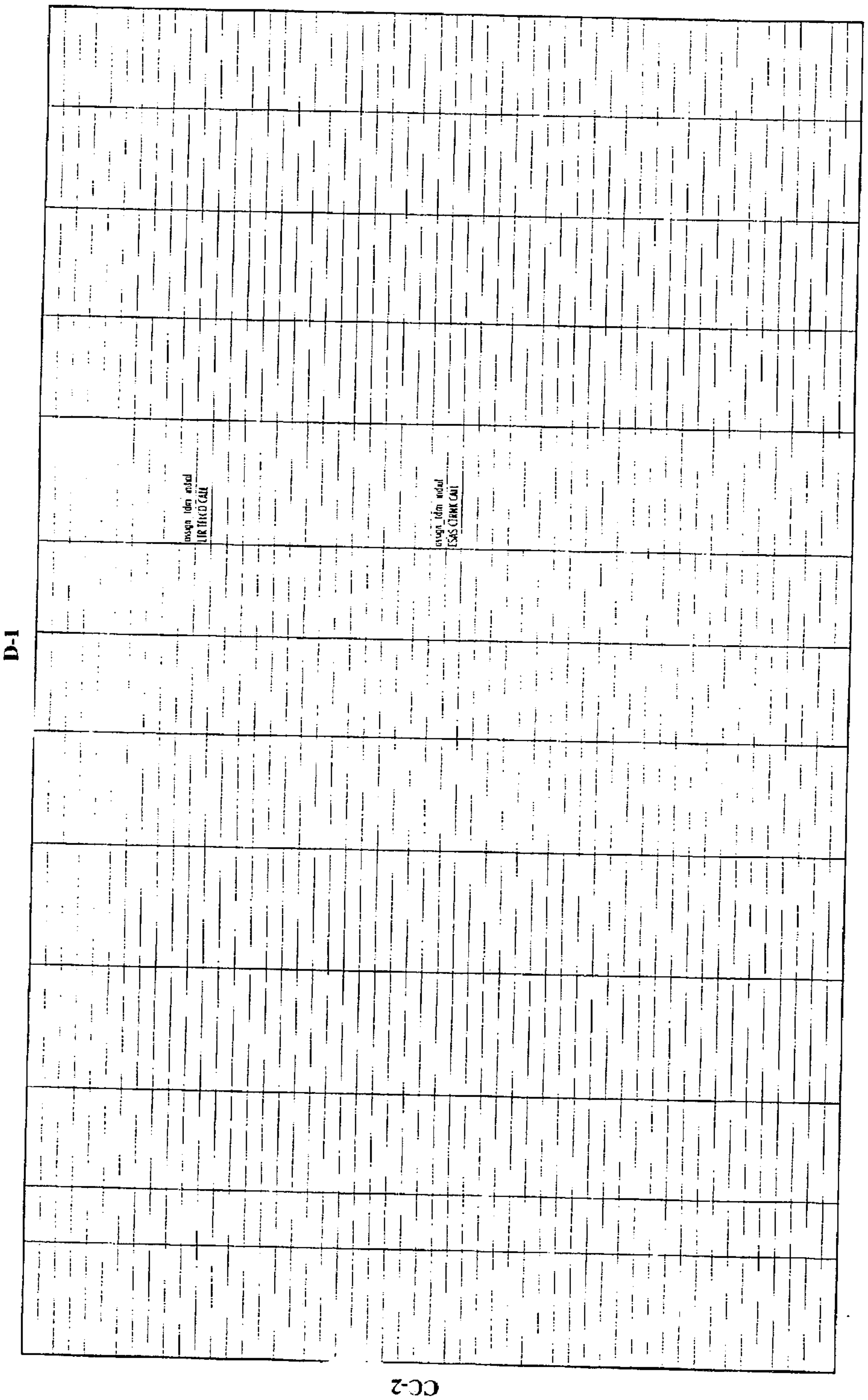
D-2
APPENDIX 1
CC-2

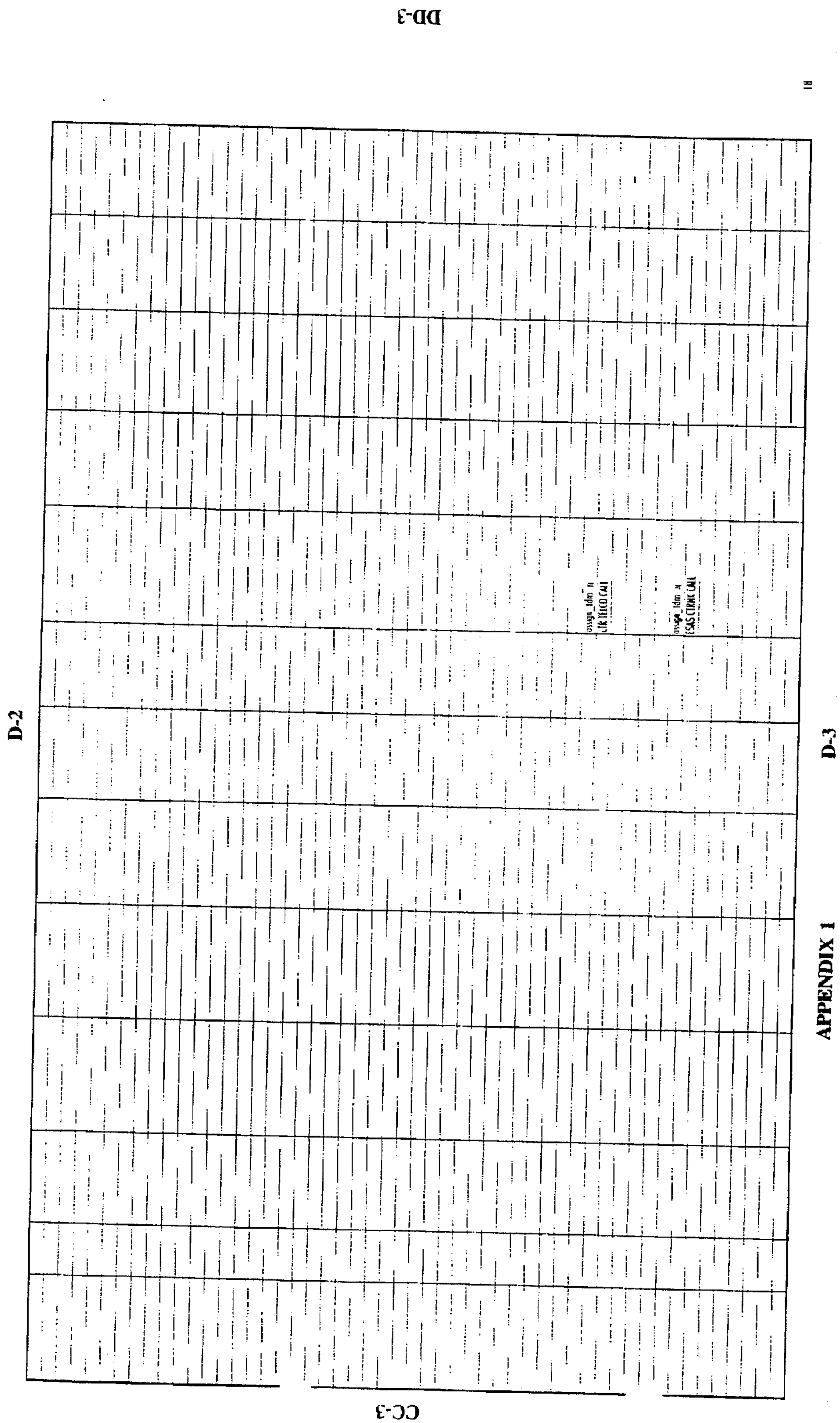
APPENDIX 1

DD-4
D-3
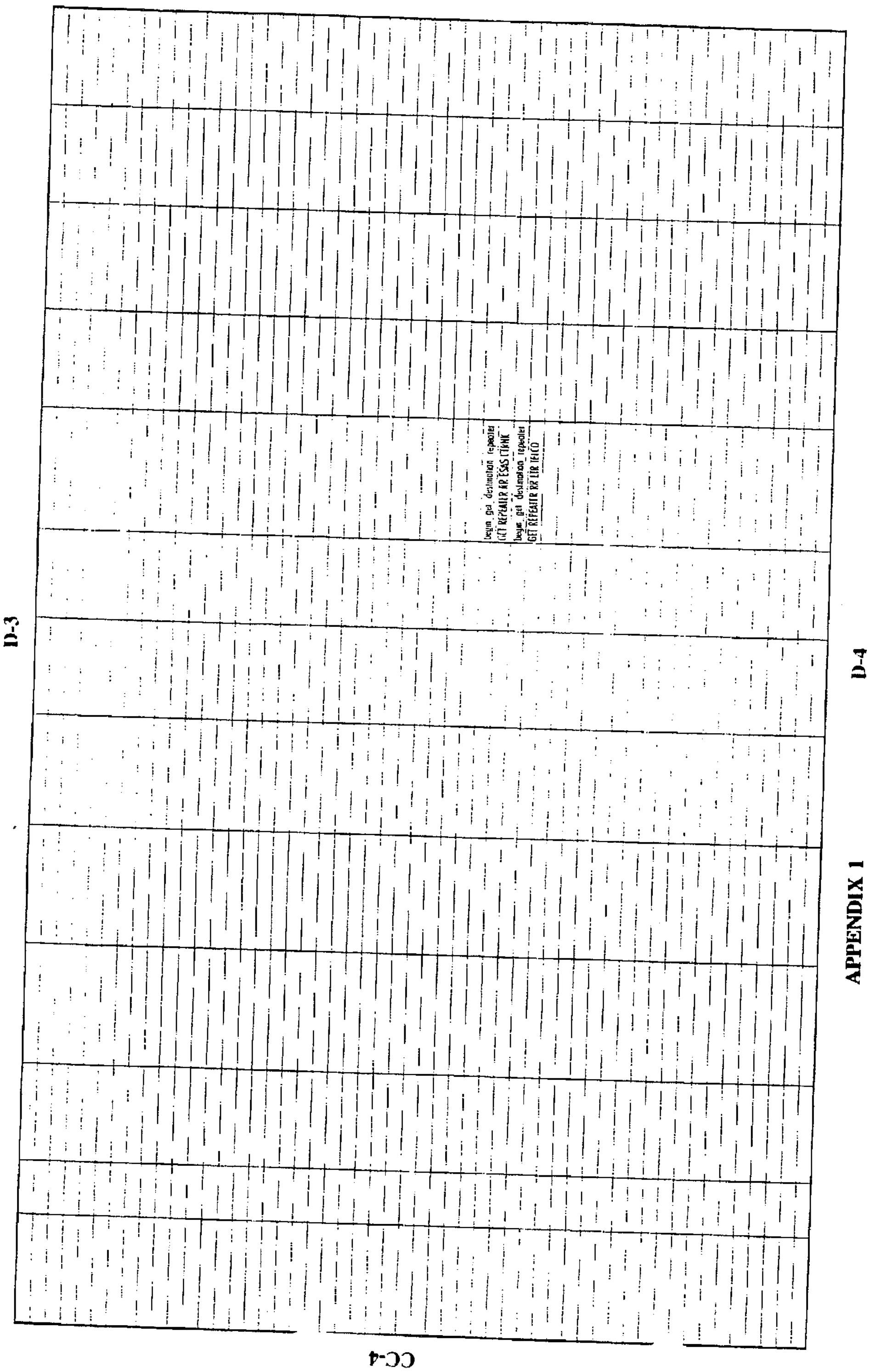
D-4
APPENDIX 1
CC-4

DD-5
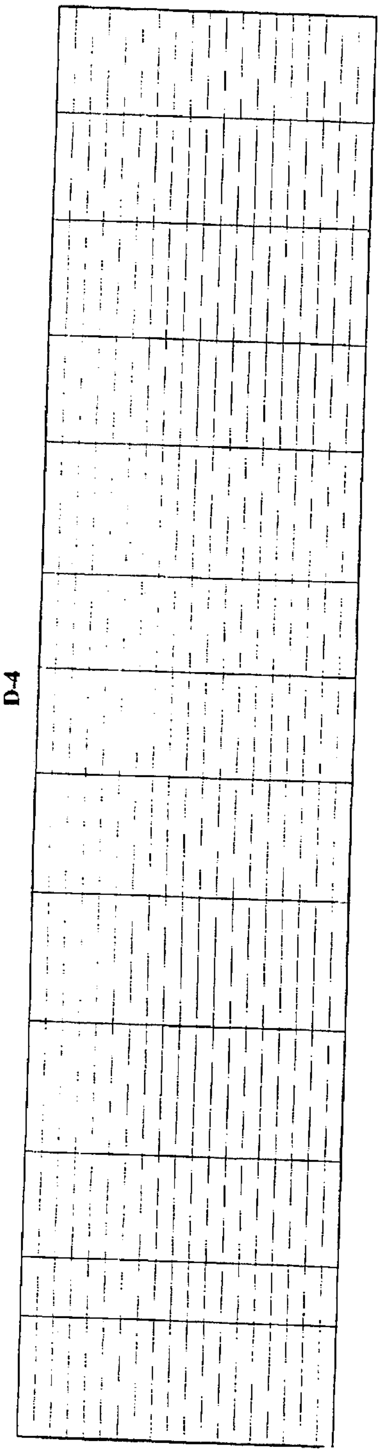
D-4
D-5
APPENDIX 1
CC-5

EE-1

DD-1

| ESAS_CTRNK_QRT | Got Radio | CC Complete T | CC Complete RT | CC Complete QRT | Got UID | Telco Line Failure | Beep Done | Bad Password | Checkin | Status | ESAS_TTRNK_QR | ESAS_TTRNK_QRT | ESAS_TTRNK_TR |
|---|---|---|---|---|---|---|---|---|---|---|---|---|---|
| | | | | | got_uid DISPATCH | | | | | | | | |
| | | | | | got_uid WAIT FOR LTR OUTDIAL | | | | | | | | |
| | | | | | | | | | process_checkin WAIT FOR EOS CHECKIN | process_status WAIT FOR ESAS COMMAND | | | |
| begin_get_telco GET TELCO QRT ESAS CTRNK | | play_cc_prompt END CALL | begin_get_telco GET TELCO RT CC COMPLETE | begin_get_telco GET TELCO QRT CC COMPLETE | | | | | | | begin_get_radio GET RADIO QR DISPATCH | begin_get_telco GET TELCO NET DISPATCH SETUP | begin_get_radio GET RADIO NET DISPATCH |
| | | | | | | handle_telco_failure GET TELCO RESOURCE | | | | | | | |
| | | | | | | | start_vm_record RECORD VOICE MAIL | | | | | | |
| | | play_cc_prompt END CALL | | | | | get_page GET PAGE | | | | | | |
| | | | | | | | get_vm_command GET VM ADMIN COMMAND | play_bad_password_prompt END CALL | | | | | |
| | | | | | | | record_vm_prompt | | | | | | |

21

APPENDIX 1

E-1

EE-2
E-1
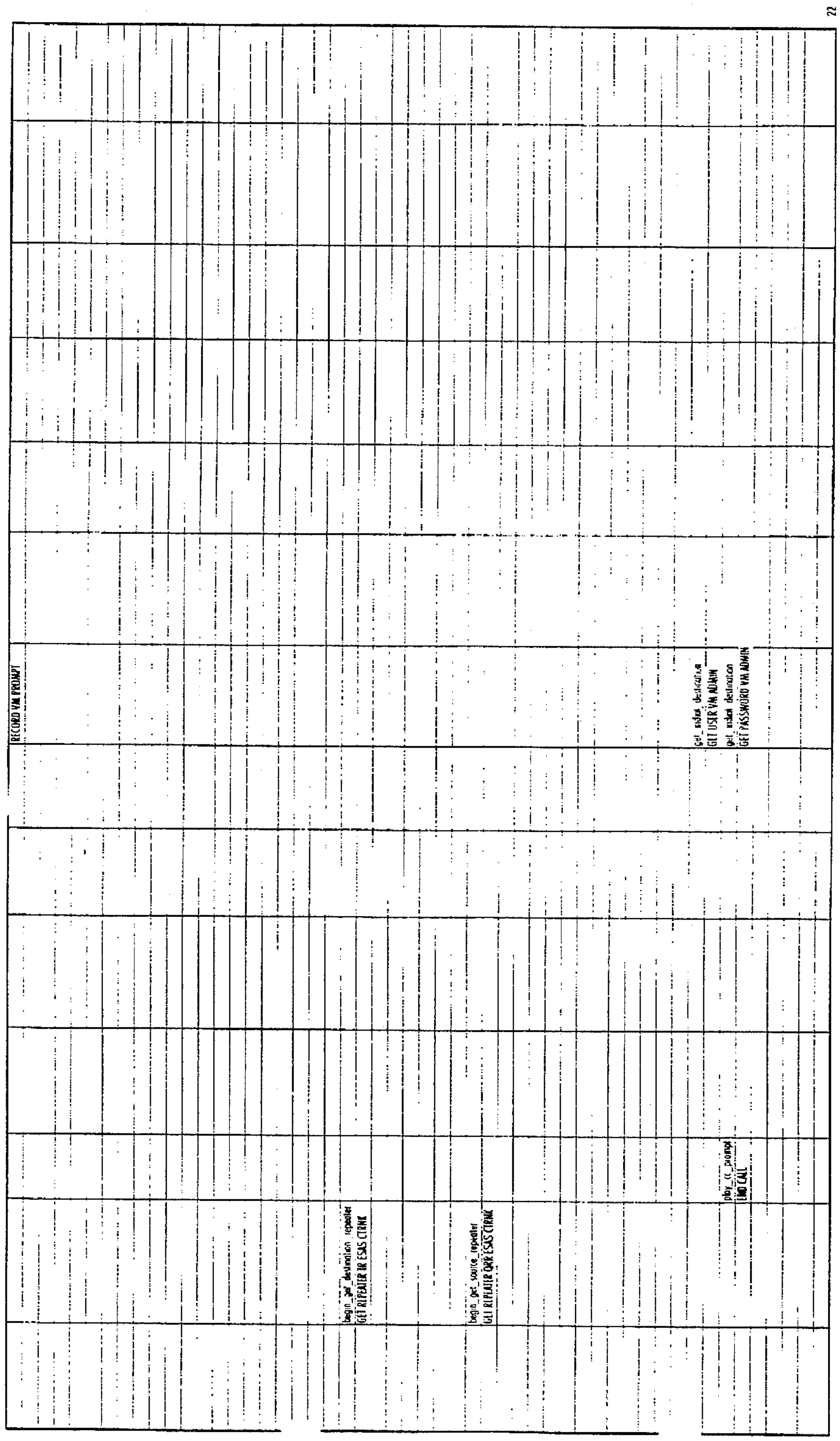
E-2
APPENDIX 1
DD-2

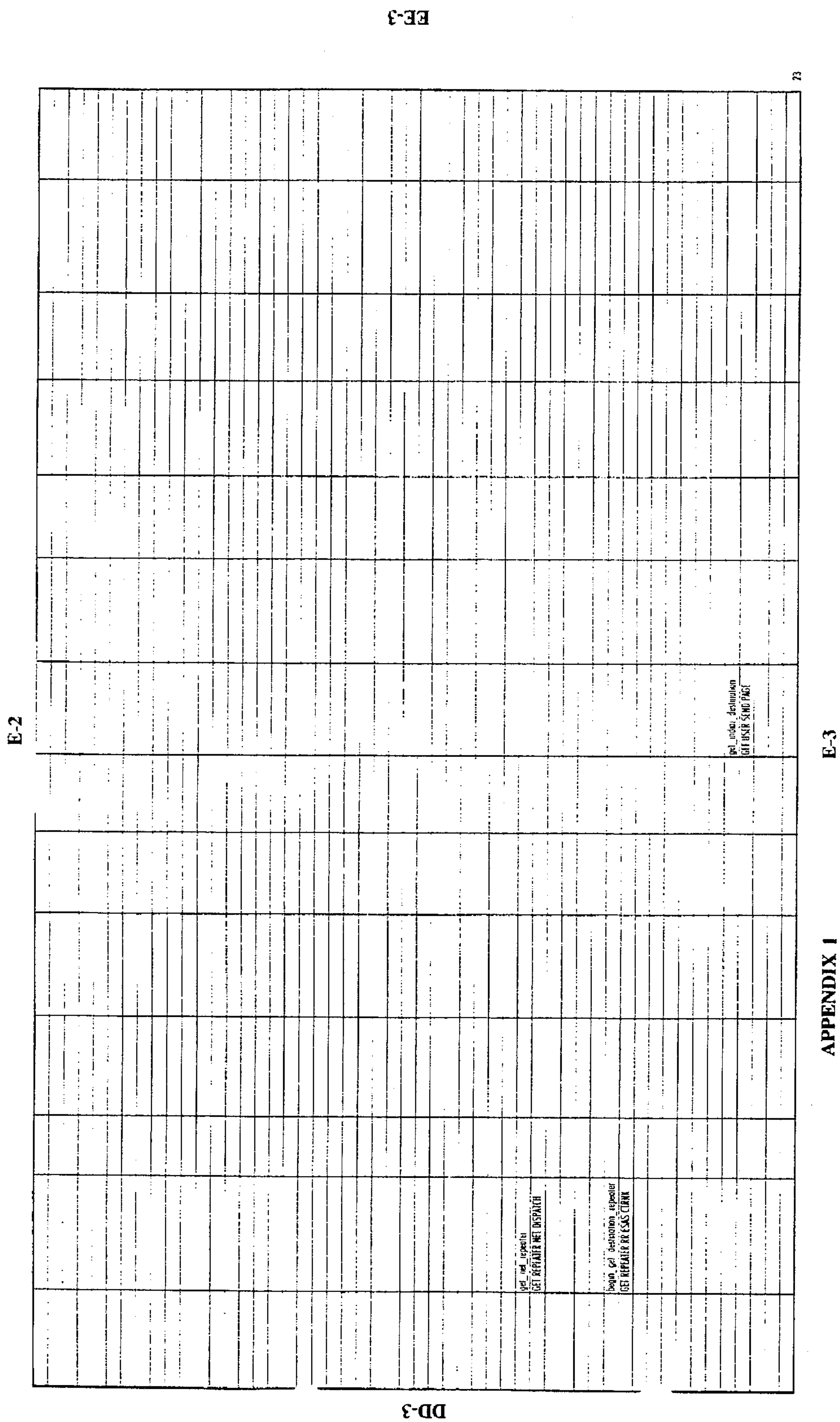
APPENDIX 1

EE-4
E-3
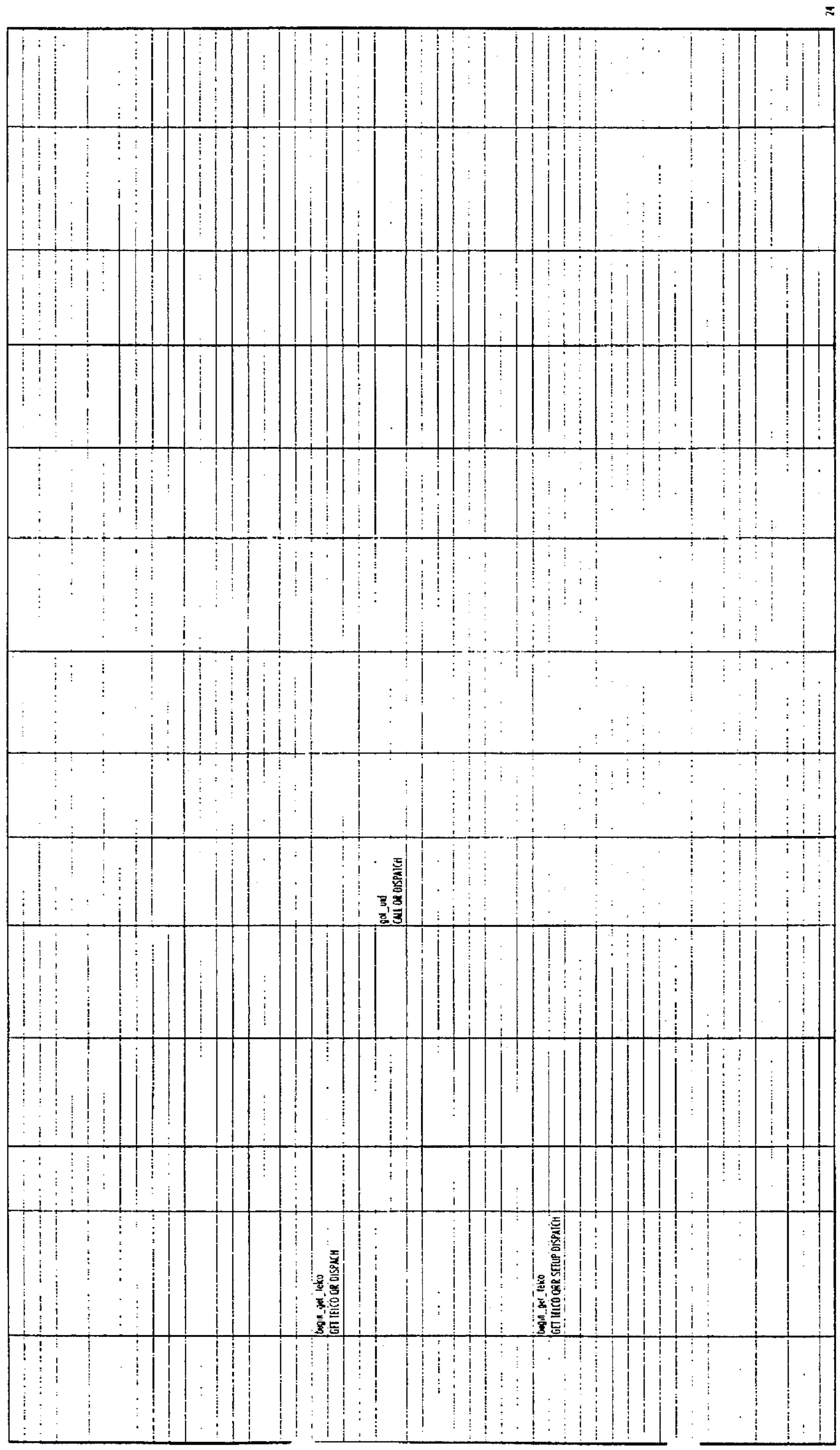
E-4
DD-4
APPENDIX 1

EE-5
E-4
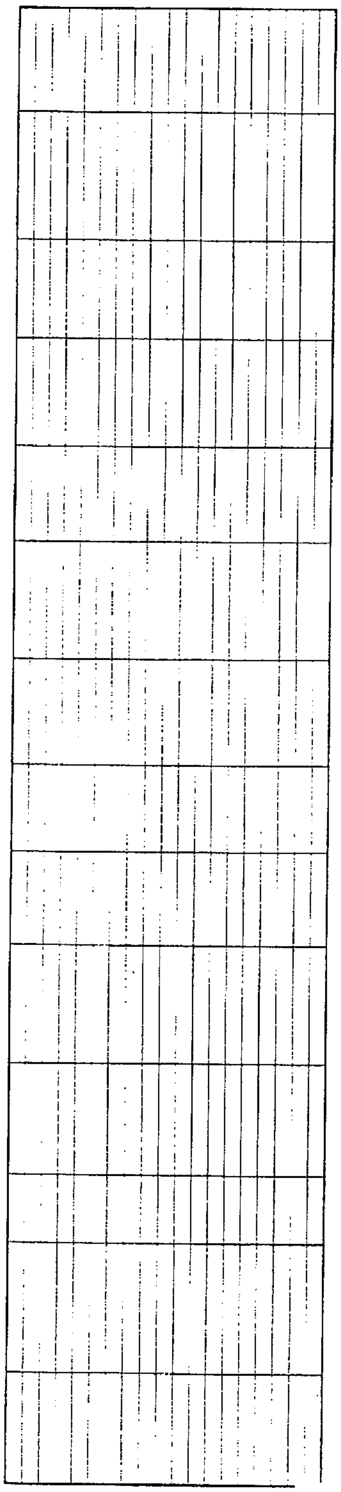
E-5
APPENDIX 1
DD-5

FF-1

| LTR_DISPATCH_QR | LTR_DISPATCH_QRT | LTR_DISPATCH_TR | NET_DEKEY | NET_REKEY | NET_ACK | NET_NAK | DO_CHECKIN_PROMPT | RING | CALL_PROGRESS_DONE | SEND_PAGE_RT | SEND_PAGE_QRT |
|---|---|---|---|---|---|---|---|---|---|---|---|
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| begin_get_telco | begin_get_telco | get_net_repeater | | | | | begin_get_telco | | | begin_get_telco | begin_get_telco |
| GET TELCO QR DISPACH | GET TELCO NET DISPATCH SETUP | GET REPEATER NET DISPATCH | | | | | GET TELCO QRT CHECKIN | | | GET TELCO RT SEND PAGE | GET TELCO QRT SEND PAGE |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | origin_idn_outdial | | | |
| | | | | | | | | TELCO CALL | | | |

26

EE-1

APPENDIX 1 F-1

FF-2
F-1
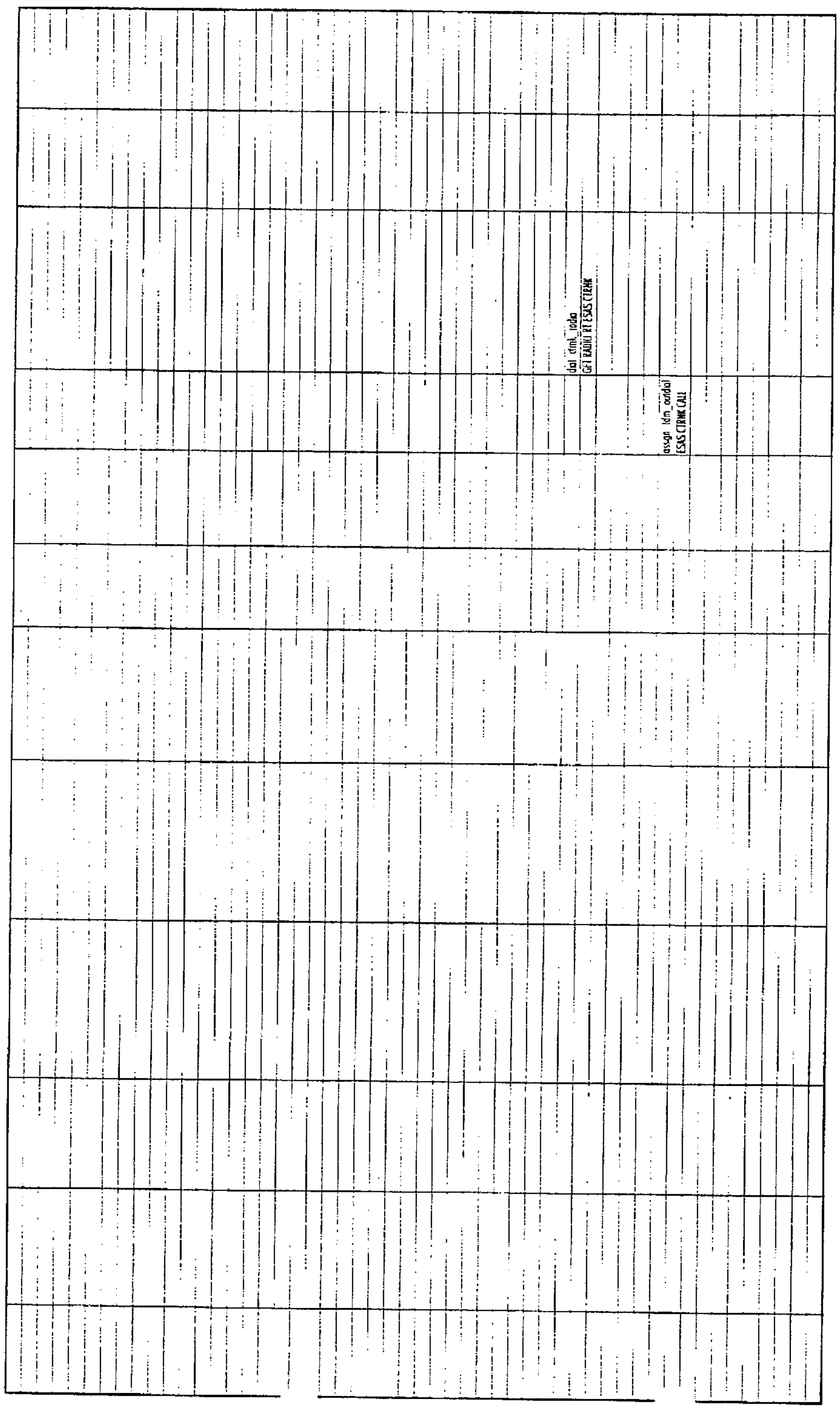
F-2
APPENDIX 1
FF-2

FF-3
F-2
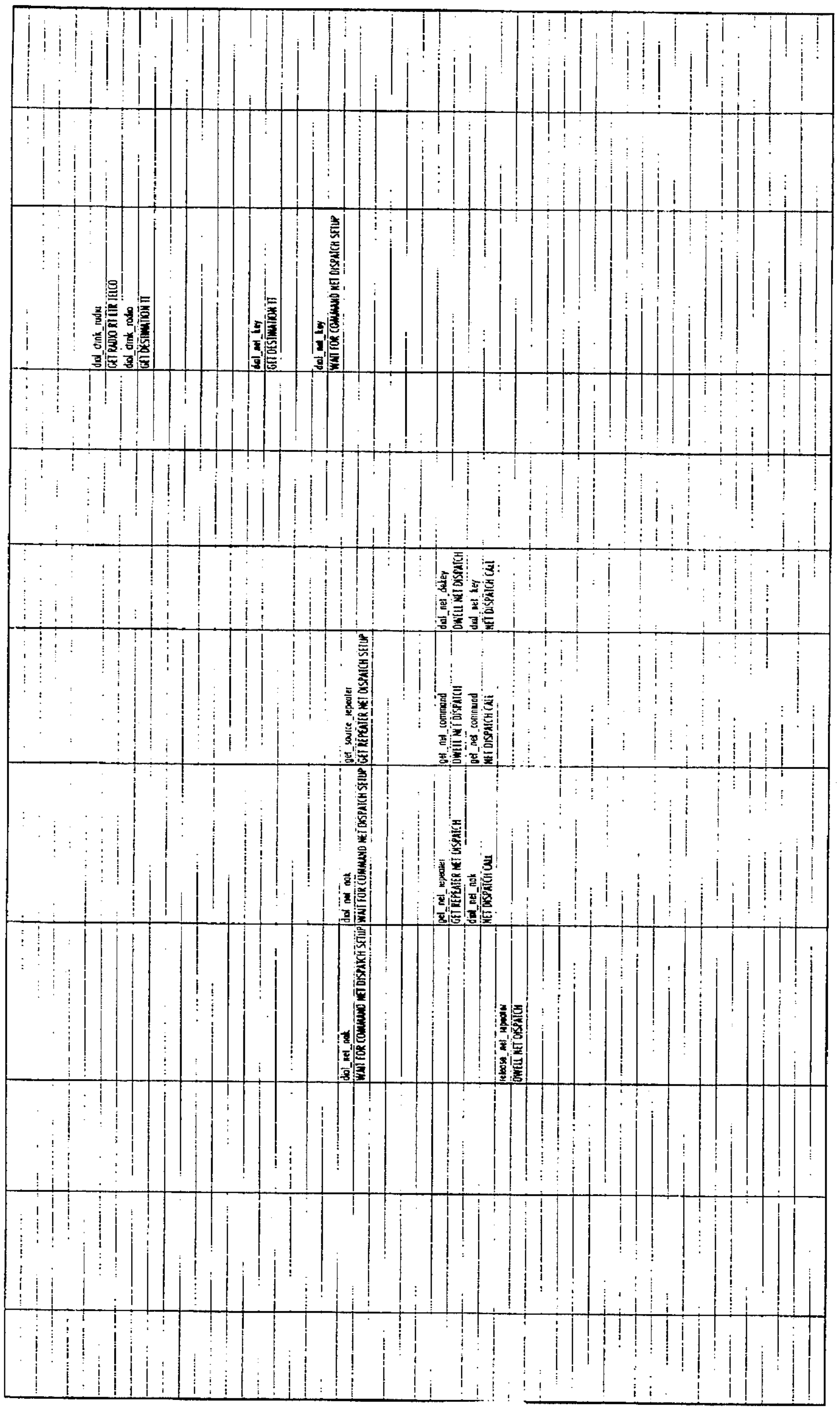
F-3
APPENDIX 1
EE-3

FF-4
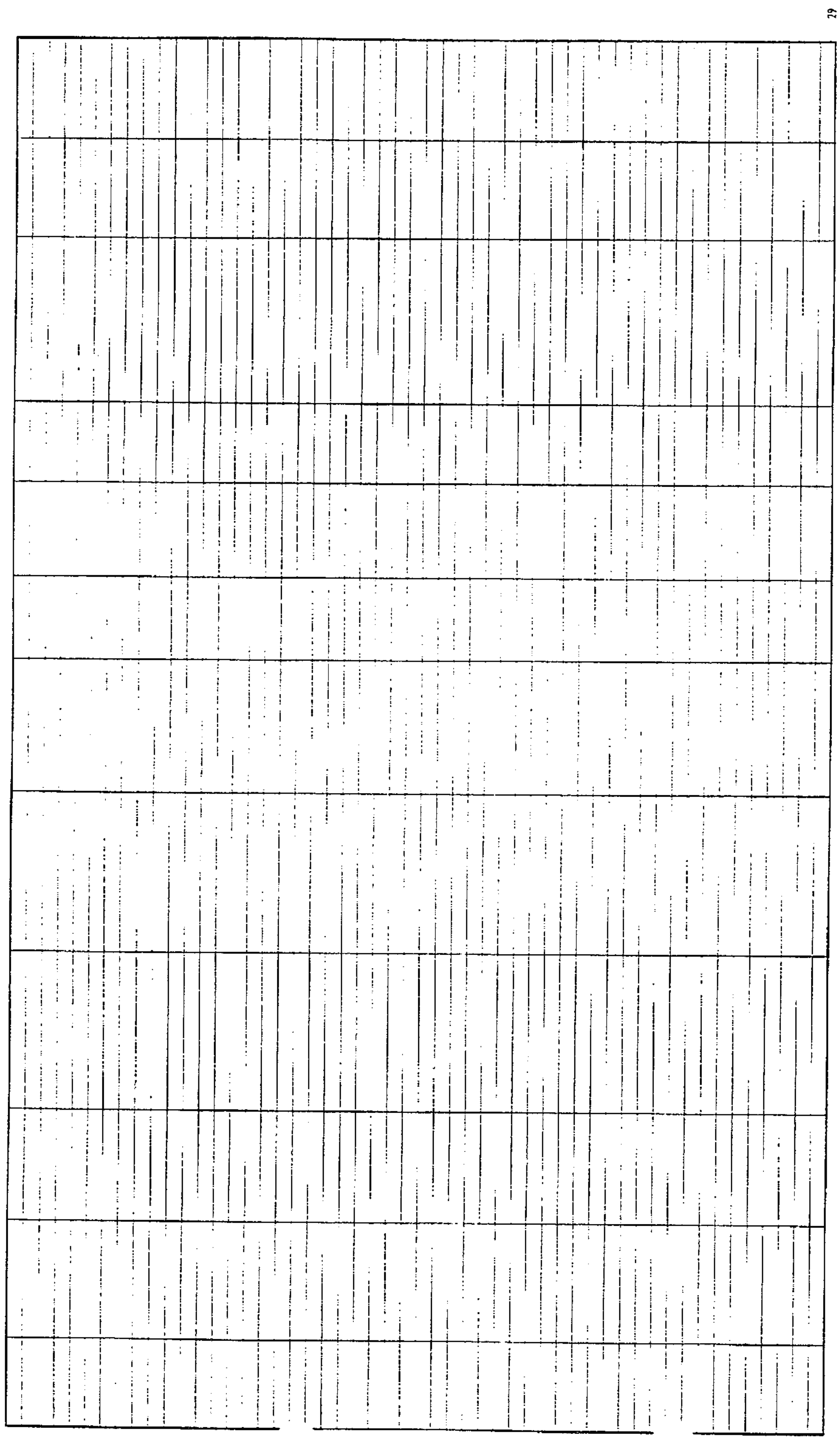
F-3
F-4
EE-4
APPENDIX 1

FF-5
F-4
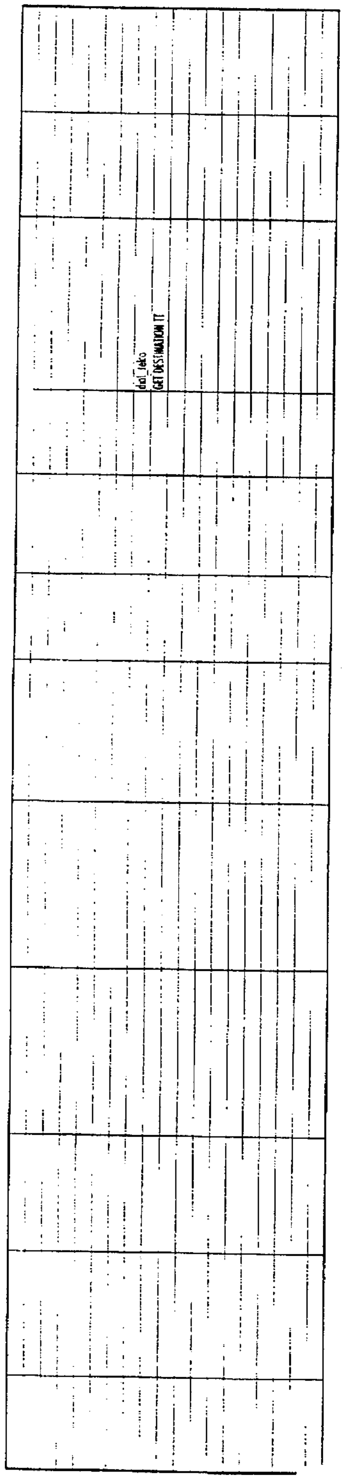
EE-5
F-5
APPENDIX 1

31

FF-1

| SEND_PAGE_1 | END_OF_ID | ESAS_TRNK_QRR | LTR_DISPATCH_QRR | SOURCE_DISPATCH | DESTINATION_DISPATCH | AUTO_CONNECT | AGE_TEMP_1 | ENDING_CALL |
|---|---|---|---|---|---|---|---|---|
| | | | | | | process_ltr_outdial<br>PROCESS DESTINATION | | |
| play_get_page_user<br>GET USER SEND PAGE | | begin_get_radio<br>GET RADIO QRR SETUP DISPATCH | begin_get_telco<br>GET TELCO QRR SETUP DISPATCH | | | | | |
| | | | | | | | func_null<br>AGE TEMP IDS | |
| | | | | | | process_indial<br>PROCESS DESTINATION | | |

APPENDIX 1

G-1

G-1
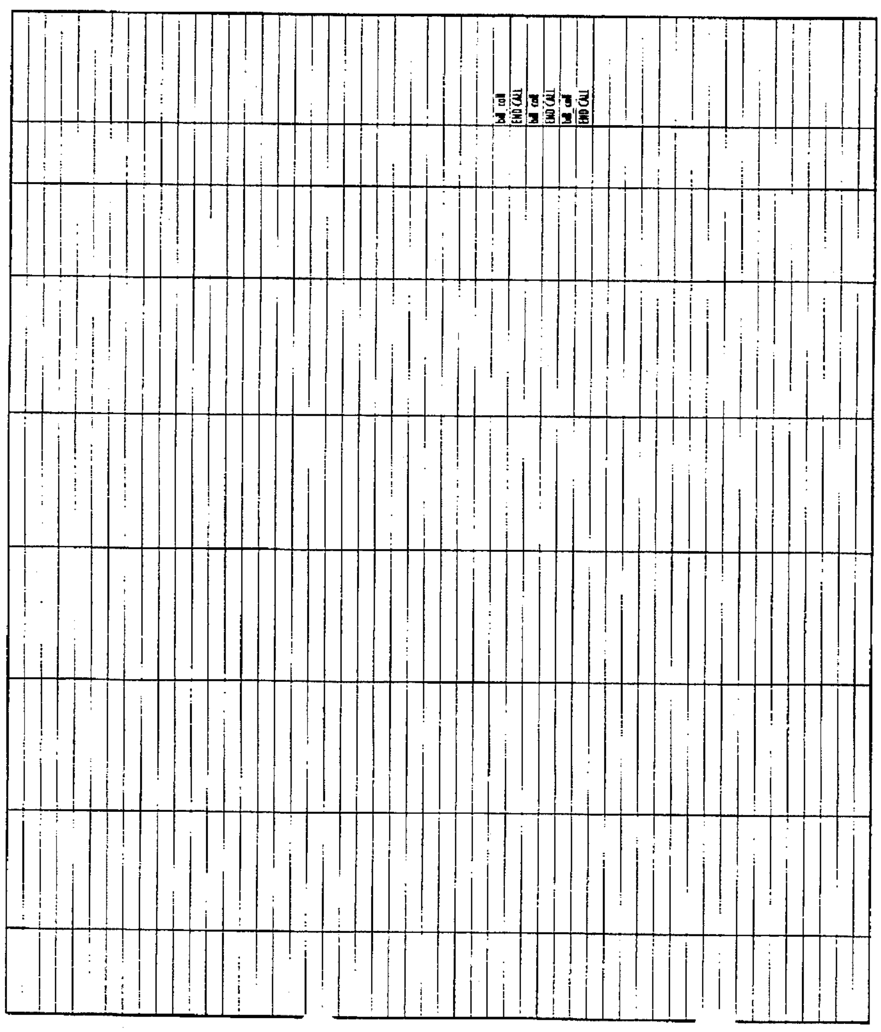
G-2
APPENDIX 1
FF-2

G-2
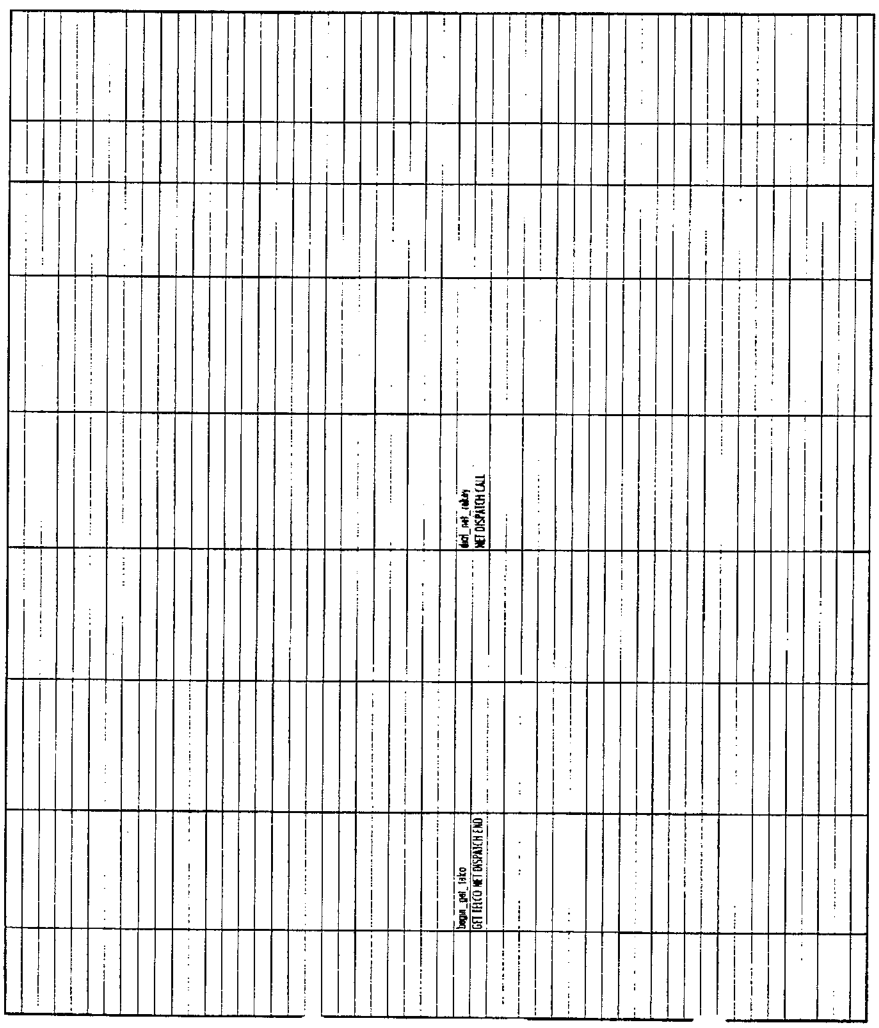
G-3
APPENDIX 1
FF-3

G-3

FF-4

| | | | | | | | | |
|---|---|---|---|---|---|---|---|---|
| | get_telco<br>GET TELCO QR END DISPATCH | | | | | | | |
| | get_telco<br>GET TELCO QR END DISPATCH | | | | | | | |
| | | | | | | | | bill_call<br>END CALL |
| | | | | | | | | bill_call<br>END CALL |
| | | | | | | | | bill_call<br>END CALL |
| | | | | | | | | bill_call<br>END CALL |
| | | | | | | | | bill_call<br>END CALL |
| | | | | | | | | bill_call<br>END CALL |
| | | | | | | | | bill_call<br>END CALL |
| | begin_get_telco<br>GET TELCO QRR END DISPATCH | | | begin_get_destination_repeater<br>GET DST REPEATER QRR DISPATCH | begin_get_source_repeater<br>GET SRC REPEATER QRR DISPATCH | | | |
| | begin_get_telco<br>GET TELCO QRR END DISPATCH | | | | | | | free_resources_setup_call<br>DWELL QRR DISPATCH |
| | begin_get_telco<br>GET TELCO QRR END DISPATCH | | | | | | | free_resources_setup_call<br>DWELL QRR DISPATCH |
| | begin_get_telco<br>GET TELCO QRR END DISPATCH | | | | | | | free_resources_setup_call<br>DWELL QRR DISPATCH |
| | | | | | | | | bill_call |

APPENDIX 1

G-4

34

G-4

| | | | | | | | | |
|---|---|---|---|---|---|---|---|---|
| | | | | | | | | END CALL |
| | | | | | | | | ball_call |
| | | | | | | | | END CALL |
| | | | | | | | | ball_call |
| | | | | | | | | END CALL |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| | | | | | | | | |

FF-5

APPENDIX 1

G-5

ESAS SOFTWARE STATES

IDLE
Idle, waiting for an event to occur.

DISPATCH
A dispatch call is in progress.

STATION ID
A repeater is transmitting its station ID.

WAIT FOR LTR OUTDIAL
Waiting for mobile to send telephone digits to be dialed.

WAIT FOR ESAS COMMAND
Waiting to receive an ESAS command from a radio.

PROCESS DESTINATION
Determining the destination location and/or destination ID for a call.

END CALL
Tearing down call set up and freeing resources.

GET TELCO RESOURCE
Getting a telephone resource.

GET TELCO QRT RESOURCE
Getting a telephone resource for a queued radio to telephone resource call.

DIAL TELCO
Dialing telephone digits to a telephone resource.

TELCO CALL
A telephone call is in progress.

GET REPEATER QRT RESOURCE
Getting a repeater for a queued radio to telephone resource call.

APPENDIX 2

2

BEGIN INDIAL
Answering telephone resource and collecting overdial digits.

WAIT FOR INDIAL PROMPT
Waiting for completion of indial voice prompt to telephone user.

WAIT FOR INDIAL DESTINATION
Waiting for telephone resource user to overdial destination ID.

RECORD VOICE MAIL
Recording voice mail Message.

GET TELCO RT VM
Getting telephone resource for repeater to telephone resource voice mail message.

GET TELCO QRT VM
Getting telephone resource for a queued repeater to telephone resource voice mail message.

GET REPEATER QRT VM
Getting a repeater for a queued repeater to telephone resource voice mail message.

GET PAGE
Getting page message.

GET TELCO RT PAGE
Getting a telephone resource for a repeater to telephone resource page message.

GET TELCO QRT PAGE
Getting a telephone resource for a queued repeater to telephone resource page message.

GET REPEATER QRT PAGE
Getting a repeater for a queued repeater to telephone resource page message.

APPENDIX 2

3

GET VM ADMIN COMMAND
Getting a voice mail administration command from a user.

LISTEN TO VM
Voice mail is being listened to.

RECORD VM PROMPT
A voice prompt is being recorded.

GET TELCO RT VM ADMIN
Getting a telephone resource for a repeater to telephone resource voice mail administration message.

GET TELCO QRT VM ADMIN
Getting a telephone resource for a queued repeater to telephone resource voice mail administration message.

GET REPEATER QRT VM ADMIN
Getting a repeater for a queued repeater to telephone resource voice mail administrator message.

GET REPEATER LTR TELCO
Getting a repeater for an LTR radio to telephone resource call.

WAIT FOR ANSWER LTR TELCO
Waiting for a radio to answer an LTR telephone call.

LTR TELCO CALL
An LTR telephone call is in progress.

GET REPEATER QRR LTR TELCO
Getting a repeater for a queued repeater to repeater LTR call.

GET TELCO RT LTR TELCO
Getting a telephone resource for a repeater to telephone resource LTR call.

GET TELCO QRT LTR TELCO

4

Getting a telephone resource for a queued repeater to telephone resource LTR call.

GET REPEATER QRT LTR TELCO
Getting a repeater for a queued repeater to telephone resource LTR call.

GET RADIO TR ESAS CTRNK
Getting a radio for a telephone resource to repeater ESAS conversation trunked call.

GET REPEATER TR ESAS CTRNK
Getting a repeater for a telephone resource to repeater ESAS conversation trunked call.

WAIT FOR ANSWER TR ESAS CTRNK
Waiting for a radio to answer a telephone resource to repeater ESAS conversation trunked call.

ESAS CTRNK CALL
An ESAS conversation trunked call is in progress.

GET RADIO QRR ESAS CTRNK
Getting a radio for a queued repeater to repeater ESAS conversation trunked call.

GET REPEATER QRR ESAS CTRNK
Getting a repeater for a queued repeater to repeater ESAS conversation trunked call.

GET TELCO RT ESAS CTRNK
Getting a telephone resource for a repeater to telephone resource ESAS conversation trunked call.

GET LINK RT ESAS CTRNK
Getting a network link for a repeater to telephone resource ESAS conversation trunked call.

GET TELCO QRT ESAS CTRNK

APPENDIX 2

Getting a telephone resource for a queued repeater to telephone resource ESAS conversation trunked call.

GET REPEATER QRT ESAS CTRNK
Getting a repeater for a queued repeater to telephone resource ESAS conversation trunked call.

GET RADIO RT ESAS CTRNK
Getting a radio for a repeater to telephone resource ESAS conversation trunked call.

GET USER VM ADMIN
Getting a user for a voice mail administration message.

GET PASSWORD VM ADMIN
Getting a password from a user for a voice mail administration message.

GET TELCO QRT CHECKIN
Getting a telephone resource to play a queued check-in voice prompt through a repeater.

GET REPEATER QRT CHECKIN
Getting a repeater to play a queued check-in voice prompt.

CHECKIN CALL
A radio check-in location prompt is in progress.

GET TELCO TT CTRNK
Getting a telephone resource for a telephone resource to telephone resource conversation trunked call.

GET RADIO RT LTR TELCO
Getting a radio for a repeater to telephone resource LTR telephone call.

GET LINK RT LTR TELCO
Getting a network link for a repeater to telephone resource LTR call.

APPENDIX 2

6

GET LINK TT CTRNK
Getting a network link for a telephone resource to telephone resource conversation trunked call.

GET DESTINATION TT
Getting the destination ID for a telephone resource to telephone resource call.

CALL TT
A telephone resource to telephone resource call is in progress.

GET TELCO TT TTRNK
Getting a telephone resource for a telephone resource to telephone resource transmission trunked call.

GET LINK TT TTRNK
Getting a network link for a telephone resource to telephone resource call.

GET TELCO NET DISPATCH SETUP
Getting a telephone resource for a networked dispatched call set-up.

GET LINK NET DISPATCH SETUP
Getting a network link for a networked dispatch call set-up.

WAIT FOR COMMAND NET DISPATCH SETUP
Waiting for a command for a networked dispatch call.

GET REPEATER NET DISPATCH SETUP
Getting a repeater for a networked dispatch call set-up.

NET DISPATCH SETUP CALL
Getting a networked dispatch setup call request.

DWELL NET DISPATCH
Waiting in dwell period during a networked dispatch call.

NET DISPATCH CALL
A networked dispatch call is in progress.

APPENDIX 2

7

GET REPEATER NET DISPATCH
Getting a repeater for a networked dispatch call.

GET RADIO NET DISPATCH
Getting a radio for a networked dispatch call.

GET REPEATER RR LTR TELCO
Getting a repeater for a repeater to repeater LTR telephone call.

WAIT FOR ANSWER RR LTR TELCO
Waiting for a radio to answer a repeater to repeater LTR telephone call.

GET RADIO RR ESAS CTRNK
Getting a radio for a repeater to repeater ESAS conversation trunked call.

GET REPEATER RR ESAS CTRNK
Getting a repeater for a repeater to repeater ESAS conversation trunked call.

WAIT FOR ANSWER RR ESAS CTRNK
Waiting for a radio to answer a repeater to repeater conversation trunked call.

GET TELCO RT SEND PAGE
getting a telephone resource for a repeater to telephone resource page message transmission.

GET USER SEND PAGE
Getting the user ID for a page message transmission.

GET TELCO QRT SEND PAGE
Getting a telephone resource for a queued repeater to telephone resource page message transmission.

GET REPEATER QRT SEND PAGE
Getting a repeater for a queued repeater to telephone resource page message transmission.

APPENDIX 2

8

GET TELCO RT CC COMPLETE
Getting a telephone resource for a repeater to telephone resource custom calling complete message.

GET TELCO QRT CC COMPLETE
Getting a telephone resource for a queued repeater to telephone resource custom calling complete message.

GET REPEATER QRT CC COMPLETE
Getting a repeater for a queued repeater to telephone resource custom calling complete message.

GET TELCO QR DISPATCH
Getting a telephone resource for a queued repeater dispatch call.

GET REPEATER QR DISPATCH
Getting a repeater for a queued repeater dispatch call.

DISPATCH SETUP CALL
Setting up a dispatch call.

WAIT FOR EOS OUTDIAL
Waiting for an End OF Session message during an outdial call.

WAIT FOR EOS WHAT
Waiting for an End Of Session WHAT command.

WAIT FOR EOS CHECKIN
Waiting for and End Of Session CHECKIN command.

GET RADIO QR DISPATCH
Getting a radio for a queued repeater dispatch call.

DWELL QR DISPATCH
Waiting for dwell period in a queued repeater dispatch call.

CALL QR DISPATCH
A queued repeater dispatch call is in progress.

APPENDIX 2

9

GET TELCO QR END DISPATCH
Getting a telephone resource to play a queued repeater end of dispatch call voice prompt.

GET REPEATER QR END DISPATCH
Getting a repeater to play a queued repeater end of dispatch call voice prompt.

WAIT FOR SOURCE ANSWER QRR ESAS CTRNK
Waiting for the source radio to answer a queued repeater to repeater ESAS conversation trunked call.

WAIT FOR SOURCE ANSWER QRR LTR TELCO
Waiting for the source radio to answer a queued repeater to repeater LTR telephone call.

GET RADIO QRR SETUP DISPATCH
Getting a radio for a queued repeater to repeater set-up dispatch call command.

GET TELCO QRR SETUP DISPATCH
Getting a telephone resource for a queued repeater to repeater set-up dispatch call request.

GET SRC REPEATER QRR SETUP DISPATCH
Getting a source repeater for a queued repeater to repeater set-up dispatch call request.

GET DST REPEATER QRR SETUP DISPATCH
Getting a destination repeater for a queued repeater to repeater set-up dispatch call request.

DISPATCH SETUP QRR CALL
A set-up dispatch queued repeater to repeater call is in progress.

DWELL QRR DISPATCH
Waiting in dwell period for a queued repeater to repeater dispatch call.

APPENDIX 2

GET SRC REPEATER QRR DISPATCH
Getting source repeater for a queued repeater to repeater dispatch call.

GET DST REPEATER QRR DISPATCH
Getting destination repeater for a queued repeater to repeater dispatch call.

CALL QRR DISPATCH
a queued repeater to repeater dispatch call is in progress.

GET TELCO QRR END DISPATCH
getting a telephone resource to play an end of queued repeater to repeater dispatch call voice prompt.

GET SRC REPEATER QRR END DISPATCH
Getting a source repeater for a queued repeater to repeater end dispatch call command.

GET DST REPEATER QRR END DISPATCH
Getting a destination repeater for a queued repeater to repeater end dispatch call command.

GET TELCO TT TELCO
Getting a telephone resource for a telephone resource to telephone resource telephone call.

GET LINK TT TELCO
Getting a network link for a telephone resource to telephone resource telephone call.

GET TELCO NET DISPATCH END
Getting a telephone resource to play an end dispatch call voice prompt.

GET REPEATER NET DISPATCH END
Getting a repeater to play an end dispatch call voice prompt.

REPEATER OFF LINE

APPENDIX 2

11

Repeater is off line.

AGE TEMP IDS
Aging temporary ID codes.

ABORT DESTINATION
Abort destination connection.

APPENDIX 2

ESAS EVENTS

WHAT ?
Received an ESAS WHAT command.

Station ID
A station ID transmission has started.

LTR_DISP_R
An LTR dispatch transmission has started.

Queued
A radio has been queued off the air.

RESOURCE FREE
A resource has become released from a call.

TIMEOUT
A time-out-timer has expired.

LOCAL TIMEOUT
A local time-out-timer has expired.

LTR_OUTDIAL
An LTR outdial call has been initiated.

REPEATER OFF LINE
A repeater has gone off-line.

DIAL DONE
Digit dialing is complete.

CALL DONE
A call is complete.

ESAS SESSION
An ESAS session has been initiated.

PLAY DONE

A voice prompt is done playing.

RADIO TO TELCO CALL
A radio to telephone resource call has been initiated.

TELCO TO TELCO CALL
A telephone resource to telephone resource call has been initiated.

TELCO TO TELCO CTRNK CALL
A telephone resource to telephone resource conversation trunked call has been initiated.

TELCO TO TELCO TTRNK CALL
A telephone resource to telephone resource transmission trunked call has been initiated.

QUEUED RADIO TO TELCO CALL
A queued radio to telephone resource call has been initiated.

GOT A TELCO LINE
A telephone resource has been found.

GOT A REPEATER
A repeater has been found.

PLAY PROMPT
A prompt has been played.

NO PROMPT
No prompt has been played.

INDIAL DIGITS DONE
Indial digits have been received.

TELCO TO VOICE MAIL
A telephone resource to voice mail call has been initiated.

RADIO TO VOICE MAIL
A radio to voice mail call has been initiated.

APPENDIX 3

3

QUEUED RADIO TO VOICE MAIL

A queued radio to voice mail call has been initiated.

RECORD DONE

A voice mail recording is complete.

PAGE FROM TELCO

A page message from a telephone resource has been initiated.

PAGE FROM RADIO

A page message from a radio has been initiated.

PAGE FROM QUEUED RADIO

A page message from a queued radio has been initiated.

VM ADMINISTRATION FROM TELCO

Voice mail administration from a telephone resource call has been initiated.

VM ADMINISTRATION FROM RADIO

Voice mail administration from a radio call has been initiated.

VM ADMINISTRATION FROM QUEUED RADIO

Voice mail administration from a queued radio call has been initiated.

RECORD VM PROMPT

A request to record a voice mail prompt has been received.

PLAY PREVIOUS

A play previous voice mail message request has been received.

PLAY NEXT

A play next voice mail message request has been received.

PLAY SLOWER

A play voice mail slower command has been received.

PLAY FASTER

A play voice mail faster command has been received.

4

PLAY SOFTER
A play voice mail softer command has been received.

PLAY LOUDER
A play voice mail louder command has been received.

PLAY GREETING
A play voice mail greeting command has been received.

ERASE
An erase voice mail message command has been received.

LTR_TELCO_TR
A telephone line to LTR interconnect ID request has been received.

LTR_TELCO_RR
An LTR telephone line to telephone line request has been received.

LTR_TELCO_QRR
A queued ESAS ID to LTR interconnect ID request has been received.

LTR_TELCO_QRT
A queued ESAS ID to remote LTR ID request has been received.

LTR_TELCO_RT
An LTR interconnect to remote LTR ID request has been received.

RADIO ANSWERED
A radio has answered.

ESAS_CTRNK_RR
An LTR interconnect ot ESAS conversation trunked request has been received.

ESAS_CTRNK_QRR
A queued ESAS ID to ESAS ID conversation trunked request has been received.

ESAS_CTRNK_TR

A telephone line to ESAS ID request has been received.

ESAS_CTRNK_QRT
A queued ESAS ID to remote ESAS ID conversation trunked request has been received.

GOT RADIO
A radio location has been found.

CC Complete T
A prompt for telephone line has been completed.

CC Complete RT
A prompt for a repeater has been completed.

CC Complete QRT
A prompt for a queued radio has been completed.

GOT UID
A unique ID has been found.

TELCO LINE FAILURE
A telephone line has failed.

BEEP DONE
A beep voice prompt has been completed.

BAD PASSWORD
A bad password has been received.

CHECKIN
A check-in command has been received.

STATUS
A status command has been received.

ESAS_TTRNK_QR
A queued ESAS ID to ESAS ID transmission trunked request has been received.

APPENDIX 3

ESAS_TTRNK_QRT
A queued ESAS ID to remote ESAS ID transmission trunked request has been received.

ESAS_TTRNK_TR
A telephone line to ESAS ID transmission trunked request has been received.

LTR_DISPATCH_QR
A queued ESAS ID to LTR dispatch ID request has been received.

LTR_DISPATCH_QRT
A queued ESAS ID to remote LTR dispatch ID request has been received.

LTR_DISPATCH_TR
A telephone line to LTR dispatch ID request has been received.

NET_DEKEY
A voice network link dekey has been received.

NET_REKEY
A voice network link rekey has been received.

NET_ACK
A voice network link acknowledgement has been received.

NET_NAK
A voice network link negative acknowledgement has been received.

DO_CHECKIN_PROMPT
A request to do a check-in prompt has been received.

RING
A telephone line ring signal has been detected.

CALL_PROGRESS_DONE
A call progress event has been detected.

SEND_PAGE_RT

7

A send page from repeater has been requested.

SEND_PAGE_QRT
A queued send page from repeater has been requested.

SEND_PAGE_T
A send page from a telephone line has been requested.

END_OF_ID
The end of an ID code transmission has been detected.

ESAS_TTRNK_QRR
A queued ESAS ID to ESAS ID transmission trunked request has been received.

LTR_DISPATCH_QRR
An ESAS ID to LTR dispatch ID transmission trunked request has been received.

SOURCE_DISPATRCH
The source radio has rekeyed during a network transmission trunked call.

DESTINATION_DISPATCH
The destination radio has rekeyed during a network transmission trunked call.

AUTO_CONNECT
An auto-connect request has been received.

AGE_TEMP_IDS
A request to age the temporary ID's associated with a has been received.

ENDING_CALL
An end call request has been received.

APPENDIX 3

ESAS Function List func_null
No action is taken, used when transitioning between states and no action is required.

reset_repeater
Resets a repeater.

free_resource
This function frees all resources associated with a call.

free_resource_setup_call
This function frees all call setup resources, and, does not release the source ID.

check_free_resources
This functions checks to see if all resources associated with a call are free. If so, it posts a CALL DONE event.

process_ltr_bandit
This function is called when a call that is ESAS restricted fails to receive a SID/UID within 2 seconds from the call start.

got_uid
This function is called when an SID/UID is received during a call and it checks to see if an ESAS restricted timer is running. If so, it stops the timer before the call is aborted.

process_dispatch
This function determines if a dispatch call is valid. If it is not valid it sends a "call invalid" command to the repeater.

pre_process_ltr_outdial
This function checks for outdial privileges. If none are found, it sends an api_CALL_INVALID to the host repeater.

process_ltr_outdial

This function checks the number dialed with the LCR rules, DID mapping, and name server in an LTR call to validate the call, translate the call, select resources, and determine the call terminator type.

abort_esas_call
This function is called to void an ESAS call request.

process_esas_session
This function checks to see if a radio has any pages waiting and sends them if so.

post_process_esas_outdial
This function asserts the call type event associated with a call being placed after the end of an ESAS session has been set up on a repeater.

process_esas_outdial
This function checks the number dialed with the LCR rules, DID mapping, and name server in an ESAS call to validate the call, translate the call, select resources, and determine the call terminator type.

play_one_moment_please
This function plays the "one moment please" voice prompt.

play_ring
This function plays a ring sound prompt.

assign_tdm_rr
This function assigns a tdm slot for a repeater to repeater call.

assign_tdm_rr_ttrunk
This function assigns a tdm slot for a repeater to repeater call that is transmission trunked.

assign_tdm_outdial
This function assigns a tdm slot for an outdial, repeater to telephone line, call.

begin_get_telco
This function searches for a valid telephone line resource.

3 get_telco
This function selects a telephone line resource.

dial_telco
This function dials a number to a telephone line resource.

begin_get_source_repeater
This function searches for a source repeater.

get_source_repeater
This function selects a source repeater.

begin_get_destination_repeater
This function searches for a destination repeater.

get_destination_repeater
This function selects a destination repeater.

INDIAL FUNCTIONS assign_tdm_indial
This function assigns a TDM slot for an indial, telephone line to repeater, call.

check_for_prompt
This function checks to see if an indial prompt needs to be played for a telephone line, and if so it sets the PLAY PROMPT event or otherwise it sets the NO PROMPT event.

process_indial
This function processes indial digits and determines what the destination string is.

play_cc_prompt
This function plays the custom calling prompt.

play_cc_prompt_r
This function plays the custom calling prompt on a repeater.

APPENDIX 4 play_indial_prompt
This function plays the indial prompt.

get_indial_destination
This function gets the destination for an indial number.

VOICE MAIL FUNCTIONS bill_vm
This function generates a voice mail billing record after a voice mail message has been stored for a user.

start_vm_record
This function is called to start a voice mail recording.

play_double_beep
This function plays a double beep prompt.

play_beep
This function plays a beep prompt.

play_vm_greeting
This function plays the user's voice mail greeting.

play_vm_record_prompt
This function plays a voice mail record prompt.

assign_vm_tdm
This function assigns a voice mail TDM slot.

PAGING FUNCTIONS play_page_prompt
This function plays a page prompt.

assign_page_tdm
This function assigns a paging TDM slot.

play_get_page_user

This function play a voice prompt requesting user to be paged on a telephone line.

play_get_page_user_r
This function play a voice prompt requesting user to be paged on a repeater.

process_send_page
This function sends a page.

play_goodbye_prompt
This function plays a "good bye" prompt.

send_page
This function processes a user page. If it is good, it plays the page message, if not, it plays the bad page message.

get_page
This function gets a page prompt from the end user on a telephone line.

VOICE MAIL ADMINISTRATION FUNCTIONS assign_vm_admin_tdm
This function plays the voice mail administration prompt.

play_louder
This functions increases the voice mail message playback volume.

play_softer
This function decreases the voice mail message playback volume.

play_faster
This function increases the speed at which a voice mail message is played back.

play_next
This function decreases the speed at which a voice mail message is played back.

6 play_next

This function plays the next sequential message from a users voice mail message list. If it reaches the end of the list, it plays the first message in the list.

play_previous

This function plays the previous message from a users voice mail message list. IF it reaches the end of the list, it plays the last message.

erase_vm

This function erases the current message from a user's voice mail message list.

record_vm_prompt

This function begins recording a user's voice mail message prompt.

process_user_id

This function validates that digits dialed are a valid user ID and that the ID has voice mail administration permissions.

process_password

This functions verifies that a dialed digit string is the correct password for a voice mail administrator user.

play_bad_password_prompt

This function plays a "bad password" voice prompt.

play_record_vm_prompt

This function plays a "record voice mail" voice prompt.

get_vm_command

This function begins getting voice mail administrator command digits.

process_vm_command

This function is called when a voice mail command is received. It checks the command and classifies the action to be taken.

TELEPHONE CALL FUNCTIONS

7 cleanup_no_answer
This function is called in case a radio fails to answer a call. The ringing radio is stopped, before the call proceeds.

process_no_answer_indial
This function is called after a user fails to answer to see if he had call forward on no answer enabled.

process_no_answer_ltr_telco
This function is called when an LTR telephone call or an ESAS conversation trunked call can not reach the destination before a time out timer expires.

process_no_answer_esas_ctrnk
This function is called when an ESAS full duplex radio that is in queue, can not reach it's destination radio.

get_source_collect_id
This function sends a message to a repeater to get the desired LTR interconnect radio and start a ring message to it.

get_detination_collect_id
This function gets the destination collection ID.

assign_tdm_imp
This function assigns a telephone line to telephone line connection on the TDM bus.

dial_voice_link
This function gets a network voice link between to cells.

ESAS SESSION FUNCTIONS check_for_page
This function checks to see if a radio has a page waiting.

call_transfer_thread
This function transfers a call.

APPENDIX 4 post_process_what
This function is called after a session ends, which had received an ESAS WHAT command.

process_what
This function is called in response to a receiving a WHAT command from a radio. It attempts to reconnect the radio to the intended call, such as a page or voice call.

process_checkin
This function is called when a radio checks into a cell and it checks for any pages or voice mail messages.

post_process_checkin
This function is called at the end of a check-in session and it determines if a voice prompt is needed to properly terminate the call.

process_status
This function is called when a status message is received and it checks to see if there is a page to send to the radio.

play_ready_prompt
This function plays a "ready" voice prompt.

play_dispatch_done
This function plays a "dispatch done" voice prompt.

play_ready_prompt_qrr
This function plays a "ready" voice prompt for a queued repeater to repeater call.

play_dispatch_done_prompt
This function plays a "dispatch done" voice prompt.

play_checkin_prompt
This function plays a check in prompt when a radio checks into a cell.

ESAS FULL DUPLEX FUNCTIONS

9 begin_get_radio
This function sends a contact message to a radio.

get_radio
This function sends a contact message to a radio based on the location supplied from the roaming manager.

NETWORK LINK FUNCTIONS net_dial
This function dials a voice network link command.

dial_ctrnk_radio
This function dials a full duplex radio after a network voice link has been established.

check_net_resources
This functions checks to see if a network link is still active.

begin_net_dwell
This function begins a network dwell timer.

dial_net_ack
This function dials a network voice link acknowledgement.

dial_net_nak
This function dials a network voice link negative acknowledgement.

dial_net_key
This function dials a network link push-to-talk key press.

dial_net_rekey
This function dials a network link push-to-talk key rekey.

dial_net_dekey
This function dials a network link push-to-talk key release.

release_net_repeater

This function releases a repeater used in a completed networked call.

get_net_repeater
This function gets a repeater for a dwelling network call.

get_net_command
This function waits for a voice link command.

process_net_command
This function processes a voice link command.

APPENDIX 4

ESAS™ API Interface Specification

2/93
Version 1.1

Uniden Commercial Communications
Copyright 1993, Uniden America Corporation. All rights reserved.

Appendix 5

1.0 Introduction ........ 1
2.0 API Protocol ........ 2
  2.1 DLE Framing ........ 3
  2.2 HDLC Framing ........ 4
  2.3 Parity ........ 5
  2.4 Modified LAPB Protocol ........ 6
3.0 API Commands ........ 8
  3.1 api_LOG_MESSAGE ........ 9
  3.2 api_ADD_GUEST ........ 10
  3.3 api_REMOVE_GUEST ........ 11
  3.4 api_ADD_TRACKING ........ 12
  3.5 api_REMOVE_TRACKING ........ 13
  3.6 api_ADD_REPEATER ........ 14
  3.7 api_REPEATER_CONFIGURATION ........ 15
  3.8 api_SEND_STATUS ........ 16
  3.9 api_GET_STATUS ........ 17
  3.10 api_LOOP_BACK_TEST ........ 18
  3.11 api_LOOP_BACK_RESULT ........ 19
  3.12 api_CALL_START ........ 20
  3.13 api_CALL_END ........ 21
  3.14 api_CALL_UPDATE ........ 22
  3.15 api_CALL_INVALID ........ 23
  3.16 api_TEMP_ID ........ 24
  3.17 api_RESET ........ 25
  3.18 api_CENSUS ........ 26
  3.19 api_CONTACT ........ 27
  3.20 api_WHERE_IS ........ 28
  3.21 api_SHOW_VERSION ........ 29
  3.22 api_VERSION_IS ........ 30
  3.23 api_DO_SELF_TEST ........ 31
  3.24 api_SELF_TEST_RESULT ........ 32
  3.25 api_PERMITS ........ 33

Appendix 5

Copyright 1993, Uniden America Corporation. All rights reserved.

1.0 Introduction

The purpose of this document is to provide a technical overview of the ESAS™ API interface and to document all currently supported API commands. This document can be used by third party developers to add and extend the system.

The following sections provide a brief overview of the API protocol followed by a description of all API commands.

Appendix 5

Copyright 1993, Uniden America Corporation. All rights reserved.

2.0 API Protocol

The API protocol is based on a modified HDLC LAPB protocol similar to X.25. The lower layers of the protocol are either based on sync or async framing depending on the link type.

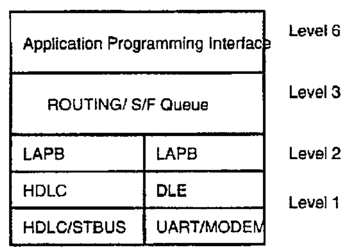

Asysnc framing based on the DLE protocol is used on site to site network links. Up to 8 Level 2 streams are supported by each site.

Sync framing based on the Mitel 8952 Chip set and the Mitel ST-BUS is used on the site to repeater links. Up to 105 level sync level 2 streams are supported by each site.

The following sections briefly describe the level 1 and level 2 protocols. Section 3.0 describes each API command.

Appendix 5

Copyright 1993, Uniden America Corporation. All rights reserved.

2.1 DLE Framing

The DLE framing is used on async lines and is based on the following three control characters:

DLE - Data Link Escape
STX - Start Of Text
ETX - End Of Text

Level 2 frames are then delineated as follows:

[STX][FRAME/PARITY][ETX]

If the level 2 frame contains any of the control characters, they are "escaped" using the DLE character. Therefore a DLE is transmitted as DLE DLE, a STX as DLE STX and an ETX as DLE ETX.

All framing and control characters are removed during the level 1 reception process.

Appendix 5

Copyright 1993, Uniden America Corporation. All rights reserved.

2.2 HDLC Framing

The HDLC framing is used on all synchronous lines and is based on a zero insertion algorithm. The frame is formed by place the flag bit pattern "01111110" at the start and end of the level 2 frame. This bit pattern is then not allowed to occur in the transmitted frame between the initial and trailing flags. To do this a *zero insertion* algorithm inserts a zero at the transmitter after five consecutive ones appear in the api Data Gram. If two frames are transmitted back to back, the trailing flag of the first frame will be used as the starting flags of the next frame.

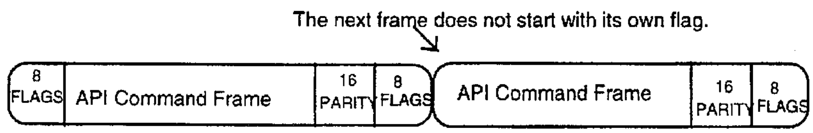

Copyright 1993, Uniden America Corporation. All rights reserved.

2.3 Parity

The parity is formed using CRC-CCITT. CRC-CCITT is based on the generator polynomial $1+X^5+X^{12}+X^{16}$. This CRC will detect single error bursts up to 17 bits long while achieving an error rate of less than 1 in $10^{14}$ bits.

Appendix 5

Copyright 1993, Uniden America Corporation. All rights reserved.

2.4 Modified LAPB Protocol

The following commands are used for level 2 session control. A session must be established for api Data Gram transfers. Once a session is established, as may Data Grams as are available can be transmitted on the same level 2 session.

| Command | Purpose |
|---|---|
| SABM | Set Asynchronous Balanced Mode |
| DISC | Disconnect |
| UA | Unnumbered Acknowledge |
| UI | Unnumbered Information |
| FRMR | Frame Error |
| DM | Disconnect Mode |
| RR | Receiver Ready |
| RNR | Receiver Not Ready |
| REJ | Frame Reject |

The following state diagram can be used to model session control:

| | IDLE | Start Master Stream | Master Stream | End Master Stream | Slave Stream | End Slave Stream | Setup Modem | Disconn ect |
|---|---|---|---|---|---|---|---|---|
| **Start Stream** | Tx SABM/ Start Master Stream | | | | | | | |
| **SABM** | Slave Start/ Slave Stream | Slave Start/ Slave Stream | | | | | | |
| **Start Modem** | Dial Modem/ Setup Modem | | | | | | | |
| **T1** | | Retry/ Start Master Stream | Retry/ Master Stream | Retry/ End Master Stream | Retry/ Slave Stream | | Disconn ect/ Disconn ect | Flush Level 2/ Idle |
| **UA** | | Send Next/ Master Stream | | Disconn ect/ Disconn ect | | | | |
| **Abort** | | Disconne ct/ Disconne ct | Send DISC/ End Master Stream | Disconn ect/ Disconn ect | Send UA/ End Slave Stream | | | |

Appendix 5

Copyright 1993, Uniden America Corporation. All rights reserved.

| | | | | | | | | |
|---|---|---|---|---|---|---|---|---|
| **I** | | | got_i/ Master Stream | | Got i/ Slave Stream | | | |
| **RR** | | | got RR/ Master Stream | | Send Next/ Slave Stream | | | |
| **NO MORE** | | | Send DISC/ End Master Stream | | Send RR/ Slave Stream | | | |
| **REJ** | | | | Retry/ End Master Stream | Retry/ Slave Stream | | | |
| **DISC** | | | | | Send UA/ End Slave Stream | | | |
| **EMPTY** | | | | | Disconnect/ Disconnect | | | Flush Level 2/ Idle |
| **Connect** | | | | | | | Setup Delay/ Setup Modem | |
| **TOT** | | | | | | | Send SABM/ Start Master Stream | Reset Modem/ Disconnect |

Appendix 5

Copyright 1993, Uniden America Corporation. All rights reserved.

3.0 API Commands

The following sections briefly describe each API command.

Appendix 5

Copyright 1993, Uniden America Corporation. All rights reserved.

3.1 api_LOG_MESSAGE

This command is sent to log a message with the destination system's diagnostic expert system. The type field can by any one of the following message types :

```
#define ERROR_MSG     0
#define INFO_MSG      1
#define ALERT_MSG     2
#define L2_MSG        3
#define L7_MSG        4
#define L3_MSG        5
```

The message field can be any ASCII coded string.

```
struct DATA_GRAM {
        /* Level 1 Adds Framing and CRC */
        /* Level 3 Info */
        int32u level_3_source;
        int32u level_3_destination;
        int8u  hop_count;
        /* Level 2 Info */
        int8u  control;
        /* API Info */
        int32u source_id;
        int32u destination_id;
        int8u  api_command;
        int8u  priority;
        int16u timer;

        struct API_LOG_MESSAGE {
                int8u  type;
                int8u  message[L2_N1-1] log_message;
        };
};
```

Appendix 5

Copyright 1993, Uniden America Corporation. All rights reserved.

3.2 api_ADD_GUEST

This command is typically sent from a repeater to its host site controller to register a new guest in the site controllers local guest table. This command is sent in response to an "check in." sequence.

```
struct DATA_GRAM {
        /* Level 1 Adds Framing and CRC */
        /* Level 3 Info */
        int32u level_3_source;
        int32u level_3_destination;
        int8u  hop_count;
        /* Level 2 Info */
        int8u  control;
        /* API Info */
        int32u source_id;
        int32u destination_id;
        int8u  api_command;
        int8u  priority;
        int16u timer;

        struct API_ADD_GUEST {
                int8u  count;
                int8u  host_repeater;
                int8u  trunk_group;
                int32u permits;
        } add_guest;
};
```

Appendix 5

Copyright 1993, Uniden America Corporation. All rights reserved.

3.3 api_REMOVE_GUEST

This command is typically sent from a repeater to its host site controller to log out a current guest in the system. This command is sent in response to an "check out" sequence.

```
struct DATA_GRAM {
        /* Level 1 Adds Framing and CRC */
        /* Level 3 Info */
        int32u level_3_source;
        int32u level_3_destination;
        int8u  hop_count;
        /* Level 2 Info */
        int8u  control;
        /* API Info */
        int32u source_id;
        int32u destination_id;
        int8u  api_command;
        int8u  priority;
        int16u timer;

        struct API_REMOVE_GUEST {
                int8u  count;
        } remove_guest;
};
```

Appendix 5

Copyright 1993, Uniden America Corporation. All rights reserved.

3.4 api_ADD_TRACKING

This command is sent by some "source" device to some "destination" device on the network. When received by the destination device, the location of the radio specified by the command is added to the device's local location tracking table. In some cases, this command may trigger the destination device to send additional tracking messages of its own.

```
struct DATA_GRAM {
        /* Level 1 Adds Framing and CRC */
        /* Level 3 Info */
        int32u level_3_source;
        int32u level_3_destination;
        int8u  hop_count;
        /* Level 2 Info */
        int8u  control;
        /* API Info */
        int32u source_id;
        int32u destination_id;
        int8u  api_command;
        int8u  priority;
        int16u timer;

        struct API_ADD_TRACKING {
                int8u  count;
                int32u        location;
                int32u        masked_permits;
        } add_tracking;
};
```

Appendix 5

Copyright 1993, Uniden America Corporation. All rights reserved.

3.5 api_REMOVE_TRACKING

This command is sent by some "source" device to some "destination" device on the network. When received by the destination device, the location of the radio specified by the command is removed from the device's local location tracking table. In some cases, this command may trigger the destination device to end additional tracking messages of its own.

```
struct DATA_GRAM {
        /* Level 1 Adds Framing and CRC */
        /* Level 3 Info */
        int32u level_3_source;
        int32u level_3_destination;
        int8u  hop_count;
        /* Level 2 Info */
        int8u  control;
        /* API Info */
        int32u source_id;
        int32u destination_id;
        int8u  api_command;
        int8u  priority;
        int16u timer;

        struct API_REMOVE_TRACKING {
                int8u  count;
        } remove_tracking;
};
```

Appendix 5

Copyright 1993, Uniden America Corporation. All rights reserved.

3.6 api_ADD_REPEATER

This command is sent from a repeater to its host site controller to add the repeater to the controller's resource list and to request configuration information. When a site controller receives this command, it will typically respond by sending an api_REPEATER_CONFIGURATION command back to the device within 5 seconds.

The repeater ID field is used to logically identify the repeater hardware sending the command.

```
struct DATA_GRAM {
        /* Level 1 Adds Framing and CRC */
        /* Level 3 Info */
        int32u level_3_source;
        int32u level_3_destination;
        int8u  hop_count;
        /* Level 2 Info */
        int8u  control;
        /* API Info */
        int32u source_id;
        int32u destination_id;
        int8u  api_command;
        int8u  priority;
        int16u timer;

        struct API_ADD_REPEATER {
                int16u repeater_id;
                int32u test_results;
                int8u  version_major;
                int8u  version_minor;
        } add_repeater;
};
```

Appendix 5

Copyright 1993, Uniden America Corporation. All rights reserved.

3.7 api_REPEATER_CONFIGURATION

This command is typically sent in response to a api_ADD_REPEATER command from a site controller to a connected repeater. This command can be sent to the repeater at any time to change its configuration parameters.

```
struct DATA_GRAM {
	/* Level 1 Adds Framing and CRC */
	/* Level 3 Info */
	int32u level_3_source;
	int32u level_3_destination;
	int8u  hop_count;
	/* Level 2 Info */
	int8u  control;
	/* API Info */
	int32u source_id;
	int32u destination_id;
	int8u  api_command;
	int8u  priority;
	int16u timer;

	struct API_REPEATER_CONFIGURATION {
		int16u repeater_id;
		int8u  signaling;
		int8u  station_id_enabled; /* 'Y' = enabled  'N' = disabled */
		int8u station_id[MAX_STATION_ID+1];
		int16u station_id_time; /* in seconds */
		int32u cell_id;
		int8u  area;
		int16u home_repeater;
		int16u trunk_group;
		int8u  indial_enabled;
		int32u transmit_frequency;
		int8u  companding_enabled;
		int8u  transmit_filter_gain;
		int8u  transmit_digital_gain;
		int16u first_digit_time;
		int16u next_digit_time;
		int16u idle_message_time;
	} repeater_configuration;

};
```

Appendix 5

Copyright 1993, Uniden America Corporation. All rights reserved.

3.8 api_SEND_STATUS

This command can be sent by any device to cause a status message to be transmitted to a destination ID. The format of the status message is as specified in the protocol specification.

```
struct DATA_GRAM {
        /* Level 1 Adds Framing and CRC */
        /* Level 3 Info */
        int32u level_3_source;
        int32u level_3_destination;
        int8u  hop_count;
        /* Level 2 Info */
        int8u  control;
        /* API Info */
        int32u source_id;
        int32u destination_id;
        int8u  api_command;
        int8u  priority;
        int16u timer;

        struct API_SEND_STATUS {
                int8u  digits[L2_N1-1]; /* null terminated string */
        } send_status;
};
```

Appendix 5

Copyright 1993, Uniden America Corporation. All rights reserved.

3.9 api_GET_STATUS

This command can be sent from any device to any other device to poll for the next status message associated with a particular destination ID. If another status message exists, then the destination device will respond with an api_SEND_STATUS command contain the status message.

```
struct DATA_GRAM {
        /* Level 1 Adds Framing and CRC */
        /* Level 3 Info */
        int32u level_3_source;
        int32u level_3_destination;
        int8u  hop_count;
        /* Level 2 Info */
        int8u  control;
        /* API Info */
        int32u source_id;
        int32u destination_id;
        int8u  api_command;
        int8u  priority;
        int16u timer;
};
```

Appendix 5

Copyright 1993, Uniden America Corporation. All rights reserved.

3.10 api_LOOP_BACK_TEST

This command can by sent from any source device to any destination device to conduct a "loop back test" of the communications facilities between the devices. When a device receives this command, it will respond with an api_LOOP_BACK_RESULT command. The message field of this command can contain any arbitrary information. This information will be returned in the api_LOOP_BACK_RESULT command.

```
struct DATA_GRAM {
        /* Level 1 Adds Framing and CRC */
        /* Level 3 Info */
        int32u level_3_source;
        int32u level_3_destination;
        int8u   hop_count;
        /* Level 2 Info */
        int8u   control;
        /* API Info */
        int32u source_id;
        int32u destination_id;
        int8u   api_command;
        int8u   priority;
        int16u timer;

        int8u api_data[L2_N1];};
```

Appendix 5

Copyright 1993, Uniden America Corporation. All rights reserved.

3.11 api_LOOP_BACK_RESULT

This command is sent in response to an api_LOOP_BACK_TEST command. The message field of the api_LOOP_BACK_TEST command is copied to the message field of this command and returned to the source of the api_LOOP_BACK_TEST command.

```
struct DATA_GRAM {
        /* Level 1 Adds Framing and CRC */
        /* Level 3 Info */
        int32u level_3_source;
        int32u level_3_destination;
        int8u   hop_count;
        /* Level 2 Info */
        int8u   control;
        /* API Info */
        int32u source_id;
        int32u destination_id;
        int8u   api_command;
        int8u   priority;
        int16u timer;

        int8u api_data[L2_N1];};
```

Appendix 5

Copyright 1993, Uniden America Corporation. All rights reserved.

3.12 api_CALL_START

This command is sent from a repeater to the site controller or from a site controller to the repeater to indicate the beginning of a new call. The type field indicates the type of call and the ID of the caller is in the source_id field of the data gram.

```
struct DATA_GRAM {
	/* Level 1 Adds Framing and CRC */
	/* Level 3 Info */
	int32u level_3_source;
	int32u level_3_destination;
	int8u  hop_count;
	/* Level 2 Info */
	int8u  control;
	/* API Info */
	int32u source_id;
	int32u destination_id;
	int8u  api_command;
	int8u  priority;
	int16u timer;

	struct API_CALL_START {
		int8u  type;
	} call_start;
};
```

Copyright 1993, Uniden America Corporation. All rights reserved.

3.13 api_CALL_END

This command is sent from a repeater to the site controller or from a site controller to the repeater to indicate the end of an ongoing call. The result code field indicates the reason for terminating the call.

```
struct DATA_GRAM {
        /* Level 1 Adds Framing and CRC */
        /* Level 3 Info */
        int32u level_3_source;
        int32u level_3_destination;
        int8u   hop_count;
        /* Level 2 Info */
        int8u   control;
        /* API Info */
        int32u source_id;
        int32u destination_id;
        int8u   api_command;
        int8u   priority;
        int16u timer;

        struct API_CALL_END {
                int8u   status;
        } call_end;
};
```

Appendix 5

Copyright 1993, Uniden America Corporation. All rights reserved.

3.14 api_CALL_UPDATE

This command is sent from a repeater to the site controller to update call information. The status field indicates if the api_CALL_UPDATE command contains valid "digits_dialed" information or not. This command may optionally supply the source radio UID in the source_id field of the data gram.

```
struct DATA_GRAM {
        /* Level 1 Adds Framing and CRC */
        /* Level 3 Info */
        int32u level_3_source;
        int32u level_3_destination;
        int8u  hop_count;
        /* Level 2 Info */
        int8u  control;
        /* API Info */
        int32u source_id;
        int32u destination_id;
        int8u  api_command;
        int8u  priority;
        int16u timer;

        struct API_CALL_UPDATE {
                int8u  status;
                int8u  digits_dialed[L2_N1-1]; /* null terminated string */
        } call_update;
};
```

Appendix 5

Copyright 1993, Uniden America Corporation. All rights reserved.

3.15 api_CALL_INVALID

This command is sent from the site controller to a repeater to indicate that the ongoing call on that channel is invalid. Depending on the type of call being processed, this command will have different results (ie., for dispatch, the repeat audio is disabled, for interconnect the call is terminated, etc.)

```
struct DATA_GRAM {
        /* Level 1 Adds Framing and CRC */
        /* Level 3 Info */
        int32u level_3_source;
        int32u level_3_destination;
        int8u   hop_count;
        /* Level 2 Info */
        int8u   control;
        /* API Info */
        int32u source_id;
        int32u destination_id;
        int8u   api_command;
        int8u   priority;
        int16u timer;

        struct API_CALL_INVALID {
                int32u reason;
        } call_invalid;
};
```

Appendix 5

Copyright 1993, Uniden America Corporation. All rights reserved.

3.16 api_TEMP_ID

This command is sent from the site controller to the repeater to instruct the repeater to relay a temporary ID assignment to the radio it is currently in contact with.

```
struct DATA_GRAM {
        /* Level 1 Adds Framing and CRC */
        /* Level 3 Info */
        int32u level_3_source;
        int32u level_3_destination;
        int8u  hop_count;
        /* Level 2 Info */
        int8u  control;
        /* API Info */
        int32u source_id;
        int32u destination_id;
        int8u  api_command;
        int8u  priority;
        int16u timer;

        struct API_TEMP_ID {
                int8u  temp_home;
                int8u  temp_id;
                int8u  queue_time;
                int8u  compand_enabled;
                int8u  half_full;
        } temp_id;
};
```

Appendix 5

Copyright 1993, Uniden America Corporation. All rights reserved.

3.17 api_RESET

This command can be sent to any device in the network to force a software and or hardware reset. When a device receives this command, it will shut down all current processes and perform the reset as commanded.

```
struct DATA_GRAM {
	/* Level 1 Adds Framing and CRC */
	/* Level 3 Info */
	int32u level_3_source;
	int32u level_3_destination;
	int8u  hop_count;
	/* Level 2 Info */
	int8u  control;
	/* API Info */
	int32u source_id;
	int32u destination_id;
	int8u  api_command;
	int8u  priority;
	int16u timer;

	struct API_RESET {
		int32u reason;
	} reset;
};
```

Appendix 5

Copyright 1993, Uniden America Corporation. All rights reserved.

3.18 api_CENSUS

The api_CENSUS command is sent from the site controller to a repeater to instruct the repeater to send out a census poll to all radio's homed on that channel. When a radio hears an CENSUS command, it will respond by going into roam mode.

```
struct DATA_GRAM {
        /* Level 1 Adds Framing and CRC */
        /* Level 3 Info */
        int32u level_3_source;
        int32u level_3_destination;
        int8u  hop_count;
        /* Level 2 Info */
        int8u  control;
        /* API Info */
        int32u source_id;
        int32u destination_id;
        int8u  api_command;
        int8u  priority;
        int16u timer;
};
```

Appendix 5

Copyright 1993, Uniden America Corporation. All rights reserved.

3.19 api_CONTACT

This command is sent from the site controller to the repeater to request that a HEY_YOU command be sent out. When a radio hears this command it will respond with a WHAT session at which time the site controller may send additional information to the radio being contacted.

```
struct DATA_GRAM {
        /* Level 1 Adds Framing and CRC */
        /* Level 3 Info */
        int32u level_3_source;
        int32u level_3_destination;
        int8u   hop_count;
        /* Level 2 Info */
        int8u   control;
        /* API Info */
        int32u source_id;
        int32u destination_id;
        int8u   api_command;
        int8u   priority;
        int16u timer;
};
```

Appendix 5

Copyright 1993, Uniden America Corporation. All rights reserved.

3.20 api_WHERE_IS

This command can be sent from any device to any site controller in the network to determine where a radio is located. When a site receives this command it will respond with a api_ADD_TRACKING command. If the location of the radio is unknown to the cell, then the "count" field of the api_ADD_TRACKING command will be set to "0".

```
struct DATA_GRAM {
        /* Level 1 Adds Framing and CRC */
        /* Level 3 Info */
        int32u level_3_source;
        int32u level_3_destination;
        int8u  hop_count;
        /* Level 2 Info */
        int8u  control;
        /* API Info */
        int32u source_id;
        int32u destination_id;
        int8u  api_command;
        int8u  priority;
        int16u timer;
};
```

Appendix 5

Copyright 1993, Uniden America Corporation. All rights reserved.

3.21 api_SHOW_VERSION

This command can be sent to any device on the network to request its current firmware version number. When a device receives this command, it will respond by sending an api_VERSION _IS command indicating its current version number.

```
struct DATA_GRAM {
        /* Level 1 Adds Framing and CRC */
        /* Level 3 Info */
        int32u level_3_source;
        int32u level_3_destination;
        int8u  hop_count;
        /* Level 2 Info */
        int8u  control;
        /* API Info */
        int32u source_id;
        int32u destination_id;
        int8u  api_command;
        int8u  priority;
        int16u timer;
};
```

Copyright 1993, Uniden America Corporation. All rights reserved.

3.22 api_VERSION_IS

This command is sent in response to an api_SHOW_VERSION command. The software version number is shown as a "major" and "minor" version number.

```
struct DATA_GRAM {
	/* Level 1 Adds Framing and CRC */
	/* Level 3 Info */
	int32u level_3_source;
	int32u level_3_destination;
	int8u  hop_count;
	/* Level 2 Info */
	int8u  control;
	/* API Info */
	int32u source_id;
	int32u destination_id;
	int8u  api_command;
	int8u  priority;
	int16u timer;

	struct API_VERSION_IS {
		int8u  version_major;
		int8u  version_minor;
	} version_is;
};
```

Copyright 1993, Uniden America Corporation. All rights reserved.

3.23 api_DO_SELF_TEST

This command can be sent to any device on the network to instruct that device to perform a self test. The test type indicates what level of testing should be conducted and varies depending on the device type. After completing a self test, the device should send the results using the command api_SELF_TEST_RESULT.

```
struct DATA_GRAM {
        /* Level 1 Adds Framing and CRC */
        /* Level 3 Info */
        int32u level_3_source;
        int32u level_3_destination;
        int8u   hop_count;
        /* Level 2 Info */
        int8u   control;
        /* API Info */
        int32u source_id;
        int32u destination_id;
        int8u   api_command;
        int8u   priority;
        int16u timer;

        struct API_DO_SELF_TEST {
                int32u reason;
        } do_self_test;
};
```

Appendix 5

Copyright 1993, Uniden America Corporation. All rights reserved.

3.24 api_SELF_TEST_RESULT

This command is sent in response to an api_SELF_TEST command. It is used to indicate the results of the tests conducted by the device. An all zero value indicates that all tests where passed. The definition of non-zero results is device dependent.

```
struct DATA_GRAM {
        /* Level 1 Adds Framing and CRC */
        /* Level 3 Info */
        int32u level_3_source;
        int32u level_3_destination;
        int8u  hop_count;
        /* Level 2 Info */
        int8u  control;
        /* API Info */
        int32u source_id;
        int32u destination_id;
        int8u  api_command;
        int8u  priority;
        int16u timer;

        struct API_SELF_TEST_RESULT {
                int32u test_results;
        } self_test_result;
};
```

Copyright 1993, Uniden America Corporation. All rights reserved.

3.25 api_PERMITS

This command is sent in response to an api_ADD_GUEST command.

```
struct DATA_GRAM {
        /* Level 1 Adds Framing and CRC */
        /* Level 3 Info */
        int32u level_3_source;
        int32u level_3_destination;
        int8u  hop_count;
        /* Level 2 Info */
        int8u  control;
        /* API Info */
        int32u source_id;
        int32u destination_id;
        int8u  api_command;
        int8u  priority;
        int16u timer;

        struct API_PERMITS {
                int32u permits;
                int8u  roam_indicator;
                int8u  status;
        } permitst;
};
```

Appendix 5

Copyright 1993, Uniden America Corporation. All rights reserved.

API Command Usage

Appendix 5

Copyright 1993, Uniden America Corporation. All rights reserved.

| • Command | Description | Repeater To Switch | Switch To Repeater | Switch To Switch |
|---|---|---|---|---|
| api_LOG_MESSAGE | Send text to info log application and diagnostic expert system. | Y | Y | Y |
| api_ADD_GUEST | Add a radio to the guest table | Y | N | N |
| api_REMOVE_GUEST | Remove a radio from the guest table | Y | N | N |
| api_ADD_TRACKING | Add an entry to tracking table | N | N | Y |
| api_REMOVE_TRACKING | Remove an entry from tracking table | N | N | Y |
| api_ADD_REPEATER | Add a new repeater to resource list and request initialization information | Y | N | N |
| api_REPEATER_CONFIGURATIO N | Repeater configuration information | | Y | N |
| api_SEND_STATUS | Send status message | Y | Y | Y |
| api_GET_STATUS | Get next status message for a specified destination | Y | N | Y |
| api_LOOP_BACK_TEST | Destination device should loop this message back to source device | Y | Y | Y |
| api_LOOP_BACK_RESULT | Result of a LOOP BACK TEST command | Y | Y | Y |
| api_CALL_START | Start of a call | Y | Y | N |
| api_CALL_END | End of a call | Y | Y | N |
| api_CALL_UPDATE | Update call information | Y | Y | N |
| api_CALL_INVALID | Invalidate a call | N | Y | N |
| api_TEMP_ID | Send Temp ID | N | Y | N |
| api_RESET | Reset destination application | Y | Y | Y |
| api_CENSUS | Do census hosted radios | N | Y | Y |
| api_CONTACT | Contact a radio | N | Y | N |
| api_WHERE_IS | Determine the location of a radio | N | N | Y |
| api_SHOW_VERSION | Request application version number | N | Y | Y |
| api_VERSION_IS | Application version number | Y | Y | Y |
| api_SELF_TEST | Request self test | N | Y | Y |
| api_TEST_RESULTS | Results of a self test | Y | N | Y |
| api_PERMITS | Permits for a guest radio | N | Y | N |

Appendix 5

Copyright 1993, Uniden America Corporation. All rights reserved.

API Command Data Structures

Appendix 5

Copyright 1993, Uniden America Corporation. All rights reserved.

Defined Constants

```
/* level 1 Framing */
#define STX 2
#define ETX 3
#define DLE 16

/* Level 2 Opcodes */
#define op_SABM        0x3f  /* Set Asynchronous Balanced Mode */
#define op_DISC        0x53  /* Disconnect */
#define op_UA          0x63  /* Unnumbered Acknowledge */
#define op_UI          0x03  /* Unnumbered Information */
#define op_FRMR        0x87  /* Frame Error */
#define op_DM          0x0f  /* Disconnect Mode */
#define op_RR          0x01  /* Receiver Ready */
#define op_RNR         0x05  /* Receiver Not Ready */
#define op_REJ         0x09  /* Reject */

#define L2_T1                              4
#define L2_N1                              256
#define L2_N2                              3

#define DATA_GRAM_OVERHEAD                 10
#define API_OVERHEAD                       12

#define api_LOG_MESSAGE                    0
#define api_CALL_START                     1
#define api_CALL_UPDATE                    2
#define api_CALL_END                       3
#define api_ADD_GUEST                      4
#define api_ADD_TRACKING                   5
#define api_REMOVE_GUEST                   6
#define api_REMOVE_TRACKING                7
#define api_SEND_STATUS                    8
#define api_GET_STATUS                     9
#define      api_LOOP_BACK_TEST            10
#define api_LOOP_BACK_RESULT               11
#define api_ADD_REPEATER                   12
#define api_REPEATER_CONFIGURATION         13
#define api_CALL_INVALID                   14
#define api_TEMP_ID                        15
#define api_RESET                          16
#define api_CENSUS                         17
#define api_CONTACT                        18
#define api_WHERE_IS                       19
#define api_SHOW_VERSION                   20
#define api_VERSION_IS                     21
```

Copyright 1993, Uniden America Corporation. All rights reserved.

Appendix 5

```
#define api_DO_SELF_TEST        22
#define api_SELF_TEST_RESULT    23
#define api_PERMITS             24
```

Appendix 5

Copyright 1993, Uniden America Corporation. All rights reserved.

API Defined Types

```
typedef unsigned long     int32u;
typedef long              int32;
typedef unsigned char     int8u;
typedef char              int8;
typedef unsigned int      int16u;
typedef int               int16;
```

Appendix 5

Copyright 1993, Uniden America Corporation. All rights reserved.

API Data Gram Structure Definition

```
struct DATA_GRAM {
        /* Level 1 Adds Framing and CRC */
        /* Level 3 Info */
        int32u level_3_source;
        int32u level_3_destination;
        int8u  hop_count;
        /* Level 2 Info */
        int8u  control;
        /* API Info */
        int32u source_id;
        int32u destination_id;
        int8u  api_command;
        int8u  priority;
        int16u timer;

        union {
                struct API_LOG_MESSAGE log_message;
                struct API_CALL_START call_start;
                struct API_CALL_UPDATE call_update;
                struct API_CALL_END call_end;
                struct API_ADD_GUEST add_guest;
                struct API_ADD_TRACKING add_tracking;
                struct API_REMOVE_GUEST remove_guest;
                struct API_REMOVE_TRACKING remove_tracking;
                struct API_SEND_STATUS send_status;
                struct API_ADD_REPEATER add_repeater;
                struct API_REPEATER_CONFIGURATION repeater_configuration;
                struct API_CALL_INVALID call_invalid;
                struct API_TEMP_ID temp_id;
                struct API_RESET reset;
                struct API_VERSION_IS version_is;
                struct API_TEST_RESULT test_result;
                int8u  api_data[L2_N1];
                } data;
};
```

Copyright 1993, Uniden America Corporation. All rights reserved.

API Data Gram Data Field Structures

| Command | Data Structure |
|---|---|
| api_LOG_MESSAGE | struct API_LOG_MESSAGE {<br>int8u type;<br>int8u message[L2_N1-1];<br>}; |
| api_CALL_START | struct API_CALL_START {<br>int8u type;<br>}; |
| api_CALL_UPDATE | struct API_CALL_UPDATE {<br>int8u status;<br>int8u digits_dialed[L2_N1-1];<br>}; |
| api_CALL_END | struct API_CALL_END {<br>int8u status;<br>}; |
| api_ADD_GUEST | struct API_ADD_GUEST {<br>int8u count;<br>int8u host_repeater;<br>int8u trunk_group;<br>int32u permits;<br>}; |
| api_ADD_TRACKING | struct API_ADD_TRACKING {<br>int8u count;<br>int32u location;<br>int32u masked_permits;<br>}; |
| api_REMOVE_GUEST | struct API_REMOVE_GUEST {<br>int8u count;<br>}; |
| api_REMOVE_TRACKING | struct API_REMOVE_TRACKING {<br>int8u count;<br>}; |

Appendix 5

Copyright 1993, Uniden America Corporation. All rights reserved.

| | |
|---|---|
| api_SEND_STATUS | struct API_SEND_STATUS {<br>int8u digits[L2_N1-1];<br>}; |
| api_ADD_REPEATER | struct API_ADD_REPEATER {<br>int16u repeater_id;<br>int32u test_results;<br>int8u version_major;<br>int8u version_minor;<br>}; |
| api_REPEATER_CONFIGURATION | struct<br>API_REPEATER_CONFIGURATION {<br>int16u repeater_id;<br>int8u signaling;<br>int8u station_id_enabled;<br>int8u<br>station_id[MAX_STATION_ID+1];<br>int16u station_id_time;<br>int8u area;<br>int16u home_repeater;<br>int16u trunk_group;<br>int8u indial_enabled;<br>int32u transmit_frequency;<br>int8u companding_enabled;<br>int8u transmit_filter_gain;<br>int8u transmit_digital_gain;<br>int16u first_digit_time;<br>int16u next_digit_time;<br>int16u idle_time;<br>}; |
| api_GET_STATUS | |
| api_LOOP_BACK_TEST | int8u api_data[L2_N1]; |
| api_LOOP_BACK_RESULT | int8u api_data[L2_N1]; |
| api_CALL_INVALID | struct API_CALL_INVALID {<br>int32u reason;<br>}; |

Appendix 5

Copyright 1993, Uniden America Corporation. All rights reserved.

| | |
|---|---|
| api_TEMP_ID | struct API_TEMP_ID {<br>int8u temp_home;<br>int8u temp_id;<br>int8u queue_time;<br>int8u compand_enabled;<br>int8u full_half;<br>}; |
| api_RESET | struct API_RESET {<br>int32u reason;<br>}; |
| api_CENSUS | |
| api_CONTACT | |
| api_WHERE_IS | |
| api_SHOW_VERSION | |
| api_VERSION_IS | struct API_VERSION_IS {<br>int8u version_major;<br>int8u version_minor;<br>}; |
| api_DO_SELF_TEST | struct API_DO_SELF_TEST {<br>int32u reason;<br>}; |
| api_SELF_TEST_RESULTS | struct API_SELF_TEST_RESULT {<br>int32u test_results;<br>}; |
| api_PERMITS | struct API_PERMITS {<br>int32u permits;<br>int8u roam_indicator;<br>int8u status;<br>}; |

Appendix 5

Copyright 1993, Uniden America Corporation. All rights reserved.

I claim:

1. A method for preventing unauthorized use of communication equipment in a land mobile radio system which has a cell with a plurality of repeaters, each repeater having a transmitter and a receiver, the method comprising the steps of:

receiving at a repeater receiver in the cell a first identification code transmitted by a first radio, after receipt of said first identification code from said first radio, establishing a link between said repeater receiver and its corresponding transmitter to set up a retransmission channel, starting a timer following receipt of said first identification code from said first radio, said timer having a predetermined time-out period, and terminating said link if a second identification code is not received from said first radio before said timer completes said predetermined time-out period.

2. A method for preventing unauthorized use of communication equipment in a land mobile radio system which has a cell with a plurality of repeaters, each repeater having a transmitter and a receiver, the method comprising the steps of:

receiving at a repeater receiver in the cell a first identification code transmitted by a first radio, after receipt of said first identification code from said first radio, establishing a link between said repeater receiver and its corresponding transmitter to set up a retransmission channel, starting a timer following receipt of said first identification code from said first radio, said timer having a predetermined time-out period, and stopping said timer if a second identification code is received from said first radio before said timer completes said predetermined time-out period.

* * * * *

UNITED STATES PATENT AND TRADEMARK OFFICE

CERTIFICATE OF CORRECTION

PATENT NO. : 5,625,870

DATED : April 29, 1997

INVENTOR(S) : Billy G. Moon

It is certified that error appears in the above-indentified patent and that said Letters Patent is hereby corrected as shown below:

Col. 1, line 60, change "single" to --signal--.

Col. 5, line 21, change "normals" to --numbers--.

Signed and Sealed this

Twenty-first Day of April, 1998

*Attest:*

Bruce Lehman

BRUCE LEHMAN

*Attesting Officer*

*Commissioner of Patents and Trademarks*